(12) United States Patent
Nishio et al.

(10) Patent No.: US 7,426,883 B2
(45) Date of Patent: Sep. 23, 2008

(54) SUBSTRATE-CUTTING SYSTEM, SUBSTRATE-PRODUCING APPARATUS, SUBSTRATE-SCRIBING METHOD, AND SUBSTRATE-CUTTING METHOD

(76) Inventors: Yoshitaka Nishio, c/o Mitsuboshi Diamond Industrial Co., Ltd., 2-12-12, Minami-Kaneden, Sulta-City, Osaka 564-0044 (JP); Yasutomo Okajima, c/o Mitsuboshi Diamond Industrial Co., Ltd., 2-12-12, Minami-Kaneden, Sulta-City, Osaka 564-0044 (JP); Yukio Oshima, c/o Mitsuboshi Diamond Industrial Co., Ltd., 2-12-12, Minami-Kaneden, Sulta-City, Osaka 564-0044 (JP); Hiroyuki Onari, c/o Mitsuboshi Diamond Industrial Co., Ltd., 2-12-12, Minami-Kaneden, Sulta-City, Osaka 564-0044 (JP); Kazuhiro Yoshimoto, c/o Mitsubishi Diamond Industrial Co., Ltd., 2-12-12, Minami-Kaneden, Sulta-City, Osaka 564-0044 (JP)

( * ) Notice: Subject to any disclaimer, the term of this patent is extended or adjusted under 35 U.S.C. 154(b) by 347 days.

(21) Appl. No.: 10/535,871

(22) PCT Filed: Sep. 24, 2003

(86) PCT No.: PCT/JP03/12182

§ 371 (c)(1), (2), (4) Date: Oct. 31, 2005

(87) PCT Pub. No.: WO2004/048057

PCT Pub. Date: Jun. 10, 2004

(65) Prior Publication Data
US 2006/0137504 A1 Jun. 29, 2006

(30) Foreign Application Priority Data
Nov. 22, 2002 (JP) ............................. 2002-340054

(51) Int. Cl.
B28D 5/04 (2006.01)
B26D 3/08 (2006.01)
(52) U.S. Cl. ............................. 83/435; 83/271; 83/885; 225/96; 198/606
(58) Field of Classification Search .................. 83/271, 83/434, 435, 879, 882, 885; 198/606, 626.3; 248/128; 225/96
See application file for complete search history.

(56) References Cited

U.S. PATENT DOCUMENTS

RE9,060 E  *  1/1880 Damant ...................... 425/298
(Continued)

FOREIGN PATENT DOCUMENTS

JP          9-188534 A      7/1997
(Continued)

OTHER PUBLICATIONS

International Search Report for corresponding Application No. PCT/JP2003/012182, mailed Jan. 20, 2004.

*Primary Examiner*—Boyer D. Ashley
*Assistant Examiner*—Edward Landrum
(74) *Attorney, Agent, or Firm*—Renner, Otto, Boisselle & Sklar, LLP

(57) ABSTRACT

A clamping device (50) is installed on a stand (10) with a hollow rectangular parallelepiped shape such that at least one place at a side edge portion of a mother board transported in the stand (10) is clamped. A pair of substrate-cutting devices for cutting the mother substrate, clamped by the clamping device (50), from its upper face and lower face is provided on a scribing device guide body (30). The scribing device guide body (30) is reciprocally movable along one side of the hollow rectangular parallelepiped. The pair of substrate-cutting devices is installed so as to be movable along the direction perpendicular to the movement direction of the scribing device guide body (30). The mother substrate clamped by the clamping device is supported by a substrate-supporting device (20).

18 Claims, 78 Drawing Sheets

FOREIGN PATENT DOCUMENTS

| | | |
|---|---|---|
| JP | 2000-247669 A | 9/2000 |
| JP | 2001-176820 A | 6/2001 |
| JP | 2001-206727 | 7/2001 |
| JP | 2001-240421 A | 9/2001 |
| JP | 2002-47024 A | 2/2002 |
| JP | 2002-224872 A | 8/2002 |

| | | |
|---|---|---|
| WO | 02/057192 A1 | 7/2002 |

U.S. PATENT DOCUMENTS

| | | | |
|---|---|---|---|
| 4,736,661 A * | 4/1988 | Shirai | 83/882 |
| 6,774,978 B2 * | 8/2004 | Shin | 349/187 |

* cited by examiner

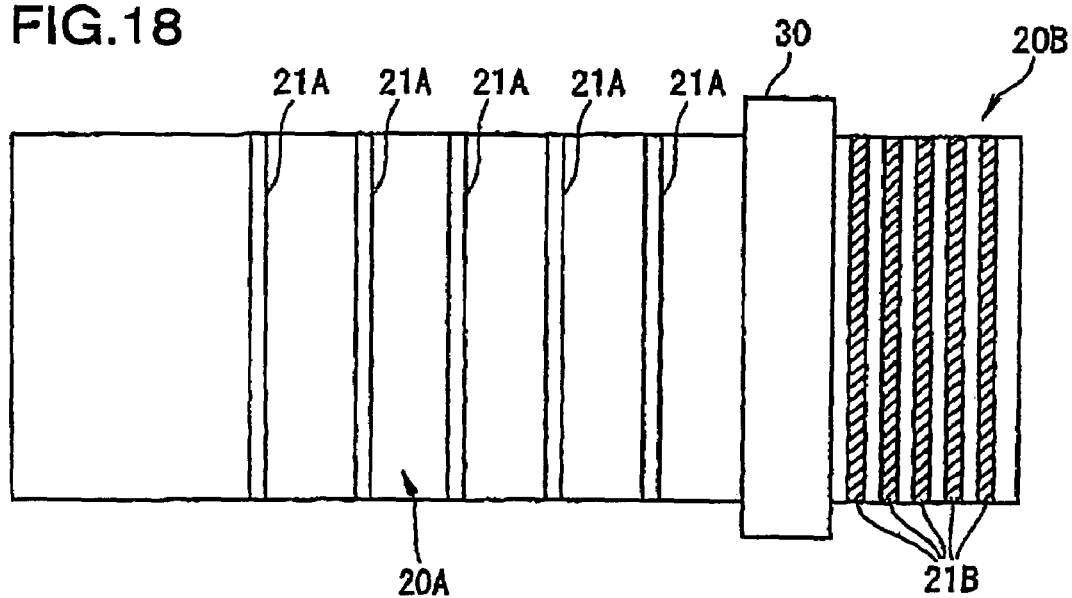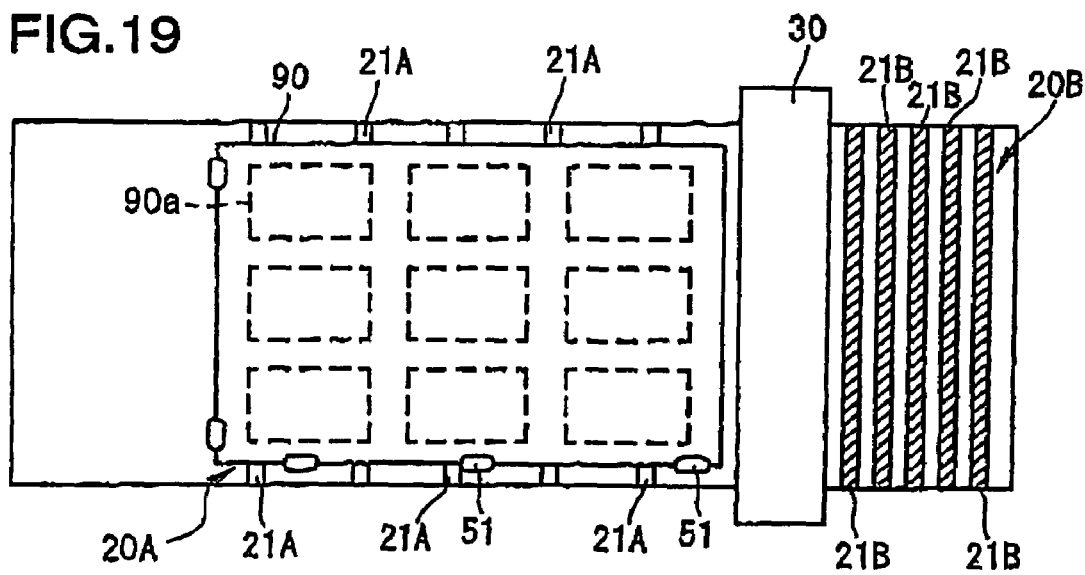

FIG.25
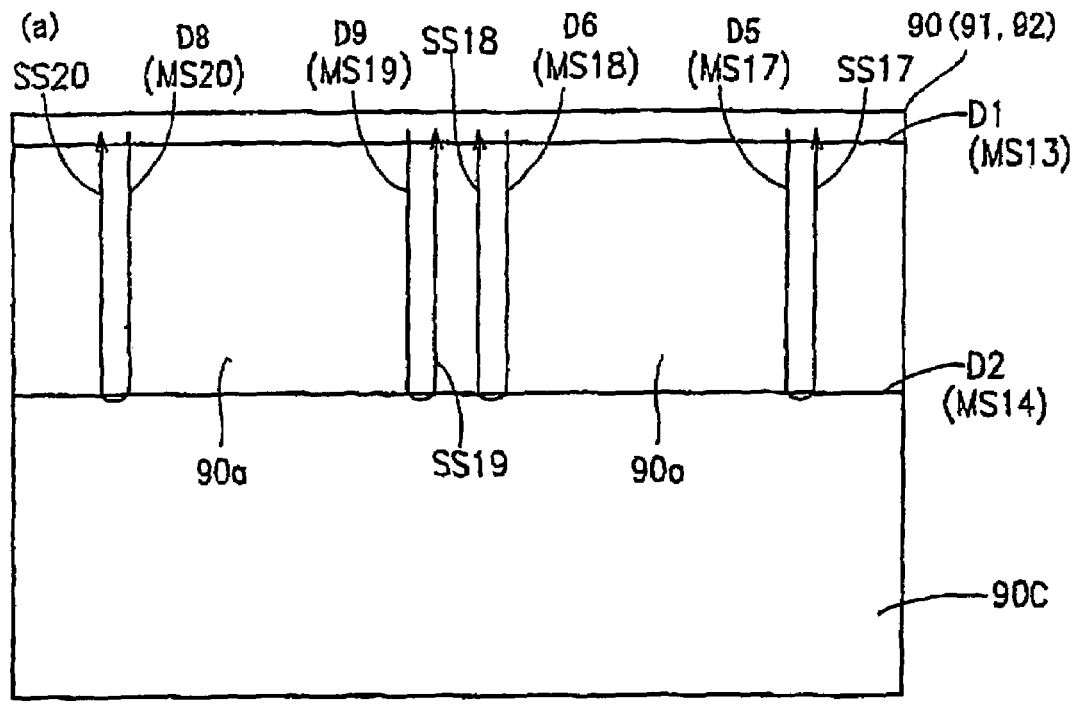
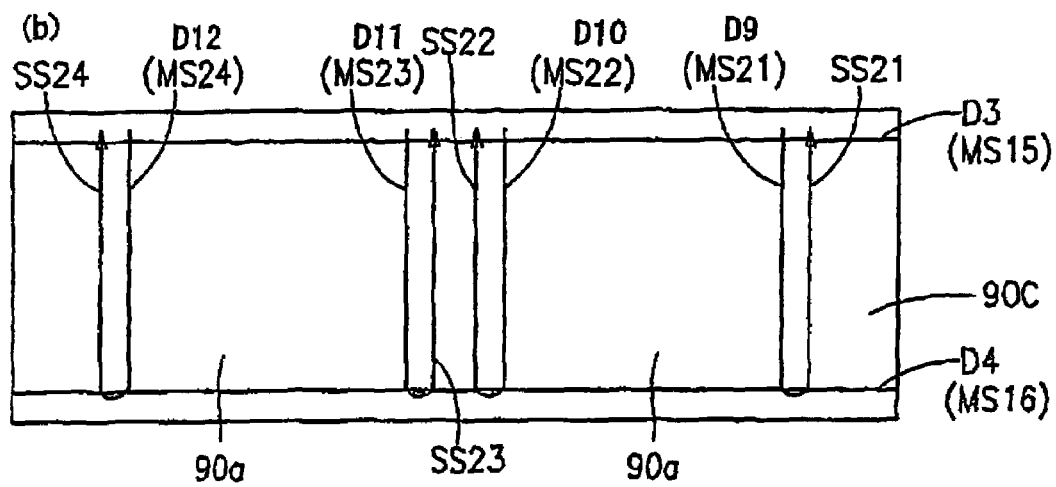

FIG.42
(a)
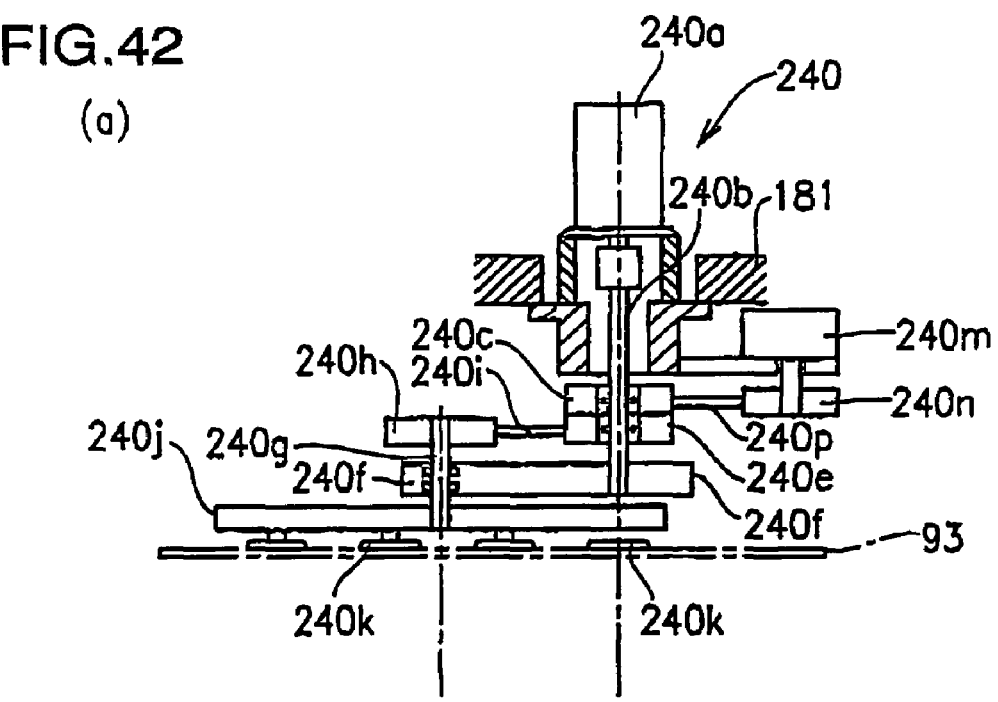
(b)
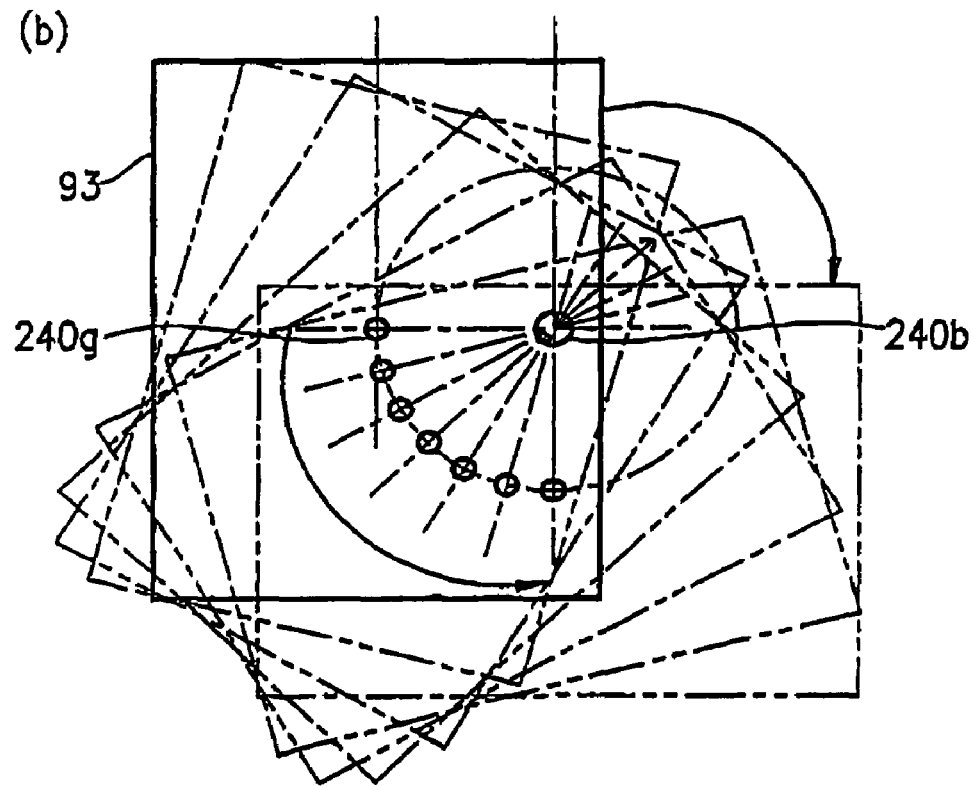

FIG.65
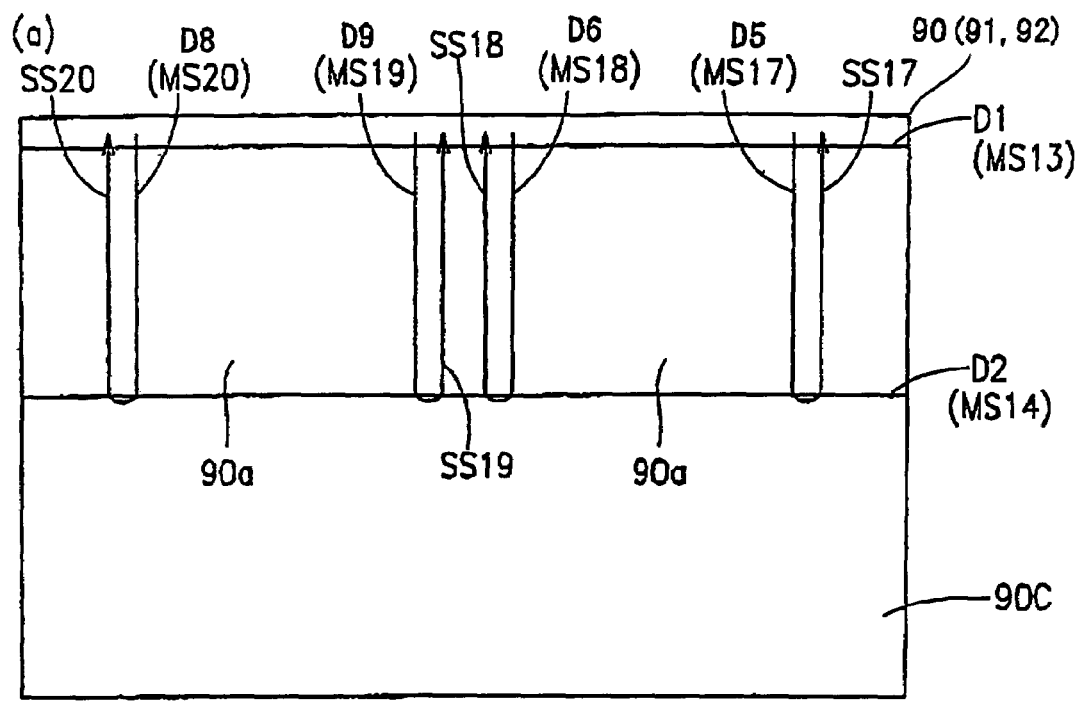
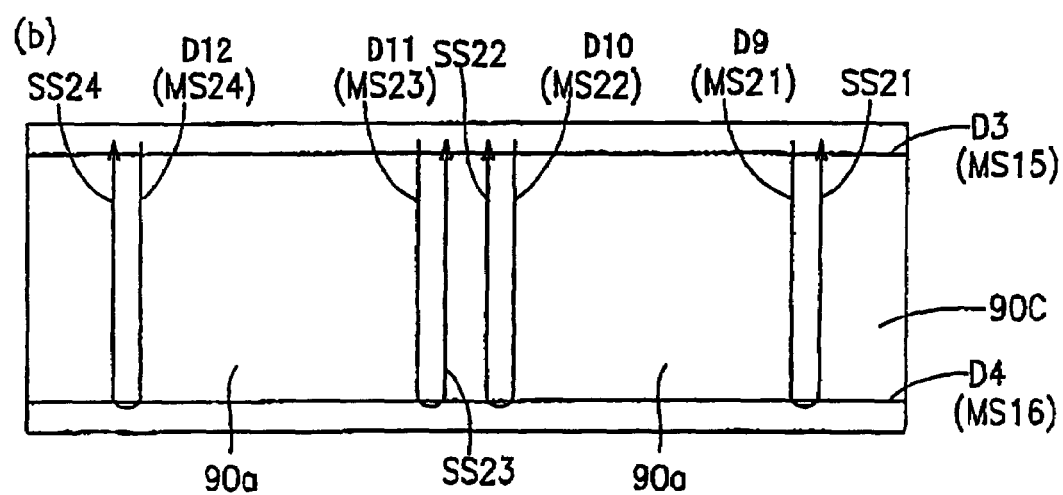

FIG.91
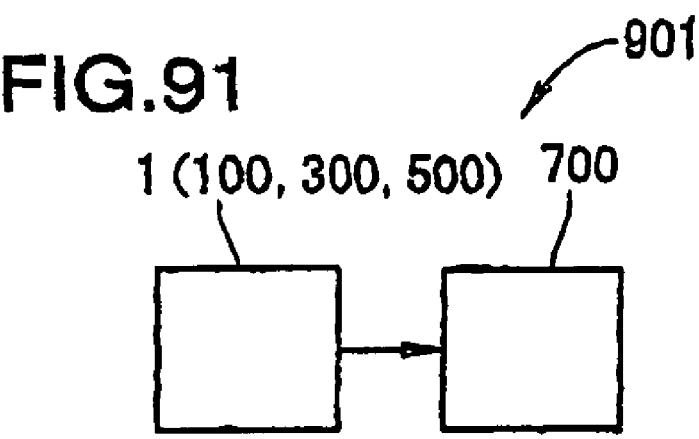
FIG.92
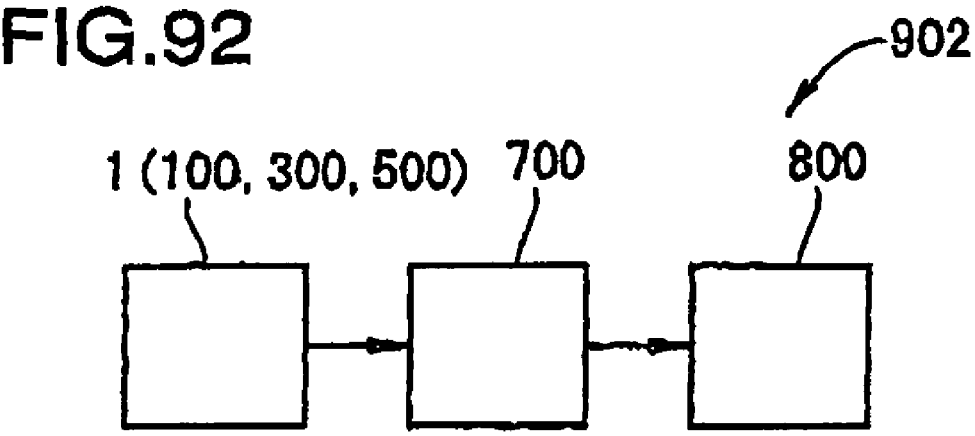
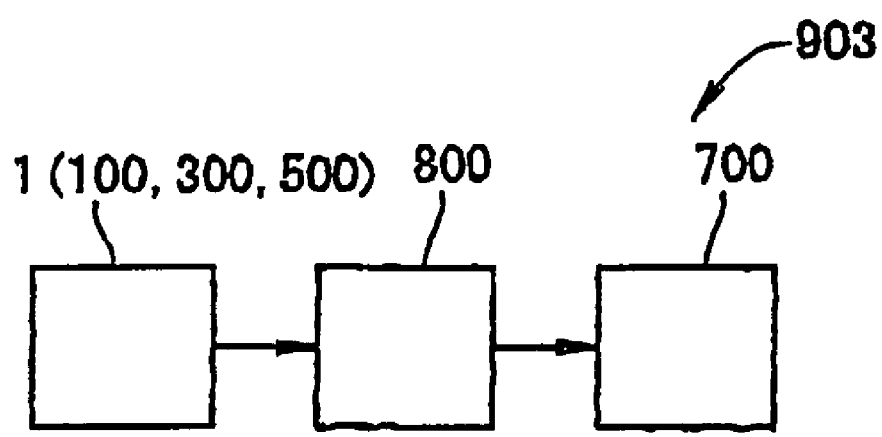

SUBSTRATE-CUTTING SYSTEM, SUBSTRATE-PRODUCING APPARATUS, SUBSTRATE-SCRIBING METHOD, AND SUBSTRATE-CUTTING METHOD

TECHNICAL FIELD

The present invention relates to a substrate cutting system and a substrate cutting line system used for cutting mother substrates of various materials, including mother substrates such as glass substrates used for display panels of liquid crystal display apparatuses and the like, and more particularly, a substrate cutting system, a substrate manufacturing apparatus, a substrate scribing method, and a substrate cutting method which can be preferably used for cutting bonded mother substrates formed by bonding a pair of brittle material substrates to each other.

BACKGROUND ART

Display panels of the liquid crystal display apparatuses and the like are usually made of glass substrates which are brittle material substrates. The liquid crystal display apparatuses includes display panels formed by bonding a pair of glass substrates with an appropriate space therebetween and enclosing liquid crystal into the space.

For manufacturing such display panels, a process to cut out a plurality of display panels of a bonded mother substrate by cutting the bonded mother substrate which is obtained by bonding mother glass substrates is performed. A scribing apparatus used for cutting bonded mother substrates is disclosed in Publication for Utility Model Opposition No. 59-22101.

FIG. 93 to a schematic view showing a structure of the scribing apparatus. A scribing apparatus 950 includes tables 951 for respectively putting a side edge portion of a bonded mother substrate 908 thereon. On the tables 951, clamp members 952 for clamping the side edge portions of the bonded mother substrate 908 are attached. The scribing apparatus 950 includes a pair of cutter heads 953 and 954 respectively provided above and below the bonded mother substrate 908. The cutter heads 953 and 954 oppose each other with the bonded mother substrate 908 interposed therebetween.

In the scribing apparatus 950 having such a structure, when the bonded mother substrate 908 is fixed to the tables 951 with the clamp members 952, a front surface and a back surface of the bonded mother substrate 908 are scribed at the same time by the pair of cutter heads 953 and 954 to form scribe lines.

However, in such a scribing apparatus 950, a breaking apparatus for cutting the bonded mother substrate 908 on which the scribe lines are formed is separately required. Further, for cutting the bonded mother substrate 908 by a breaking apparatus, it is necessary to reverse the bonded mother substrate 908 (to turn the substrate upside down) after cutting one of the mother substrates of the bonded mother substrate 908 for cutting another substrate. For cutting display panels out of the bonded mother substrate 908, a complicated line system has to be established.

For cutting display panels out of the bonded mother substrate 908 by using such a scribing apparatus 950, a complicated line system having a footprint few times larger then that of the scribing apparatus 950 has to be established. This is one of the reasons increasing the manufacturing cost of display panels.

Further, in the scribing apparatus 950 shown in FIG. 93, the bonded mother substrate 908 is scribed from both front surface and back surface at the same time. However, the process direction is limited to one direction, and cross scribing (scribing along directions such that the scribe lines are orthogonal to each other) is impossible.

This means that another scribing apparatus is necessary for cross-scribing. There is a problem that the scribing process efficiency for the bonded mother substrate 908 to significantly low.

Moreover, there is a problem that the process cannot be performed along two directions which are orthogonal to each other in one setting when the mother substrate is cut from both the front surface and the back surface by using an apparatus similar to the above-described scribing apparatus 950.

The present invention is to solve such problems and the object thereof is to provide a substrate cutting system and a substrate cutting system which has a small foot print and a compact structure, and which can efficiently cut various types of mother substrates.

DISCLOSURE OF THE INVENTION

A substrate cutting system according to the present invention is characterized by comprising: a hollow parallelepiped mounting structure; a clamp device attached to the mounting structure so as to clamp at least one portion of a side edge of a substrate carried into the mounting structure; a pair of substrate cutting devices for cutting the substrate from an upper surface side and a lower surface side of the substrate clamped by the clamping device; and a scribing device guide body which is movable back and forth along one side of the hollow parallelepiped mounting structure and to which the pair of substrate cutting devices are attached so as to be movable along a direction orthogonal to the moving direction.

The present invention is further characterized by comprising a substrate supporting device for supporting the substrate clamped by the clamping device.

The present invention is further characterized by comprising a first substrate supporting portion provided on one side in the moving direction of the scribing device guide body.

The present invention is further characterized in that the first substrate supporting portion includes a plurality of first substrate supporting units which can move parallel along the moving direction of the scribing device guide body, the first substrate supporting units being moved so as to apart from each other as the scribing device guide body moves in one direction and being moved so as to approach each other as the scribing device guide body moves in other direction.

The present invention is further characterized in that, in the first substrate supporting units, a plurality of first supporting belts respectively arranged along the moving direction of the scribing device guide body are supported, and the substrate is supported in a horizontal fashion by the first supporting belts by moving the first substrate supporting units so as to apart from each other.

The present invention is further characterized by comprising first winding means for winding the first supporting belts by moving the first substrate supporting units so as to approach each other.

The present invention is further characterized in that, in the first substrate supporting units, a substrate upward/downward moving device for lifting the substrate above the first supporting belts so that the substrate is clamped by the clamp device is provided.

The present invention is further characterized in that the first substrate supporting portion includes a plurality of first substrate supporting units which move parallel along the moving direction of the scribing device guide body, the first substrate supporting units being moved with the scribing device guide body as the scribing device guide body moves in one direction.

The present invention is further characterized in that the first substrate supporting units comprises a plurality of belts for supporting the substrate.

The present invention is further characterized by comprising at least one clutch unit for selectively rotating the plurality of belts in accordance with the movement of the scribing device guide body.

The present invention is further characterized in that the substrate supporting device further comprises second substrate supporting portion provided on the other side in the moving direction of the scribing device guide body.

The present invention is further characterized in that the second substrate supporting portion includes a plurality of second substrate supporting units which move parallel along the moving direction of the scribing device guide body, the second substrate supporting units being moved so as to approach each other in the movement in one direction and being moved so as to apart from each other in the movement in other direction.

The present invention is further characterized in that, in the second substrate supporting units, a plurality of second supporting belts respectively arranged along the moving direction of the scribing device guide body are supported, and the substrate is supported in a horizontal fashion by the second supporting belts by moving the second substrate supporting units so as to apart from each other.

The present invention is further characterized by comprising second winding means for winding the second supporting belts by moving the second substrate supporting units so as to approach each other.

The present invention is further characterized in that the second substrate supporting portion includes a plurality of second substrate supporting units which move parallel along the moving direction of the scribing device guide body, the second substrate supporting units being moved with the scribing device guide body as the scribing device guide body moves in one direction.

The present invention is further characterized in that the second substrate supporting units comprises a plurality of belts for supporting the substrate.

The present invention is further characterized by comprising at least one clutch unit for selectively rotating the plurality of belts in accordance with the movement of the scribing device guide body.

The present invention is further characterized in that a or the substrate cutting devices comprises a cutter head for transmitting pressure to the substrate using a servo motor for a cutter wheel.

The present invention is further characterized by comprising a steam unit portion for spraying steam on front and back surfaces of the substrate having scribe lines carved thereon at a or the substrate cutting devices.

The present invention is further characterized in that the steam unit portion includes substrate drying means for drying front and back surfaces of the substrate.

A substrate cutting system according to claim 10, characterized by comprising a substrate carry-out device for taking out the substrate which has been cut at the steam unit portion.

The present invention is further characterized in that the substrate carrying device includes a carrying robot comprising: substrate holding means for holding the substrate; substrate rotation means for rotating the substrate holding means holding the substrate around a first axis vertical to the substrate; and means for rotating the substrate rotation means around a second axle which is different from the first axis vertical to the substrate held by the substrate holding means.

The present invention is further characterized by comprising substrate inversion means for inverting the substrate carried by the substrate carrying device upside down.

The present invention is further characterized by comprising a positioning unit portion for positioning the substrate.

The present invention is further characterized by comprising a carrying unit for carrying the substrate scribed by the scribing device guide body to a steam unit portion.

The present invention is further characterized by comprising removal means for removing unnecessary portion of the cut substrate.

The present invention is further characterized in that the plurality of belts are strained between a frame on a substrate carry-in side and a frame on a substrate carry-out side, the plurality of belts sinking below the scribing device guide body or coming up from below the scribing device guide body during the first substrate supporting portion is moving.

The present invention is further characterized in that the plurality of belts are strained between a frame on a substrate carry-in side and a frame on a substrate carry-out side, the plurality of belts sinking below the scribing device guide body or coming up from below the scribing device guide body during the second substrate supporting portion is moving.

The present invention is further characterized in that the substrate is a bonded mother substrate formed by bonding a pair of mother substrates.

A substrate manufacturing apparatus according to the present invention is characterized in that a chamfering system for chamfering end surfaces of the cut substrate is connected to the above substrate cutting system.

The present invention is further characterized in that an inspection system for inspecting functions of the cut substrate is connected.

A substrate scribing method for forming scribe lines on an upper surface and a lower surface of a substrate according to the present invention is characterized in that: scribe line formation means for forming a vertical crack along a thickness direction of the substrate oppose each other, and the scribe lines are continuously formed by the scribe formation means without being apart from the substrate.

The present invention is further characterized in that three or more linear scribe lines are formed by the scribe line formation means, a closed curve being formed by all the scribe lines which has been formed.

The present invention to further characterized in that the scribe line formation means form a closed curve having a rectangular shape.

The present invention is further characterized in that the scribe line formation means is a cutter wheel tip having a disc shape and having a blade edge for rotating on a surface of the substrate in an outer periphery.

The present invention is further characterized in that the cutter wheel tip has a plurality of protrusions formed in a blade edge in a predetermined pitch.

The present invention is further characterized in that sub-scribe lines along at least two formed scribe lines are formed by the cutter wheel tip after at least two scribe lines are formed by the cutter wheel tip.

The present invention is further characterized in that the sub-scribe lines are formed continuously after the at least two scribe lines formed on the substrate without separating the cutter wheel tip from a surface of the substrate.

The present invention to further characterized in that the cutter wheel tip forms one scribe line, moves on the surface drawing a circular trace, and then, forms the other scribe line.

The present invention is further characterized in that, when the cutter wheal tip moves on the substrate drawing a circular trace, pressure to the substrate is reduced compared to pressure to the substrate when the scribe lines are being formed.

A substrate cutting method according to the present invention is characterized in that a scribing method for forming scribe lines on an upper surface and a lower surf ace of the substrate comprises the steps of: forming a main scribe line along a line to be cut on the substrate by opposing scribe line formation means for forming a vertical crack along a thickness direction of the substrate; and forming a supplementary scribe line along the main scribe line with a predetermined space apart from the formed main scribe line.

The present invention is further characterized in that the supplementary scribe line is formed with a space of 0.5 mm to 1.0 mm apart from the main scribe line.

The present invention is further characterized in that the main scribe line is formed by a vertical crack which extends to 80% or more of a thickness direction of the substrate from the substrate surface.

The present invention is further characterized in that the main scribe line is formed by a vertical crack which extends to 90% or more of a thickness direction of the substrate from the substrate surface.

The present invention is further characterized in that the main scribe line is formed by a cutter wheel having a disc shape which rotates on the substrate surface, the cutter wheel protruding outward so as to have a center portion of an outer periphery in a width direction which has a shape of letter V with an obtuse angle, a plurality of protrusions with a predetermined height being provided across the entire circumferential with a predetermined pitch in a portion having the obtuse angle.

The present invention is further characterized in that a formation direction of main scribe line and a formation direction of supplementary scribe line by the cutter wheel are opposite to each other, and the cutter wheel continuously form the main scribe line and the supplementary scribe line in contact with the substrate surface.

The present invention is further characterized in that the main scribe line and the supplementary scribe line are formed with an appropriate space from at least one end portion of the line to be out.

Further a substrate cutting method for cutting a substrate having scribe lines formed respectively on an upper surface and a lower surface of the substrates characterized in that: the upper surface and the lower surface of the substrate are heated for cutting the substrate.

BRIEF DESCRIPTION OF THE DRAWINGS

FIG. 18 is a schematic plan view for illustrating an operation of the substrate cutting system according to Embodiment 1 of the present invention.

FIG. 19 is a schematic plan view for illustrating an operation of the substrate cutting system according to Embodiment 1 of the present invention.

FIG. 25 is a plan view showing a scribe pattern for the substrate for illustrating yet another example of the substrate cutting method according to the present invention.

FIG. 42 includes: portion (a) schematically showing structure of a carrying robot of a substrate carrying apparatus; and portion (b) illustrating an operation of the carrying robot.

FIG. 65 includes: portions (a) and (b) providing plan view of a substrate showing a scribe pattern of the substrate for illustrating yet another example of the substrate cutting method according to the present invention.

FIG. 91 is a schematic view showing an example of a structure of a substrate manufacturing apparatus according to the present invention using the substrate cutting system according to Embodiments 1 to 4.

FIG. 92 is a schematic view showing another example of a structure of a substrate manufacturing apparatus according to the present invention using the substrate cutting system according to Embodiments 1 to 4.

BEST MODE FOR CARRYING OUT THE INVENTION

Hereinafter, embodiments of the present invention will be described in detail with reference to the drawings.

Embodiment 1

Figure 1:
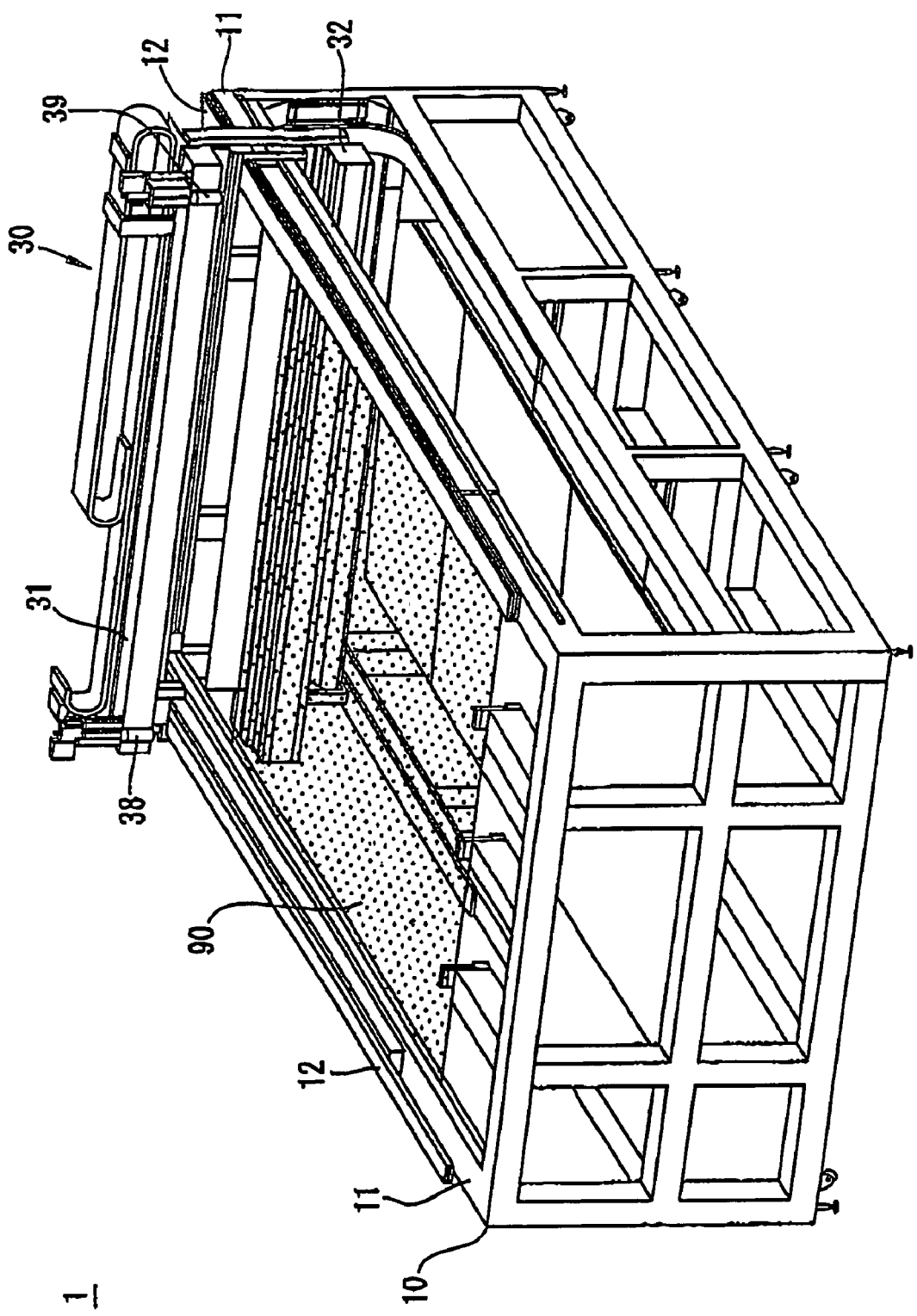
FIG. 1 is a schematic perspective view showing an example of a substrate cutting system according to Embodiment 1 of the present invention.
Figure 2:
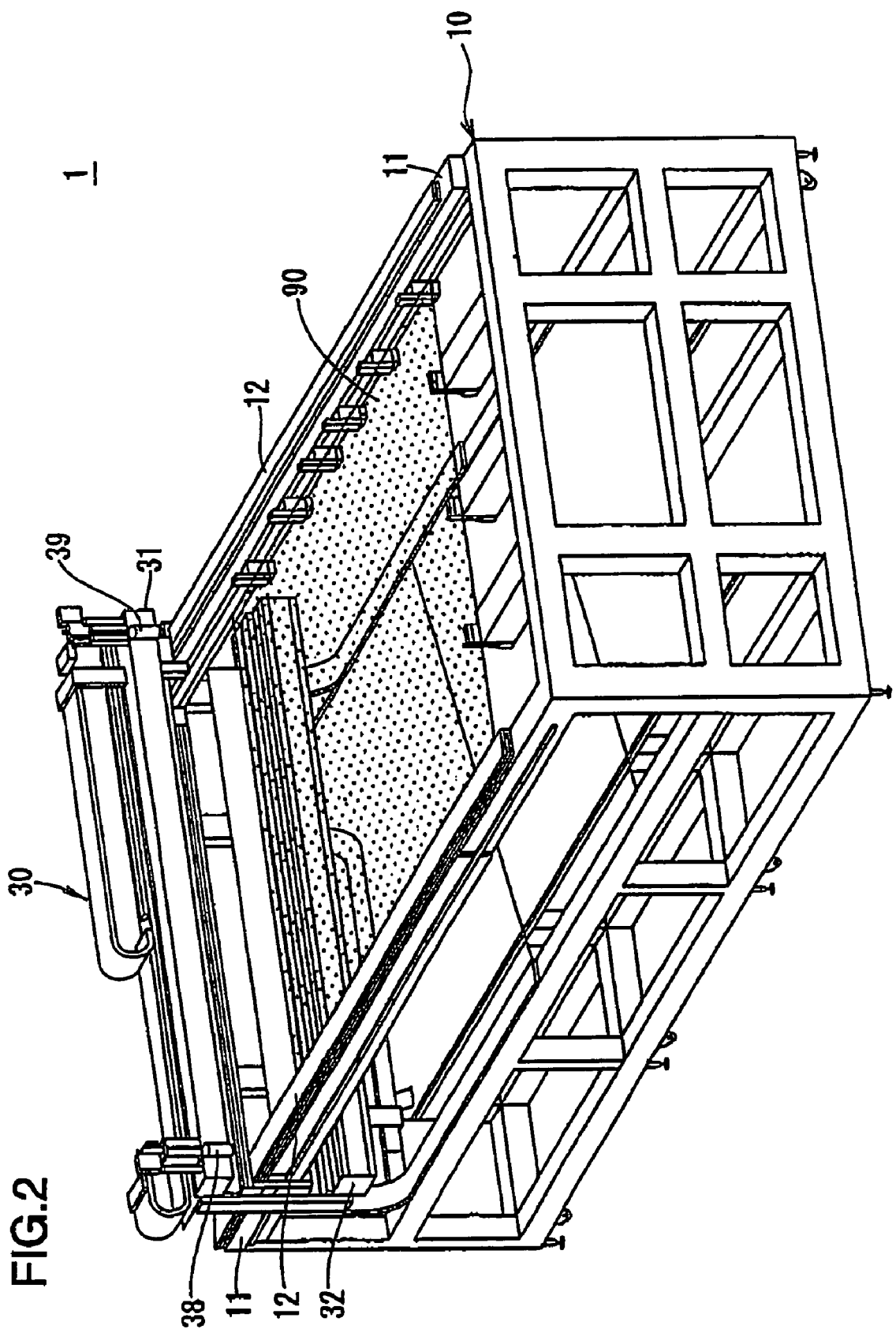
FIG. 2 is a schematic perspective view of the substrate cutting system according to Embodiment 1 of the present invention viewed from another direction.
Figure 3:
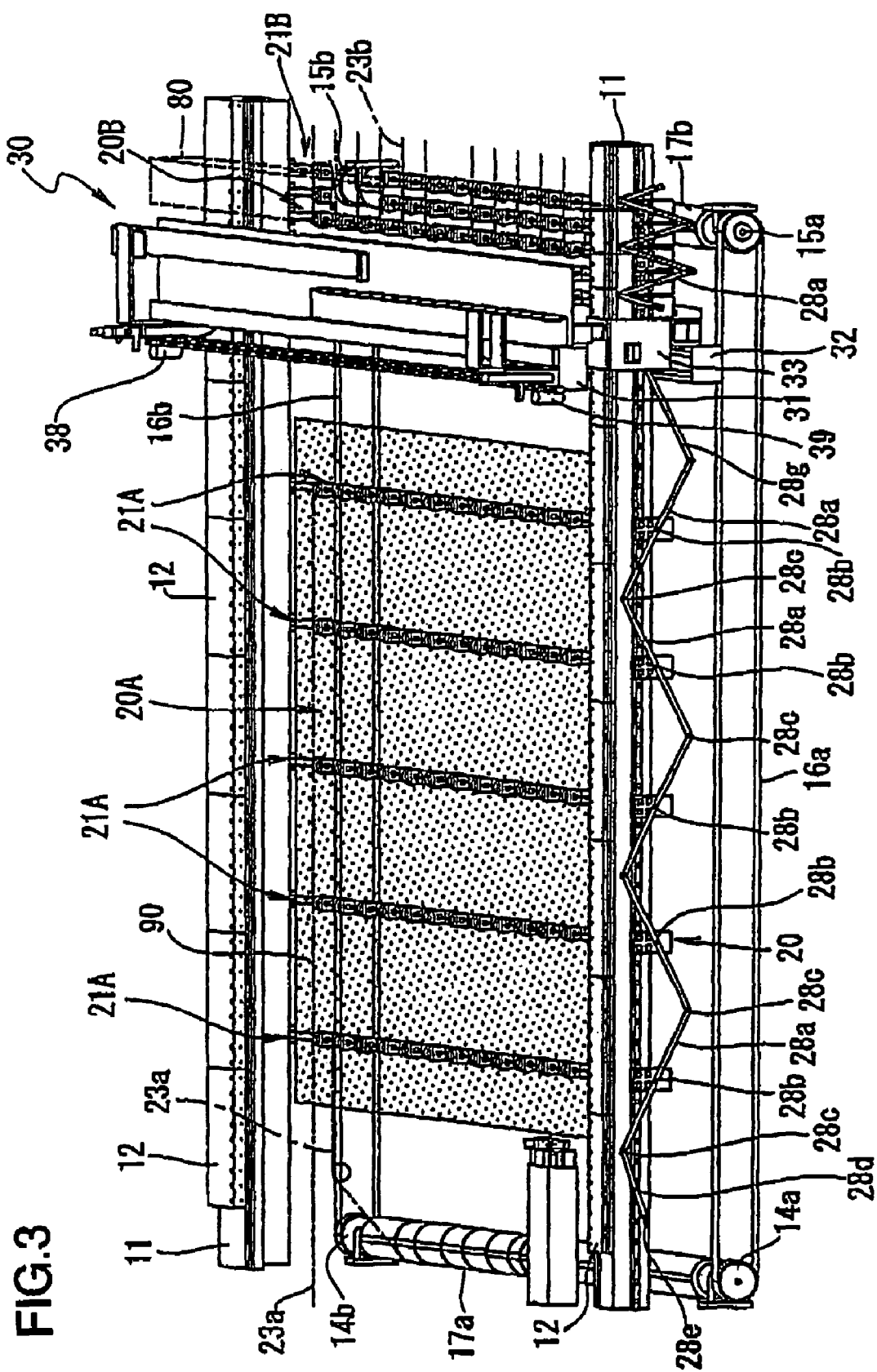
FIG. 3 is a perspective view of an important part of the substrate cutting system according to Embodiment 1 of the present invention.
Figure 4:
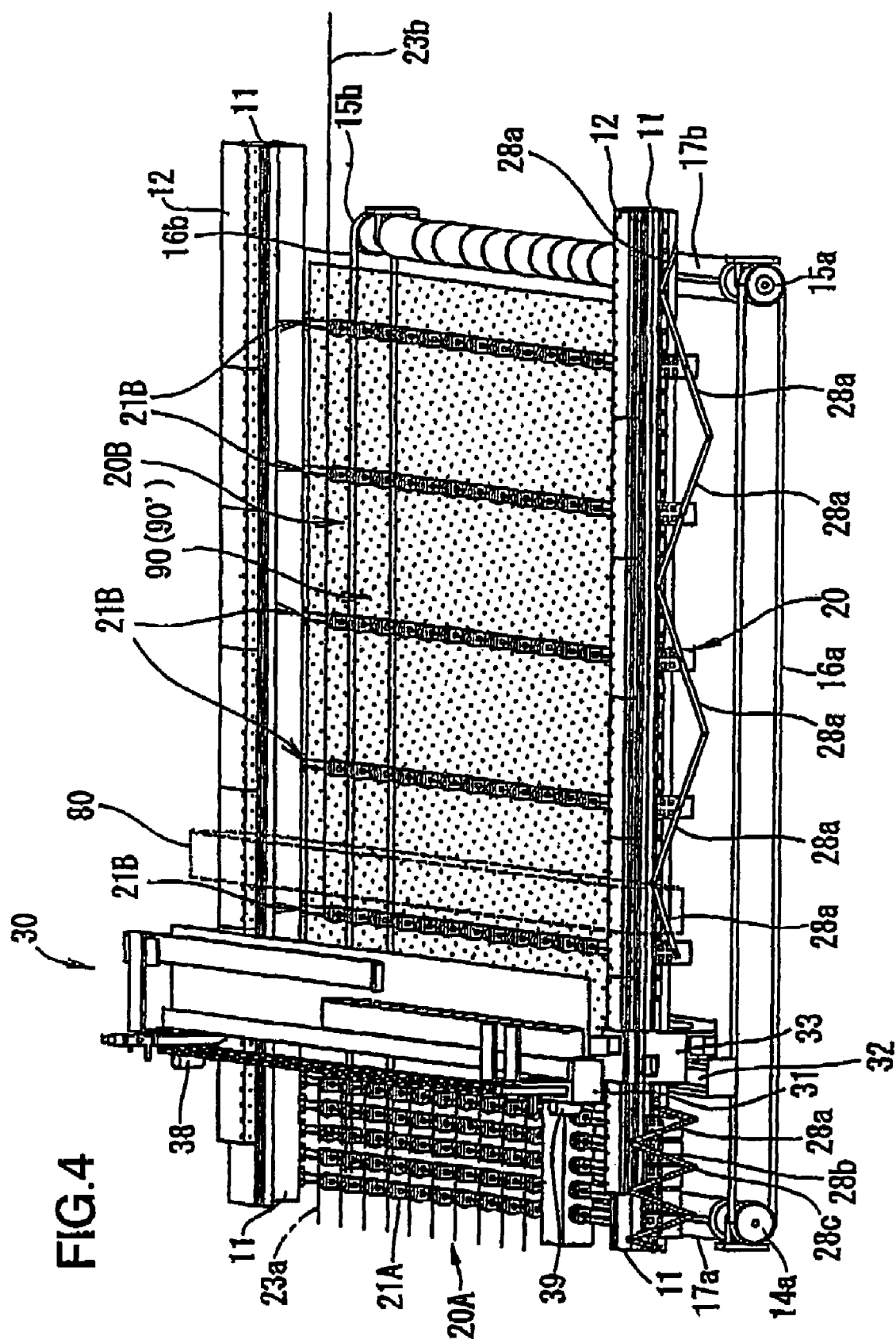
FIG. 4 is a perspective view for illustrating operations of a substrate supporting device of the substrate cutting system according to Embodiment 1 of the present invention.
Figure 5:
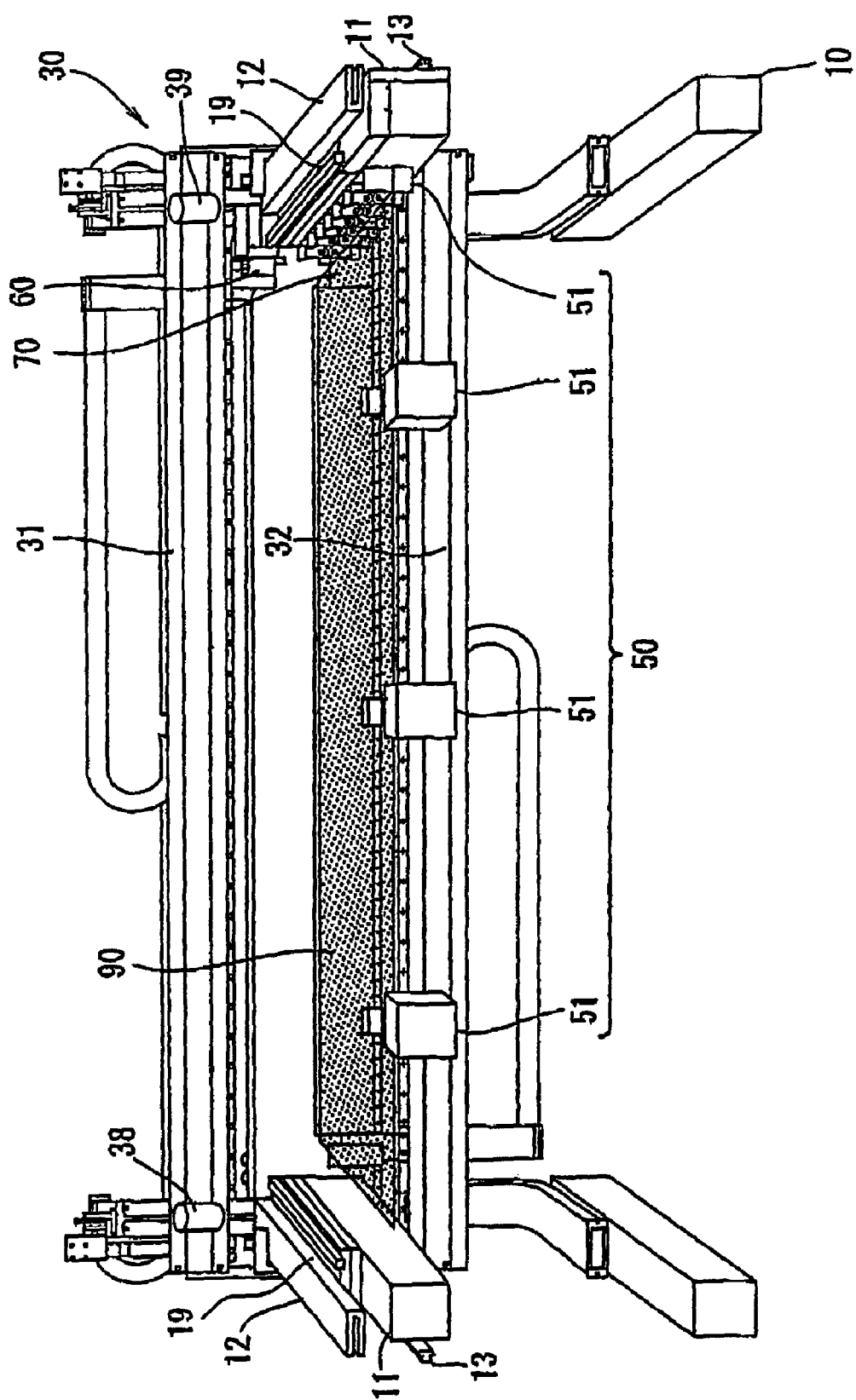
FIG. 5 is a cross-sectional view of an important part of the substrate cutting system according to Embodiment 1 of the present invention.

FIGS. 1 and 2 are perspective views schematically showing an entire structure of an example of a substrate cutting system according to Embodiment 1 of the present invention from different directions. FIG. 3 is a perspective view schematically showing a structure of an important part of the system. FIG. 4 is a perspective view for illustrating an operation. FIG. 5 is a cross-sectional view of the important part.

In the present invention, "substrates" include mother substrates cut into a plurality of substrates and also include single plates of metal substrates such as steel sheets, wood plates, plastic substrates and ceramic substrate, semiconductor substrates, and brittle material substrates such as glass substrates. Furthermore, the "substrates" are not limited to such single plates, but also includes bonded substrates formed by bonding pairs of substrates and laminated substrates formed by laminating pairs of substrates.

For example, when panel substrates of a liquid crystal display apparatus in which a pair of glass substrates are bonded to each other (bonded substrate for display panel substrates) are manufactured, a substrate cutting system according to the present invention cuts a bonded mother substrate 90 which is formed by bonding a pair of mother glass substrates to each other into a plurality of panel substrates (bonded substrate for display panel substrates).

The substrate cutting system includes a hollow mounting structure 10 having a parallelepiped shape. On the mounting structure 10, a pair of main frames 11 are located along a longitudinal direction. In the mounting structure 10, a substrate supporting device 20 (see FIGS. 3 and 4) for supporting the bonded mother substrate 90 to be carried to the substrate cutting system by a carrying robot, carrying belt or the like in a horizontal manner to located.

Further, as shown in FIG. 5, in the mounting structure 10, a clamp device 50 for holding a substrate held in a horizontal manner by substrate upward/downward moving device 40 (see FIG. 8) provided in the substrate supporting device 20 (a first substrate supporting unit 21A) in a horizontal manner is provided. The substrate supporting device 20 is not shown in FIG. 5. Further, on the main frames 11, scribing device guide body 30 is provided so as to be movable along the longitudinal direction of the main frames 11. The scribing device guide body 30 includes an upper guide rail 31 extending along a direction orthogonal to the main frames 11 above the main frames 11 and a lower guide rail 32 extending along the upper guide rail 31 below the main frames 11. The upper guide rail 31 and the lower guide rail 32 are formed so as to move integrally along the main frames 11.

Figure 6:
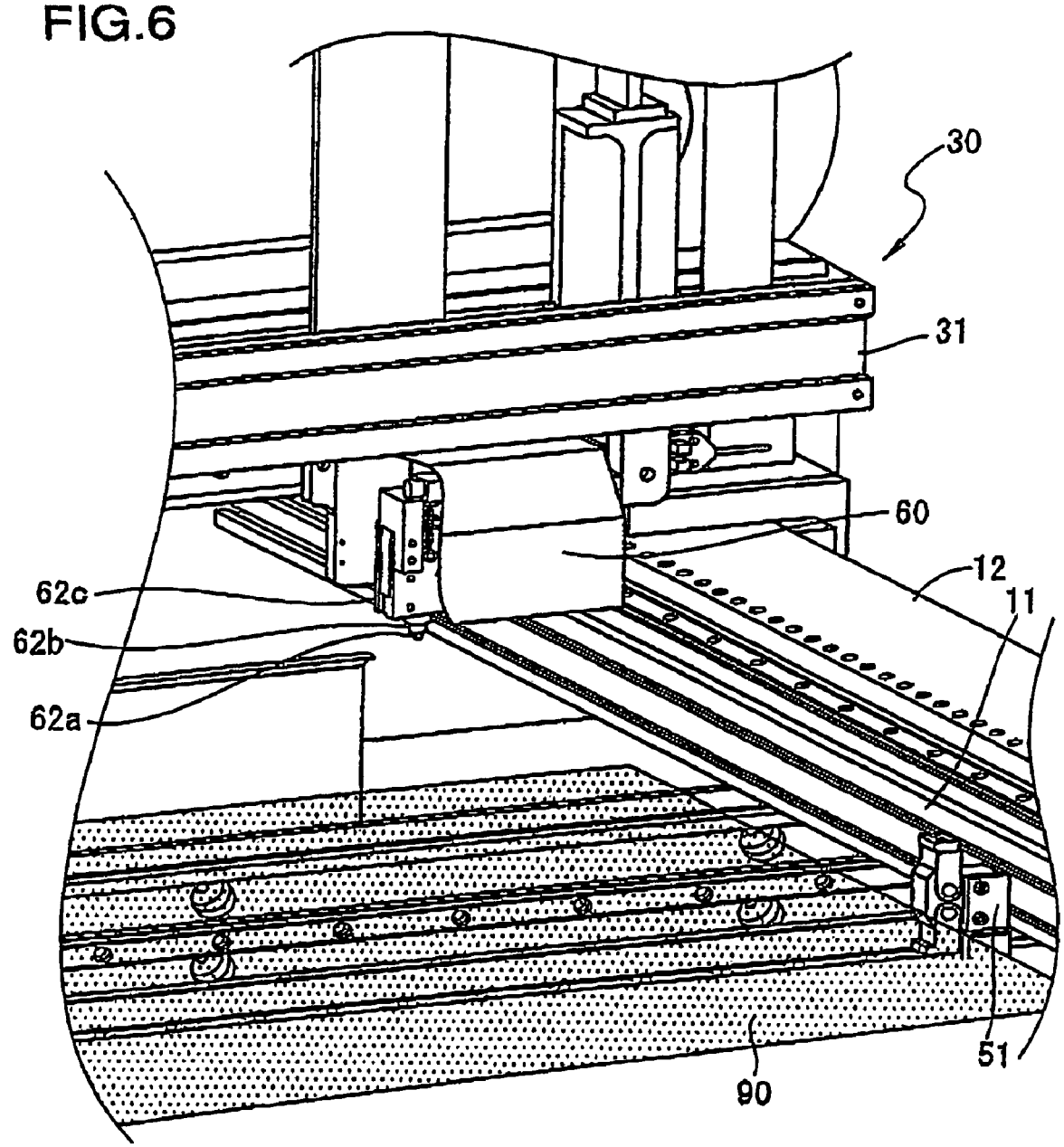
FIG. 6 to a schematic perspective view of an important part of the substrate cutting system according to Embodiment 1 of the present invention which is enlarged.
Figure 7:
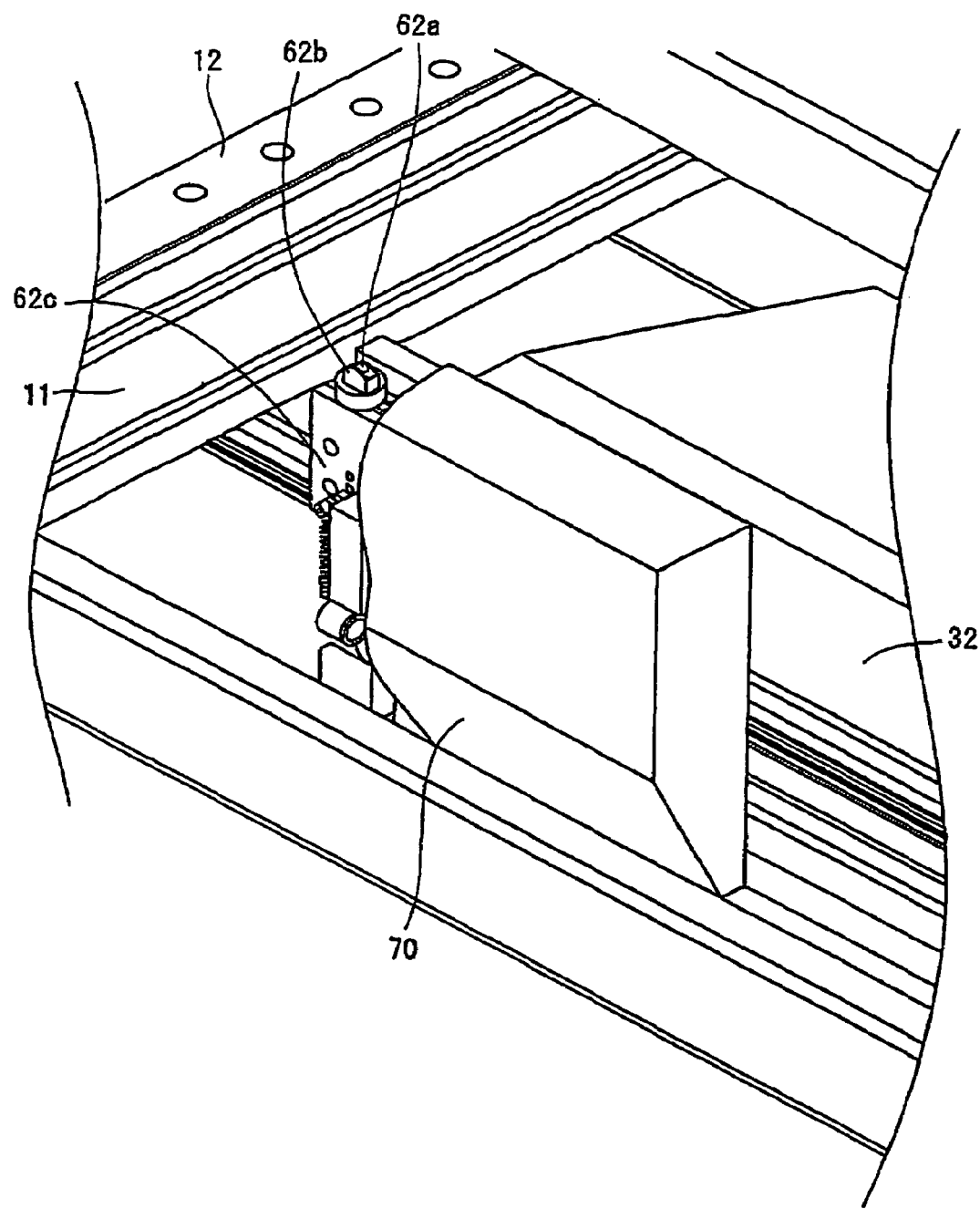
FIG. 7 is a schematic perspective view of another important part of the substrate cutting system according to Embodiment 1 of the present invention which is enlarged.

FIG. 6 is a schematic perspective view showing near the upper guide rail 31 in the scribing device guide body 30. To the upper guide rail 31, upper portion substrate cutting device 60 is attached so as to be movable along the upper guide rail 31. FIG. 7 is a schematic perspective view showing near the lower guide rail 32 in the scribing device guide body 30. To the lower guide rail 32, lower portion substrate cutting device 70 is attached so au to be movable along the lower guide rail 32.

The upper portion substrate cutting device 60 and the lower portion substrate cutting device 70 respectively move back and forth along the upper guide rail 31 and the lower guide rail 32 by linear motors. To the upper guide rail 31 and the lower guide rail 32, stators of the linear motors are respectively attached. To the upper portion substrate cutting device 60 and the lower portion substrate cutting device 70, movers of the linear motors are respectively attached. The upper portion substrate cutting device 60 and the lower portion substrate cutting device 70 cut glass substrates on upper and lower sides of the bonded mother substrate 90 held by the clamp device 50 in a horizontal manner and also supported by the substrate supporting device 20 for assisting holding the substrates.

In one end portion of the scribing device guide body 30, a first optical device 38 for taking an image of a first alignment mark of the bonded mother substrate 90 held by the clamp device 50 and supported by the substrate supporting device 20 is provided so as to be movable along the scribing device guide body 30. In the other end portion of the scribing device guide body 30, a second optical device 39 for taking an image of a second alignment mark provided on the bonded mother substrate 90 is provided so as to be movable along the scribing device guide body 30.

As shown in FIGS. 3 and 4, the substrate supporting device 20 includes a first substrate supporting portion 20A located on a side, to which substrates are to be carried, of the scribing device guide body 30 for supporting the bonded mother substrate 90 to be carried into the mounting structure 10 (see FIG. 2), and a second substrate supporting portion 20B located on a side, from which substrates are carried out, of the scribing device guide body 30 for supporting the bonded mother substrate 90 after the bonded mother substrate 90 is cut and the panel substrates are sequentially carried out of the mounting structure 10. In the mounting structure 10, the first substrate supporting portion 20A side is a substrate carry-in side, the second substrate supporting portion 20B side is a carry-out side.

In the main frames 11 of the mounting structure 10, stators 12 of linear motors for moving the scribing device guide body 30 are respectively provided on upper surfaces of the main frames 11 along the longitudinal direction of the main frames 11. The stators 12 are respectively formed to have a flat hollow parallelepiped shape with external side surfaces opened. Thus, cross-sections thereof have squared "C" shape. In the stators, movers (not shown) of the linear motors attached to the scribing device guide body 30 are inserted so as to be movable along the main frames 11.

In the stators 12, a plurality of permanent magnets are respectively located along the longitudinal directions with the magnetic poles of the permanent magnets adjacent to each other are reversed. The movers are respectively formed of electromagnets. By sequentially switching magnetic poles of the electromagnets forming the movers, the movers slide respectively along the stators 12.

As shown in FIG. 4, the movers of the linear motors are attached to inner side surfaces of coupling plates 33 for coupling end surfaces of the upper guide rail 31 and the lower guide rail 32 to each other. The movers are driven in synchronization and slid with respect to the stators 12.

Between the main frames 11 in the mounting structure 10 (see FIG. 2), a substrate carry-out device 80 (see FIG. 3) for carrying out panel substrates cut out of the bonded mother substrate 90 bridges. The substrate carry-out device 80 is located on the substrate carry-out side with respect to the scribing device guide body 30, and end portions thereof slide along guide rails 19 (see FIG. 5) respectively provided on the main frames 11 by the linear motors. In this case, the linear motors are formed by inserting movers (not shown) of the linear motors respectively attached to the end portions of the substrate carry-out device 80 into the linear motor stators 12 respectively provided on the main frames 11.

The substrate carry-out device 80 includes an adsorption portion (not shown) for suction-adsorbing panel substrates cut out of the bonded mother substrate 90. The entire substrate carry-out device 80 is slid to the substrate carry-out side with the panel substrate adsorbed by the adsorption portion, and the panel substrates are carried out from the mounting structure 10.

As shown in FIGS. 3 and 4, in end portions of one of the main frames 11, i.e., an end portion on the substrate carry-in side and an end portion on the substrate carry-out side of one main frame 11, a first carry-in pulley 14a and a first carry-out pulley 25a are respectively provided. Further, in an end portion on the substrate carry-in side and an end portion on the substrate carry-out side of the other main frame 11, a second carry-in pulley 14b and a second carry-out pulley 15b are respectively provided. A first transmission belt 16a loops around the first carry-in pulley 14a and the first carry-out pulley 15a located along one main frame 11. A second transmission belt 16b loops around the second carry-in pulley 14b and the second carry-out pulley 15b located along the other main frame 11.

Between the first carry-in pulley 14a and the second carry-in pulley 14b located in the end portion on the substrate carry-in side, a carry-in side winding drum 17a is provided in a concentric fashion with the first carry-in pulley 14a and the second carry-in pulley 14b. The carry-in side winding drum 17a in coupled to the first carry-in pulley 14a around which the first transmission belt 16a loops. When the first carry-in pulley 14a rotates, the carry-in side winding drum 17a integrally rotates in the same direction. The second carry-in pulley 14b provided in the other end portion of the carry-in side winding drum 17a can rotate freely with respect to the carry-in side winding drum 17a.

Between the first carry-out pulley 15a and the second carry-out pulley 15b located in the end portion on the substrate carry-out side, a carry-out side winding drum 17b is provided in a concentric fashion with the first carry-out pulley 15a and the second carry-out pulley 15b. The carry-out side winding drum 17b is coupled to the second carry-out pulley 15b around which the second transmission belt 16b loops. When the second carry-out pulley 15b rotates, the carry-out side winding drum 17b integrally rotates in the same direction. The first carry-out pulley 15a provided in the other end portion of the carry-out side winding drum 17b can rotate freely with respect to the carry-out side winding drum 17b.

The first transmission belt 16a located along one of the main frames 11 of the mounting structure 10 is coupled to an end portion of the respective scribing device guide body 30. Thus, when the scribing device guide body 30 moves toward the substrate carry-in side, the first transmission belt 16a moves and the first carry-in pulley 14a and the first carry-out pulley 15a around which the first transmission belt 16a loops rotate in the same direction. The rotation of the first carry-in pulley 14a causes the carry-in side winding drum 17a to rotate integrally with the first carry-in pulley 14a in the same direction. In such a case, the carry-out side winding drum 17b located in the concentric fashion with the second carry-out pulley 15b is not rotated and only the first carry-out pulley 15a is rotated since the first carry-out pulley 15a and the carry-out side winding drum 17b are not coupled to each other.

On the other hand, when the scribing device guide body 30 moves toward the substrate carry-out side, the first transmission belt 16a moves and the first carry-in pulley 14a and the first carry-out pulley 15a around which the first transmission belt 16*a* loops rotate in the same direction. Thus, the carry-in side winding drum 17*a* rotates in the same direction as the first carry-in pulley 14*a*. However, in such a case, as described above, the carry-out side winding drum 17*b* located on the substrate carry-out side does not rotate.

The first substrate supporting portion 20A and the second substrate supporting portion 20B of the substrate supporting device 20 respectively have five first substrate supporting units 21A and second substrate supporting units 21B. The first substrate supporting units 21A and the second substrate supporting units 21B are respectively formed to have a linear shape along the direction orthogonal to the main frames 11.

Figure 8:
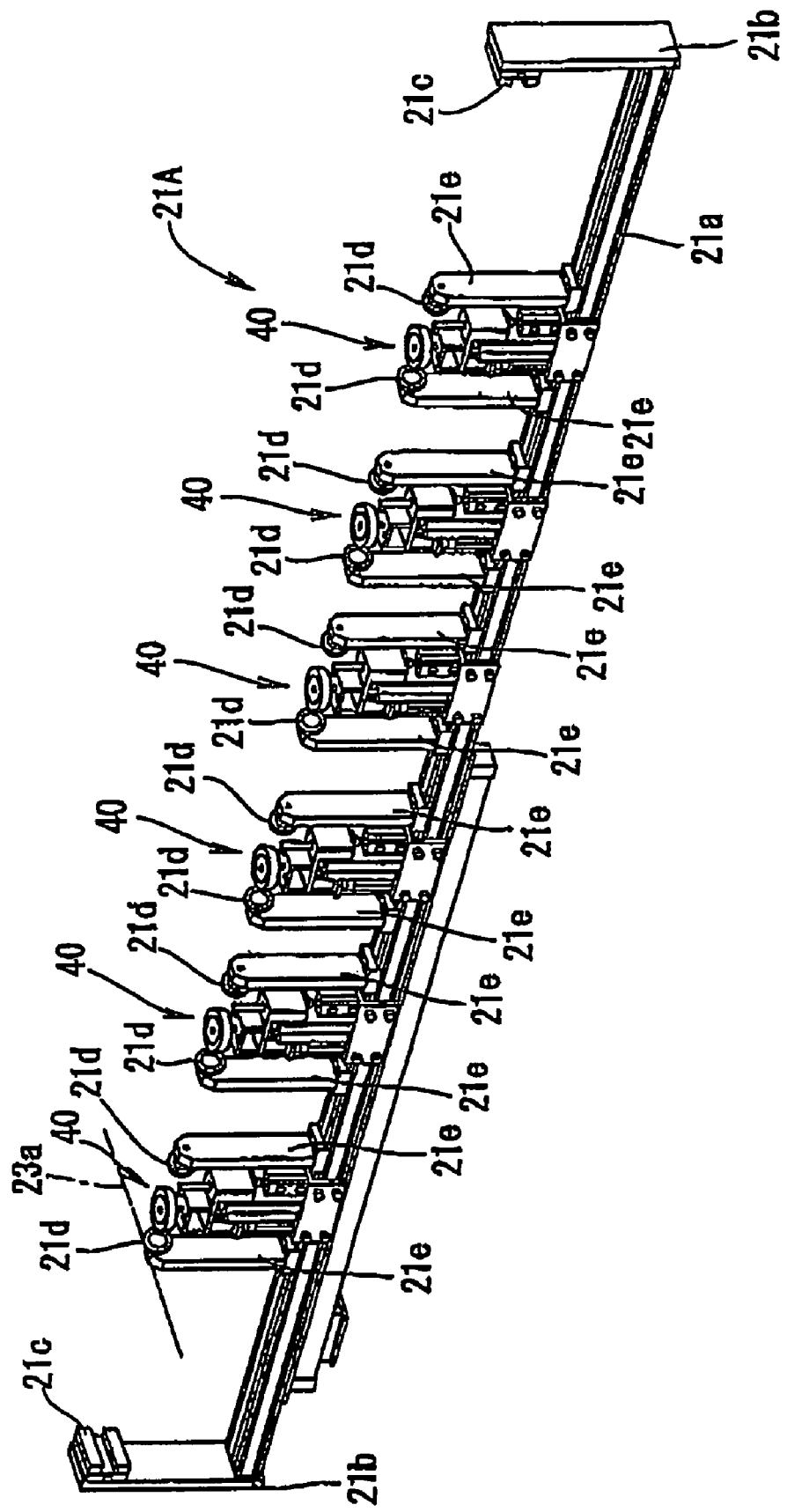
FIG. 8 is a perspective view of a first substrate supporting unit provided in the substrate supporting device of the substrate cutting system according to Embodiment 1 of the present invention.

FIG. 8 is a perspective view of one of the first substrate supporting units 21A provided in the first substrate supporting portion 20A. The first substrate supporting unit 21A has a support main body 21*a* elongated linearly along the direction orthogonal to the main frames 11. To end portions of the support main body 21*a*, connection plates 21*b* extended upward in a direction vertical to the support main body 21*a* are attached. In upper end portions of the connection plates 21*b*, sliders 21*c*, which slidably engage substrate supporting unit guide rails 13 (see FIG. 5) provided on outer side surfaces of the main frames 11, are provided. The sliders 21*c* slide along the substrate supporting unit guide rails 13. Thus, the first substrate supporting units 21A move along the main frames 11.

On each of the first substrate supporting units 21A, for example, six pairs of guide rollers 21*d* are provided with a predetermined space therebetween in the direction orthogonal to the main frames 11, and the substrate upward/downward moving device 40 is provided between a pair of guide rollers 21*d*.

Figure 9:
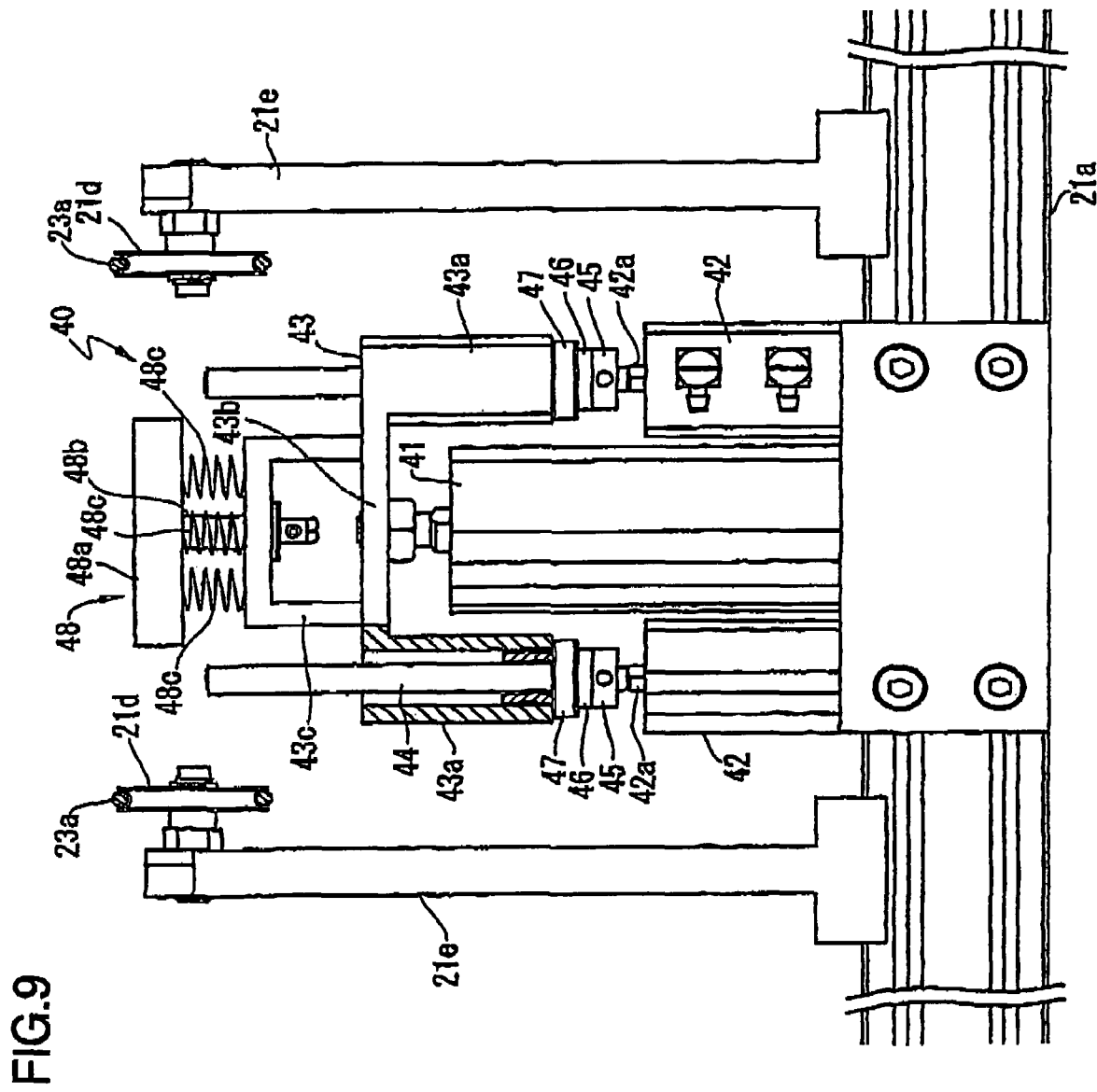
FIG. 9 is a front view of a substrate upward/downward moving device in the first substrate supporting unit with a part thereof being broken.

FIG. 9 is a front view of a pair of the guide rollers 21*d* provided in the first substrate supporting units 21A of the first substrate supporting portion 20A and the substrate upward/downward moving device 40 provided between the guide rollers 21*d* with a part of the substrate upward/downward moving device 40 being broken. The guide rollers 21*d* are supported so as to be rotatable at upper edge portions of roller supporting members 21*e* vertically supported by the support main bodies 21*a* with the roller axes thereof are in a horizontal manner along the direction orthogonal to the main frames 11.

Among five first substrate supporting units 21A which form the first substrate supporting portion 20A, the guide rollers 21*d* provided on the first substrate supporting units 21A are provided at the same position of the support main body 21*a*. Thus, the guide rollers 21*d* provided on one of the first substrate supporting units 21A and the guide rollers 21*d* provided on the adjacent first substrate supporting unit 21A are arranged in a line along the main frames 11. The guide rollers 21*d* of all the first substrate supporting units 21A which are lined along the main frames 11 together support one first supporting belt 23*a*.

As shown in FIGS. 3 and 4, each of the first supporting belts 23*a* has one end portion fixed in place on the substrate carry-in side of the mounting structure 10. Each of the first supporting belts 23*a* is supported by the guide rollers 21*d* of all the first substrate supporting units 21A which are lined along the main frames 11 in the first substrate supporting portion 20A. The first supporting belts 23*a* respectively loop around the guide rollers 21*d* provided on the first substrate supporting units 21A nearest to the scribing device guide body 30. The first supporting belts 23*a* pass below the guide rollers 21*d* of all the first substrate supporting units 21A lined along the main frames 11 in the first substrate supporting portion 20A and are pulled toward the substrate carry-in side. The first supporting belts 23*a* are respectively wound to the carry-in side winding drum 17*a* between the first carry-in pulley 14*a* and the second carry-in pulley 14*b* located in the and portion on the substrate carry-in side.

Figure 10:
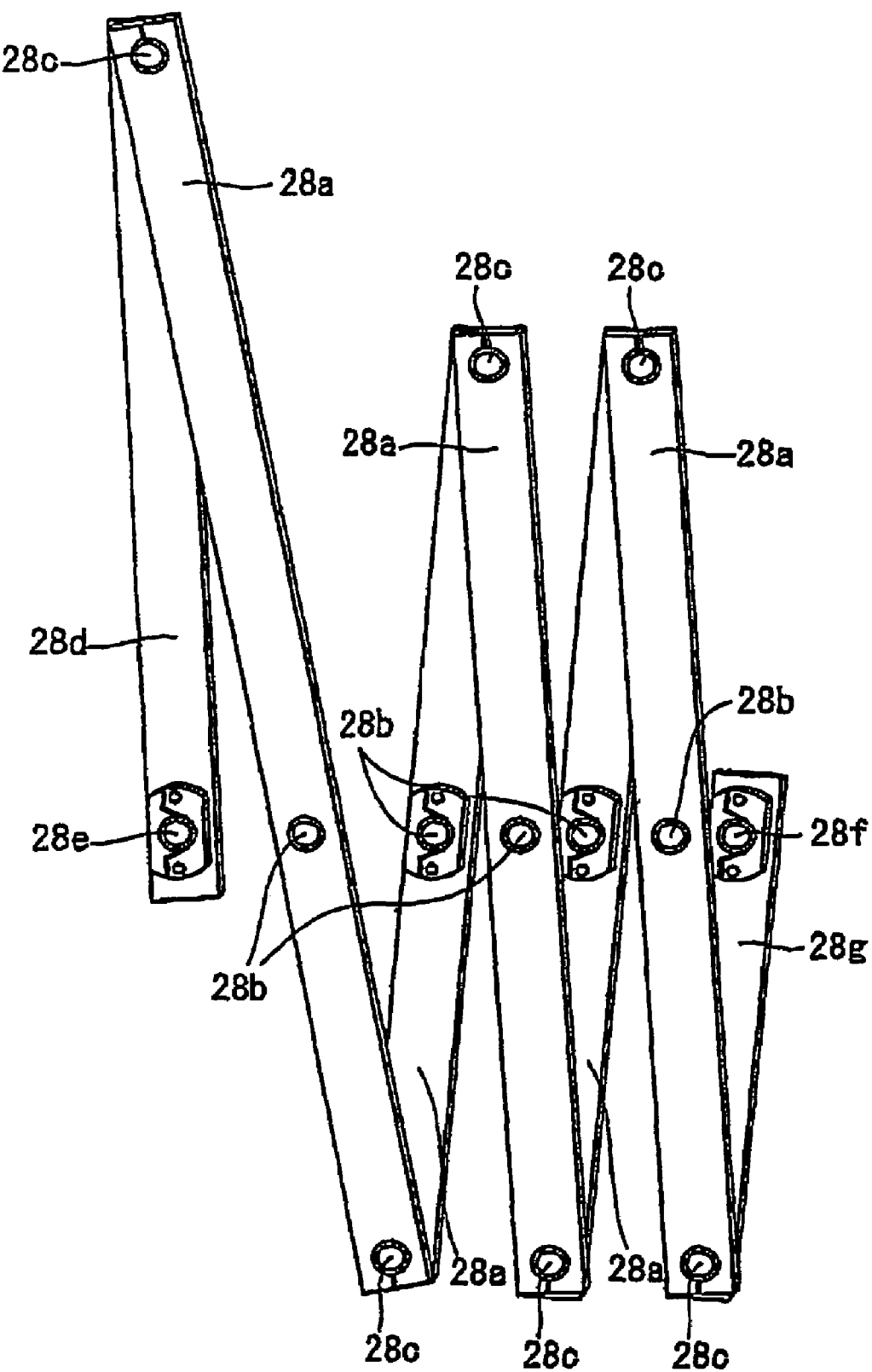
FIG. 10 is a side view showing structures of connection arms attached to at least one end portion of the first substrate supporting units 21.

The first substrate supporting units 21A adjacent to each other are coupled to each other by connection arms 28*a* respectively attached to end portions of the first substrate supporting units 21A. FIG. 10 is a side view showing the structure of the connection arms 28*a* attached to at least one end portion of the first substrate supporting units 21A. It is preferable that the connection arms 28*a* are attached to both end portions of the first substrate supporting units 21A. The connection arms 28*a* have center portions rotatably attached to the connection plates 21*b* attached to end portions of the support main bodies 21*a* in the first substrate supporting units 21A by attachment pins 28*b*. End portions of the connection arms 28*a* attached to the first substrate supporting units 21A adjacent to each other are rotatably attached to each other by a connection pin 28*c*.

The connection arm 28*a* attached to the first substrate supporting unit 21A located nearest to the end portion on the substrate carry-out side has its end portion which is different from the end portion coupled to the adjacent first substrate supporting unit 21A rotatably attached to one end portion of a rotation arm 28*d* by a connection pin 28*c*. The rotation arm 28*d* has the other end portion rotatably attached to the main frames 11 by a fixing pin 28*e*.

The connection arm 28*a* attached to the first substrate supporting unit 21A located to be nearest to the scribing device guide body 30 has its end portion which is different from the end portion coupled to the adjacent first substrate supporting unit 21A rotatably attached to one end portion of a rotation arm 28*g* by a connection pin 28*c*. The rotation arm 28*g* has the other end portion rotatably attached to the scribing device guide body 30 by a fixing pin 28*f*.

In the first substrate supporting portion 20A having the structure as described above, when the scribing device guide body 30 slides toward the substrate carry-out side, the first substrate supporting unit 21A provided near the scribing device guide body 30 integrally slides in the same direction. Then, each of the first substrate supporting units 21A slides toward the end portion on the substrate carry-out side with a space apart from the adjacent first substrate supporting unit 21A in the sliding direction in turn. Thus, all the first substrate supporting units 21A are arranged across the longitudinal direction of the mounting structure 10 with predetermined spaces therebetween.

In this case, the scribing device guide body 30 slides toward the substrate carry-out side, and thus, the first transmission belt 16*a* moves, the first carry-in pulley 14*a* rotates, and the carry-in side winding drum 17*a* rotates. Thus, the first substrate supporting units 21A move integrally with the scribing device guide body 30, and the all the first supporting belts 23*a* wound to the carry-in side winding drum 17*a* are drawn out.

As described above, when all the first substrate supporting units 21A in the first substrate supporting portion 20A are arranged across the entire region of the longitudinal direction of the mounting structure 10 with predetermined spaces therebetween, the bonded mother substrate 90 is placed on abut members 48 (see FIG. 9) of the substrate upward/downward moving device 40 provided on the first substrate supporting units 21A.

On the other hand, in the first substrate supporting portion 20A, when the scribing device guide body 30 slides toward the substrate carry-in side, the first substrate supporting unit 21A provided near the scribing device guide body 30 integrally slides in the same direction. Then, each of the first substrate supporting units 21A slides toward the end portion on the substrate carry-in side becoming closer to the adjacent first substrate supporting unit 21A in the sliding direction. Thus, all the first substrate supporting units 21A become close to each other in the end portion on the substrate carry-in side.

In this case, as described above, the scribing device guide body 30 slides toward the substrate carry-in side, and thus, the first transmission belt 16a moves, the first carry-in pulley 14a rotates, and the carry-in side winding drum 17a rotates integrally with the first carry-in pulley 14a. Thus, the first supporting belts 23a supported by the guide rollers 21d of the first substrate supporting units 21A are wound to the carry-in side winding drum 17a.

When the first substrate supporting units 21A slide in the end portion on the substrate carry-in side to the state where they are close to each other with the bonded mother substrate 90 being held by the clamp device 50 and supported on the first supporting belts 23a, the first supporting belts 23a are wound by the carry-in side winding drum 17a as the first substrate supporting units 21A slide. Thus, there is no possibility that the first supporting belts 23a are in sliding contact with a bottom surface of the bonded mother substrate 90.

The second substrate supporting portion 20B located on the substrate carry-out side with respect to the scribing device guide body 30 also has, for example, five second substrate supporting units 21B. The second substrate supporting units 21B provided in the second substrate supporting portion 20B have similar structures as the first substrate supporting units 21A of the first substrate supporting portion 20A except for that the substrate upward/downward moving device 40 is not provided. In the second substrate supporting portion 20B, each of second supporting belts 23b is respectively supported by the guide rollers 21d in all the second substrate supporting units 21B which are lined along the main frames 11.

Each of the second supporting belts 23b has an end portion located in the end portion on the substrate carry-out side fixed in place on the mounting structure 10. The second supporting belts 23b loop around the guide rollers 214 provided in the second substrate supporting unit 215 which is closest to the scribing device guide body 30, pace below the guide rollers 21d of all the second substrate supporting units 21B lined along the main frames 11 in the second substrate supporting portion 20B, and wound to the carry-out side winding drum 17b provided between the first carry-out pulley 15a and the second carry-out pulley 15b on the substrate carry-out side.

In the second substrate supporting portion 20B, movers (not shown) which form linear motors with the stators 12 provided on the main frames 11 are respectively provided in end portions in the longitudinal direction of the second substrate supporting unit 21B located closest to the scribing device guide body 30. The movers are respectively inserted into the stators 12. The movers slide inside the stators 12 to cause the second substrate supporting unit 21B close to the scribing device guide body 30 independently slides along the main frames 11 separately from the scribing device guide body 30.

Further, the second substrate supporting unit 218 close to the scribing device guide body 30 is coupled to the second transmission belt 16b. Thus, when the second substrate supporting unit 21B slides along the main frames 11, the second transmission belt 16b is moved.

As described above, the second carry-out pulley 15b around which the second transmission belt 16b loops is coupled to the carry-out side winding drum 17b. Thus, when the second substrate supporting units 21B attached to the second transmission belt 16b is slid toward the substrate carry-out side, the second transmission belt 16b moves in the same direction and the second carry-out pulley 15b rotates, the carry-out wide winding drum 17b rotates and the all the second supporting belts 23b attached to the carry-out side winding drum 17b are wound to the carry-out side winding drum 17b.

In the second substrate supporting portion 20B, second substrate supporting units 21B adjacent to each other are coupled to each other by connection arms 28a respectively attached to the end portions of the second substrate supporting units 21B. Center portions of the connection arms 28a are rotatably attached to the second substrate supporting units 21B. The and portions of the connection arms 28a attached to the second substrate supporting units 21B adjacent to each other are rotatably attached to each other. The connection arm 28a attached to the second substrate supporting unit 21B provided to be closest to the substrate carry-out side has its end portion opposite to the end portion attached to the adjacent second substrate supporting unit 21B rotatably attached to the main frames 11. Further, the connection arm 28a attached to the second substrate supporting unit 21B close to the scribing device guide body 30 has one end portion rotatably attached to the second substrate supporting unit 21B and the other end portion attached to an end portion of a connection arm 28a attached to the adjacent second substrate supporting unit 21B.

In the second substrate supporting portion 20B having such a structure, when the second substrate supporting unit 21B close to the scribing device guide body 30 slides toward the substrate carry-in side, each of the second substrate supporting units 21B slide toward the end portion on the substrate carry-in side while being separated from the adjacent second substrate supporting unit 21B in the sliding direction. Thus, all the second substrate supporting units 21B are arranged across the approximately entire region in the longitudinal direction of the mounting structure 10 with predetermined spaces therebetween.

In this case, the second substrate supporting unit 21B close to the scribing device guide body 30 slides toward the substrate carry-in side, and thus, the second transmission belt 16b moves, the second carry-out pulley 15b rotates and the carry-out side winding drum 17b rotates. Thus, the second substrate supporting units 21B around which the second supporting belts 23b loop move and the all the second supporting belts 23b wound to the carry-out side winding drum 17b are drawn out.

As described above, when all the first substrate supporting units 21A of the first substrate supporting portion 20A are located across approximately entire region of the longitudinal direction of the mounting structure 10 with predetermined spaces therebetween, the bonded mother substrate 90 is placed on the abut members 48 (see FIG. 9) of the substrate upward/downward moving device 40 provided on the first substrate supporting units 21A.

Thereafter, when the bonded mother substrate 90 is positioned, the positioned bonded mother substrate 90 is held by the clamp device 50 and also supported by first supporting belts 23a of the first substrate supporting portion 20A.

In this state, cutting of the bonded mother substrate 90 is started by the upper portion substrate cutting device 60 and the lower portion substrate cutting device 70 provided on the scribing device guide body 30. As the scribing device guide body 30 moves toward the substrate carry-in aide, each of the first substrate supporting units 21A of the first substrate supporting portion 20A slides to the end portion on the substrate carry-in side while becoming closer to the adjacent first substrate supporting unit 21A in the sliding direction. Further, each of the second substrate supporting unit 21B of the second substrate supporting portion 20B slides toward the end portion on the substrate carry-in side while being separated from the adjacent second substrate supporting unit 21B in the sliding direction. Thus, the bonded mother substrate 90 while being cut is also supported by the second supporting belts 23b of the second substrate supporting portion 20B.

When cutting of the bonded mother substrate 90 is finished, all the second substrate supporting units 21B of the second substrate supporting portion 20B are arranged across approximately entire region of the longitudinal direction of the mounting structure 10 with predetermined spaces therebetween, and the bonded mother substrate 90 is supported by the second supporting belts 23b.

Thus, when all the second substrate supporting units 21B of the second substrate supporting portion 20B are arranged across approximately entire region of the longitudinal direction of the mounting structure 10 with predetermined spaces therebetween, cut bonded mother substrate 90' (mill end) is supported on the second supporting belts 23b supported by the guide rollers 21d provided on the second substrate supporting units 21B after all the panel substrates are carried out by the substrate carry-out device 80.

Thereafter, the cut bonded mother substrate 90' is released from being held by the clamp device 50 and the second substrate supporting unit 21B close to the scribing device guide body 30 slides toward the end portion on the substrate carry-out side. Thus, each of the second substrate supporting units 21B slides toward the end portion on the substrate carry-out side while becoming closer to the adjacent second substrate supporting unit 21B in the sliding direction, and all the second substrate supporting units 21B become close to each other in the end portion on the substrate carry-out side.

In this case, as described above, the second substrate supporting unit 21B close to the scribing device guide body 30 slides toward the substrate carry-out side and the second transmission belt 16b moves. Then, the second carry-out pulley 15b rotates and the carry-out side winding drum 17b rotates integrally with the second carry-out pulley 15b. Thus, the second supporting belts 23b supported by the guide rollers 21d of the second substrate supporting units 21B are wound to the carry-out side winding drum 17b. The means for winding the first supporting belts 23a and the second supporting belts 23b is not limited to those rotating the carry-in side winding drum 17a and the carry-out side winding drum 17b by moving the scribing device guide body 30 and the second substrate supporting units 21B as described above.

For example, a turning force may be applied in a direction to wind supporting belts to the winding drum all the time, and the scribing device guide body 30 and the second substrate supporting units 21B may be moved by a force stronger than the turning force.

Further, a mechanism for winding the first supporting belts 23a of the first substrate supporting portion 20A and the second supporting belts 23b of the second substrate supporting portion 20B described above may include a device for applying tension to the first supporting belts 23a and the second supporting belts 23b appropriately in accordance with the size of the device.

The carry-in pulleys 14a and 14b and the carry-out pulleys 15a and 15b may include a clutch for coupling and decoupling the winding drums 17a and 17b as necessary.

As described above, since the second substrate supporting units 21B slide toward the end portion on the substrate carry-out aide, and thus, the guide rollers 21d provided on the second substrate supporting units 21B slid in the same direction, the second supporting belts 23b are sequentially brought into a non-contact state without being in sliding contact with the bottom surface of the cut bonded mother substrate 90'. The supports of the cut bonded mother substrate 90' by the second supporting belts 23b are sequentially released. When all the second substrate supporting units 21B become close to each other in the end portion on the substrate carry-out side, the cut bonded mother substrate 90' (mill end) is not supported by the first supporting belts 23a any more and drops downward. In this case, the cut bonded mother substrate 90' dropped downward (mill end and cullet) is guided by a guiding plate arranged in a slanted state and is accommodated within a cullet accommodation box.

Figure 11:
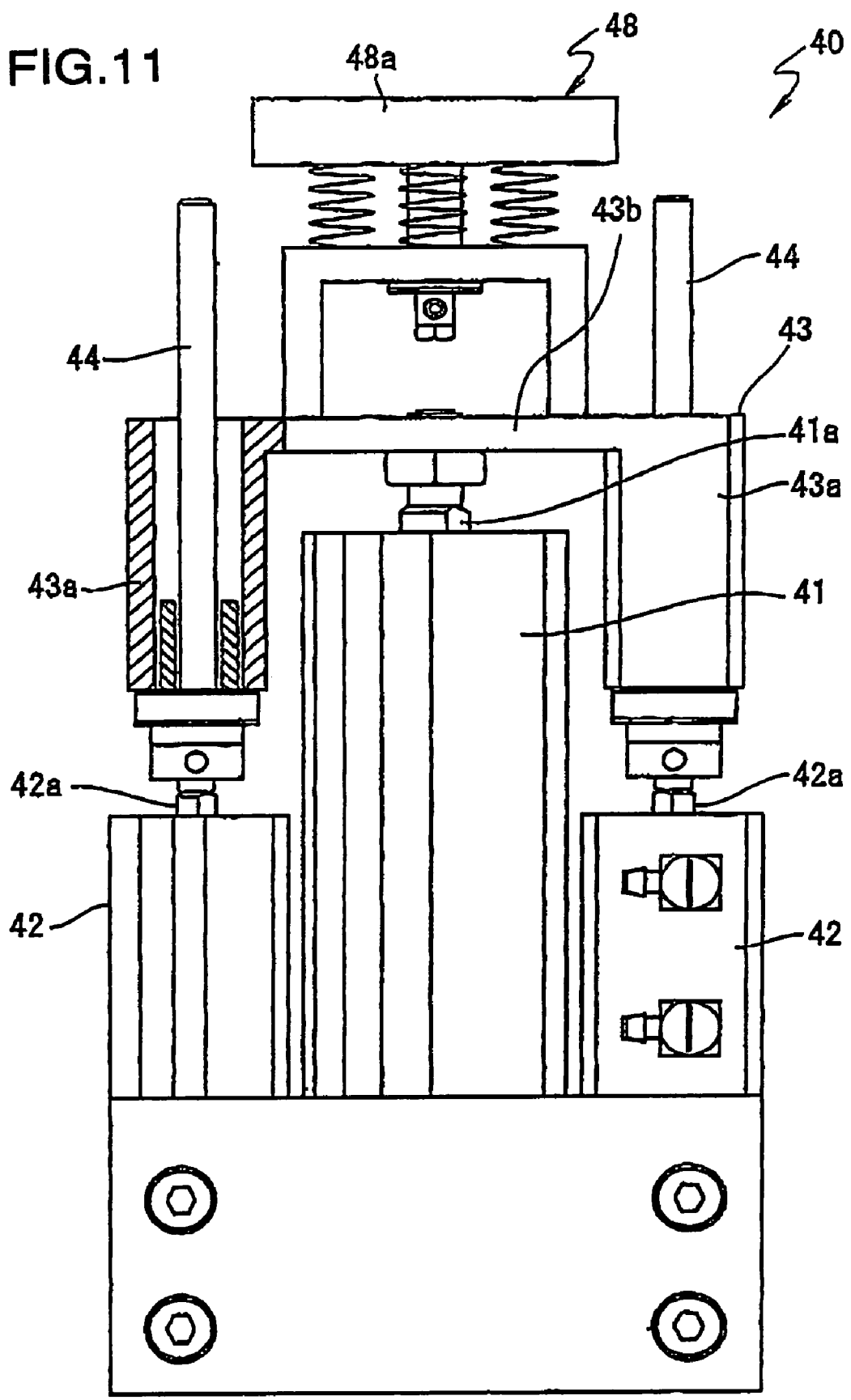
FIG. 11 is a front view of the substrate upward/downward moving device shown in FIG. 9 with a part thereof being broken.
Figure 12:
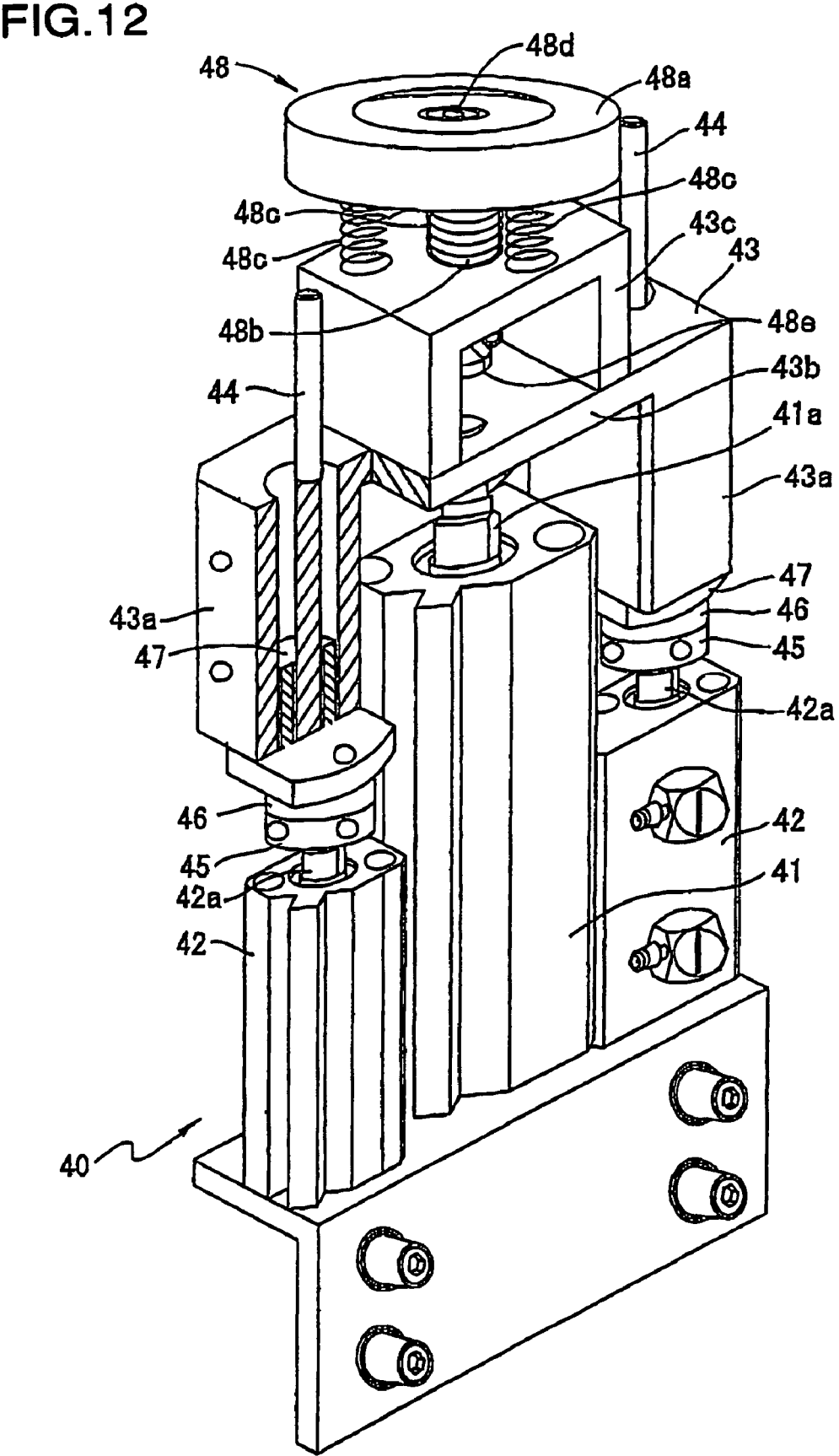
FIG. 12 is a perspective view of the substrate upward/downward moving device with a part thereof being broken.

FIG. 11 is a front view of the substrate upward/downward moving device 40 provided in the first substrate supporting units 21A of the first substrate supporting portion 20A with a part of the substrate upward/downward moving device 40 being broken. FIG. 12 is a perspective view thereof. On each of the first substrate supporting units 21A provided in the first substrate supporting portion 20A, the substrate upward/downward moving device 40 is provided between a pair of guide rollers 21d. The substrate upward/downward moving device 40 includes a moving cylinder 41 attached to the support main body 21a of the first substrate supporting units 21A in a vertical fashion and positioning cylinders 42 located on both sides of the moving cylinder 41 in a vertical fashion. The second substrate supporting units 21B provided in the second substrate supporting portion 20B do not include such a substrate upward/downward moving device.

A piston rod 41a of the moving cylinder 41 is made to move upward, and a sliding member 43 is attached to a tip portion of the piston rod 41a. The sliding member 43 includes sliding portions 43a having a pipe shape which are provided on side so as to locate on both sides of the moving cylinder 41, and a connection portion 43b having a plate shape which couples the sliding portions 43a. The center portions of the sliding portions 43a are attached to the tip portion of the piston rod 41a of the moving cylinder 41.

The positioning cylinders 42 provided on both sides of the moving cylinder 41 have similar structures. Respective piston rods 42a are made to move upward. To the tip portions of the piston rods 42a, guide rods 44 are coupled co-axially. The guide rods 44 are inserted through the sliding portions 43a of the sliding member 43 with appropriate spaces therebetween. In lower parts of the sliding portions 43a, slide bushings 47 which are in smooth sliding contact with the guide rods 44 inserted through the sliding portions 43a are provided.

To the lower end portions of the guide rods 44, set collars 45 having a disc shape are attached in a fitted state. On the set collars 45, buffer members 46 having a disc shape which are formed of polyurethane rubber are attached in a fitted state. The set collars 45 are at predetermined positions respectively close to the positioning cylinders 42 when the piston rods 42a of the positioning cylinders 42 are retracted into the positioning cylinders 42 to the innermost position.

On the connection portion 43b of the sliding member 43, a fixing table 43c is provided. On the fixing table 43c, the abut member 48 which abuts the bottom surface of the bonded mother substrate when the bonded mother substrate 90 is carried to the substrate cutting system by carrying means such as a carrying robot, carrying belt, or the like. The abut member 48 includes an abut main body 48a having a disc shape, and an axis portion 48b vertically extended from the center portion of the abut main body 48a. A lower and portion of the axis portion 48b is inserted through an upper surface portion of the fixing table 43c. To the axis portion 48b of the abut member 48, a coil spring 48c is fitted so as to position between the abut main body 48a of the abut member 48 and an upper surface of the fixing table 43c. Furthermore, a plurality of coil springs 48c are provided around the axis portion 48b between the abut main body 48a of the abut member 48 and the upper surface of the fixing table 43c. The coil springs 48c apply forces to the abut main body 48a in upward direction. The abut main body 48a is supported in a horizontal fashion by the coil springs 48c.

In the substrate upward/downward moving device 40 having such a structure, all the moving cylinders 41 provided in the first substrate supporting portion 20A are driven integrally and all the positioning cylinders 42 are driven integrally. When the piston rods 41a of the moving cylinders 41 are retracted to the innermost position, the abut main bodies 48a of the abut members 48 are at retraction positions which are below the upper end portion of the guide rollers 21d. Thus, at such retraction positions, the abut main bodies 48a of the abut members 48 are positioned below the bonded mother substrate 90 supported by the first supporting belts 23a in the first substrate supporting portion 20A.

When the piston rods 41d of the moving cylinders 41 moves out to the uppermost position, the abut main bodies 48a of the abut members 48 are at support positions above the upper and portions of the guide rollers 21d, protruded upward by a predetermined height from the first supporting belts 23a. In such a case, the positioning cylinders 42 are not driven. Therefore, when the piston rods 41a of the moving cylinders 41 move out, the sliding members 43 attached to the piston rods 41a slide along the guide rods 44. When the piston rods 41a of the moving cylinders 41 moves out to the uppermost position, the abut main bodies 48a of the abut members 48 are at positions above the first supporting belts 23a. The bonded mother substrate 90 is placed on and supported by the abut main bodies 48a of the abut members 48.

The moving cylinder 41 is formed to have the piston rod 41a moved out by a predetermined amount such that the abut main body 48a of the abut member 48 is at a predetermined intermediate position protruded upward by a predetermined height from the first supporting belts 23a with the bonded mother substrate 90 being held. In this case, the moving cylinder 41 is driven such that the piston rod 41a of the moving cylinder 41 which has been moved out to the uppermost position is retracted after the piston rods 42a of the positioning cylinders 42 are made to move out by predetermined amounts. In this way, the set collars 45 attached to the guide rods 44 coupled to the piston rods 42a are at the predetermined positions and the sliding portions 43a of the sliding member 43 abut the set collars 45 via the buffer members 46 by the moving cylinder 41 so that the sliding member 43 is at a predetermined height position. This causes the abut main body 48a of the abut member 48 to be at a predetermined height position and the bonded mother substrate 90 supported by the abut main body 48a is placed at that position.

In the axis portion 48b of the abut member 48, a through hole 48d is formed. Through the through hole via a joint 48e, gas, for example, compressed air, nitrogen, He or the like is to be blown out.

The second substrate supporting units 21B provided in the second substrate supporting portion 20B does not have a substrate upward/downward moving device 40 having such a structure.

The structure of the substrate upward/downward moving device 40 as described above is merely an example used in the substrate cutting system of the present invention, and the structure is not limited to such a structure. As long as the substrate upward/downward moving device 40 can receive and support the bonded mother substrate 90 carried to the substrate cutting system of the present invention by a carrying robot, carrying belt or the like inside the substrate cutting system, it may have any structure.

The mounting structure 10 includes a positioning device (not shown) for positioning the bonded mother substrate 90 supported at a intermediate portion by all the substrate upward/downward moving devices 40 provided in the first substrate supporting portion 20A.

The positioning device includes, for example, a plurality of positioning pins (not shown) along one of the main frames 11 and along a direction orthogonal to the main frame 11 with predetermined spaces therebetween. For the positioning pins arranged along the one of the main frames 11, pushers (not shown) for pushing a side edge of the bonded mother substrate 90 which opposes the positioning pins supported at the intermediate position. For the positioning pins arranged in a direction orthogonal to the main frame 11, pushers (not shown) for pushing an opposing side edge of the bonded mother substrate 90 are provided.

Further, for example, when the positioning device for performing positioning of the bonded mother substrate 90 immediately before transportation to the substrate cutting system of the present invention is provided separately from the substrate cutting system, a positioning device within the substrate cutting system may be omitted.

Further, the positioning device within the substrate cutting system to not limited to the positioning pins and pushers as described above. It may be any kind of devices as long as it can provide a constant position of the bonded mother substrate 90 in the substrate cutting system.

Furthermore, the mounting structure 10 includes the clamp device 50 for clamping the bonded mother substrate 90 which is supported at the intermediate position by all the substrate upward/downward moving devices 40 provided in the first substrate supporting portion 20A and pushed against the positioning pine so as to be positioned. For example, as shown in FIG. 5, the clamp device 50 includes a plurality of clamp members 51 attached to one of the main frames 11 with predetermined spaces therebetween in a longitudinal direction so as to clamp a side edge of the positioned bonded mother substrate 90 along the main frame 11, and a plurality of clamp members 51 arranged along the direction orthogonal to the main frames 11 with a predetermined spaces therebetween for clamping a side edge of the positioned bonded mother substrate 90 on the substrate carry-in side.

Figure 13:
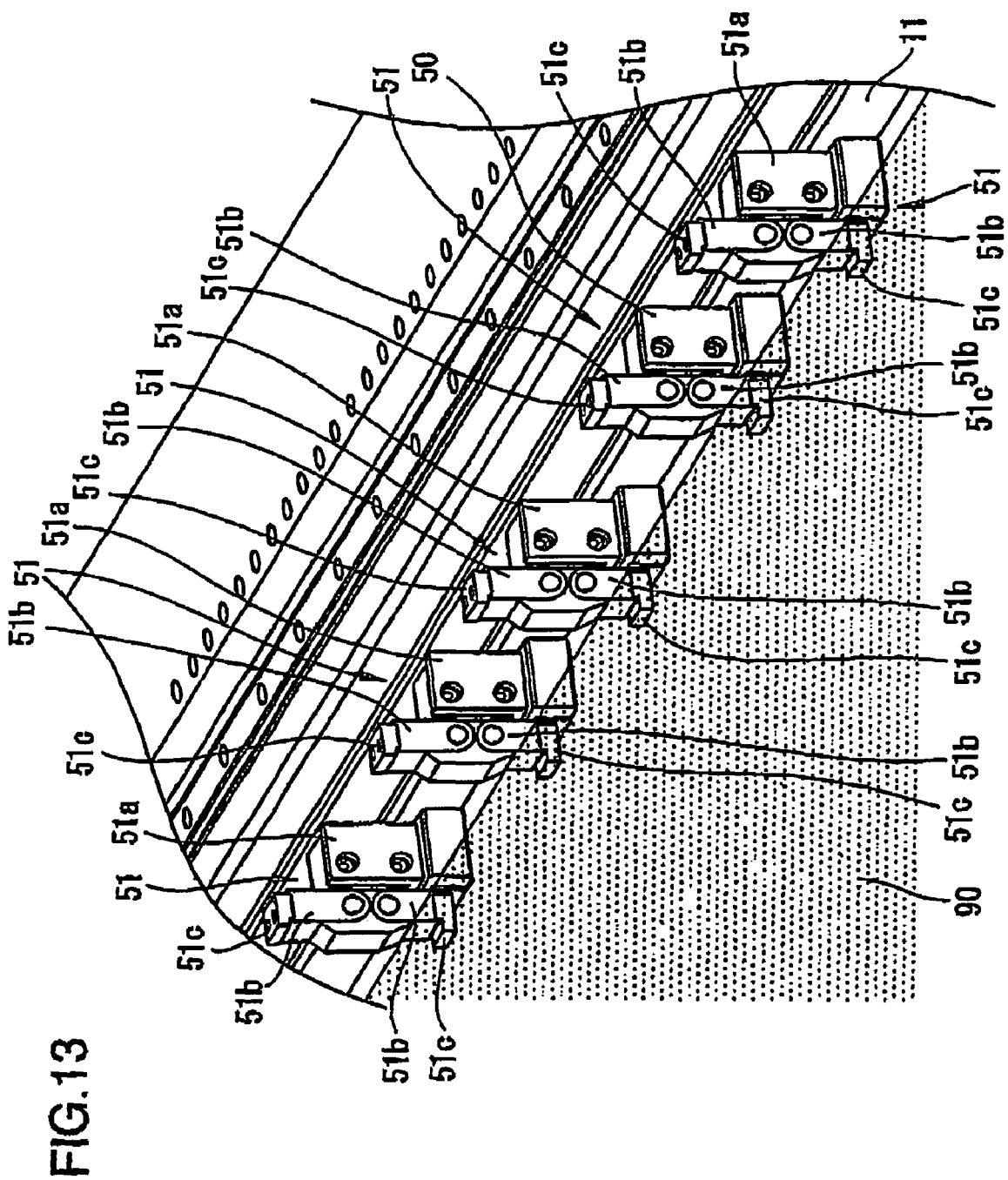
FIG. 13 is a perspective view for showing structures of clamp device provided in the substrate cutting system.
Figure 14:
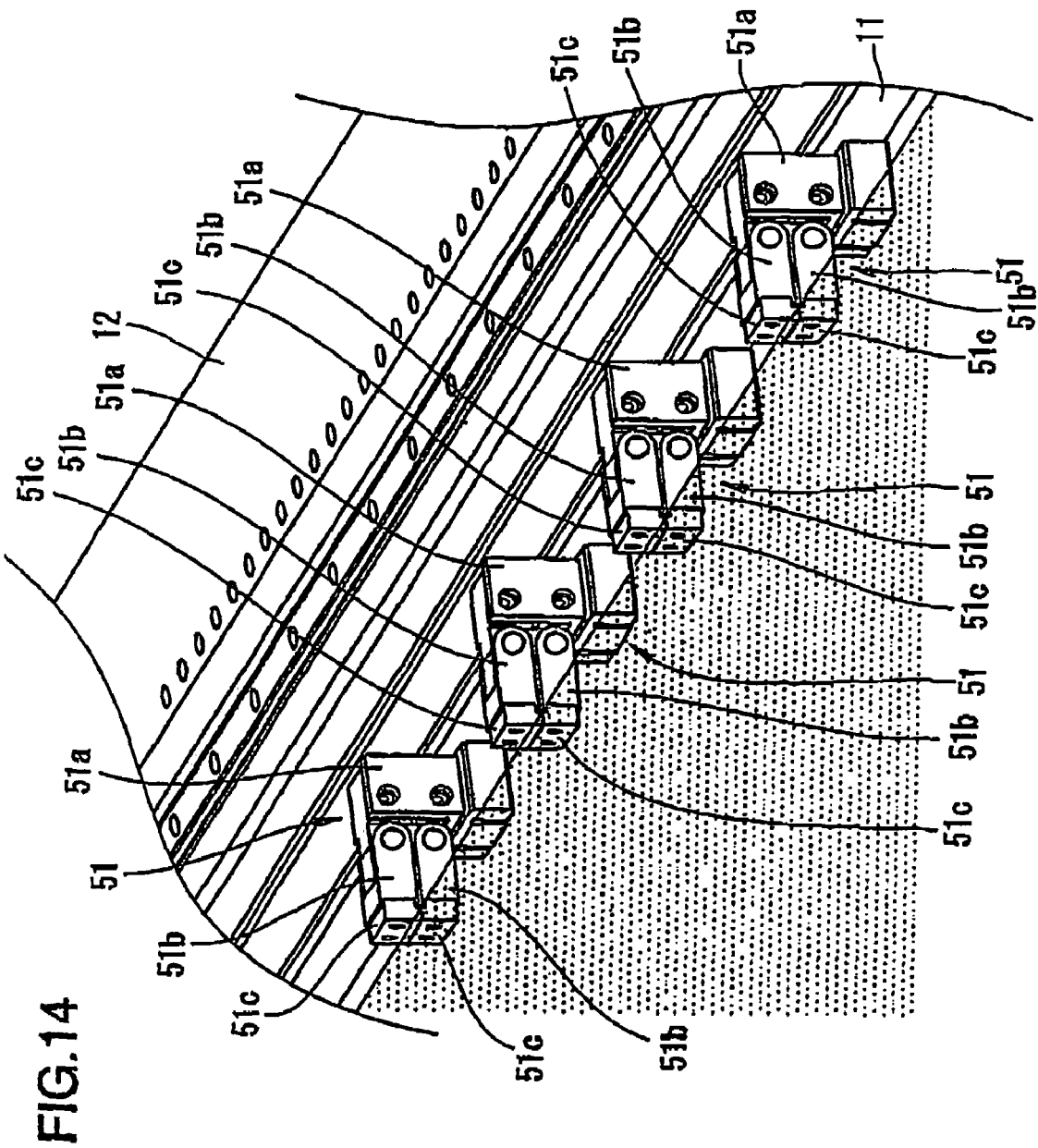
FIG. 14 is a perspective view for showing an operation of the clamp device.

FIG. 13 is a perspective view for showing a plurality of clamp members 51 provided on one of the main frames 11. FIG. 14 is a perspective view for showing an operation thereof. The clamp members 51 have similar structures to each other. Each of the clamp members 51 includes a casing 51a attached to the main frame 11 and a pair of upper and lower rotation arms 51b attached to the casing 51a so as to be rotatable from a vertical position to a horizontal position. Each of the rotation arms 51b can rotate having one end portion as a center. The end portions to be the center of rotation are located close to each other. A tip portion of the upper rotation arm 51b locates above the rotation center in the vertical position. A tip portion of the lower rotation arm 51b locates below the rotation center in the vertical position. The rotation arms 51b respectively rotate by 90 degrees toward the bonded mother substrate 90, and thus, the rotation arms 51b are in horizontal positions opposing each other.

To the tip portions of the rotation arms 51b, clamp portions 51c which respectively abut the upper surface or the lower surface of the bonded mother substrate 90 are attached. The clamp portions 51c are formed of elastic body. The rotation arms 51b are integrally rotated from the vertical position to the horizontal position and from the horizontal position to the vertical position. When the rotation arms 51*b* are rotated to the horizontal position, the clamp portions 51*c* attached to the tip portions of the rotation arms 51*b* clamp the bonded mother substrate 90.

The clamp members 51 arranged along a direction orthogonal to the main frames 11 have similar structures. These clamp members 51 are also driven integrally. After the side edges orthogonal to each other of the bonded mother substrate 90 are clamped by the plurality of clamp members 51, all the clamp members 51 sink below, and the bonded mother substrate 90 is supported by the first supporting belts 23*a* of the first substrate supporting portion 20A.

The structures of the clamp device 50 and the clamp members 51 as described above are merely examples used in the substrate cutting system of the present invention, and the structures are not limited to such structures. The clamp device 50 and the clamp members 51 may have any kind of structures as long as they can grip or hold the side edges of the bonded mother substrate 90. When the substrate size is small, the substrate can be held by clamping one position of the side edge of the substrate, and the substrate can be cut without causing a defect in the substrate.

As shown in FIG. 6, the upper portion substrate cutting device 60 is attached to the upper guide rail 31 in the scribing device guide body 30. As shown in FIG. 7, the lower portion substrate cutting device 70 having the similar structure as the upper portion substrate cutting device 60 but inverted upside down is attached to the lower guide rail 32. As described above, the upper portion substrate cutting device 60 and the lower portion substrate cutting device 70 respectively slide along the upper guide rail 31 and the lower guide rail 32 by the linear motors.

For example, in the upper portion substrate cutting device 60 and the lower portion substrate cutting device 70, a cutter wheel 62*a* for scribing the upper glass substrate of the bonded mother substrate 90 is rotatably attached to a tip holder 62*b*, and the tip holder 62*b* is rotatably attached to a cutter head 62*c* having an axis in a direction vertical to the surface of the bonded mother substrate 90 held by the clamp device 50. The cutter head 62*c* is movable along a direction vertical to the surface of the bonded mother substrate by driving means which it not shown. The cutter wheel 62*a* is appropriately loaded by energizing means which is not shown.

The cutter wheel 62*a* held by the tip holder 62*b* may have a blade edge protruded so as to have a center portion in a width direction of a shape of letter V with an obtuse angle and may have protrusions of a predetermined height formed on the blade edge with predetermined pitches in a circumferential direction as disclosed in Japanese Laid-Open Publication No. 9-188534.

The lower portion substrate cutting device 70 provided on the lower guide rail 32 has a structure similar to the upper portion substrate cutting device 60 but inverted upside down. A cutter wheel 62*a* of the lower portion substrate cutting device 70 (see FIG. 7) is arranged so as to oppose the cutter wheel 62*a* of the upper portion substrate cutting device 60.

The cutter wheel 62*a* of the upper portion substrate cutting device 60 are pressed onto a surface of the bonded mother substrate 90 and rotated by the above-described energizing means and moving means of the cutter head 62*a*. The cutter wheel 62*a* of the lower portion substrate cutting device 70 is pressed onto a back surface of the bonded mother substrate 90 and rotated by the above-described energizing means and moving means of the cutter head 62*c*. By moving the upper portion substrate cutting device 60 and the lower portion substrate cutting device 70 in the same direction at the same time, the bonded mother substrate 90 is cut.

It is preferable that the cutter wheel 62*a* is rotatably supported by a cutter head 65 using a servo motor disclosed in WO 03/011777.

Figure 15:
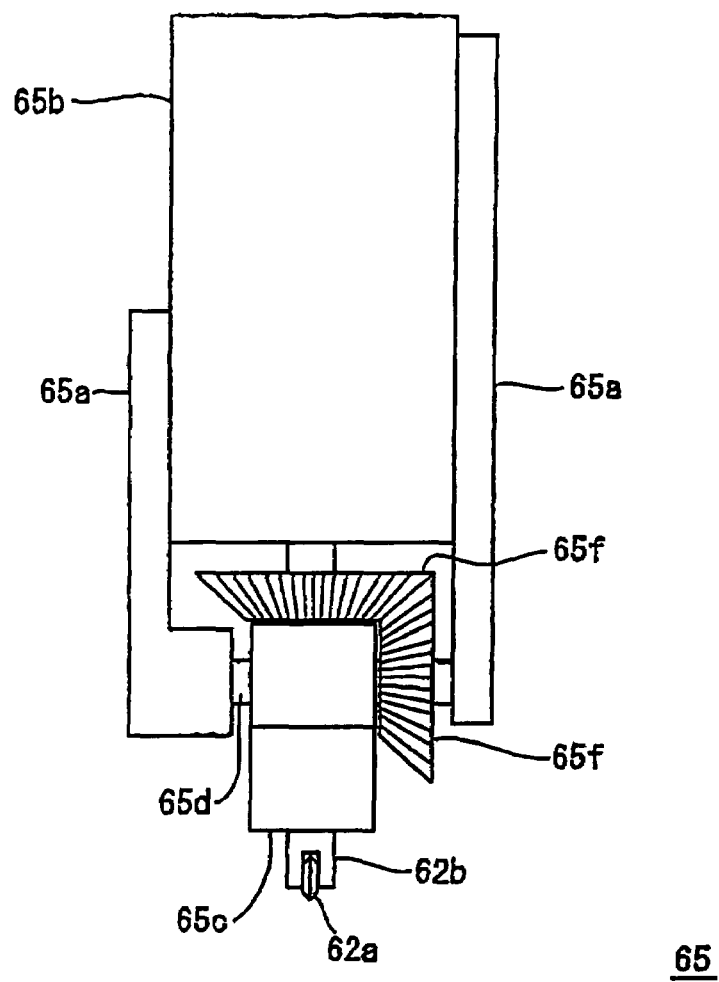
FIG. 15 is a side view showing an example of a cutter head provided in the substrate cutting device in the substrate cutting system according to Embodiment 1 of the present invention.
Figure 16:
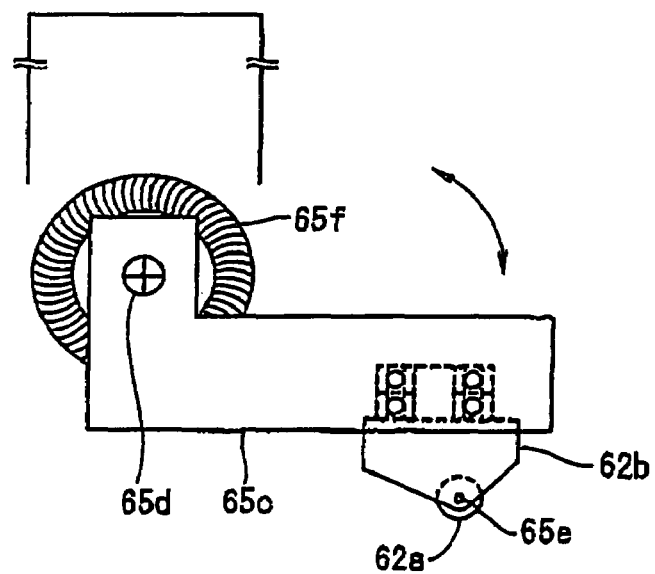
FIG. 16 is a front view showing an important part of the cutter head.

FIG. 15 shows a side view of an exemplary cutter head 65 using a servo motor. FIG. 16 is a front view of the main part of the cutter head 65. A servo motor 65*b* is held between a pair of side walls 65*a* in an inverted state. In the lower part of the side walls 65*a*, a holder maintaining assembly 65*c* having a shape of letter L when viewed from side is rotatably provided via a spindle 65*d*. On the front portion of the holder maintaining assembly 65*c* (the right hand part in FIG. 16), the tip holder 62*b* for rotatably supporting the cutter wheel 62*a* via an axis 65*e*. Flat bevel gears 65*f* are respectively attached to the rotation axis of the servo motor 65*b* and the spindle 65*d* so as to engage each other. With such a structure, by rotating the servo motor 65*b* in normal or inverted direction, the holder maintaining assembly 65*c* performs an elevating operation having the spindle 65*d* as a fulcrum and the cutter wheel 62*a* moves up and down. The cutter head 65 itself is included in the upper portion substrate cutting device 60 and/or lower portion substrate cutting device 70.

Figure 17:
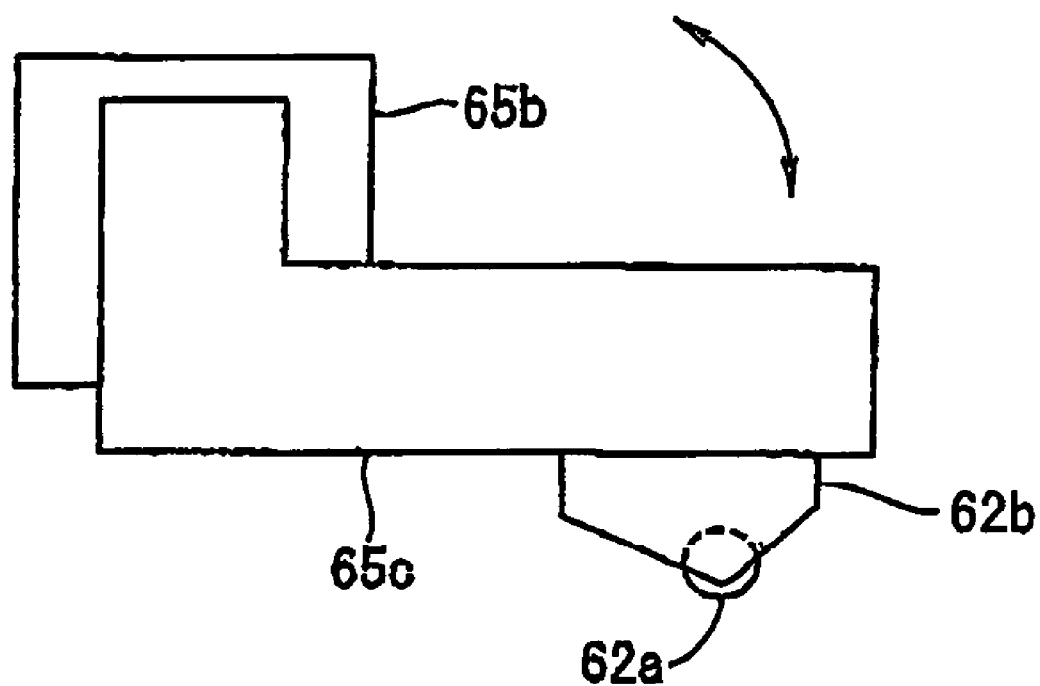
FIG. 17 is a front view showing another example of the cutter head provided in the substrate cutting device in the substrate cutting system according to Embodiment 1 of the present invention.

FIG. 17 is a front view showing another example of a cutter head using a servo motor. In this example, the rotation axis of the servo motor 65*b* is directly connected to the holder maintaining assembly 65*c*.

The cutter heads of FIGS. 15 and 17 moves the cutter wheel 62*a* for positioning by rotating the servo motor by position control. Such a cutter head controls a rotation torque which acts to bring back the position of the cutter wheel 62*a* to the position which has been previously set to the servo motor 65*b* when the position is moved from the set position, and transmits a scribing pressure to a brittle material substrate during scribing operation in which the cutter head is moved in the horizontal direction to form scribe lines on the bonded mother substrate 90. In other words, the servo motor 65*b* controls the position of the cutter wheel 62*a* in a vertical direction and also serves as energizing means for the cutter wheel 62*a*.

By using the cutter head including the servo motor as described above, the rotation torque of the servo motor can be corrected while the bonded mother substrate 90 is being scribed instantly in accordance with the change in a scribing pressure due to a variance in resistance applied to the cutter wheel 62*a*. Thus, stable scribing is performed and scribe lines with high quality can be formed.

A cutter head including a mechanism to periodically change the pressure to the bonded mother substrate 90 by a scribing cutter by vibrating the scribing cutter such as a diamond point cutter and/or cutter wheel for scribing the bonded mother substrate 90 may also effectively applied to the cutting of the mother substrate by the substrate cutting system of the present invention.

The structures of the upper portion substrate cutting device 60 and the lower portion substrate cutting device 70 are not limited to the above-described structures. The devices may have any kind of structures as long as they process the front and back surfaces of the substrate to cut the substrate.

For example, the upper portion substrate cutting device 60 and the lower portion substrate cutting device 70 may be a device for cutting the mother substrate by using laser light, a dicing saw, a cutting blade, a diamond cutter, or the like.

When the mother substrate is a metal substrate such as steel sheet, wood plate, a plastic substrate, and a brittle material substrate such as ceramics substrate, glass substrate, semiconductor substrate or the like, a scribing device for cutting the mother substrate by using, for example, laser light, a dicing saw, a cutting blade, a diamond cutter, or the like may be used.

Furthermore, the upper portion substrate cutting device 60 and the lower portion substrate cutting device 70 may further include cutting assistance means for assisting in the cutting of the substrate. The cutting assistance means may be, for example, means for pressing a roller or the like to the substrate, or means for warming (heating) the substrate by spraying compressed air to the substrate or blowing hot air to the substrate.

In the above example, the upper portion substrate cutting device 60 and the lower portion substrate cutting device 70 have the same structure. However, they may have different structures depending upon the cutting pattern of the substrate and cutting conditions for the substrate.

The operation of the substrate cutting system having such a structure will be explained with reference mainly to an example in which a bonded substrate formed by bonding large-scale glass plates is cut.

For cutting the bonded mother substrate 90 formed by bonding large-scale glass substrates to each other into a plurality of panel substrates 90a (see FIG. 19), first, as shown in FIG. 18, all the second substrate supporting units 21B of the second substrate supporting portion 20B in the substrate supporting device 20 are moved toward the end portion on the substrate carry-out aide, and the scribing device guide body 30 is also moved toward the end portion on the substrate carry-out side. When the scribing device guide body 30 is moved to the end portion on the substrate carry-out side, all the first substrate supporting units 21A on the carry-in side of the first substrate supporting portion 20A in the substrate supporting device 20 are arranged across approximately entire region of the mounting structure 10 with predetermined spaces therebetween.

Then, moving cylinders 41 of all the substrate upward/downward moving devices 40 provided in the first substrate supporting units 21A are driven in synchronization, and the respective piston rods 41a move upward. Thus, the abut main bodies 48a of the abut members 48 are at the positions for receiving the bonded mother substrate which is protruded above relative to the first supporting belts 23a.

In such a state, the bonded mother substrate 90 is carried to the substrate cutting system from the end portion on the substrate carry-in side by a carrying conveyer, a carrying robot or the like. The bonded mother substrate 90 is supported by the abut main bodies 48a of the abut members 48 in all of the substrate upward/downward moving devices 40 in the first substrate supporting device 20A.

When the bonded mother substrate 90 is supported by the abut main bodies 48a of the abut members 48, a pair of positioning cylinders 42 in each of the substrate upward/downward moving devices 40 are driven and the piston rod 42a moves out by a predetermined amount. Then the moving cylinders 41 of all the substrate upward/downward moving devices 40 are driven in synchronization and the respective piston rods 41a retract downward. Thus, the set collars 45 attached to guide rods 44 coupled to the piston rods 42a are at the predetermined position, and the sliding portions 43a of the sliding member 43 abut the set collars 45 via the buffer members 46. Accordingly, the abut main bodies 48a of the abut members 48 provided in the substrate upward/downward moving devices 40 are at the intermediate positions above the first supporting belts 23a by a predetermined height, and the bonded mother substrate 90 supported by the abut main bodies 48a in a horizontal fashion is positioned at the intermediate position above the first supporting belts 23a.

In such a state, compressed air to blown out from the through holes 48d of the abut members 48 to slightly lift the bonded mother substrate 90 from the abut main bodies 48a. The bonded mother substrate 90 supported by the abut main bodies 48a in a horizontal fashion is pressed by a pressure which is not shown so that it abut the positioning pins (not shown) arranged along one of the main frames 11 and also pressed by a pressure which is not shown so that it abut the positioning pins (not shown) arranged along the direction orthogonal to the main frame 11. In this way, the bonded mother substrate 90 slightly lifted from the abut main bodies 48a in a horizontal fashion is positioned to a predetermined position within the mounting structure 10 in the substrate cutting system.

Then, as shown in FIG. 19, the bonded mother substrate 90 supported by the abut main bodies 48a in a horizontal fashion has its side edge along the one of the main frames 11 clamped by the clamp members 51 of the clamp device 50. The side edge of the bonded mother substrate 90 on the substrate carry-in side edge is clamped by the clamp members 51 arranged on the substrate carry-in side so as to be orthogonal to the main frames 11.

When the side edges of the bonded mother substrate 90 which are orthogonal to each other are respectively clamped by the clamp device 50, the moving cylinder 41 and a pair of the positioning cylinders 42 of each of the substrate upward/downward moving devices 40 provided in the first substrate supporting units 21A are driven to retract the piston rods 41a and 42a. The abut main bodies 48a of the abut members 48 are at retracted position below the first supporting belts 23a. Accordingly, the clamp members clamping the side edges of the bonded mother substrate 90 sink approximately at the same time due to the weight of the bonded mother substrate itself. Thus, the bonded mother substrate 90 is supported supplementarily by the first supporting belts 23a.

In such a state, the scribing device guide body 30 slide toward the substrate carry-in side so as to be a predetermined position on a side edge near the bonded mother substrate 90 clamped by the clamp device 50 in a horizontal fashion. The first optical device 38 and the second optical device 39 provided on the scribing device guide body 30 move along the guide body 30 from waiting positions. Thus, the images of the first alignment mark and the second alignment mark provided on the bonded mother substrate 90 are taken.

In this example, since the scribing device guide body 30 slides, the first substrate supporting unit 21A in the substrate supporting device 20 which is close to the scribing device guide body 30 slides toward the end portion on the substrate carry-in side, and the second substrate supporting units 21B in the second substrate supporting portion 20B which is close to the scribing device guide body 30 slides toward the end portion on the substrate carry-it side.

Next, based on the results of taking the images of the first alignment mark and the second alignment mark, angle of the bonded mother substrate 90 supported by the clamp device 50 in a horizontal fashion in a direction along the scribing device guide body 30, cutting start position and cutting end position by a calculation using an operation process device which is not shown. Based on the calculated results, the scribing device guide body 30 is moved with the upper portion substrate cutting device 60 and the lower portion substrate cutting device 70 to out the bonded mother substrate 90.

Figure 20:
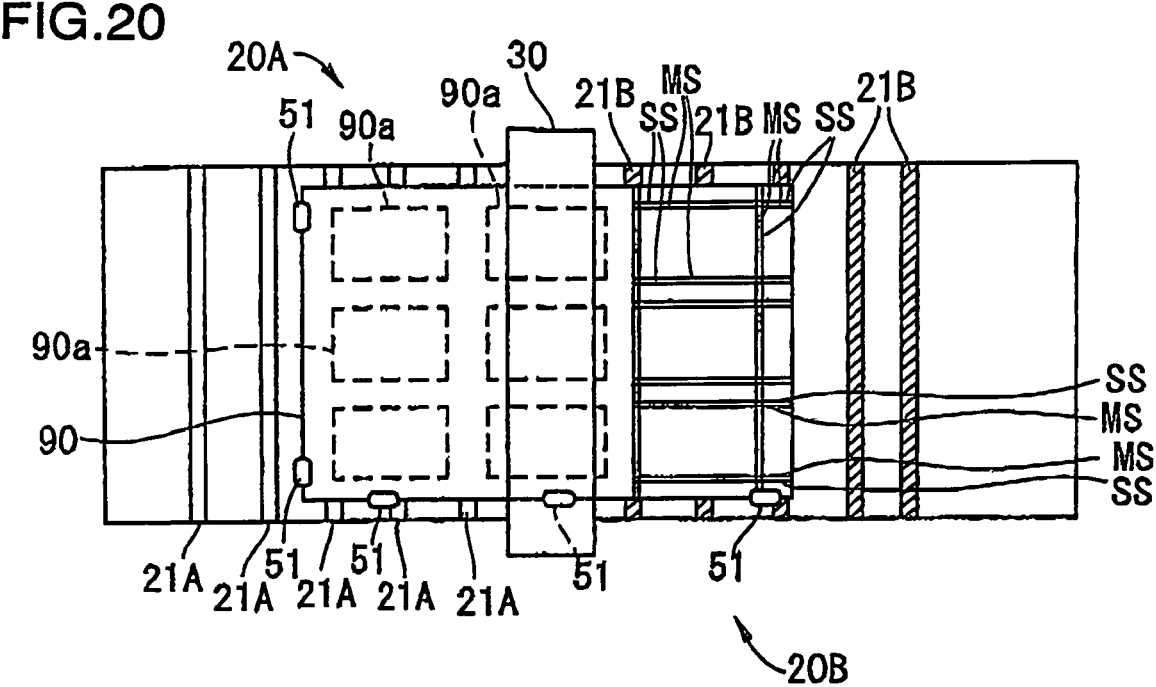
FIG. 20 is a schematic plan view for illustrating an operation of the substrate cutting system according to Embodiment 1 of the present invention.

In this example, as shown in FIG. 20, the cutter wheels 62a respectively opposing the front surface and the back surface of the bonded mother substrate 90 are pressed onto the front back surfaces and rotated. Thus, scribe lines are formed on the front surface and the back surface of the bonded mother substrate 90.

Figure 21:
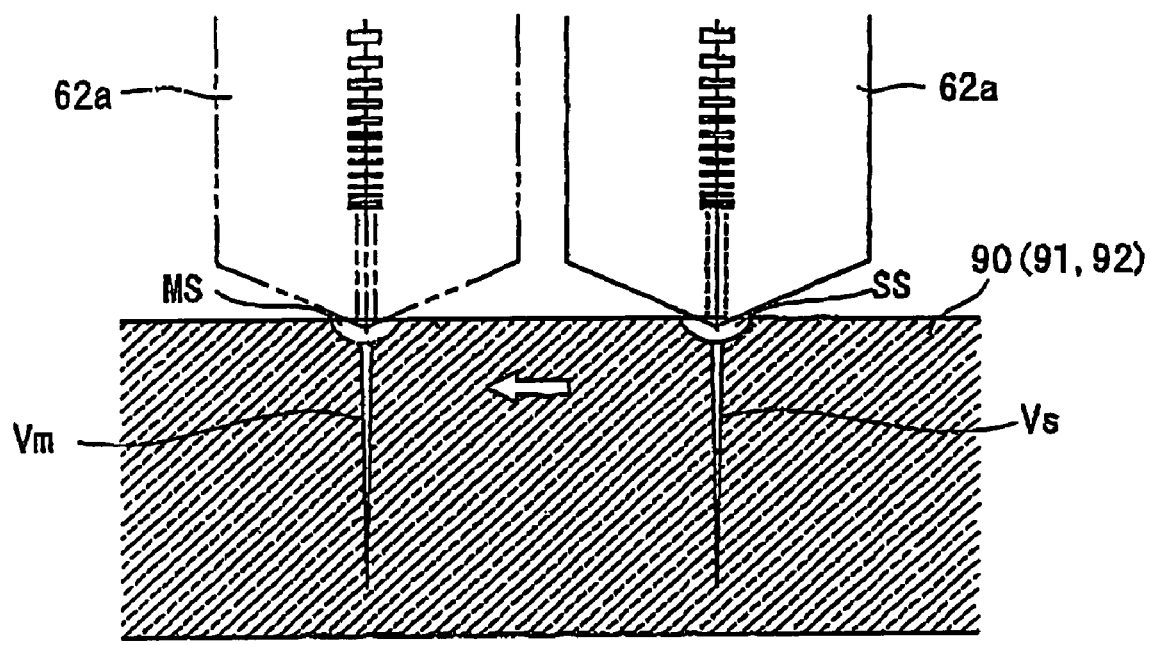
FIG. 21 is a cross sectional view of a substrate for illustrating the principle of a substrate cutting method according to the present invention.

At this time, as shown in FIG. 21, the cutter wheels 62a are pressed and rotated on an upper mother substrate 91 and a lower mother substrate 92 of the bonded mother substrate 90 along lines to be cut on the mother substrates 91 and 92 for scribing the mother substrates 91 and 92. Thus, vertical cracks Vm along thickness directions of the mother substrates 91 and 92 are sequentially formed along the lines to be cut, and main scribe lines MS are formed. The vertical cracks Vm are formed such that they extend by 80% or more of the thickness of the mother substrates 91 and 92, and more preferably, 90% or more from surfaces of the mother substrates 91 and 92.

Thereafter, in the area outside the panel substrates obtained by cutting the mother substrates 91 and 92, the mother substrates 91 and 92 are scribed by pressing and rotating the cutter wheels 62a along the main scribe lines MS on the mother substrates 91 and 92 with spaces of about 0.5 to 1.0 mm apart from the main scribe lines MS. In this way, vertical cracks Vs along the thickness directions of the mother substrates 91 and 92 are sequentially formed along the main scribe lines MS to form supplementary scribe lines SS.

At this time, the cutter wheels 62a presses and rotates on the surfaces of the mother substrates 91 and 92, and the blades thereof cut into the surfaces of the mother substrates 91 and 92. Thus, a compressed force is applied to the surfaces of the mother substrates 91 and 92 and the compressed force has influence on the surface portions of the vertical cracks Vm in the main scribe lines MS which have been already formed. In this example, the vertical cracks Vm forming the main scribe lines MS are formed to extend by 80% or more of the thickness of the mother substrates 91 and 92. Thus, when the surface portion of the mother substrates 91 and 92 are compressed, the vertical cracks Vm of the main scribe lines MS have gaps on the surface portions of the mother substrates 91 and 92 compressed and gaps on bottom portions are widened. Therefore, the vertical cracks Vm are elongated toward the bonded surface of the mother substrates 91 and 92. When the vertical cracks Vm reach the bonded surface of the mother substrates 91 and 92 and the vertical cracks Vm reach the bonded surface of the mother substrates 91 and 92 across the entirety of the main scribe lines MS, the bonded mother substrate 90 is out along the main scribe lines MS.

It is preferable that the supplementary scribe lines SS are formed with spaces of about 0.5 to 1.0 mm apart from the main scribe lines MS. When the spaces between the supplementary scribe lines SS and the main scribe lines MS are smaller than 0.5 mm, a large compression force is applied to the surface portion of the vertical cracks Vm forming the main scribe lines MS, and damage such as chip may occur in the surface side end portions of the vertical cracks Vm. On the other hand, when the space is larger than 1.0 mm, the compression force applied to the vertical cracks Vm on the main scribe lines MS is not enough, and the vertical cracks Vm may not reach the bonded surface of the mother substrates 91 and 92.

As described above, by forming double scribe lines of the main scribe lines MS and the supplementary scribe lines SS with predetermined spaces, a plurality of panel substrates 90a are cut out of the bonded mother substrate 90.

Figure 22:
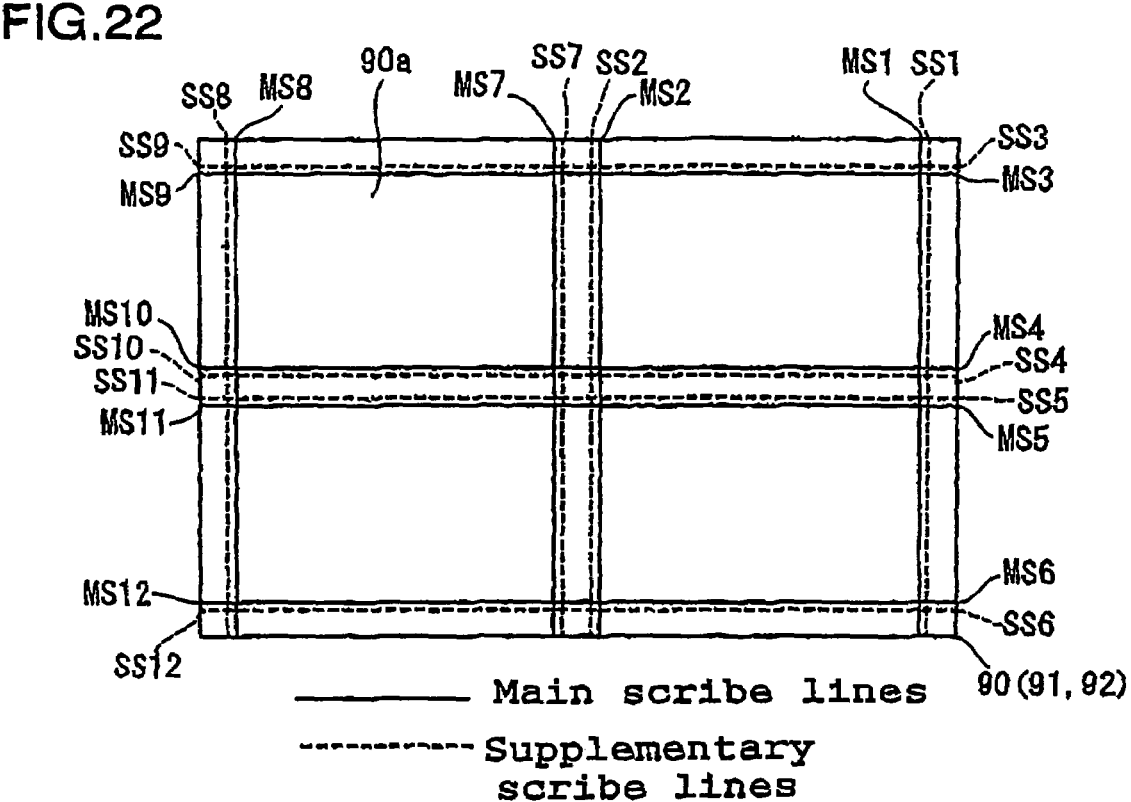
FIG. 22 is a plan view of a substrate showing a scribe pattern for the substrate for illustrating an example of the substrate cutting method according to the present invention.

FIG. 22 is a diagram for illustrating a scribe pattern for cutting panel substrates 90a out of the bonded mother substrate 90 by using such double scribe lines of the main scribe lines MS and the supplementary scribe lines SS. The cutter wheels 62a of the upper portion substrate cutting device 60 and the lower portion substrate cutting device 70 run along side edges of the substrate carry-out side of two panel substrates 90a on the substrate carry-out side of the bonded mother substrate 90, and a double scribe line (main scribe line MS1 and supplementary scribe line SS1) is formed on the side edges of the substrate carry-out side of the two panel substrates 90a.

Then, main scribe line MS2 and supplementary scribe line SS2 are formed along the side edges of the substrate carry-in side of the two panel substrates 90a on the substrate carry-out side of the bonded mother substrate 90. When the side edges of the substrate carry-out side and the substrate carry-in side of the two panel substrates 90a on the substrate carry-out side of the bonded mother substrate 90 are out, the scribing device guide body 30 slides toward the substrate carry-out side so that the cutter wheels 62a locate on the side edge portion located on the substrate carry-out side of the bonded mother substrate 90. Then, the upper portion substrate cutting device 60 and the lower portion substrate cutting device 70 slide along the upper guide rail 31 and the lower guide rail 32 so that the cutter wheels 62a of the upper portion substrate cutting device 60 and the lower portion substrate cutting device 70 are on an extension of the side edge of the panel substrate 90a on the substrate carry-out side and close to a frame 11A of the main frames 11, which is close to the main frame 11. Along the extension of the side edge, a double scribe line (main scribe line MS3 and supplementary scribe line SS3) is formed, and the side edge close to the frame 11A of the panel substrate 90a on the substrate carry-out side and close to the frame 11A of the main frames 11 is out.

Then, double scribe lines (main scribe lines MS4 to MS6 and supplementary scribe lines SS4 to SS6) are formed in parallel with the frame 11A in a similar manner. Thus, side edges of the panel substrates 90a located on the substrate carry-out side in a direction along the frame 11A are respectively cut.

Thereafter, regarding two other panel substrates 90a along the upper guide rail 31 and the lower guide rail 32, side edges of the panel substrates 90a are cut by forming double scribe lines (main scribe lines MS7 to MS12 and supplementary scribe lines SS7 to SS12) along side edges of the panel substrates 90a.

In the above description, an example where double scribe lines are individually formed has been explained. However, the present invention is not limited to such a method. As long as the double scribe lines are formed along the side edges of the panels 90a, any method may be used. For example, double scribe lines may be formed on the side edges of the panel substrates 90a by using one scribe line.

Figure 23:
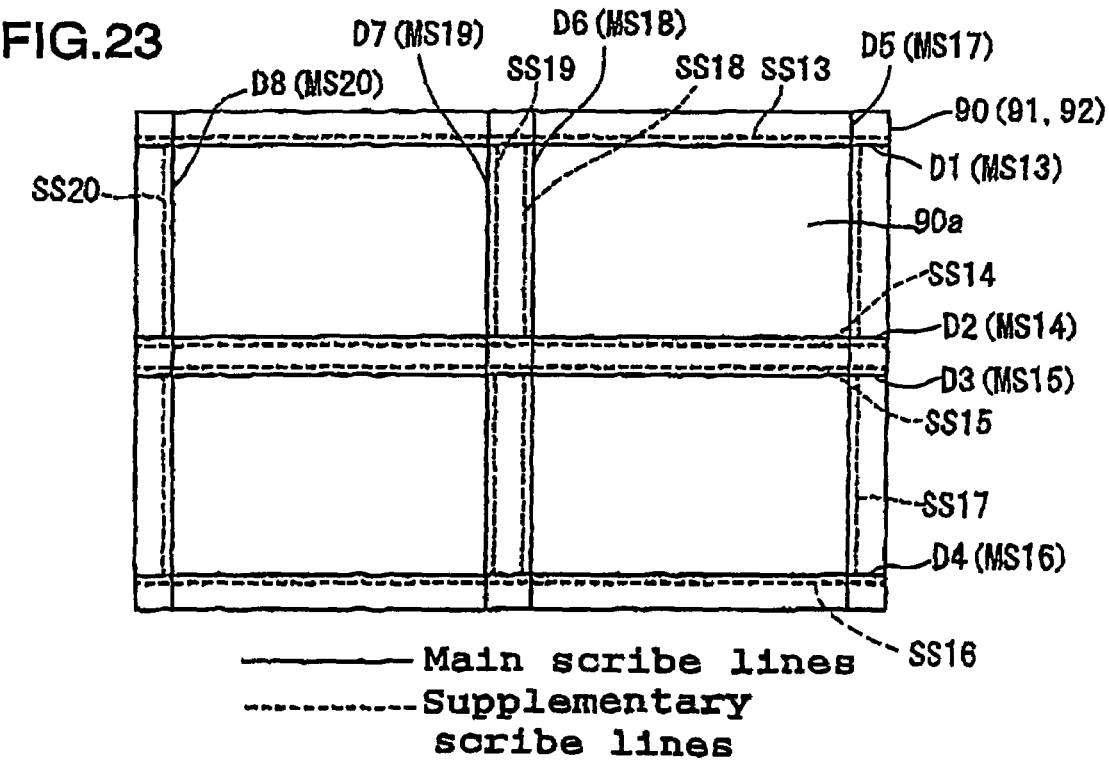
FIG. 23 is a plan view of a substrate showing a scribe pattern for the substrate for illustrating another example of the substrate cutting method according to the present invention.

FIG. 23 is a plan view for illustrating a scribe pattern for cutting panel substrates 90a out of the bonded mother substrate 90 by using double scribe lines of the main scribe lines MS and the supplementary scribe lines SS. In this example, the mother substrates 91 and 92 of the bonded mother substrate 90 are out along first to eighth lines to be cut D1 through D8 in this order to become four panel substrates 90a arranged in two rows and two columns.

The first line to be cut D1 corresponds to side edges of two panel substrates 90a in a first row along a row direction (horizontal direction), and is spaced apart from a side edge of the banded mother substrate 90 along the row direction by a predetermined space. The second line to be cut D2 corresponds to side edges of the two panel substrates 90a in the first low, which are close to the panel substrate 90a in a second row. The third line to be cut D3 corresponds to side edges of two panel substrates 90a in the second row which are close to the panel substrates 90a in the first row, and is spaced apart from the second line to be cut D2 by 2 to 4 mm. The fourth line to be cut D4 corresponds to side edges of the two panel substrates 90a in the second row in a row direction (horizontal direction), and is spaced apart from the other side edges of the bonded mother substrate 90 along the row direction by a predetermined space.

The fifth line to be cut D5 corresponds to side edges of two panel substrates 90a in a first column along the column direction (vertical direction), and is spaced apart from one side edge of the bonded mother substrate 90 along the column direction. The sixth line to be cut D6 corresponds to the side edges of the two panel substrates 90a in the first column, which are close to panel substrates 90a in a second column. The line to be cut D7 corresponds to side edges of the two panel substrates 90a in the second column, which are close to the panel substrates 90a in the first column, and is spaced apart from the sixth line to be cut D6 by 2 to 4 mm. The line to be cut D8 corresponds to the side edges of the two panel substrates 90a in the second column along the column direction (vertical direction), and is spaced apart from the other side edges of the bonded mother substrate 90 along the column direction by a predetermined space.

For cutting such a bonded mother substrate 90, first, the cutter wheels 62a are pressed and rotated along, for example, the first to fourth lines to be cut D1 to D4 in this order. Thus, first to fourth main scribe lines MS13 to MS16 are formed by vertical cracks having depths of 90% or more of the thicknesses of the mother substrates 91 and 92 from the surface of the upper and lower mother substrates 91 and 92 of the bonded mother substrate 90.

In this state, the cutter wheels 62a are pressed and rotated along the fifth line to be cut D5. Thus, fifth main scribe line MS17 is formed along the fifth line to be cut D5.

Thereafter, sixth to eighth main scribe lines MS18 to MS20 are formed along the sixth through eighth lines to be cut D6 to D8 in this order by pressing and rotating the cutter wheels 62a along the sixth through eighth lines to be cut D6 to D8 in turn in a similar manner.

After the first through eighth main scribe lines MS 13 to MS 20 are formed as such, first supplementary scribe line SS13 is formed along the first main scribe line MS13 by pressing and rotating the cutter wheels 62a in a side edge portion of the bonded mother substrate 90, which is on opposite side of the panel substrates 90a with respect to the first main scribe line MS13, with a space of about 0.5 to 1.0 mm from the first main scribe line MS13. Thus, vertical cracks on the first main scribe line MS13 extend toward the bonded surface of the mother substrates 91 and 92 of the bonded mother substrate 90 and reach the bonded surface of the mother substrates 91 and 92. Such a phenomena occurs across entirety of the first main scribe line MS13, and the bonded mother substrate 90 to cut along the first main scribe line MS13.

Next, a second supplementary scribe line SS14 is formed along the second main scribe line MS14 by the cutter wheels 62a in an area opposite to the panel substrates 90a with respect to the second main scribe line MS14, with a space of about 0.5 to 1.0 mm from the second main scribe line MS14. Thus, vertical cracks on the second main scribe line MS14 extend toward the bonded surface of the mother substrates 91 and 92 of the bonded mother substrate 90 from the surfaces of the mother substrates 91 and 92 of the bonded mother substrate 90, and the vertical cracks reach the bonded surface of the mother substrates 91 and 92 across the entirety of the second main scribe line MS14. In this way, the bonded mother substrate 90 is cut along the second main scribe line MS14.

Along the third main scribe line MS15 and the fourth main scribe line MS16, third supplementary scribe line SS15 and a fourth supplementary scribe line SS16 are respectively formed on the side opposite to the panel substrates 90. Thus, the bonded mother substrate 90 is sequentially cut along the third main scribe line MS15 and the fourth main scribe line MS16.

Thereafter, along the fifth to eighth main scribe lines MS17 to MS20, fifth to eighth supplementary scribe lines SS17 to SS20 are formed on the side opposite to the panel substrates 90a respectively between the first main scribe line 13 and the second main scribe line MS14, and between the third main scribe line MS35 and the fourth main scribe line MS16. Thus, the bonded mother substrate 90 are cut along the fifth to eighth main scribe lines MS17 to MS20 and unnecessary portions are removed. As a result, four panel displays 90a can be obtained.

In this example, the first to eighth main scribe lines MS13 to MS20 are formed between end surfaces of the bonded mother substrate 90, more specifically, formed across the entirety of the lines to be cut D1 to D8 formed across one end surface of the bonded mother substrate 90b to the opposing other and surface. Further, the first to eighth supplementary scribe lines SS13 to SS20 are respectively formed across the end surface or one cut surface which has been cut to the opposing other end surface or the other cut surface.

Figure 24:
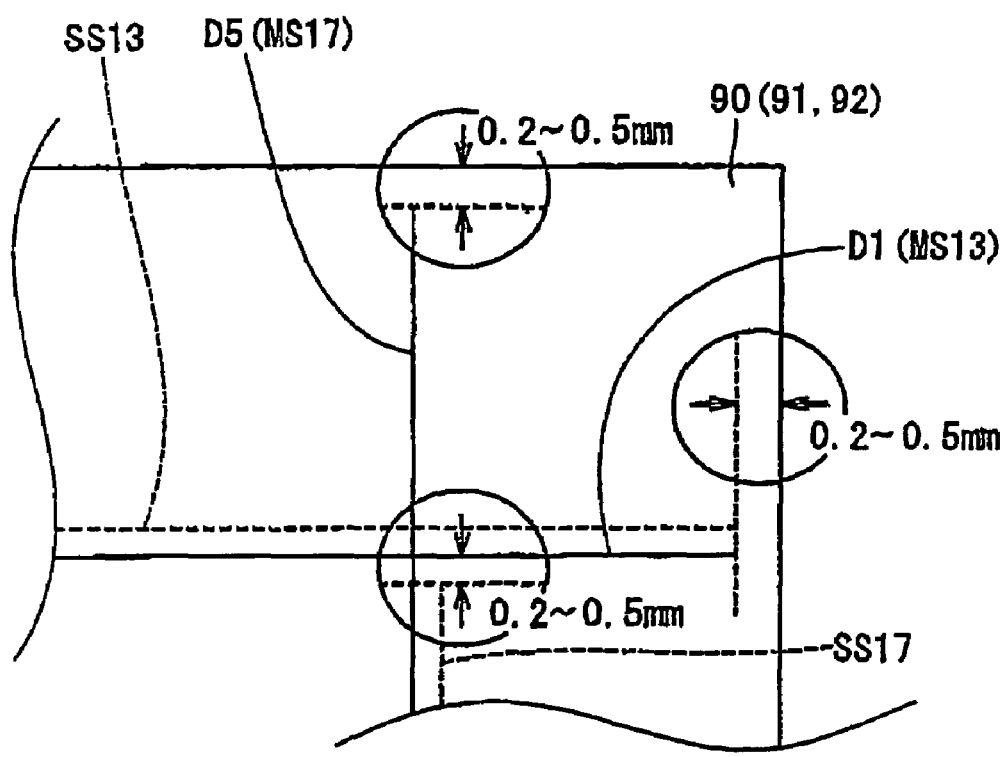
FIG. 24 is a partial plan view showing a scribe pattern for the substrate for illustrating yet another example of the substrate cutting method according to the present invention.

The present invention is not limited to the method in which the first to eighth main scribe lines MS13 to MS20 are formed across the entirety of the lines to be cut D1 to D8 formed between the end surfaces of the bonded mother substrate 90, the first to fourth supplementary scribe lines SS13 to SS16 across the one end surface of the bonded mother substrate 90 and the opposing other end surface, and the fifth to the eighth supplementary scribe lines SS17 to the SS20 are formed across one cut surface of the bonded mother substrate 90 to the opposing other cut surface. As shown in FIG. 24, positions spaced apart from the one end surface of the mother glass substrate 10 by about 0.2 to 0.5 mm may be the start positions of the first to eighth main scribe lines MS13 to MS 20, and similarly, positions in front of the other end surfaces by about 0.2 to 0.5 mm may be end portions of the first to eighth main scribe lines MS13 to MS20.

In this example, when the cutter wheels 62a are pressed and rotated on the mother substrates 91 and 92 of the bonded mother substrate 90 to perform scribing for forming the first to eighth main scribe lines MS13 to MS20, vertical cracks extend in back and front directions of the scribing direction with respect to the scribing start positions. Thus, the first to eighth main scribe lines MS13 to MS20 to be formed reach one end surface of the mother substrates 91 and 92 of the bonded mother substrate 90.

Similarly, even though the scribing end positions of the first to eighth main scribe lines MS13 to MS20 are in front of the other end surface of the mother substrates 91 and 92 of the bonded mother substrate 90, since the vertical cracks in the mother substrates 91 and 92 extend in the scribing direction, the first to eighth main scribe lines MS13 to MS20 to be formed reach the other end surface of the mother substrates 91 and 92.

This shows that it is not necessary to form first to eighth supplementary scribe lines SS13 to SS20 across one end surface or one cut surface which has been cut of the mother substrates 90 and 91 to the opposing other end surface or the opposing other cut surface. As shown in FIG. 24, positions appropriately spaced apart from one end surface or the one cut surface which has been cut of the mother substrates 91 and 92 of the bonded mother substrate 90 by 0.2 to 0.5 mm may be start positions of the first to eighth supplementary scribe lines SS13 to SS20. Similarly, positions in front of the other end surface or cut surface by about 0.2 to 0.5 mm may be end positions of the first to eighth supplementary scribe lines SS13 to SS20.

Furthermore, one of the first to eighth main scribe lines MS13 to MS20 and the first to eighth supplementary scribe lines SS13 to SS20 may be formed across the one end surface or one cut surface which has been cut of the mother substrates 91 and 92 of the bonded mother substrate to the other end surface or the other cut surface of the mother substrates 91 and 92, and the other of the first to eighth main scribe lines MS13 to MS20 and the first to eighth supplementary scribe lines SS13 to SS20 may be formed across the position appropriately space apart from the one end surface or one cut surface which has been cut of the mother substrates 91 and 92 of the bonded mother substrate 90 to positions in front of the other end surface or the other cut surface of the mother substrates 91 and 92.

FIG. 25 is a plan view for illustrating another scribe patter for cutting the panel substrates 90a out of the bonded mother substrate 90. In this scribing method, first and second main scribe lines MS13 and MS14 are formed by the cutter wheels 162a, along first and second lines to be cut D1 and D2 on the bonded mother substrate 90 along the horizontal direction are respectively formed by vertical cracks which extend to 90% or more of the thicknesses of the mother substrates 91 and 92 from the surfaces of the mother substrates 91 and 92 of the bonded mother substrate 90. Thereafter, in the area between the first and second main scribe lines MS13 and MS14, fifth main scribe line MS17 along the fifth line to be cut D5 along the vertical direction is formed by the cutter wheels 62a, and fifth supplementary scribe lines SS17 is formed on the side opposite to the panel substrates 90a being spaced apart from the fifth main scribe line MS17 by about 0.5 to 1.0 mm.

In this example, the fifth main scribe line MS17 and the fifth supplementary scribe line SS117 respectively cross the first and second main scribe lines MS13 and MS14. The fifth main scribe line MS17 runs over the second main scribe line MS14 and then is inverted by 180 degrees to form the fifth supplementary scribe line SS17 so that the fifth main scribe line MS17 and the fifth supplementary scribe line SS17 are formed continuously with one scribing.

Thereafter, similarly, in the area between the first and second main scribe lines MS13 and MS14, sixth scribe line MS18 is formed by the cutter wheels 62a along sixth line to be cut D8, and then is inverted to form sixth supplementary scribe line SS18 on the side opposite to the panel substrates 90a. Further, seventh main scribe line MS19 and seventh supplementary scribe lines SS19, and eight main scribe line MS20 and eighth supplementary scribe lines SS20 are formed similarly in turn. Since the fifth to eighth main scribe lines SS17 to SS20 and the fifth to eighth supplementary scribe lines SS17 to SS20 pass across the first and second main scribe lines MS13 and MS14, it is ensured that vertical cracks forming the first and second main scribe lines MS13 and MS14 reach the bonded surface of the mother substrates 91 and 92 of the bonded mother substrate 90 across the entirety of the first and second main scribe lines MS13 and MS14, and a pair of the panel substrates 90a are obtained.

Before the substrate is cut into the pair of the panel substrates 90a at this point, an area of the bonded mother substrate 90 which has not been cut is referred to a second substrate portion 90c.

Next, as shown in portion (b) of FIG. 25, on the second substrate portion 90c out by the second main scribe line MS14, the cutter wheels 62a are pressed and rotated along the lines to be cut D3 and D4 on the bonded mother substrate 90 along the vertical direction, and third and fourth main scribe lines MS15 and MS16 are formed by vertical cracks extended to 90% or more of the thicknesses of the mother substrates 91 and 92 from the surfaces of the mother substrates 91 and 92 of the bonded mother substrate 90. Thereafter, in the area between the third and fourth main scribe lines MS15 and MS16, ninth main scribe line MS21 and fifth supplementary scribe line SS21 along ninth line to be cut D9 along the vertical direction, tenth main scribe line MS22 and tenth supplementary scribe line SS22 along the tenth line to be cut D10, eleventh main scribe line MS23 and eleventh supplementary scribe line SS23 along the eleventh line to be cut D11, and twelfth main scribe line MS24 and twelfth supplementary scribe line SS24 along the twelfth line to be cut D12 are sequentially formed outside the panel substrates 90a so as to cross the third and fourth main scribe lines MS15 and MS16. Thus, the second substrate portion 90c is cut, and a pair of panel substrates 90c are out.

Figure 26:
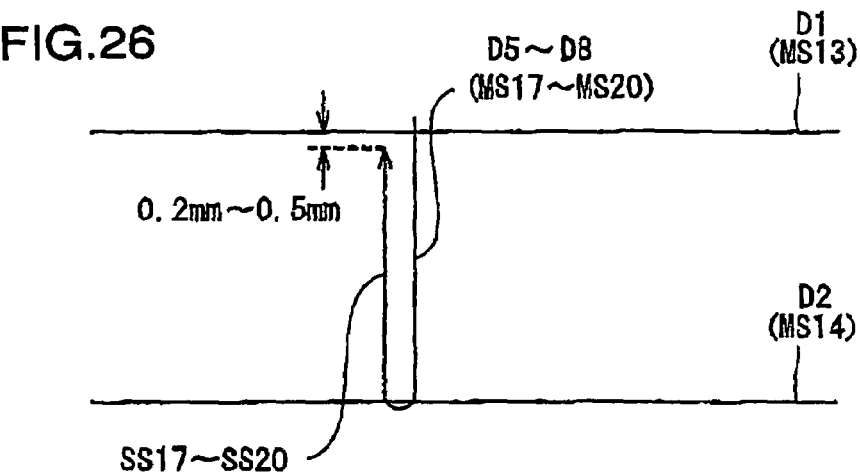
FIG. 26 is a plan view of a substrate showing a scribe pattern for the substrate far illustrating yet another example of the substrate cutting method according to the present invention.

It is not necessary that the fifth to twelfth supplementary scribe lines SS21 to SS24 cross the first and third main scribe lines MS13 and MS15. For example, as shown in FIG. 26, positions in front of the first and third main scribe lines MS13 and MS15 by about 0.2 to 0.5 mm may be end portions of the fifth to twelfth supplementary scribe lines SS17 to SS24. In such a case, vertical cracks forming the fifth to twelfth supplementary scribe lines SS17 to S824 also extend in the scribing direction. The fifth to twelfth main scribe lines MS17 to MS24 are cut across the entirety of the main scribe lines MS17 to MS24.

Figure 27:
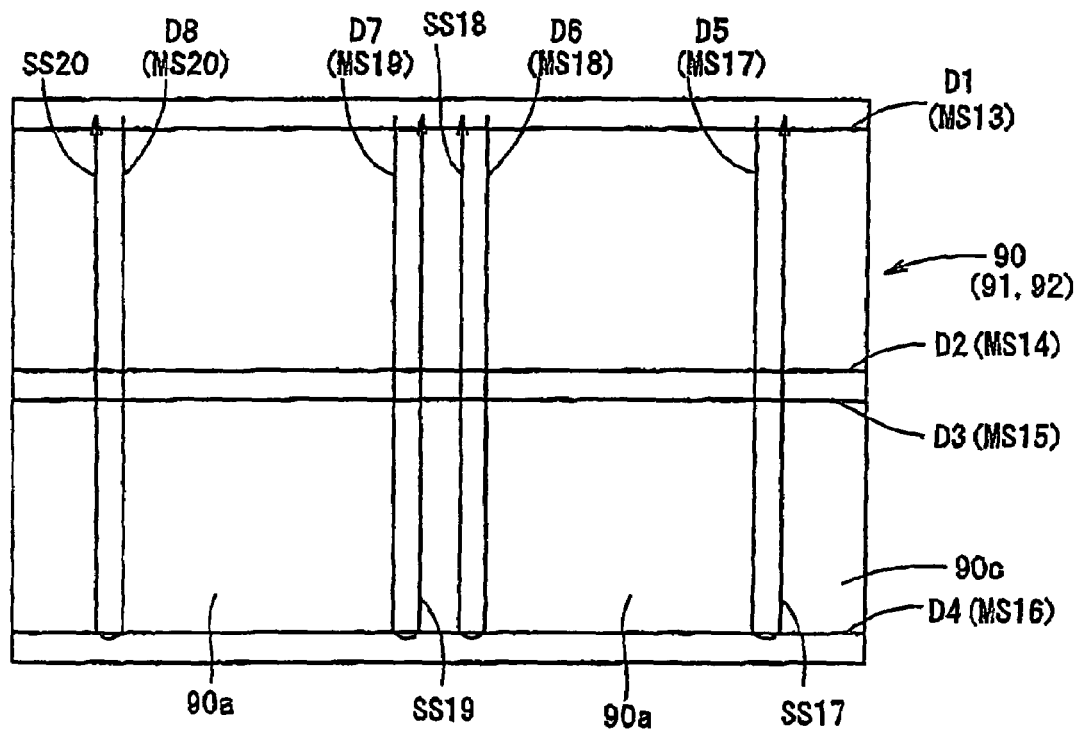
FIG. 27 is a partial plan view of a substrate showing a scribe pattern for the substrate for illustrating yet another example of the substrate cutting method according to the present invention.

In the case where the scribe lines are formed to cross each other for cutting the substrate as described above, as shown in FIG. 27, first, the main scribe lines MS13 to MS16 are formed along the first to fourth lines to be cut D1 to D4, and then, the fifth main scribe line MS17 and the fifth supplementary scribe line SS17, the sixth main scribe line MS18 and the sixth supplementary scribe line SS18, the seventh main scribe line MS19 and the seventh supplementary scribe line SS19, and the eighth main scribe line MS20 and the eighth supplementary scribe line SS20 are formed to respectively cross the first main scribe line MS13 and fourth main scribe line MS16 such that the main scribe lines and the supplementary scribe lines are formed continuously with one scribing by inverting the line by 180 degrees after they cross over the fourth main scribe line MS16.

Figure 28:
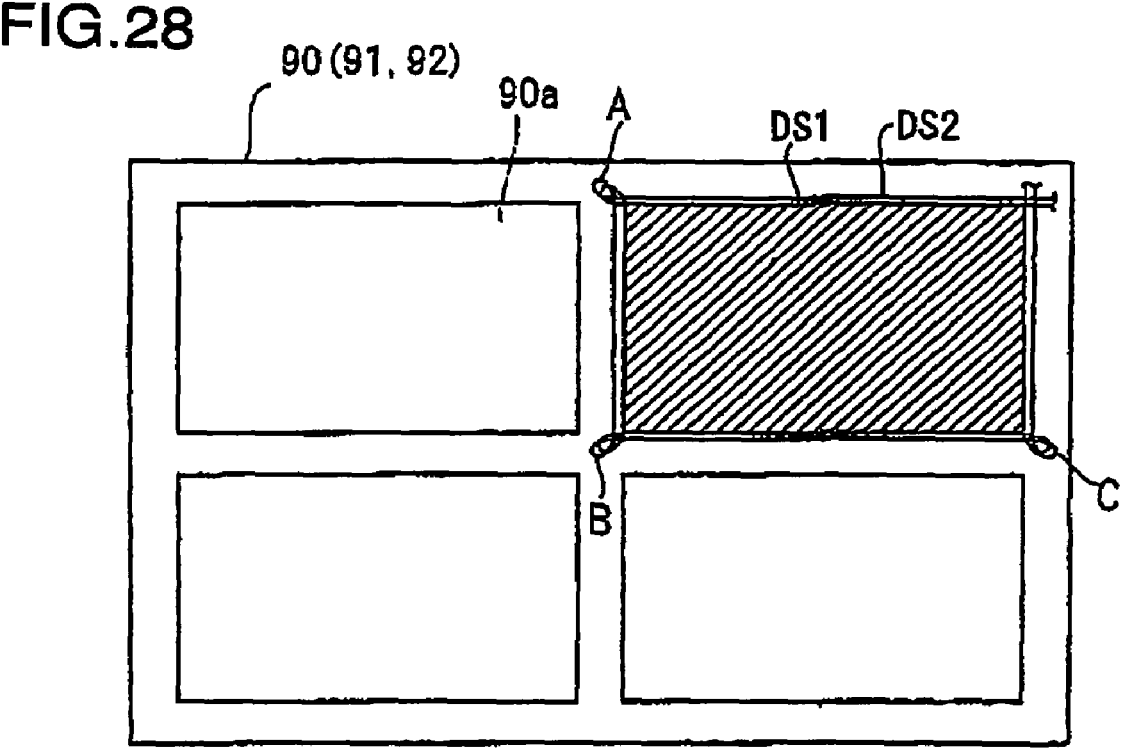
FIG. 28 is a plan view of a substrate showing a scribe pattern for the substrate for illustrating yet another example of the substrate cutting method according to the present invention.

FIG. 28 is a schematic plan view for illustrating, a scribing pattern for cutting the panel substrates 90a out of the bonded mother substrate 90 by using double scribe lines of main scribe lines MS and supplementary scribe lines SS. First, four scribe lines along lines to be scribed S1 to S4 with respect to the panel substrates 90a (hereinafter, four linear scribe lines across the entire circumferences of the panel substrates 90a will be referred to as main scribe line DS1) are formed. Then, outside the panel substrates 90a with respect to the main scribe line DS1, four linear sub-scribe line DS2 in parallel to the main scribe line DS1 spaced apart from the main scribe line DS1 by about 0.5 to 1 mm.

As described above, when the sub-scribe line DS2 is formed with a space of about 0.5 to 1 mm apart from the main scribe line DS1, a stress is applied to a horizontal direction which is orthogonal to the formation direction of the scribe lines on a surface of the bonded mother substrate 90 when the sub-scribe line S2 is formed. Thus, a compression force is applied to surface portions of the vertical cracks which form the main scribe line DS1 which has been already formed. When the compression force is applied to the surface portion of the vertical cracks forming the main scribe line DS1 as such, a reaction force is applied in a direction to widen the width of the vertical cracks forming the main scribe line DS1. In this way, the vertical cracks extend in the thickness direction of the bonded mother substrate 90 and the vertical cracks reach the bonded surface of the mother substrates 91 and 92 of the bonded mother substrate.

Figure 29:
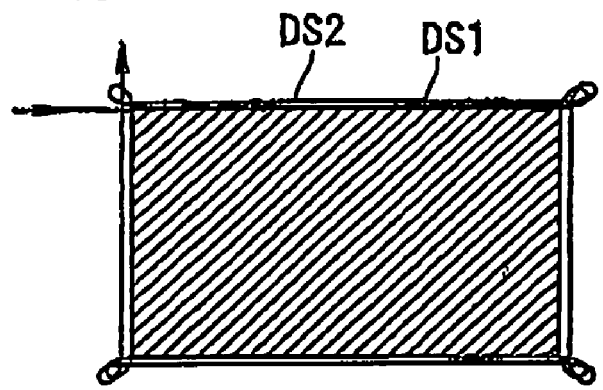
FIG. 29 is a plan view for illustrating yet another example of the substrate cutting method according to the present invention.

In this example, as shown in FIG. 29, sub-scribe line DS2 may be formed continuously after the main scribe line DS1 without separating the cutter wheels 624 from the front and back surfaces of the bonded mother substrate 90 after the main scribe line DS1 is formed.

Figure 30:
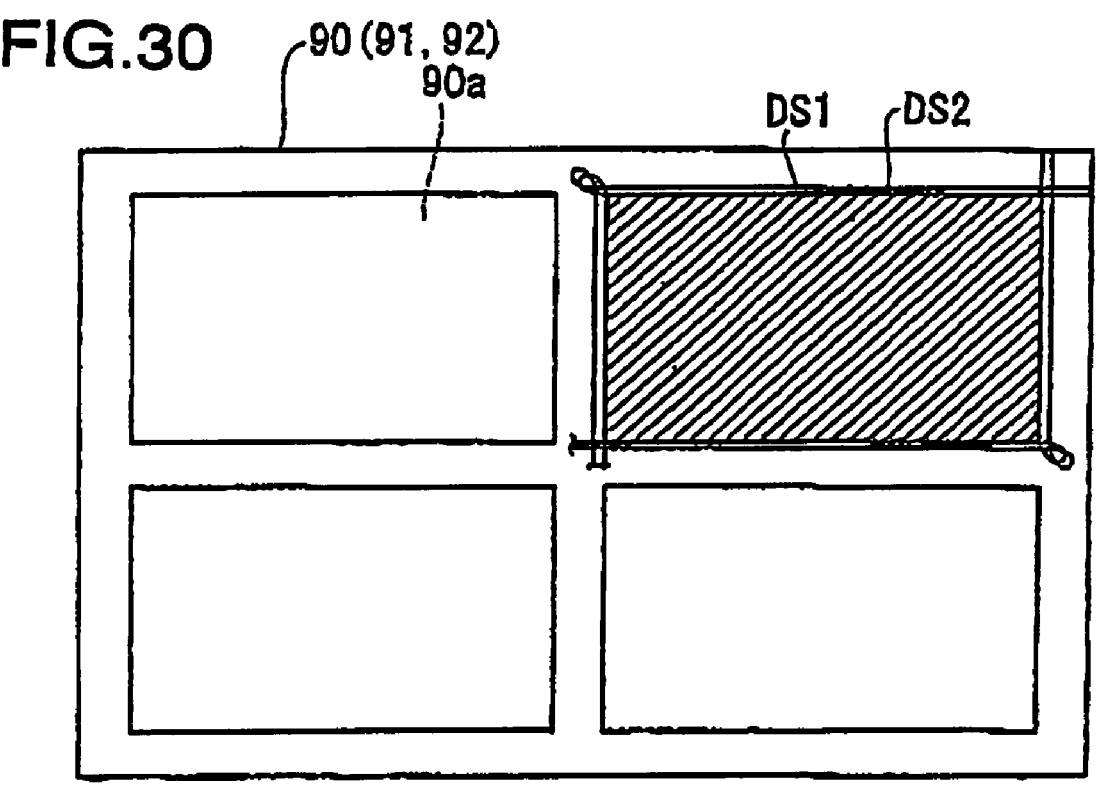
FIG. 30 is a plan view of a substrate showing a scribe pattern for the substrate for illustrating yet another example of the substrate cutting method according to the present invention.

Furthermore, when scribe lines are first formed along lines to be scribed S1 and S2, and then scribe lines are continuously formed along lines to be scribed S4 and S2, as shown in FIG. 30, the sub-scribe line DS2 may be formed after the main scribe line DS1 is formed.

As described above, by forming the double scribe line of the main scribe line MS and supplementary scribe line SS with a predetermined space a plurality of panel substrates 90a are cut out of the bonded mother substrate 90.

Figure 31:
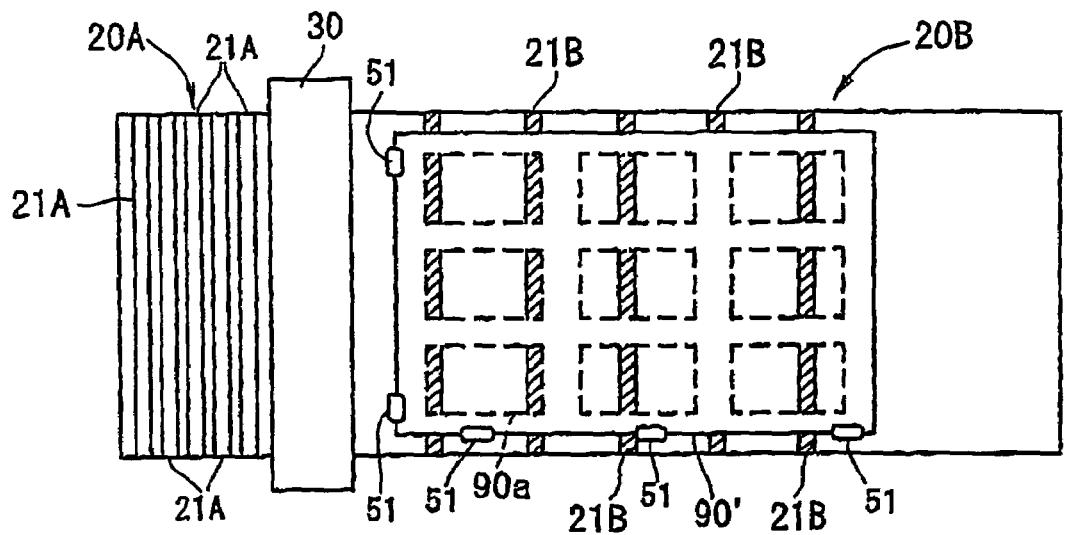
FIG. 31 is a schematic plan view for illustrating an operation of the substrate cutting system according to Embodiment 1 of the present invention.

Then, the scribing device guide body 30 slides as shown in FIG. 31. Thus, each of the first substrate supporting units 21A of the first substrate supporting portion 20A slides toward the substrate carry-in side such that the space with the adjacent first substrate supporting unit 21A becomes smaller.

In the above description, an example in which double scribe lines are individually formed has been explained. However, the present invention is not limited to such an example. As long as double scribe lines are formed along the side edges of the display bonded substrates 90a, any method may be used. For example, double scribe lines are formed on one scribe line panel substrates 90a.

Further, as a method for cutting the substrate, a method in which double scribe lines are formed on the bonded mother substrates where the glass substrates, which is a type of brittle material substrate, are bonded as mother substrates has been described. However, the present invention is not limited to this. When the mother substrate is a metal substrate such as steel sheet, wood plate, a plastic substrate, and a brittle material substrate such as ceramics substrate, glass substrate, semiconductor substrate or the like, a method for cutting the mother substrate by using, for example, laser light, a dicing saw, a cutting blade, a diamond cutter, or the like may be used.

Furthermore, the substrates include, besides mother substrate, a bonded substrate formed by bonding the same type of mother substrates, a bonded mother substrate formed by bonding different types of mother substrates, and a substrate formed by laminating mother substrates.

In this way, as the panel substrates 90a from the bonded mother substrate 90 are sequentially cut and made to be removable from the bonded mother substrate 90, substrate carry-out device 80 slides and the panel substrates 90a are sequentially adsorbed by the substrate carry-out device 80 and carried out of the mounting structure 10.

When the cutting of the panel substrates 90a is finished and all the cut panel substrates 90a are carried out of the mounting structure 10, as shown in FIG. 31, the scribing device guide body 30 slides to the position closest to the end portion on the substrate carry-in aide. Thus, all the first substrate supporting units 21A in the first substrate supporting portion 20A are arranged to be close to each other in the end portion on the substrate carry-in side of the mounting structure 10. At this time, the second substrate supporting unit 21B located to be the closest to the scribing device guide body 30 in the second substrate supporting portion 20B moves in accordance with movement of the scribing device guide body 30. Thus, all the second substrate supporting units 21B in the second substrate supporting portion 20B are arranged to have a predetermined space across the entirety below the cut bonded mother substrate 90'.

Figure 32:
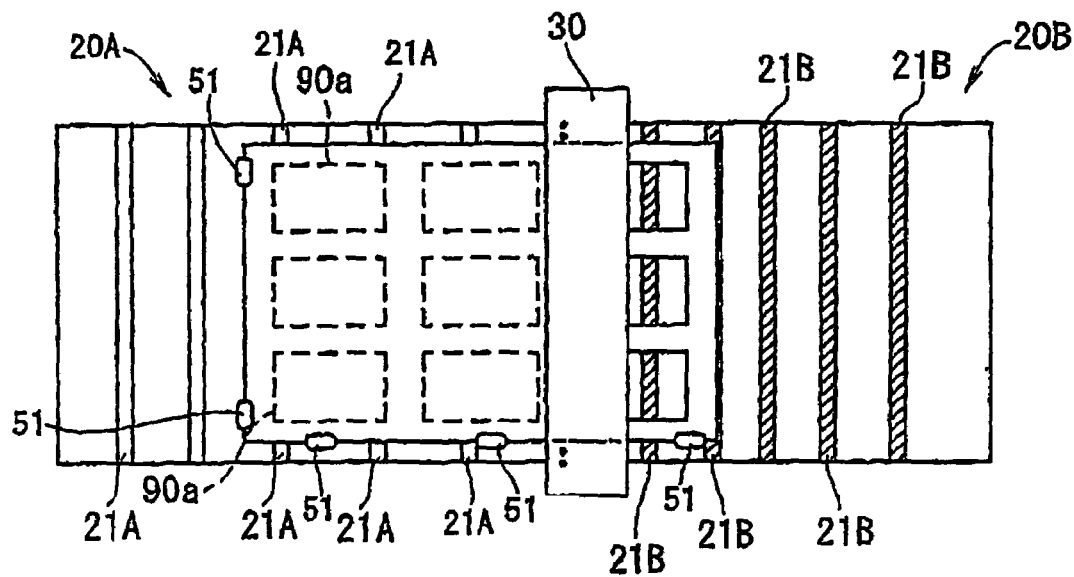
FIG. 32 is a schematic plan view for illustrating an operation of the substrate cutting system according to Embodiment 1 of the present invention.

Then, as shown in FIG. 32, when all the panel substrates 90a are carried out from the bonded mother substrate 90, the cut bonded mother substrate 90' which has become a frame since all the panel substrates 90a are carried out is released from clamping by the clamp members 51. Then, the second substrate supporting unit 21B closest to the scribing device guide body 30 slides toward the end portion on the substrate carry-out aide. Thus, the second supporting belts 23b supporting the cut bonded mother substrate 90' sequentially release the support of the cut bonded mother substrate 90'. Clamping by the clamp members 51 is released, and the cut bonded mother substrate 90' drops downward, is guided by the guide plate to be accommodated in the cullet accommodation box.

Further, instead of the above-described scribing methods for forming double scribe lines, a device for warming (heating) the bonded substrate 90 by spraying compressed air to the front and back surfaces of the bonded mother substrate 90 or blowing hot air to the front and back surfaces of the bonded mother substrate 90 may be provided on the substrate carry-out side of the scribing device guide body 30 as a device for cutting the bonded mother substrate 90 after the scribing process.

Figure 33:
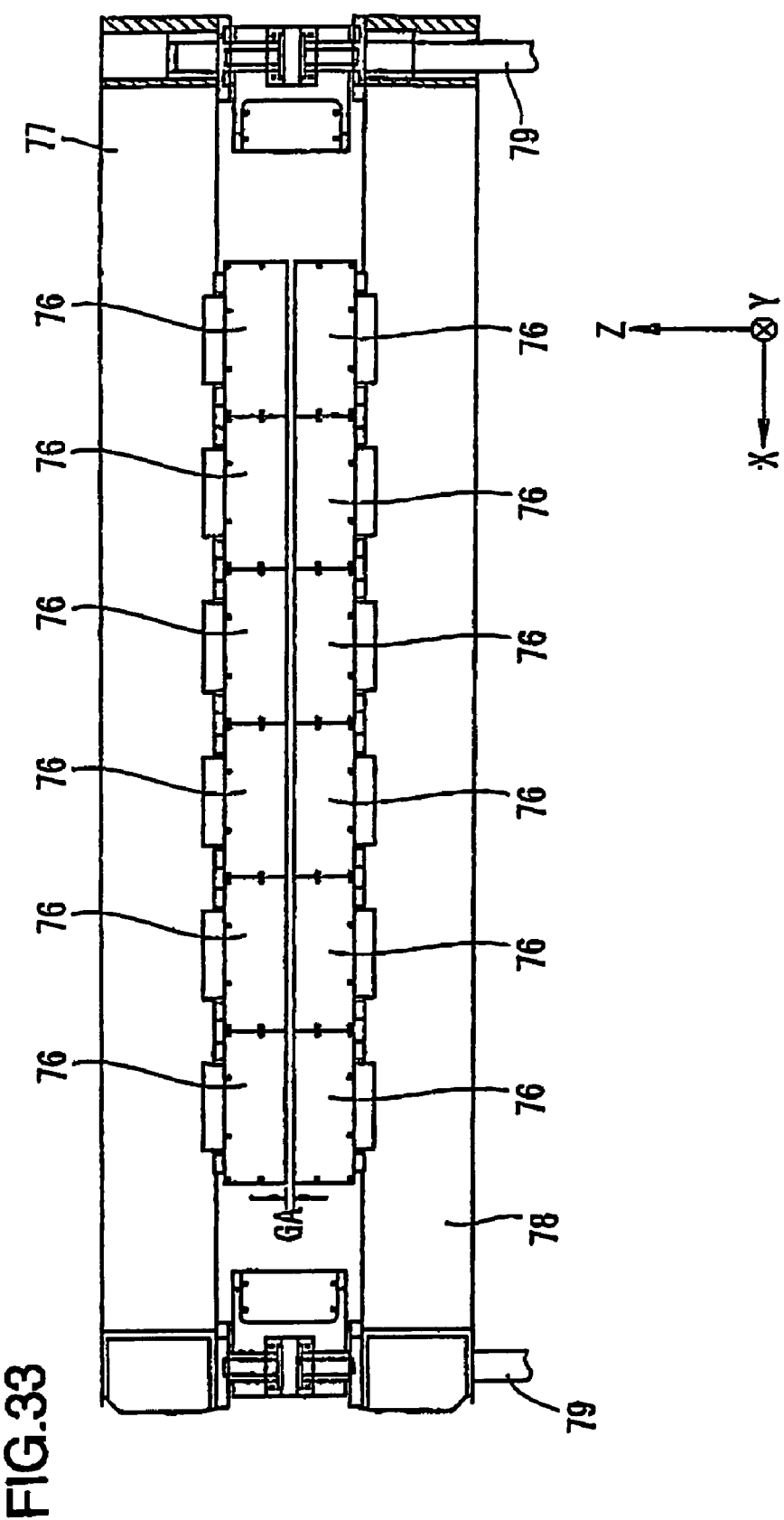
FIG. 33 is a front view of an important part of a steam unit portion of the substrate cutting system according to Embodiment 1 of the present invention.

FIG. 33 is a front view of important parts of a steam unit portion 75 as viewed from the substrate carry-in side. Six steam units 76 are attached to an upper steam unit attachment bar 77 and six steam units 76 are attached to a lower steam unit attachment bar 78 with a gap GA spaced apart from the upper six steam units 76. The gap GA is adjusted so as to allow the bonded mother substrate 90 to pass through the gap when the steam units 76 move toward the substrate carry-in side.

After the steam unit portion 75 arranged on the substrate carry-out side of the scribing device guide body 30 is scribed by the scribing device guide body 30, the bonded mother substrate 90 which has been already scribed and is clamped (held) by the clamp device 50 and supported by the second substrate supporting portion 20B slides (moves) toward the substrate carry-in side so as to pass through the gap between a plurality of upper and lower steam units 76 of the steam unit portion.

Figure 34:
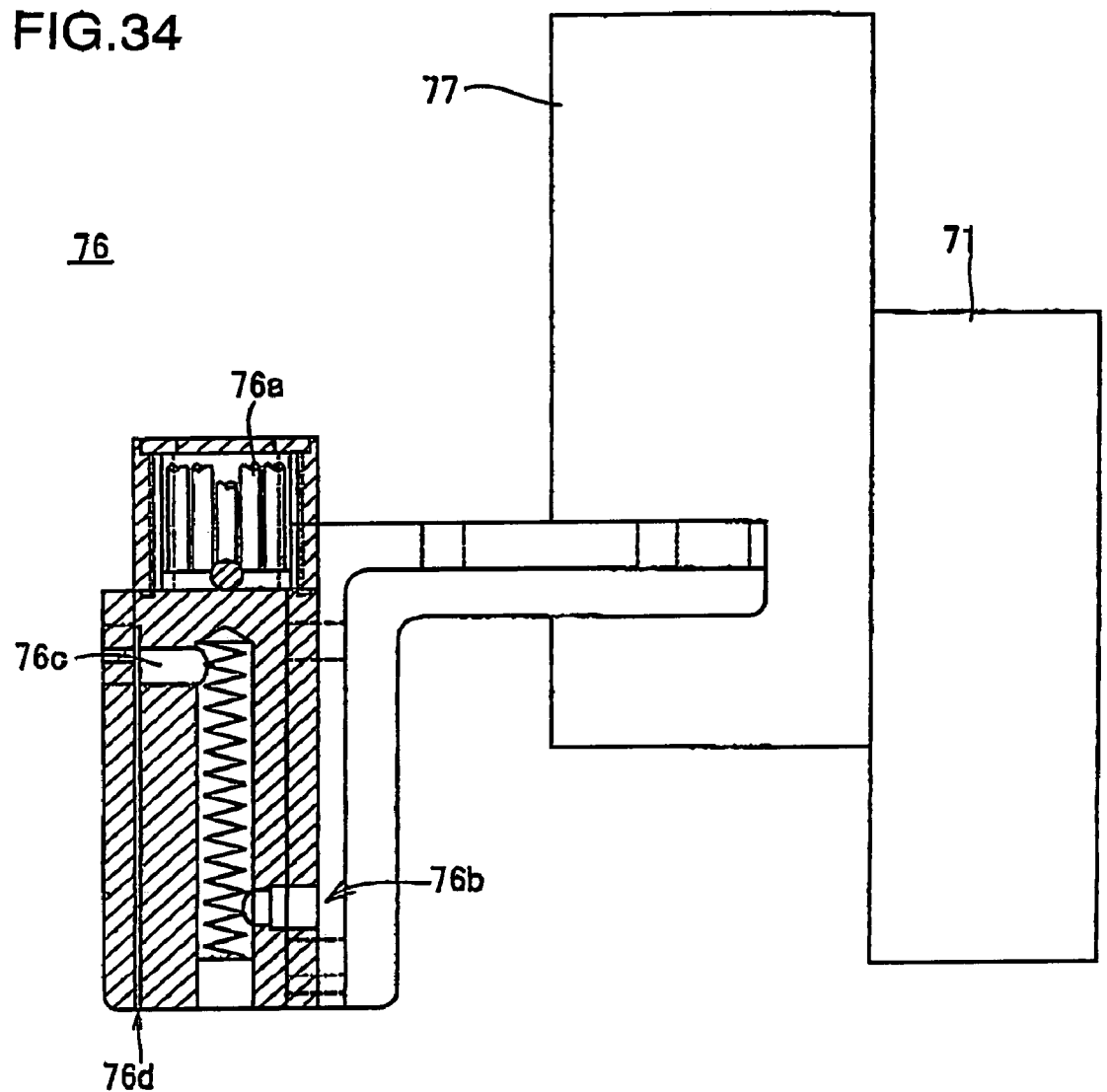
FIG. 34 to a partial cross-sectional side view showing a structure of a steam unit in the steam unit portion.

FIG. 34 is a partial cross-sectional side view showing the structures of the steam units 76. Each of the steam units 76 is mostly made of an aluminum material, and a plurality of heaters 76a are embedded in a vertical direction. When an opening/closing valve (not shown) which can be opened or closed automatically is opened, water flows into the steam unit 76 from a water supply port 76b and heated by the heaters 76a. The supplied water is vaporized and becomes steam. The steam is blown to the surface of the mother substrate through a conducting hole 76c and from a spray nozzle 76d.

Further, on the carry-out side of the upper steam unit attachment bar 77, an air knife 71 for removing water which remains on the surface of the bonded mother substrate 90 after the steam is blown to the upper surface of the bonded mother substrate 90 is attached.

The lower steam unit attachment bar 78 also includes the steam units 76 and the air knife 71 similar to those attached to the upper steam unit attachment bar 77.

The cutter wheel 62a of the upper portion substrate cutting device 60 and the cutter wheels 62a of the lower portion substrate cutting device 70 generate vertical cracks in the portions of the glass substrates where the cutter wheels 62a rotated, and a scribe line 95 is formed. Since protrusions are formed in a predetermined pitch in peripheral edges of the blade edges of the cutter wheels 62a, vertical cracks having the length of about 90% of the thickness of the glass substrate in the thickness direction are formed in the glass substrates.

Further, a scribing method using a cutter head including a mechanism for periodically changing (vibrating) a pressure to the bonded mother substrate 90 by a scribe cutter such as a diamond point cutter, cutter wheel or the like for scribing the bonded mother substrate 90 may be effectively applied to the cutting of the bonded mother substrate 90 by the substrate cutting system of the present invention.

Figure 35:
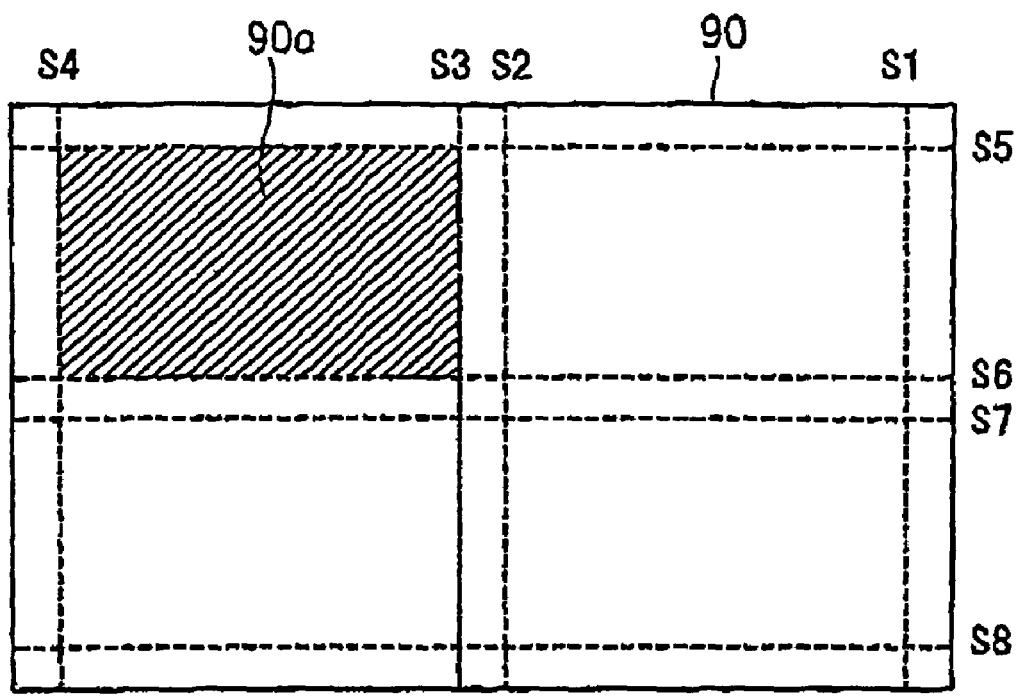
FIG. 35 is a diagram for showing a scribe pattern for scribing a substrate in a substrate cutting system according to Embodiment 2 of the present invention.

As the method for scribing the front and back surfaces of the bonded mother substrate 90, a conventional method as shown in FIG. 35, in which scribe lines are formed in turn along lines to be scribed S1 to S4 along a vertical direction, which is a narrow side direction of the bonded mother substrate 90, and then scribe lines are formed in turn along lines to be scribed S5 to S8 along the horizontal direction, which is wide side direction, may be used in general.

Figure 36:
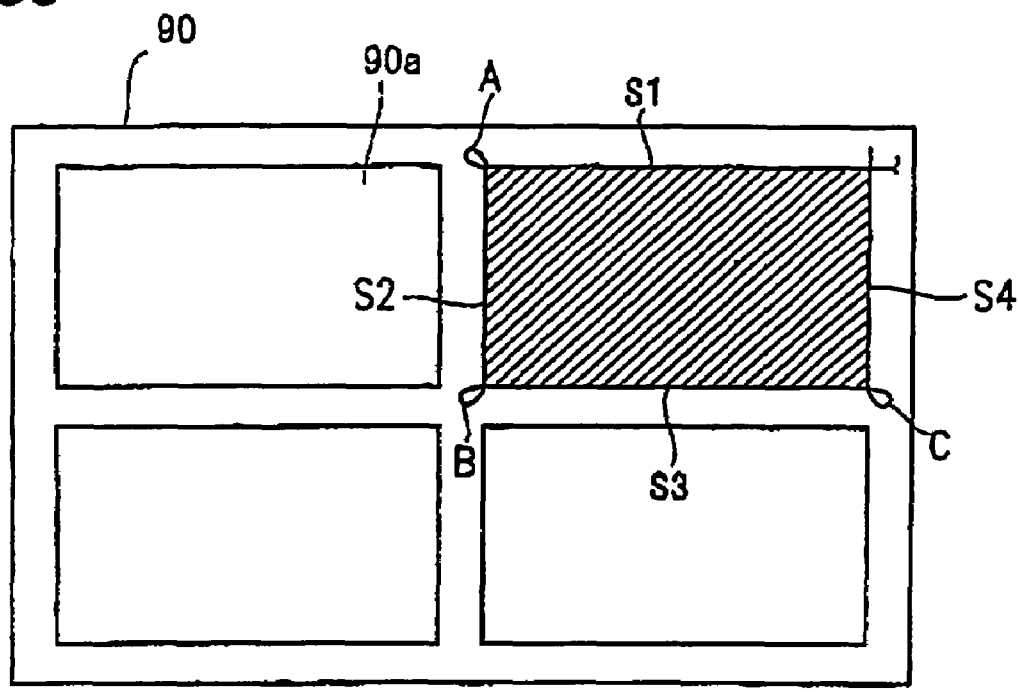
FIG. 36 is a diagram for showing another scribe pattern for scribing a substrate in the substrate cutting system according to Embodiment 1 of the present invention.

Beside the above-described scribing method, a scribing method as shown in FIG. 36 may be preferably used for the substrate cutting system of the present invention. In FIG. 20, four panel substrates 90a are formed from one bonded mother substrate 90.

The bonded mother substrate 90 has a rectangular shape. Four panel substrates 90a are obtained by forming two panel substrates 90a along the longitudinal direction of the bonded mother substrate 90 and forming two panel substrates 90a along the width direction which is orthogonal to the longitudinal direction. Each of the panel substrates 90a is formed with an appropriate apace apart from the adjacent panel substrate 90a and from side edges along the longitudinal direction and side edges of the width direction of the bonded mother substrate 90.

By having the cutter wheel 62a of the upper portion substrate cutting device 60 and the cutter wheel 62a of the lower portion substrate cutting device 70 oppose each other, and are pressed and rotated at the same time, scribe lines across the entire circumference are formed on the front and back surface of the bonded mother substrate 90 for each of the cut substrates 90a one by one in turn.

In this example, first, scribe line is formed along one linear line to be scribed S1 along the side edges parallel to the longitudinal direction of the bonded mother substrate 90 for the panel substrate 90a to be scribed. More specifically, the cutter wheels 62a of the cutter heads 62c are pressed and rotated on the bonded mother substrate 90 along the line to be scribed S1.

Figure 37:
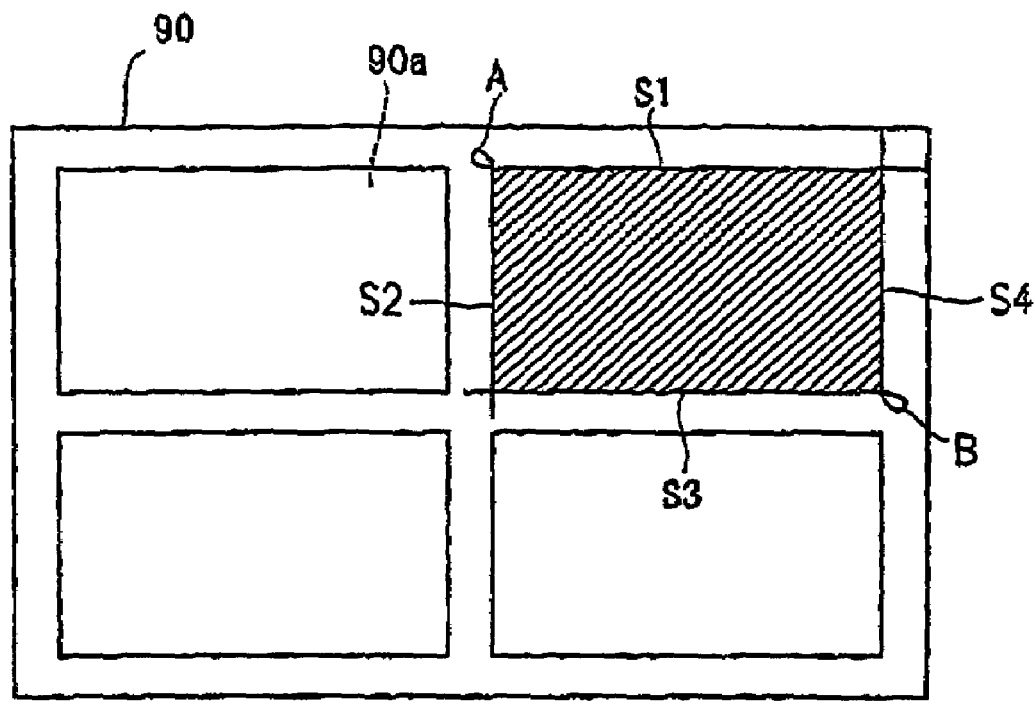
FIG. 37 is a diagram for showing yet another scribe pattern for scribing a substrate in the substrate cutting system according to Embodiment 1 of the present invention.

In FIG. 37, it is shown that the scribe start point by the cutter wheels 62a is a position on the bonded mother substrate 90 (a position for internal cut). However, it may be a position near the outside of the end surface of the bonded mother substrate 90 along the line to be scribed S1 (a position for external cut).

When the scribe line is formed along the line to be scribed S1 by a vertical crack which extends across the entirety of the thickness direction, the scribing device guide body 30 is moved to Y direction and the upper portion substrate cutting device 60 and the lower portion substrate cutting device 70 are moved in X direction at the same time such that the cutter wheels 62a revolves around the vertical axis by 270 degrees to form a circular trace having a radius of about 1 mm (a corner portion A in FIG. 37).

When the cutter wheels 62a are revolving, the pressure of the cutter wheels 62a to the bonded mother substrate 90 is reduced so that there is no deep vertical crack formed on the bonded mother substrate 90. When the thickness of the bonded substrate 90 is 0.7 mm, the depth of the vertical crack formed in the bonded mother substrate 90 when the cutter wheels 61a is revolving to about 100 to 200 μm.

When the cross-scribing is performed by the cutter wheels 62a as shown in FIG. 35, a chip tends to be generated in the bonded mother substrate 90 at cross points of the scribe lines formed when scribing is performed in first direction and scribing is performed in second direction.

Since a vertical cracks which almost extends to the thickness of the bonded mother substrate 90 has been already formed when scribing is performed in the first direction, the mother glass substrate 90 sinks in front of the first scribe line when the cutter wheels 62a reach near the scribe line in the first direction while scribing in the second direction and such a chip may be generated when the cutter wheels 62a run on the glass substrates along the scribe line in the first direction at a crossing portion of the scribe line in the first direction and a scribe line in the second direction.

In the scribing method as shown in FIG. 36, the cutter wheels 62a revolve and cross the scribe line which has been already formed along the line to be scribed S1 with the pressure to the bonded mother substrate 90 being reduced. Thus, a part of the bonded mother substrate 90 does not sink before the scribing lines cross each other, and thus, it is possible to prevent a chip from occurring in the bonded mother substrate 90 when the scribing lines cross each other.

When travel direction of the cutter wheels 62a revolve by 270 degrees and the cutter wheels 62a are along the linear line to be scribed S2 along the width direction of the panel substrates 90a which are orthogonal to the line to be scribed S1, the cutter wheels 62a are pressed and rotated along the line to be scribed S2. Thus, the scribe line is formed by a vertical crack which extends across the entirety of the thickness direction along the line to be scribed S2.

Then, again, the cutter wheels 62a revolve by 270 degrees to a direction orthogonal to the line to be scribed S2 while forming a circular trace having a radius of about 1 mm in corner portion B without separating the cutter wheels 62a from the front and back surfaces of the bonded mother substrate 90. Thus, the cutter wheels 62a are along the line to be scribed S3 and form the scribe line by a vertical crack which extends across the entirety of the thickness direction along the line to be scribed S3. Furthermore, again, the cutter wheels 62a revolve by 270 degrees to a direction orthogonal to the line to be scribed S3 while forming a circular trace having a radius of about 1 mm in corner portion C without separating the cutter wheels 62a from the front and back surfaces of the bonded mother substrate 90. Thus, the cutter wheels 62a are along the line to be scribed 64 and form the scribe line by a vertical crack which extends across the entirety of the thickness direction along the line to be scribed S4.

In this way, a closed curve including four linear scribe lines is formed around a panel substrate 90a. Then, for example, for forming the panel substrate 90a adjacent in the longitudinal direction of the bonded mother substrate 90, a closed curve including four linear scribe lines is formed across the entire circumference of the panel substrate 90a similarly. Then, closed curves including four linear scribe lines are formed across the entire circumferences for each of the remaining pair of the panel substrates 90a in turn.

Besides the above-described scribing method, a scribing method as shown in FIG. 37 can be preferably used in the substrate cutting system of the present invention. In FIG. 37, four panel substrates 90a are formed from one bonded mother substrate 90.

In the scribing method shown in FIG. 37, scribe lines along lines to be scribed S1 and S2 which are orthogonal to each other on the panel substrates 90a are formed in the method as described above. For forming the scribe line along the line to be scribed S1, the cutter wheels 62a is positioned outside the end surface of the bonded mother substrate 90 and the scribe line along the line to be scribed S1 is continuously formed therefrom.

A chip which may be generated when the cutter wheels 62a run on the front and back surfaces of the bonded mother substrate 90 at the start of scribing does not affect the panel substrates 90a to become products.

Then, the cutter wheels 62a revolve by 270 degrees to a direction orthogonal to the line to be scribed S1 while forming a circular trace in the corner portion A. Thus, the cutter wheals 62a are along the line to be scribed S2 and form the scribe line by a vertical crack which extends across most of the entirety of the thickness direction along the line to be scribed S2.

Then, the cutter wheels 62a are temporarily separated from the surface of the bonded mother substrate 90, and the scribe lines along the lines to be scribed S3 and S4 in a direction orthogonal to the line to be scribed S1 are formed in this order. In this case, a chip which may be generated when the cutter wheels 62a run on the front and back surfaces of the bonded mother substrate 90 at the start of scribing does not affect the panel substrates 90a to become products.

In this way, four linear scribe lines are formed around the panel substrate 90a. Then, for example, for forming the panel substrate 90a adjacent in the longitudinal direction of the bonded mother substrate 90, four linear scribe lines are formed across the entire circumference of the panel substrate 90a similarly. Then, closed curves including four linear scribe lines are formed across the entire circumferences for each of the remaining pair of the panel substrates 90a in turn.

After the scribe lines are formed on the bonded mother substrate by the above-described scribing method, the steam unit portion 75 moves toward the substrate carry-in side and blows the steam entirely on the front and back surfaces of the bonded mother substrate 90 on which the scribe lines are carved to completely cut the bonded mother substrate 90. At the same time, the water remaining on the front and back surfaces of the bonded mother substrate 90 after the steam is blown thereto is removed by the air knife 71.

By blowing the steam onto the entire front and back surface of the bonded mother substrate 90 having the scribe lines carved thereon, the scribe lines formed by the cutter wheel tips 62a experience volume expansion since the front and back surface portions of the bonded mother substrate 90 are heated. In this way, vertical cracks extend from the surface of the upper and lower mother substrates of the bonded mother substrate 90 toward the bonded surface, and the bonded mother substrate 90 is completely cut.

In the above description of the operations of the substrate cutting system according to the present invention, an example in which the mother glass substrate formed by bonding glass substrates is cut has been described. However, the present invention is not limited to this. For example, operations different from the above description may be performed depending on the types of the substrates to be cut or in order to enhance the functionalities of the devices which form the substrate cutting system.

Embodiment 2

Figure 38:
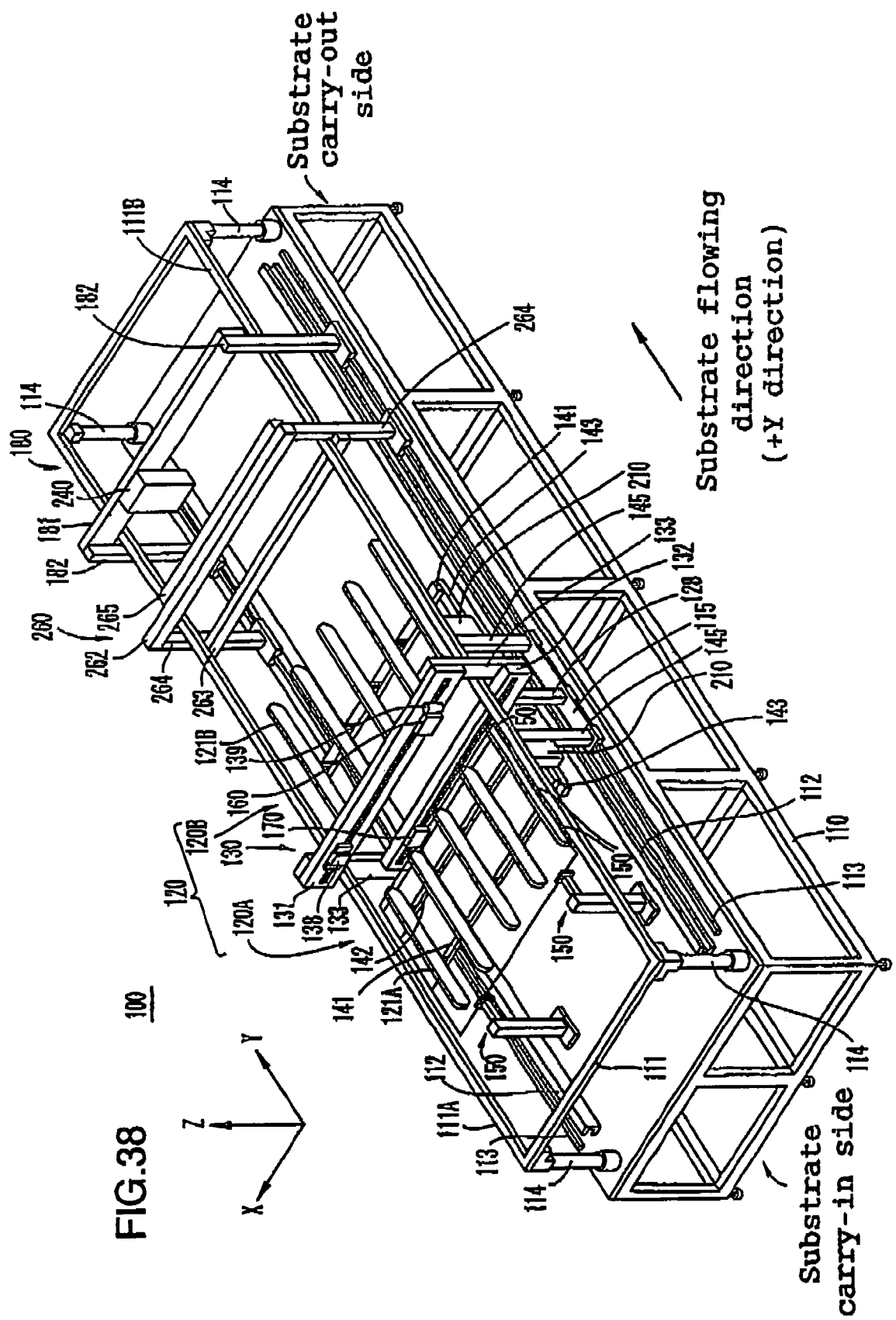
FIG. 38 is a schematic perspective view for showing an example of the substrate cutting system according to Embodiment 2 of the present invention.
Figure 39:
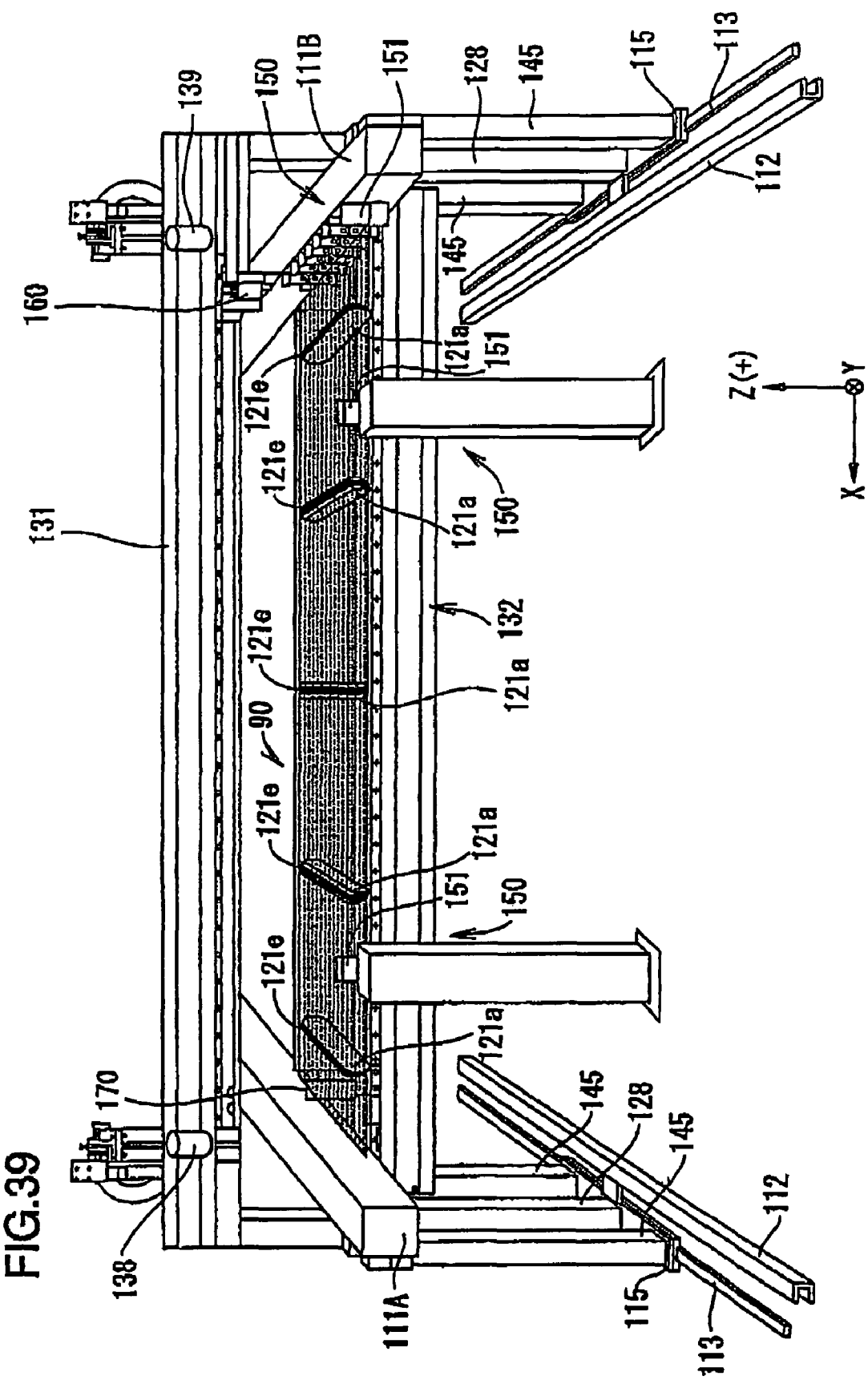
FIG. 39 is a schematic perspective view of the substrate cutting system viewed from another direction.

FIGS. 38 and 39 are schematic perspective view showing another example of the embodiment of the substrate cutting system according to the present invention in whole as viewed from different directions.

In the present invention, "substrates" include mother substrates cut into a plurality of substrates and also include single plates of metal substrates such as steel sheets, wood plates, plastic substrates and ceramic substrate, semiconductor substrates, and brittle material substrates such as glass substrates. Furthermore, the "substrates" are not limited to such single plates, but also includes bonded substrates formed by bonding pairs of substrates and laminated substrates formed by laminating pairs of substrates.

The substrate cutting system according to the present invention cut the bonded mother substrate 90 formed by bodding a pair of mother glass substrates to each other into a plurality of panel substrates (display panel bonded substrates) for producing, for example, panel substrates (display panel bonded substrates) of the liquid crystal display apparatus which are bonded to each other.

Regarding a substrate cutting system 100 according Embodiment 2, a side on which a first substrate supporting portion 120A is located is referred to as a substrate carry-in side and a side on which a substrate carry-out device 180 is located is referred to as a substrate carry-out side in the following description. In the substrate cutting system 100, a direction in which the substrates are carried (substrate flowing direction) is +Y direction from the substrate carry-in side to the substrate carry-out side. The direction in which the substrates are carried is a direction orthogonal to a scribing device guide body 130 in a horizontal fashion and the scribing device guide body 130 is provided along X direction.

The substrate cutting system 100 includes a hollow mounting structure 110 having a parallelepiped shape. On an upper surface of the mounting structure 110, four pillars 114 are provided, and a main frame 111 of a frame is located on the pillars 114. On the upper surface of the mounting structure 110, a substrate supporting device 120 for supporting the bonded mother substrate 90 to be carried to the substrate cutting system 100 by a carrying robot in a horizontal manner is located.

As shown in FIG. 38, the substrate supporting device 120 includes a first substrate supporting portion 120A located on the substrate carry-in side of the substrate cutting system 100 for supporting the bonded mother substrate 90 to be carried into the main frame 111, and a second substrate supporting portion 120B located on the substrate carry-out side of the substrate cutting system 100 for supporting the bonded mother substrate 90 after the bonded mother substrate 90 is cut and the display panels are sequentially carried out of the substrate cutting system. In the mounting structure 110, the first substrate supporting portion 120A side is a substrate carry-in side, the second substrate supporting portion 120B side is a carry-out side.

Further, as shown in FIG. 39, on the mounting structure 110, a clamp device 150 for holding a substrate held in a horizontal manner by the substrate supporting device 120 (a first substrate supporting unit 121A) in a horizontal manner is provided. Further, as shown in FIG. 38, on the upper surface of the mounting structure 110, scribing device guide body 130 is provided so as to be movable along frames 111A and 111B in the longitudinal direction of the main frame 111. The scribing device guide body 130 includes an upper guide rail 131 extending along X direction orthogonal to frames 111A and 111B in the longitudinal direction of the main frame 111 above the main frame 111 and a lower guide rail 132 extending along the upper guide rail 131 below the main frame 111. The upper guide rail 131 and the lower guide rail 132 are formed so as to move integrally along the frames 111A and 111B in the longitudinal direction (Y direction) of the main frame 111.

Figure 40:
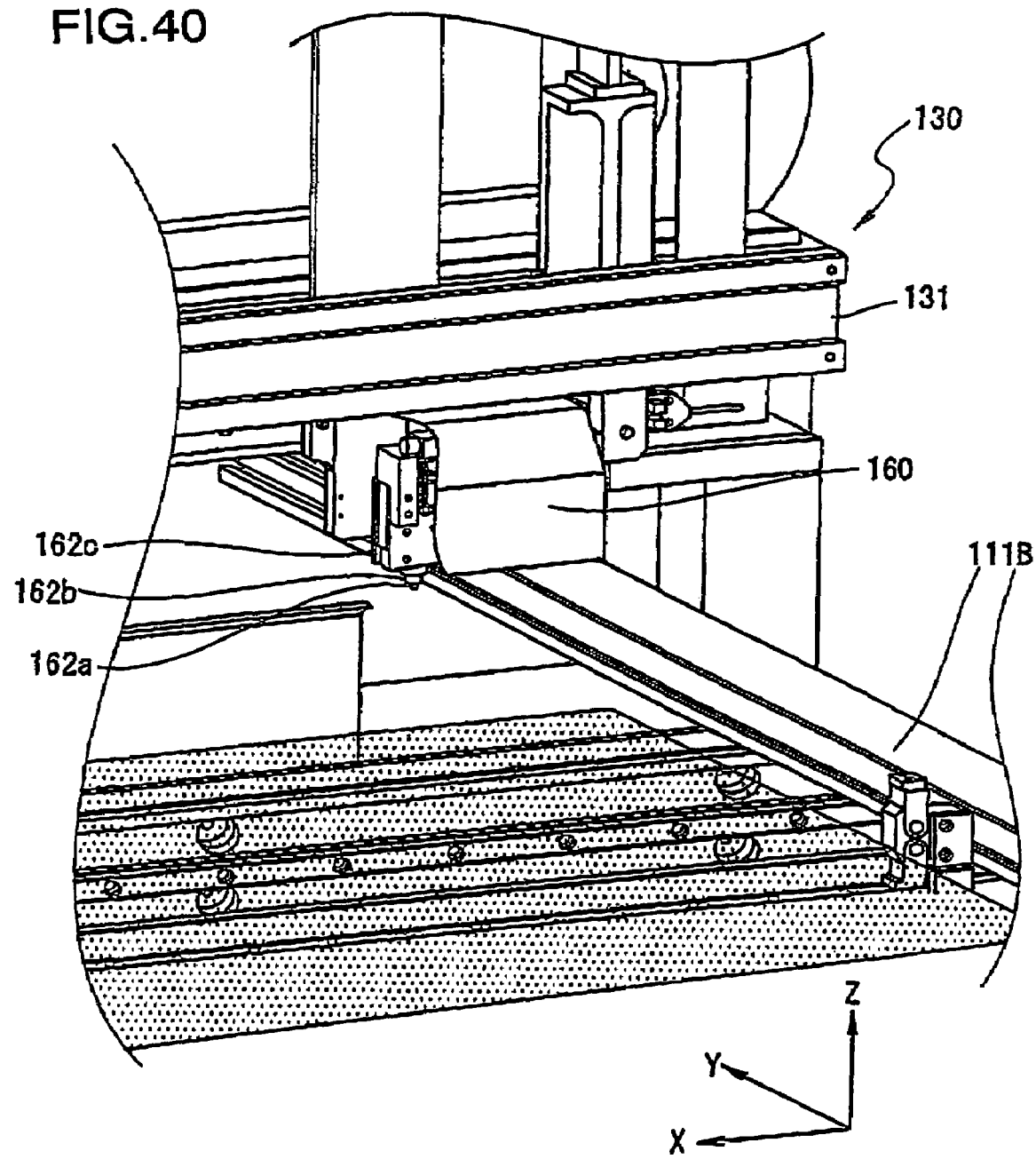
FIG. 40 is a schematic perspective view of an important part of the substrate cutting system which is enlarged.
Figure 41:
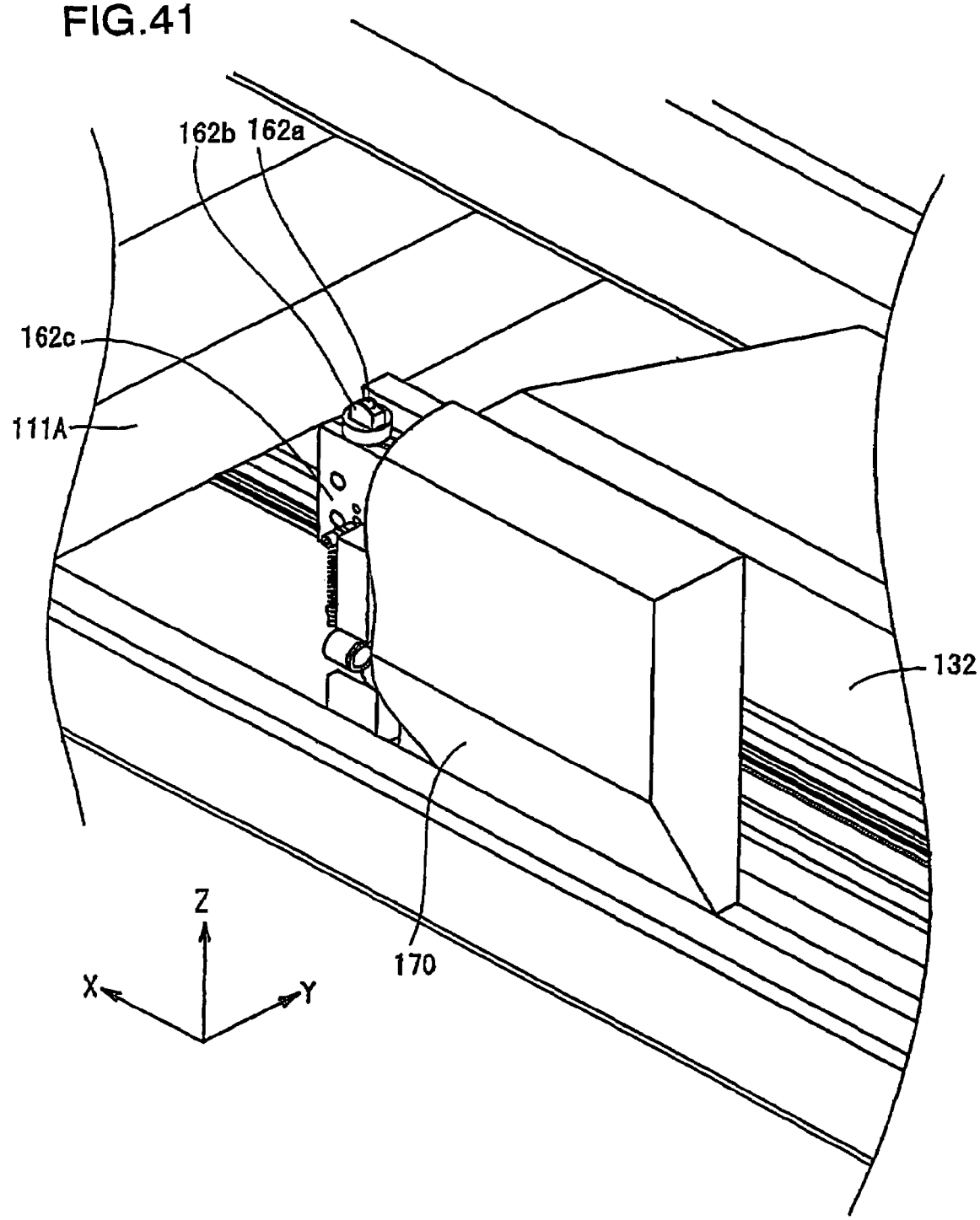
FIG. 41 is a schematic perspective view of another important part of the substrate cutting system which is enlarged.

FIG. 40 is a schematic perspective view showing near the upper guide rail 131 in the scribing device guide body 130. To the upper guide rail 131, upper portion substrate cutting device 160 is attached so as to be movable along the upper guide rail 131. FIG. 41 is a schematic perspective view showing near the lower guide rail 132 in the scribing device guide body 130. To the lower guide rail 132, lower portion substrate cutting device 170 is attached so as to be movable along the lower guide rail 132.

The upper portion substrate cutting device 160 and the lower portion substrate cutting device 170 respectively move back and forth along the upper guide rail 131 and the lower guide rail 132 by linear motors. To the upper guide rail 131 and the lower guide rail 132, stators of the linear motors are respectively attached, and to the upper portion substrate cutting device 160 and the lower portion substrate cutting device 170, movers of the linear motors are respectively attached. The upper portion substrate cutting device 160 and the lower portion substrate cutting device 170 cut glass substrates on upper and lower sides of the bonded mother substrate 90 held by the clamp device 150 in a horizontal manner and also supported by the substrate supporting device 120 for assisting holding the mother substrates.

In one end portion of the scribing device guide body 130, a first optical device 138 for taking an image of a first alignment mark of the bonded mother substrate 90 held by the clamp device 150 and supported by the substrate supporting device 120 is provided so as to be movable along the scribing device guide body 130. In the other end portion of the scribing device guide body 130, a second optical device 139 for taking an image of a second alignment mark provided on the bonded mother substrate 90 is provided so as to be movable along the scribing device guide body 130.

Stators 112 of linear motors for moving the scribing device guide body 130 are respectively provided on the upper surface of the mounting structure 110 along the frames 111A and 111B in the longitudinal direction of the main frame 111. The stators 112 are respectively formed to have a flat hollow parallelepiped shape with external side surfaces opened. Thus, cross-sections thereof have squared "C" shape. In the stators, movers (not shown) of the linear motors are inserted into guide bases 115 for holding pillars 128 for supporting both ends of the scribing device guide body 130 so as to be movable along the frames 111A and 111B in the longitudinal direction of the main frame 111.

In the stators 112, a plurality of permanent magnets are respectively located along the longitudinal directions with the magnetic poles of the permanent magnets adjacent to each other are reversed. The movers are respectively formed of electromagnets. By sequentially switching magnetic poles of the electromagnets forming the movers, the movers slide respectively along the stators 112.

As shown in FIGS. 38 and 39, both ends of the scribing device guide body 130 having the end surfaces of the upper guide rail 131 and the lower guide rail 132 coupled to each other by a connection plate 133 are supported by the pillars 128. The pillars 128 are supported on upper surfaces of the guide bases 115. The movers are respectively attached to the guide bases 115. The movers are driven in synchronization and slid along the stators 112.

Above the mounting structure 110 on the carry-out side, a carrying robot 240 for carrying out display panels cut out of the bonded mother substrate 90, and the substrate carry-out device 180 provided for allowing the carrying robot 240 to move in X direction which is orthogonal to the frames 111A and 111B in the longitudinal direction of the main frame 111 are located on the substrate carry-out side with respect to the scribing device guide body 130. End portions of substrate carry-out device guides 181 slide by linear motors via supporting members 182 along the guide rails 113 provided on the upper surface of the mounting structure 110. The linear motors in this example are formed by inserting movers (not shown) attached to the portions of the substrate carry-out device 180 into the stators 112 respectively provided on the upper surface of the mounting structure 110.

The carrying robot 240 of the substrate carry-out device 180 includes an adsorption portion (not shown) for suction-adsorbing panel substrates cut out of the bonded mother substrate 90. The entire substrate carry-out device 180 is slid to the substrate carry-out side with the panel substrate adsorbed by the adsorption portion, and cut display panels are carried out from the mounting structure 110.

The portion (a) of FIG. 42 is a schematic view showing the structure of the carrying robot 240 in the substrate carry-out device 180. The carrying robot 240 is attached to the substrate carry-out device guides 181 and is movable in a direction along the substrate carry-out device guides 181 (X direction) by a moving mechanism formed by combining driving means of the linear motors or servo motors and linear guides.

The carrying robot 240 includes two servo motors 240a and 240m. The servo motor 240a is coupled to a driving shaft 240b. A first pulley 240c and a second pulley 240e are integrally attached, and are respectively attached to the driving shaft 240b via bearings and cut from the rotation of the driving shaft 240b. An end portion of an arm 240f is integrally attached to the driving shaft 240b, and the arm 240f is rotated by the driving shaft 240b having the driving shaft 240b as the center. On a tip portion of the arm 240f, a rotation shaft 240g is rotatably supported. The rotation shaft 240g penetrates through the arm 240f, and a third pulley 240h is integrally attached to one end portion thereof. A belt 240i such as, for example, a timing belt in hung between the second pulley 240e and the third pulley 240h.

Furthermore, fourth pulley 240n is attached to a rotation axis of the servo motor 240m. A belt 240p such as, for example, a timing belt is hung between the fourth pulley 240n and the first pulley 240c. Thus, rotation of the servo motor 240m is transmitted to the first pulley 240c via the belt 240, further transmitted to the third pulley 240h via the belt 240i, and the rotation shaft 240g rotates.

To the other end portion of the rotation shaft 240g, a center portion of an adsorption pad attachment plate 240j is integrally attached. On the lower surface of the adsorption pad attachment plate 240j, adsorption pads 240k for adsorbing the substrates cut by the substrate cutting system 100 by using a sucking mechanism which is not shown.

The carrying robot 240 having such a structure can carry substrates to a device in next step with the directions of the substrates in a horizontal manner but varying in angle directions with the minimum movement of the arm 240f. This is achieved by setting rotation directions and rotation angles of the servo motor 240a and the servo motor 240m.

When the cut substrates are carried, the out substrates are held by adsorption pads by sucking, and the entire carrying robot 240 is temporarily lifted by a moving mechanism (not shown). Then, the substrates are carried to a device in next step, and the entire carrying robot 240 is moved down again by the moving mechanism (not shown) and placed in a previously decided state in a predetermined position in the next step.

Next, the example of changing the direction of the cut substrates by using the carrying robot 240 having such a structure by, for example, 90° will be described with reference to the portion (b) of FIG. 42.

When the adsorption pads 240k attached to the adsorption pad attachment plate 240j are adsorbed to the cut substrates 93, the entire carrying robot 240 is lifted by the moving mechanism. The servo motor 240a is driven, and the driving shaft 240b is rotated by 90 degrees in counterclockwise direction as viewed from the substrate side. When the driving shaft 240b is rotated by 90 degrees, the arm 240f is rotated by 90 degrees in the counterclockwise direction as viewed from the substrate side having the driving shaft 240b as a center. Thus, the adsorption pad attachment plate 240j rotatably supported by the tip portion of the arm 240f via the rotation shaft 240g is rotated in counterclockwise direction as viewed from the substrate side having the driving shaft 240b as the center together with the arm 240f. In this case, the rotation shaft 240g attached to the adsorption pad attachment plate 240j is also rotated having the driving shaft 240b as the center.

At this time, the rotation of the servo motor 240m is transmitted to the first pulley 240c via the belt 240p, and further transmitted to the third pulley 240h via the belt 240i. Thus, the rotation shaft 240g is rotated by 180° in clockwise direction. The adsorption pad attachment plate 240j attached to the rotation shaft 240g also rotates by 180° in clockwise direction having the rotation shaft 240g as the center. Thus, the adsorption pad attachment plate 240j rotates by 180 degrees in clockwise direction as viewed from the substrate side having the rotation shaft 240g as the center while it is rotated by 90 degrees in counterclockwise direction as viewed from the substrate side having the driving shaft 240b as the center. As a result, as shown in the portion (b) of FIG. 42, the cut substrate 93 adsorbed by the adsorption pads 240k are rotated by 90 degrees in clockwise direction when viewed from the substrate side with a relatively small space having the rotation center position being moved.

As shown in FIG. 38, the first substrate supporting portion 120A and the second substrate supporting portion 120B of the substrate supporting device 120 respectively includes, for example, five first substrate supporting units 121A and second substrate supporting units 121B which are movable in a direction same as the moving direction of the scribing device guide body 130. The first substrate supporting units 121A and the second substrate supporting units 121B are arranged linearly along the direction parallel to the frames 111A and 111B in the longitudinal direction of the main frame 111 (Y direction) respectively on the substrate carry-in side and the substrate carry-out side of the scribing device guide body 130.

Figure 43:
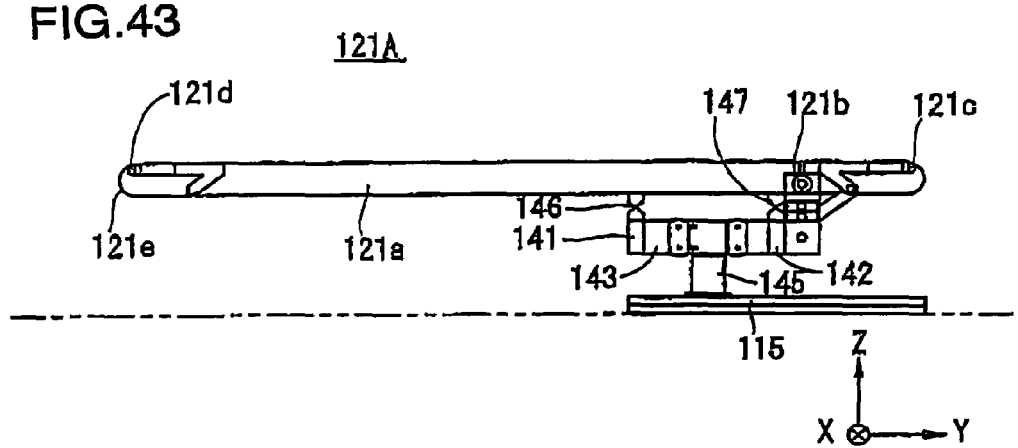
FIG. 43 is a side view of a first substrate supporting unit provided in a substrate supporting device of the substrate cutting system.

FIG. 43 is a side view of one of the first substrate supporting units 121A provided in the first substrate supporting portion 120A. The first substrate supporting unit 121A has a pillar 145 provided on the surface of the guide base 115 held by a moving unit of the pair of guide rails 113 provided on the upper surface of the mounting structure 110, and has a supporting member 143 parallel to Y direction along the frames 111A and 111B in the longitudinal direction of the main frame 111 above the pillar 145. Two unit attachment members 141 and 142 extending in X direction orthogonal to the frames 111A and 111B of the main frame 111 on the supporting member 143 are attached to junction members 146 and 147.

A plurality of first substrate supporting units 121A (five in the present embodiment) are arranged with a predetermined spaces therebetween, and move in Y direction along the frames 111A and 111B of the main frame 111 together with the scribing device guide body 130.

Each of the first substrate supporting units 121A has a support main body 121a elongated linearly along a direction parallel to the main frame 111 (Y direction), and timing pulleys 121c and 121d for guiding a timing belt 121e are respectively attached to end portions of the support main body 121a. The timing belt 121e is rotated when clutches described below rotate a driving timing pulley 121b in connection with a driving axis.

Figure 44:
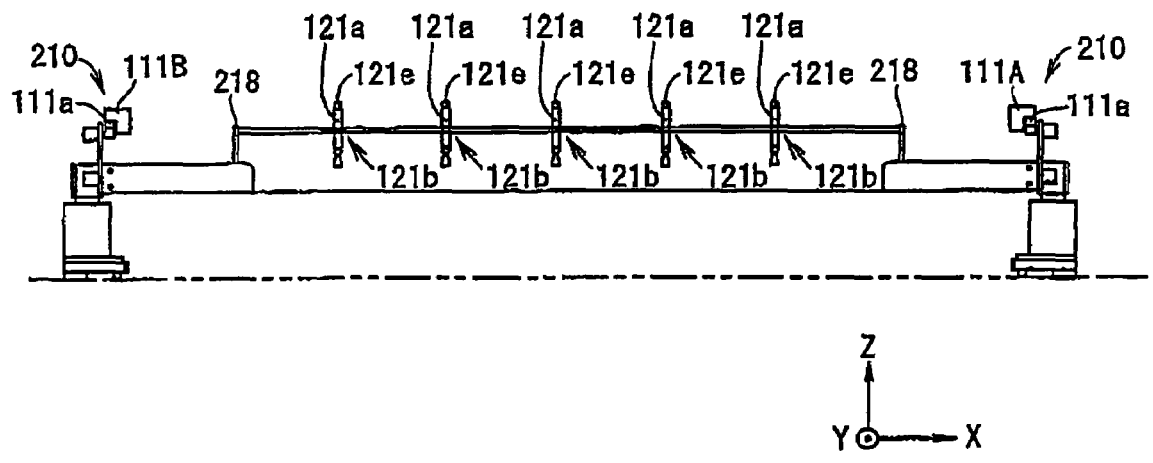
FIG. 44 is a front view of the first substrate supporting unit viewed from a scribing device guide body side of the substrate cutting system.
Figure 45:
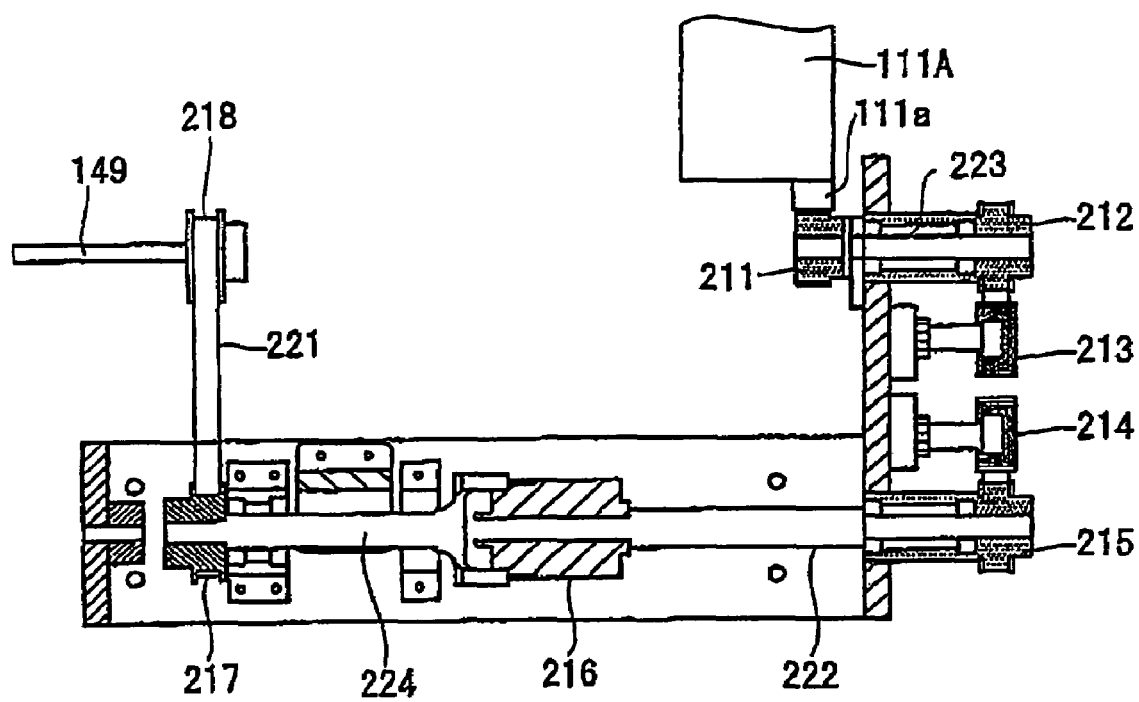
FIG. 45 is a schematic diagram showing a structure of a clutch unit provided in a substrate supporting portion of the substrate cutting system.
Figure 46:
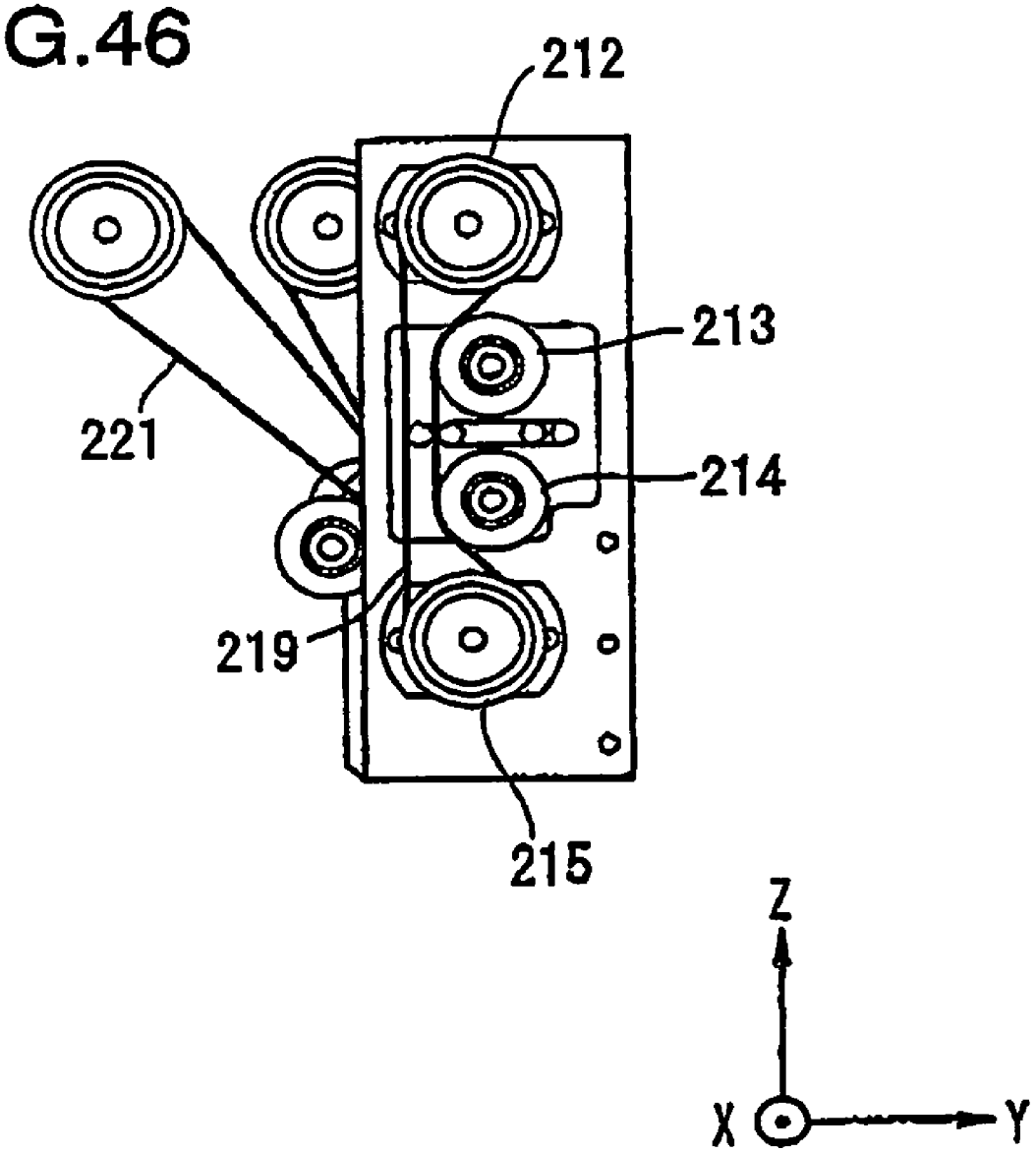
FIG. 46 is a side view of the clutch unit.

A mechanism for moving the timing belt 121e of the first substrate supporting unit 121A having above-described structure will be described with reference to FIGS. 44, 45 and 46. FIG. 44 to a front view of the plurality of (five) first substrate supporting units 121A provided in the first substrate supporting portion 120A as viewed from the wide of the scribing device guide body 130. FIG. 45 is a schematic view showing a structure of a clutch unit 210. FIG. 46 is a side view of the clutch unit 210.

As shown in FIG. 44, the driving timing pulleys 121b included in the support main bodies 121a of the first substrate supporting units 121A are coupled to a rotation driving shaft 149 provided in parallel to X direction which is orthogonal to the frames 111A and 111B in the longitudinal direction of the main frame 111. Both ends of the rotation driving shaft 149 are connected to the clutch units 210. Whether the rotation driving shaft 149 rotate or not rotate depends upon a connection state of a clutch in the clutch unit 210 with a driving axis. More specifically, when the clutch in the clutch unit is coupled with a driving axle 222, the rotation driving shaft 149 rotates. When the clutch is decoupled from the driving axle 222, the rotation driving shaft 149 is not rotated.

On the bottom surface of the frames 111A and 111B in the longitudinal direction of the main frame 111, a rack 111a for rotating a pinion 211 of the clutch unit 110 is attached along the longitudinal direction of the frames 111A and 111B.

The pinion 211 of the clutch unit 210 is coupled to one end of an axis 223. To the other end of the axis 223, a timing pulley 212 for a timing belt 219 is coupled.

To one end of the driving axis 222, a timing pulley 215 is coupled. The timing belt 219 is hung between the timing pulley 212 and the timing pulley 215 via the two idlers 213 and 214, and rotation of the axis 223 is transmitted to the driving axis 222.

To the other end of the driving axis 222, clutch 216 such as an air clutch is attached. When compressed air is put into the clutch 216, the driving axis 222 and a driven axis 224 are coupled. When putting compressed air into the clutch 216 is stopped and the air pressure inside the clutch 216 becomes atmospheric pressure, the coupling between the driving axis 222 and the driven axis 224 is blocked.

To the end portion of the driven axis 224 which is not jointed to the clutch 216, a timing pulley 217 is coupled. A timing belt 221 is hung between the timing pulley 217 and a timing pulley 218 on one end of the rotation driving shaft 149 to which the driving timing pulley 121b included in the support main body 121a of the first substrate supporting units 121A is coupled.

As shown in FIG. 44, a mechanism for moving the timing belts 121e by rotating the driving timing pulleys 121b of the five first substrate supporting units 121A provided in the first substrate supporting portion 120A (clutch unit 210) is also provided on the frame 111B side in the longitudinal direction of the main frame 111.

As described above, the pillar 145 on the frame 111A side which supports five first substrate supporting units 121A and the pillar 145 on the frame 111B side are held by the guide bases 115, and are coupled such that they move integrally with the guide bases 115 for holding the pillars 128 for supporting both ends of the scribing device guide body 130. To the guide bases 115 which support the pillars 128, movers (not shown) of the linear motors are attached. Thus, by driving the linear motors, the scribing device guide body 130 is moved toward the substrate carry-in side, and five first substrate supporting units 121A of the first substrate supporting portion 120A are moved toward the substrate carry-in side.

When the scribing device guide body 130 is moved, the pinion 211 of the clutch unit 210 on the frame 111A side and the pinion 211 of the clutch unit 210 on the frame 111B side, which are engaged with the racks 111a attached along the frames 111A and 111B, are rotated.

For rotating the driving timing pulleys 121b of the first substrate supporting unite 121A and moving the timing belts 121e, clutches on both sides of the frames 111A and 111B may be coupled to the respective driving axes 222, or the clutch on one of the frames 111A and 111B may be coupled to the driving axes 222.

The second substrate supporting portion 120B of the substrate supporting device 120 includes, for example, five second substrate supporting units 121B which are movable in the same direction as the moving direction of the scribing device guide body 130. The second substrate supporting units 121B have similar structures as those of the first substrate supporting units 121A, and supported by the pillar 145 on the frame 111A side and the pillar 145 on the frame 111B side so as to be attached in an inverted direction with respect to Y direction to provide an arrangement symmetrical with respect to the scribing device guide body 130. The respective pillars are supported by the guide bases 115.

The pillar 145 on the frame 111A side and the pillar 145 on the frame 111B side which support five first substrate supporting units 121A are held by the guide bases 115. The pillar 145 on the frame 111A side and the pillar 145 on the frame 111B side which supports five second substrate supporting units 121B are held by the guide bases 115. Further, they are coupled such that they integrally move with the guide bases 115 for supporting pillars which support both ends of the scribing device guide body 130. Since the movers (not shown) of the linear motors are attached to the guide bases 115 for holding the pillars 128 which support both ends of the scribing device guide body 130, the scribing device guide body 130 is moved toward the substrate carry-in side by driving the linear motor, and the five first substrate supporting units 121A of the first substrate supporting portion 120A and the five second substrate supporting units 121B of the second substrate supporting portion 120B also move toward the substrate carry-in side.

On the frame 111A side and the frame 111B side of the second substrate supporting portion 120B, clutch units 210 similar to those in the first substrate supporting portion 120A are provided. When the scribing device guide body 130 is moved, the pinion 211 of the clutch unit 210 on the frame 111A side and the pinion 211 of the clutch unit 210 on the frame 111B side, which are engaged with the racks 111 attached along the frames 111A and 111B, are rotated.

For rotating the driving timing pulleys 121b of the second substrate supporting units 121B and moving the timing belts 121e, clutches on both sides of the frames 111A and 111B may be coupled to the respective driving axes 222, or the clutch on one of the frames 111A and 111B may be coupled to the driving axes 222.

As shown in FIG. 38, above the mounting structure 110 on the substrate carry-out side, a steam unit portion 260 for completely cutting the bonded mother substrate 90 which is not completely cut after the scribing process is located on the substrate carry-out side with respect to the second substrate supporting portion 120B and the substrate carry-in side with respect to the substrate carry-out device 180.

The steam unit portion 260 includes an upper steam unit attachment bar 262 for attaching a plurality of steam units 261 for spraying steam to the upper mother substrate of the bonded mother substrate 90 and a lower steam unit attachment bar 263 for attaching a plurality of steam units 261 for spraying steam on the lower mother substrate of the bonded mother substrate 90 attached to a pillar 264 on the frame 111A side and a pillar 264 on the frame 111B side along X direction which is orthogonal to the frames 111A and 111B.

Along the guide rails 113 provided on the upper surface of the mounting structure 110, the pillars 264 on the frame 111A and 111B sides slide by the linear motors. In this case, the linear motors are formed by inserting movers (not shown) of the linear motors respectively attached to the steam unit portion 260 into the linear motor stators 112 respectively provided on the upper surface of the mounting structure 110.

Figure 47:
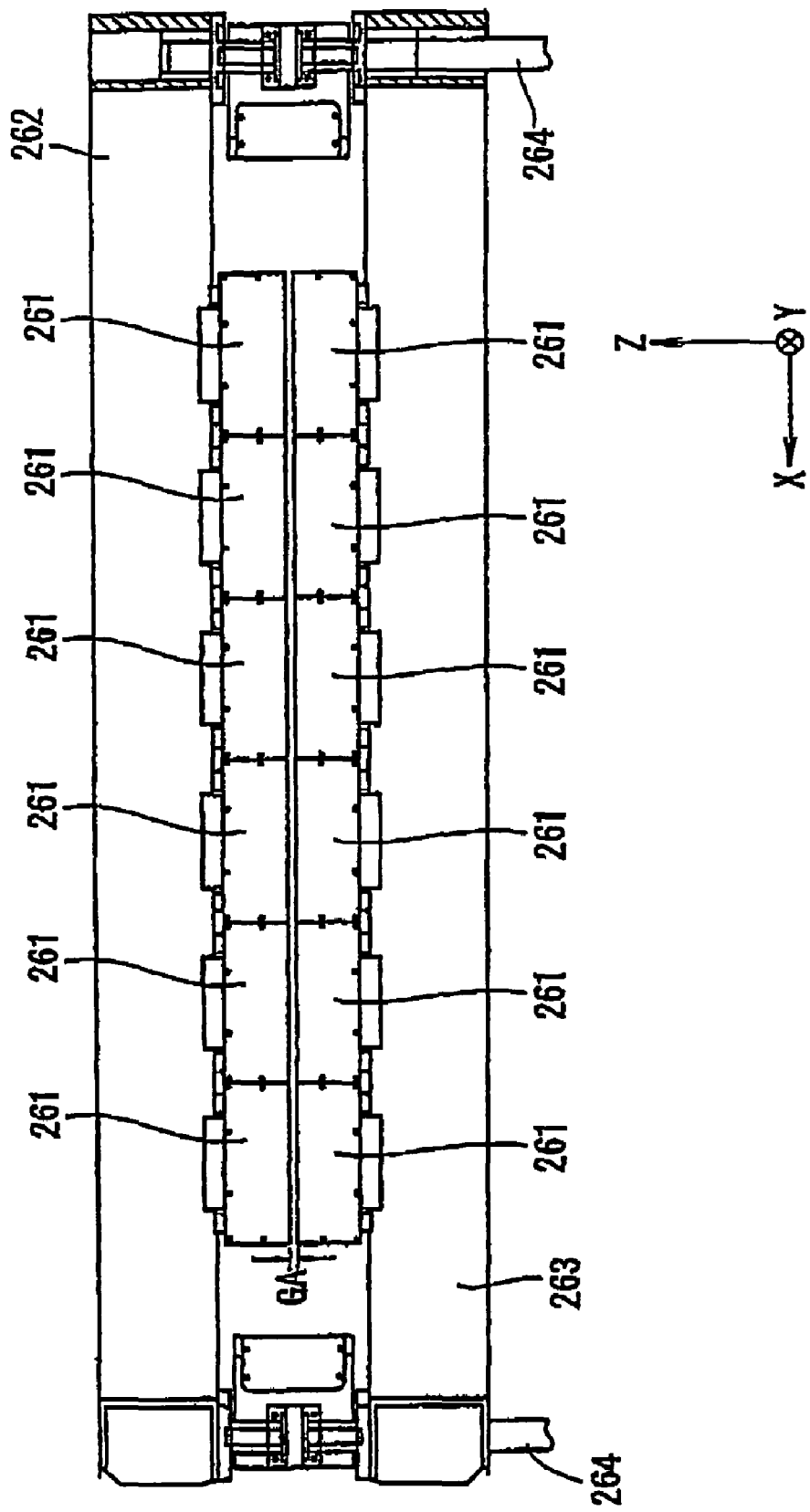
FIG. 47 is a front view of an important part of a steam unit portion of the substrate cutting system according to Embodiment 2 of the present invention when viewed from a substrate carry-in side.

FIG. 47 is a front view of important parts of a steam unit portion 260 as viewed from the substrate carry-in side. Six steam units 261 are attached to the upper steam unit attachment bar 262 and six steam units 261 are attached to the lower steam unit attachment bar 263 with a gap GA spaced apart from the upper six steam units 261. The gap GA is adjusted so as to allow the bonded mother substrate 90 to pass through the gap GA when the steam unit portion 260 moves toward the substrate carry-in side.

Figure 48:
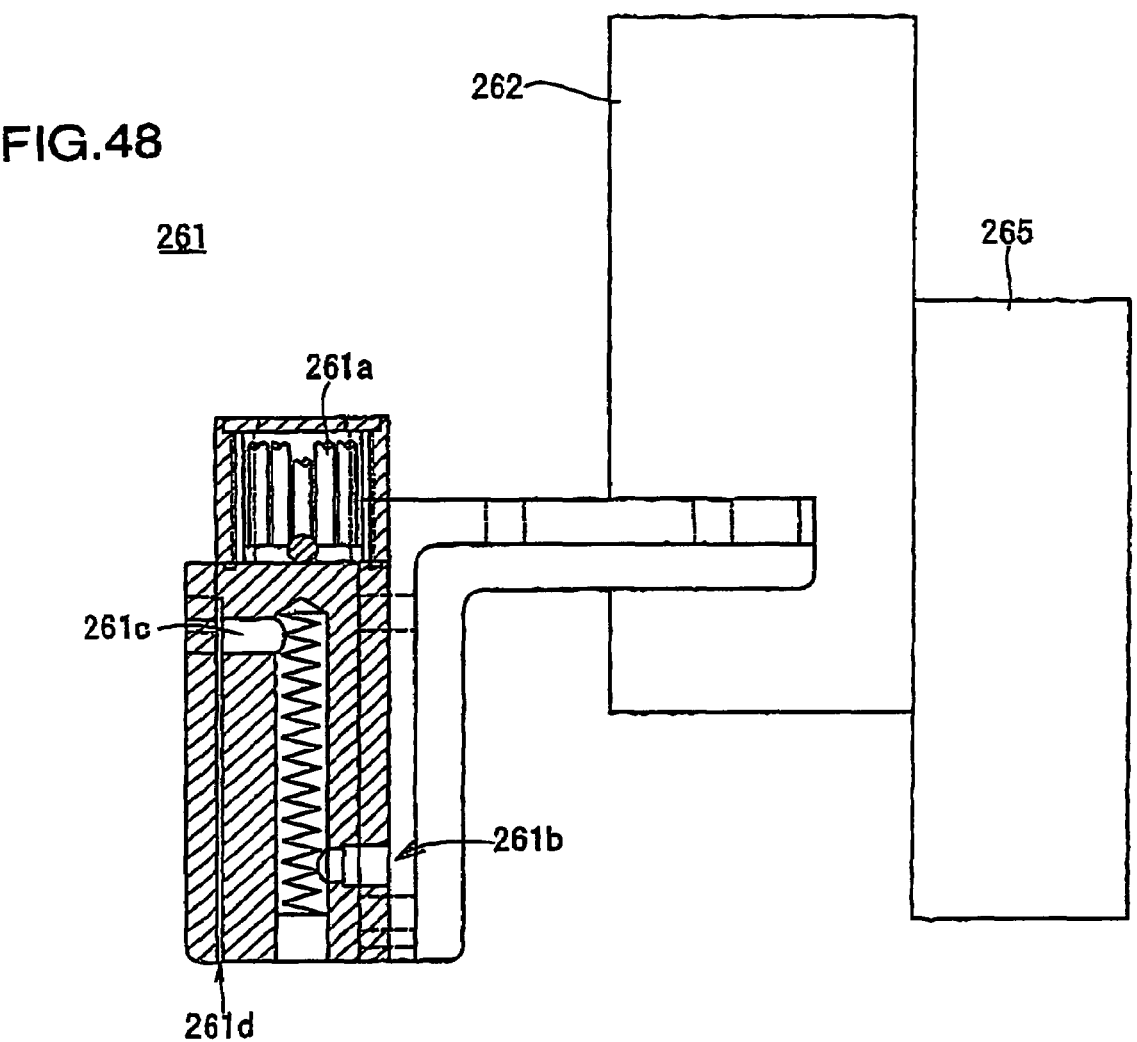
FIG. 48 is a partial cross-sectional side view showing a structure of a steam unit in the steam unit portion.

FIG. 48 is a partial cross-sectional side view showing the structures of the steam units 261. Each of the steam units 261 is mostly made of an aluminum material, and a plurality of heaters 261a are embedded in a vertical direction. When an opening/closing valve (not shown) which can be opened or closed automatically is opened, water flows into the steam unit 261 from a water supply port 261b and heated by the heaters 261a. The supplied water is vaporized and becomes steam. The steam is blown to the surface of the mother substrate through a conducting hole 261c and from a spray nozzle 261d.

Further, on the carry-out side of the upper steam unit attachment bar 262, an air knife 265 for removing water which remains on the surface of the bonded mother substrate 90 after the steam is blown to the upper surface of the bonded mother substrate 90 is attached.

The lower steam unit attachment bar 263 also includes the steam units 261 and the air knife 265 similar to those attached to the upper steam unit attachment bar 262.

When the bonded mother substrate 90 is placed on the first substrate supporting portion 120A, and the bonded mother substrate 90 is positioned, the positioned bonded mother substrate 90 is held by the clamp device 150 and also supported by the timing belts 221e of the first substrate supporting units 121A.

In this state, cutting of the bonded mother substrate 90 is started by the upper portion substrate cutting device 160 and the lower portion substrate cutting device 170 provided on the scribing device guide body 130 after the clutches of four clutch units 210 of the first substrate supporting portion 120A and the second substrate supporting portion 120B are coupled to the driving axes 222. As the scribing device guide body 130 moves toward the substrate carry-in side, the first substrate supporting portion 120A slides toward the substrate carry-in side. Further, second substrate supporting portion 120B slides toward the substrate carry-in side. While the scribing device guide body 130 is moving toward the substrate carry-in side, the timing belts 121e of the first substrate supporting units 121A of the first substrate supporting portion 120A and the timing belts 121e of the second substrate supporting units 121B of the second substrate supporting portion 120B rotate at the same rate as the moving speed of the scribing device guide body 130 and moves the bonded mother substrate 90 in the substrate carry-out direction. The bonded mother substrate 90 being cut is supported by the timing belts 121e of the first substrate supporting units 121A of the first substrate supporting portion 120A and the timing belts 121e of the second substrate supporting units 121B of the second substrate supporting portion 120B.

However, while the scribing device guide body 130 is being moved, the timing belts 121a of the first substrate supporting units 121A of the first substrate supporting portion 120A and the timing belts 121e of the second substrate supporting units 121B of the second substrate supporting portion 120B try to move the bonded mother substrate 90 in a direction opposite to the moving direction of the scribing device guide body 130 at a rate same as the moving speed of the scribing device guide body 130. Thus, the bonded mother substrate 90 does not actually move, and the bonded mother substrate 90 is supported while being hold by the clamp device 150 without the timing belts 121e of the first substrate supporting units 121A of the first substrate supporting portion 120A and the timing belts 121e of the second substrate supporting units 121B of the second substrate supporting portion 120B being in sliding contact with the bonded mother substrate 90.

When cutting of the bonded mother substrate 90 is finished, the bonded mother substrate 90 is supported by the timing belts 121e of all the second substrate supporting units 121B of the second substrate supporting portion 120B.

With the bonded mother substrate 90 being supported by the timing belts 121e of the second substrate supporting units 121B, the steam unit portion 260 moves toward the substrate carry-in side, and sprays steam on the entire front and back surfaces of the bonded mother substrate 90 having the scribe lines carved. Thus, the vertical cracks are extended by thermal stress, and the bonded mother substrate 90 is completely cut. At the same time, water remaining on the front and back surfaces of the bonded mother substrate 90 after spraying steam is removed by the air knives 265.

Thereafter, all the display panels cut from the bonded mother substrate 90 on the timing belts 121e of all the second substrate supporting units 121B of the second substrate supporting portion 120B are carried out by the carrying robot 240 of the substrate carry-out device 180, and thus, a out bonded mother substrate 90' (mill end) is supported.

Then, the substrate carry-out device 180 and the steam unit portion 260 moves toward the end portion on the substrate carry-out side.

Thereafter, the scribing device guide body 130, the second substrate supporting portion 120B, and the first substrate supporting portion 120A are slid toward the substrate carry-out side. At this time, timing belts 121e of the first substrate supporting units 121A of the first substrate supporting portion 120A and the timing belts 121e of the second substrate supporting units 121B of the second substrate supporting portion 120B rotates as if they move the bonded mother substrate 90 in the substrate carry-in direction at the same rate as the moving speed of the scribing device guide body 130.

Thus, the timing belts 121e of the first substrate supporting units 121A and the timing belts 121e of the second substrate supporting units 121B are sequentially brought into a non-contact state without being in sliding contact from the lower surface of the cut bonded mother substrate 90'. The supports of the cut bonded mother substrate 90' by the timing belts 121e are sequentially released. Then, support of the cut bonded mother substrate 90' (mill end) by the clamp device 150 is released and the cut bonded mother substrate 90' (mill end) drops downward. In this case, the cut bonded mother substrate 90' dropped downward (mill end and cullet) is guided by a guiding plate arranged in a slanted state and is accommodated within a cullet accommodation box.

The mounting structure 110 includes a positioning device (not shown) for positioning the bonded mother substrate 90 supported by the first substrate supporting portion 120A. The positioning device includes, for example, a plurality of positioning pins (not shown) the frame 111B of the main frame 111 and along a direction orthogonal to the frame 111B with predetermined spaces therebetween. For the positioning pins arranged along the frame 111B, pushers (not shown) for pushing a side edge of the bonded mother substrate 90 which opposes the positioning pins. For the positioning pine arranged in a direction orthogonal to the frame 111B, pushers (not shown) for pushing an opposing side edge of the bonded mother substrate 90 are provided.

Further, for example, when the positioning device for performing positioning of the bonded mother substrate 90 immediately before transportation to the substrate cutting system of the present invention is provided separately from the substrate cutting system, a positioning device within the substrate cutting system may be omitted.

Further, the positioning device within the substrate cutting system is not limited to the positioning pins and pushers as described above. It may be any kind of devices as long as it can provide a constant position of the bonded mother substrate 90 in the substrate cutting system.

Furthermore, above the mounting structure 110, the clamp device 150 for clamping the bonded mother substrate 90, which is supported by the first substrate supporting portion 120A and pushed against the positioning pins so as to be positioned, is provided. For example, as shown in FIG. 39 the clamp device 150 includes a plurality of clamp members 151 attached to the frame 111B of the main frame 111 with predetermined spaces therebetween in a longitudinal direction so as to clamp a side edge of the positioned bonded mother substrate 90 along the frame 111B, and a plurality of clamp members 151 arranged along the direction orthogonal to the main frame 111 with a predetermined spaces therebetween for clamping a side edge of the positioned bonded mother substrate 90 on the substrate carry-in side.

Figure 49:
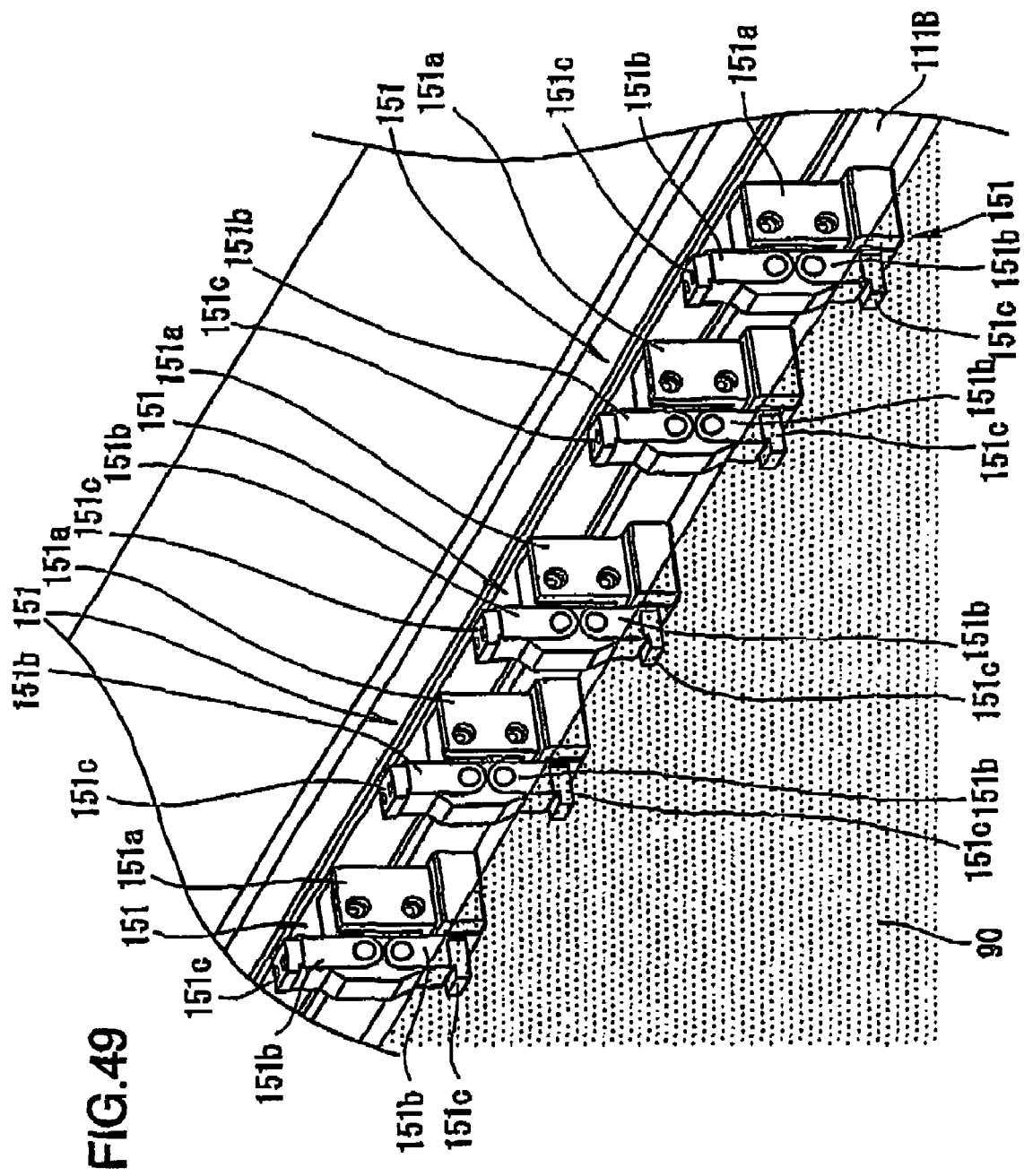
FIG. 49 is a perspective view for showing a clamp device provided in the substrate cutting system according to Embodiment 2 of the present invention and illustrating an operation thereof.
Figure 50:
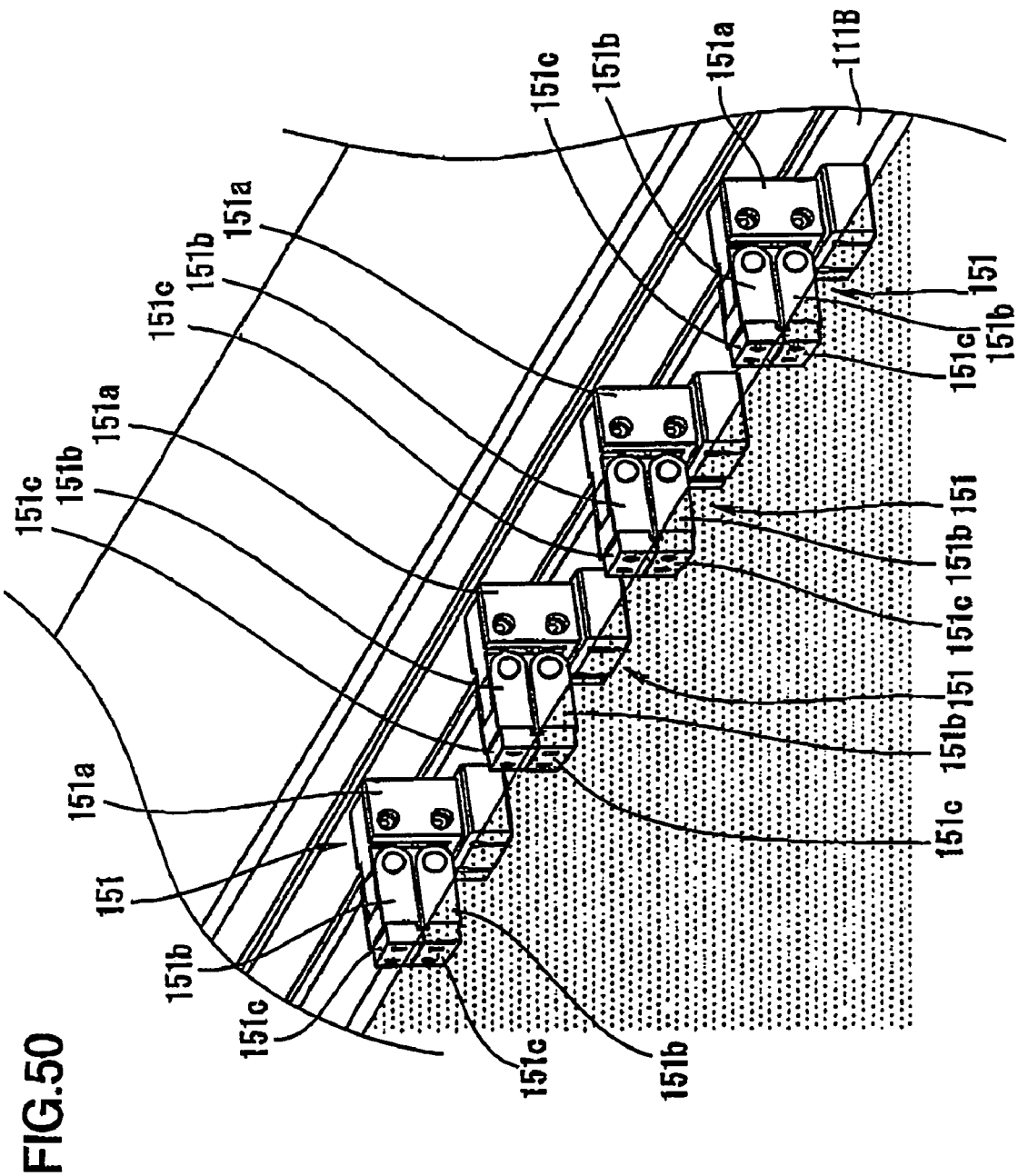
FIG. 50 is a perspective view for showing a clamp device provided in the substrate cutting system according to Embodiment 2 of the present invention and illustrating an operation thereof.

FIGS. 49 and 50 are perspective views for showing a plurality of clamp members 151 provided on the frame 111B of the main frames 11, and for illustrating an operation thereof. The clamp members 151 have similar structures to each other. Each of the clamp members 151 includes a casing 151a attached to the frame 111B of the main frame 111 and a pair of upper and lower rotation arms 151b attached to the casing 151a so as to be rotatable from a vertical position to a horizontal position. Each of the rotation arms 151b can rotate having one end portion as a center. The end portions to be the center of rotation are located close to each other. As shown in FIG. 49, a tip portion of the upper rotation arm 151b locates above the rotation center in the vertical position. A tip portion of the lower rotation arm 151b locates below the rotation center in the vertical position. The rotation arms 151b respectively rotate by 90 degrees toward the bonded mother substrate 90, and thus, the rotation arms 51b are in horizontal positions opposing each other.

To the tip portions of the rotation arms 151b, clamp portions 151c which respectively abut the upper surface and the lower surface of the bonded mother substrate 90 are attached. The clamp portion 151c are formed of elastic body. The rotation arms 151b are integrally rotated from the vertical position to the horizontal position and from the horizontal position to the vertical position. When the rotation arms 151b are rotated to the horizontal position, as shown in FIG. 50, the clamp portions 151c attached to the tip portions of the rotation arms 151b clamp the bonded mother substrate 90.

The clamp members 151 arranged along a direction orthogonal to the frame 111B of the main frame 111 have similar structures. These clamp members 151 are also driven integrally. After the side edges orthogonal to each other of the bonded mother substrate 90 are clamped by the plurality of clamp members 151, all the clamp members 151 sink below, and the bonded mother substrate 90 is supported by the timing belts 121e of the first substrate supporting portion 120A.

Further, in the above-described the arrangement of the clamp device 150, the clamp device 150 for holding the bonded mother substrate 90 is provided on the substrate carry-in side in a direction orthogonal to the frame 111A and the frame 111B of the main frame 111. However, even when the clamp device 150 is provided only on the frame 111B, the bonded mother substrate 90 can be held without causing damage in the substrates.

The structures of the clamp device 150 and the clamp members 151 as described above are merely examples used in the substrate cutting system of the present invention, and the structures are not limited to such structures. The clamp device 150 and the clamp members 151 may have any kind of structures as long as they can grip or hold the side edges of the bonded mother substrate 90. When the substrate size is small, the substrate can be held by clamping one position of the side edge of the substrate, and the substrate can be cut without causing a defect in the substrate.

As shown in FIG. 40, the upper portion substrate cutting device 160 is attached to the upper guide rail 131 in the scribing device guide body 130. As shown in FIG. 41, the lower portion substrate cutting device 170 having the similar structure as the upper portion substrate cutting device 160 but inverted upside down is attached to the lower guide rail 132. An described above, the upper portion substrate cutting device 160 and the lower portion substrate cutting device 170 respectively slide along the upper guide rail 131 and the lower guide rail 132 by the linear motors.

For example, in the upper portion substrate cutting device 160 and the lower portion substrate cutting device 170, a cutter wheel 162a for scribing the upper glass substrate of the bonded mother substrate 90 is rotatably attached to a tip holder 162b, and the tip holder 162b is rotatably attached to a cutter head 162c having an axis in a direction vertical to the surface of the bonded mother substrate 90 held by the clamp device 150. The cutter head 162c is movable along a direction vertical to the surface of the bonded mother substrate by driving means which is not shown. The cutter wheel 162a is appropriately loaded by energizing means which is not shown.

The cutter wheel 162a held by the tip holder 162b may have a blade edge protruded so as to have a center portion in a width direction of a shape of letter V with an obtuse angle and may have protrusions of a predetermined height formed on the blade edge with predetermined pitches in a circumferential direction as disclosed in Japanese Laid-Open Publication No. 9-188534.

The lower portion substrate cutting device 170 provided on the lower guide rail 132 has a similar structure as the upper portion substrate cutting device 160 but inversed upside down. A cutter wheel 162a of the lower portion substrate cutting device 170 (see FIG. 41) is arranged so as to oppose the cutter wheel 162a of the upper portion substrate cutting device 160.

The cutter wheel 162a of the upper portion substrate cutting device 160 are pressed onto a surface of the bonded mother substrate 90 and rotated by the above-described energizing means and moving means of the cutter head 162c. The cutter wheel 162a of the lower portion substrate cutting device 170 is pressed onto a back surface of the bonded mother substrate 90 by the above-described energizing means and moving means of the cutter head 162c. By moving the upper portion substrate cutting device 160 and the lower portion substrate cutting device 170 in the same direction at the same time, the bonded mother substrate 90 is cut.

It is preferable that the cutter wheel 162a to rotatably supported by a cutter head 165 using a servo motor disclosed in WO 03/011777.

Figure 51:
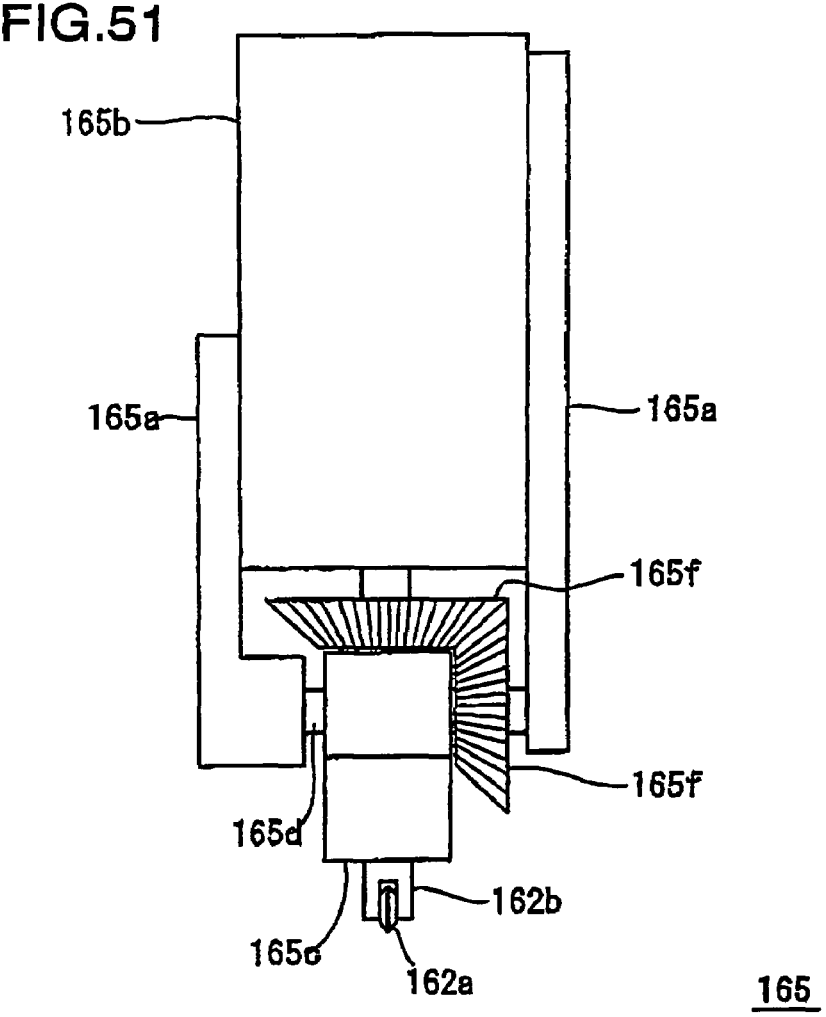
FIG. 51 is a side view showing an example of a cutter head included in a substrate cutting device of the substrate cutting system according to Embodiment 2 of the present invention.
Figure 52:
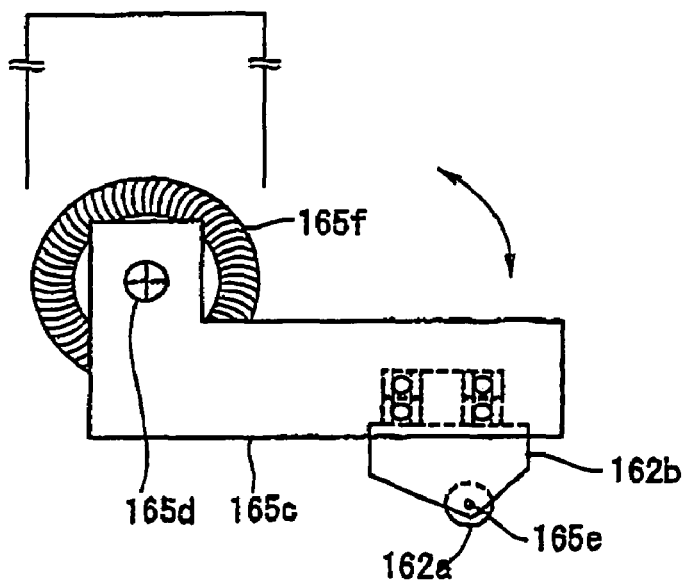
FIG. 52 is a front view of a major part of the cutter head.

FIG. 51 shows a side view of an exemplary cutter head 165 using a servo motor. FIG. 52 is a front view of the main part of the cutter head 165. A servo motor 165b is held between a pair of side walls 165a in an inverted state. In the lower part of the side walls 165a, a holder maintaining assembly 165c having a shape of letter L when viewed from side is rotatably provided via a spindle 165d. On the front portion of the holder maintaining assembly 165c (the right hand part in FIG. 52), the tip holder 162b for rotatably supporting the cutter wheel 162a via an axis 165e. Flat bevel gears 165f are respectively attached to the rotation axis of the servo motor 165b and the spindle 165d so as to engage each other. With such a structure, by rotating the servo motor 165b in normal or inverted direction, the holder maintaining assembly 165c performs an elevating operation having the spindle 165d as a fulcrum and the cutter wheel 162a moves up and down. The cutter head 165 itself is included in the upper portion substrate cutting device 160 and/or lower portion substrate cutting device 170.

Figure 53:
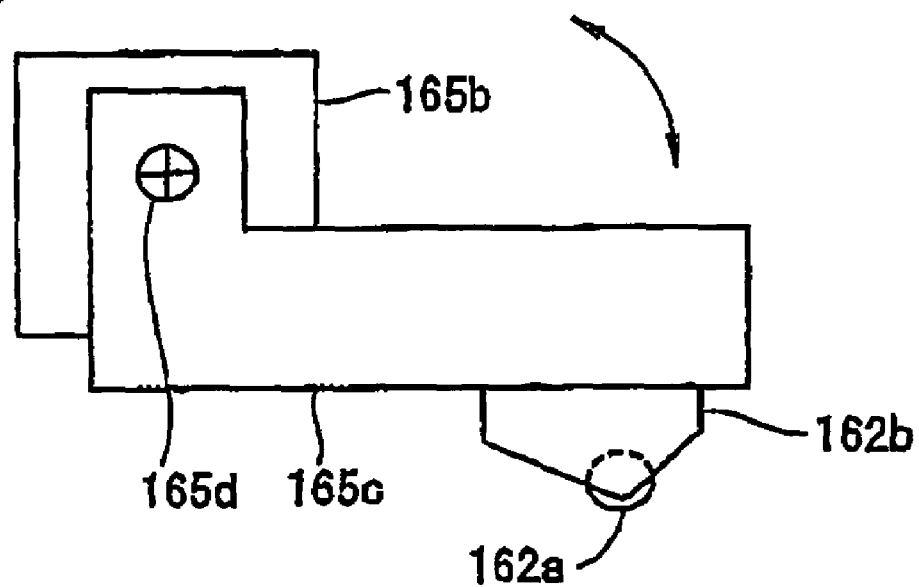
FIG. 53 is a front view showing another example of the cutter head included in the substrate cutting device of the substrate cutting system according to Embodiment 2 of the present invention.

FIG. 53 is a front view showing another example of a cutter head using a servo motor. In this example, the rotation axis of the servo motor 165b is directly connected to the holder maintaining assembly 165c.

The cutter heads of FIGS. 51 and 53 moves the cutter wheel 162a for positioning by rotating the servo motor by position control. Such a cutter head controls a rotation torque which acts to bring back the position of the cutter wheel 162a to the position which has been previously set to the servo motor 165b when the position is moved from the set position, and transmits a scribing pressure to a brittle material substrate during scribing operation in which the cutter head is moved in the horizontal direction to form scribe lines on the bonded mother substrate 90. In other words, the servo motor 165b controls the position of the cutter wheel 162a in a vertical direction and also serves as energizing means for the cutter wheel 162a.

By using the cutter head including the servo motor as described above, the rotation torque of the servo motor can be corrected while the bonded mother substrate 90 is being scribed instantly in accordance with the change in a scribing pressure due to a variance in resistance applied to the cutter wheel 162a. Thus, stable scribing is performed and scribe lines with high quality can be formed.

A cutter head including a mechanism to periodically change the pressure to the bonded mother substrate 90 by a scribing cutter by vibrating the scribing cutter such as a diamond point cutter and/or cutter wheel for scribing the bonded mother substrate 90 may also effectively applied to the cutting of the mother substrate by the substrate cutting system of the present invention.

The structures of the upper portion substrate cutting device 160 and the lower portion substrate cutting device 170 are not limited to the above-described structures. The devices may have any kind of structures as long as they process the front and back surfaces of the substrate to cut the substrate.

For example, the upper portion substrate cutting device 160 and the lower portion substrate cutting device 170 may be a device for cutting the mother substrate by using laser light, a dicing saw, a cutting blade, a diamond cutter, or the like. When the mother substrate is a metal substrate such as steel sheet, wood plate, a plastic substrate, and a brittle material substrate such as ceramics substrate, glass substrate, semiconductor substrate or the like, a scribing device for cutting the mother substrate by using, for example, laser light, a dicing saw, a cutting blade, a diamond cutter, or the like may be used.

Furthermore, the upper portion substrate cutting device 160 and the lower portion substrate cutting device 170 may further include cutting assistance means for assisting in the cutting of the substrate. The cutting assistance means may be, for example, means for pressing a roller or the like to the substrate, or means for warming (heating) the substrate by spraying compressed air to the substrate, irradiating the substrate with laser, or blowing hot air to the substrate.

In the above example, the upper portion substrate cutting device 160 and the lower portion substrate cutting device 170 have the same structure. However, they may have different structures depending upon the cutting pattern of the substrate and cutting conditions for the substrate.

The substrate cutting system having such a structure will be explained with reference mainly to an example in which a bonded substrate formed by bonding large-scale glass plates is cut.

Figure 54:
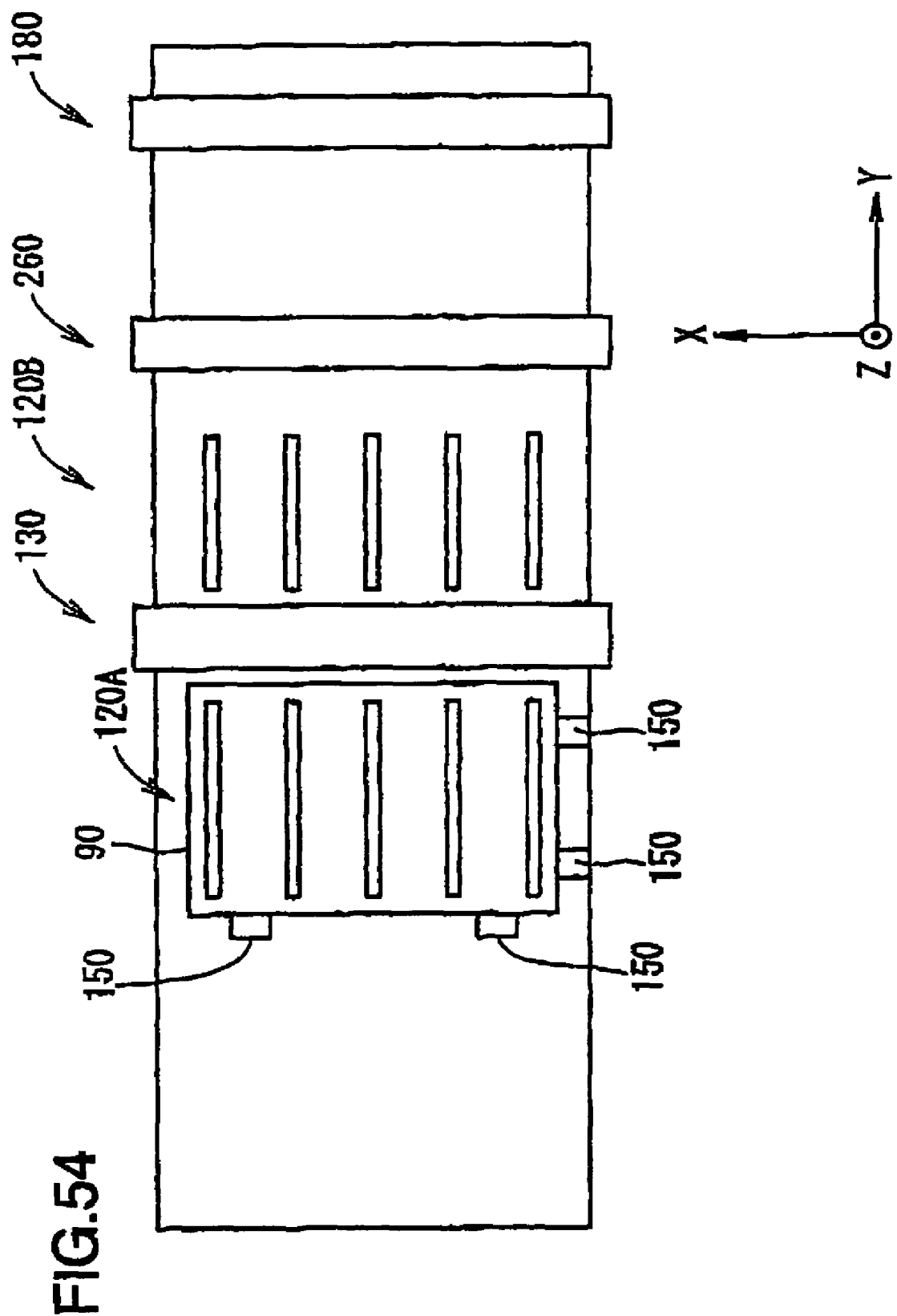
FIG. 54 is a schematic plan view for illustrating an operation of the substrate cutting system according to Embodiment 2 of the present invention.

For cutting the bonded mother substrate 90 formed by bonding large-scale glass substrates to each other into a plurality of panel substrates 90a (see FIG. 55), first, as shown in FIG. 54, the bonded mother substrate 90 is carried into the substrate cutting system by the carrying robot or the like from the end portion on the substrate carry-in side, and is placed on the timing belts 121e of all the second substrate supporting units 121A of the first substrate supporting portion 120A in a horizontal fashion.

In such a state, the bonded mother substrate 90 is pressed with a pressure which is not shown so as to abut positioning pins (not shown) arranged along the frame 111B of the main frame 111. The bonded mother substrate 90 is also pressed with a pressure which is not shown so as to abut positioning pins (not shown) arranged along a direction orthogonal to the frame 111B. In this way, the bonded mother substrate 90 is positioned at a predetermined position in the housing 110 in the substrate cutting system.

Then, as shown in FIG. 54, the bonded mother substrate 90 has its side edge along the frame 111B of the main frames 111 clamped by the clamp members 151 of the clamp device 150. The side edge of the bonded mother substrate 90 on the substrate carry-in side is clamped by the clamp members 151 arranged on the substrate carry-in side so as to be orthogonal to the frame 111B.

When the side edges of the bonded mother substrate 90 which are orthogonal to each other are respectively clamped by the clamp device 150, the clamp members 151 clamping the side edges of the bonded mother substrate 90 sink approximately at the same time due to the weight of the bonded mother substrate 90 itself. Thus, the bonded mother substrate 90 is supported supplementarily by the timing belts 121e of all the first substrate supporting units 121A.

In such a state, the scribing device guide body 130 slide toward the substrate carry-in side so as to be at a predetermined position on a side edge near the bonded mother substrate 90 clamped by the clamp device 50 in a horizontal fashion after the clutches 216 of the four clutch units 210 of the first substrate supporting portion 120A and the second substrate supporting portion 120B are coupled to the driving axes. The first optical device 138 and the second optical device 139 provided on the scribing device guide body 130 move along the guide body 130 from waiting positions. Thus, the images of the first alignment mark and the second alignment mark provided on the bonded mother substrate 90 are taken.

Since the scribing device guide body 130 slides, the first substrate supporting portion 120A elides toward the substrate carry-in side, and second substrate supporting portion 120B slides toward the substrate carry-in side. The timing belts 121e of the first substrate supporting units 121A of the first substrate supporting portion 120A and the timing belts 121e of the second substrate supporting units 121B of the second substrate supporting portion 120B moves the bonded mother substrate 90 in a direction opposite to the moving direction of the scribing device guide body 130 at the rate same as the moving speed of the scribing device guide body 130. Thus, the bonded mother substrate 90 is supported while being hold by the clump device 150 without the timing belts 121e of the first substrate supporting units 121A of the first substrate supporting portion 120A and the timing belts 121e of the second substrate supporting units 121B of the second substrate supporting portion 120B being in sliding contact with the bonded mother substrate 90.

Next, based on the results of taking the images of the first alignment mark and the second alignment mark, angle of the bonded mother substrate 90 supported by the clamp device 150 in a horizontal fashion in a direction along the scribing device guide body 130, cutting start position and cutting end position by a calculation using an operation process device which is not shown. Based on the calculated results, the scribing device guide body 130 is moved with the upper portion substrate cutting device 160 and the lower portion substrate cutting device 170 to cut the bonded mother substrate 90 (Such an operation may be referred to as scribing or cutting by linear interpolation).

Figure 55:
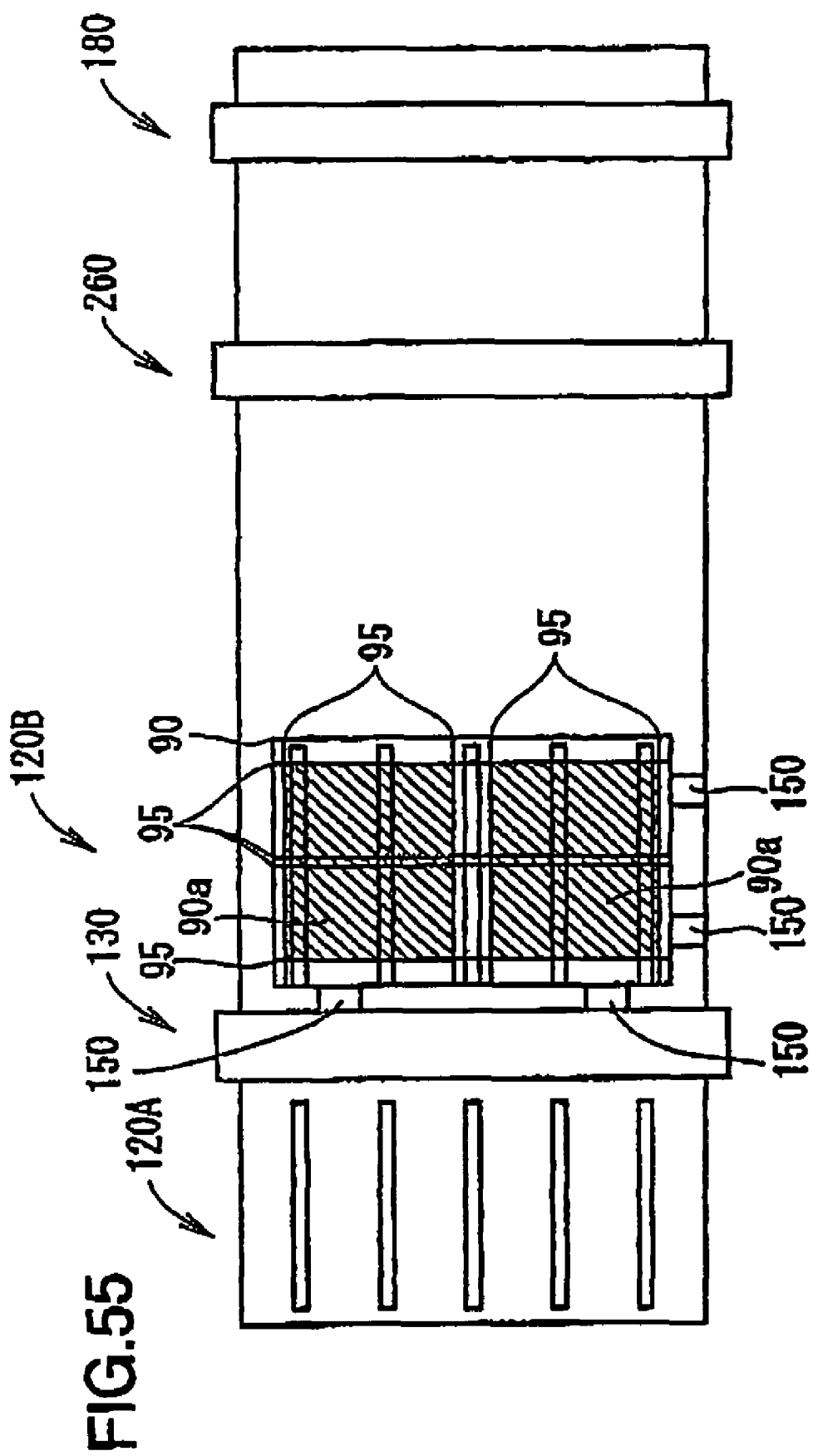
FIG. 55 is a schematic plan view for illustrating an operation of the substrate cutting system according to Embodiment 2 of the present invention.

In this example, as shown in FIG. 55, the cutter wheels 162a respectively opposing the front surface and the back surface of the bonded mother substrate 90 are pressed onto the front back surfaces and rotated. Thus, scribe lines are formed on the front surface and the back surface of the bonded mother substrate 90.

From the bonded mother substrate 90, for example, two panel substrates 90a in a column direction along the upper guide rail 132 and the lower guide rail 132 are cut out for two columns. For cutting four panel displays 90a out of the bonded mother substrate 90, the cutter wheel 162a of the upper portion substrate cutting device 160 and the cutter wheel 162a of the lower portion substrate cutting device 170 are respectively pressed and rotated along the side edges of the panel substrates.

In this example, the cutter wheel 162a of the upper portion substrate cutting device 160 and the cutter wheels 162a of the lower portion substrate cutting device 170 generate vertical cracks in the portions of the glass substrates where the cutter wheels 162a rotated, and a scribe line 95 is formed. Since protrusions are formed in a predetermined pitch in peripheral edges of the blade edges of the cutter wheels 162a, vertical cracks having the length of about 90% of the thickness of the glass substrate in the thickness direction are formed in the glass substrates.

Further, a scribing method using a cutter head including a mechanism for periodically changing (vibrating) a pressure to the bonded mother substrate 90 by a scribe cutter such as a diamond point cutter, cutter wheel or the like for scribing the bonded mother substrate 90 may be effectively applied to the cutting of the bonded mother substrate 90 by the substrate cutting system of the present invention.

Figure 56:
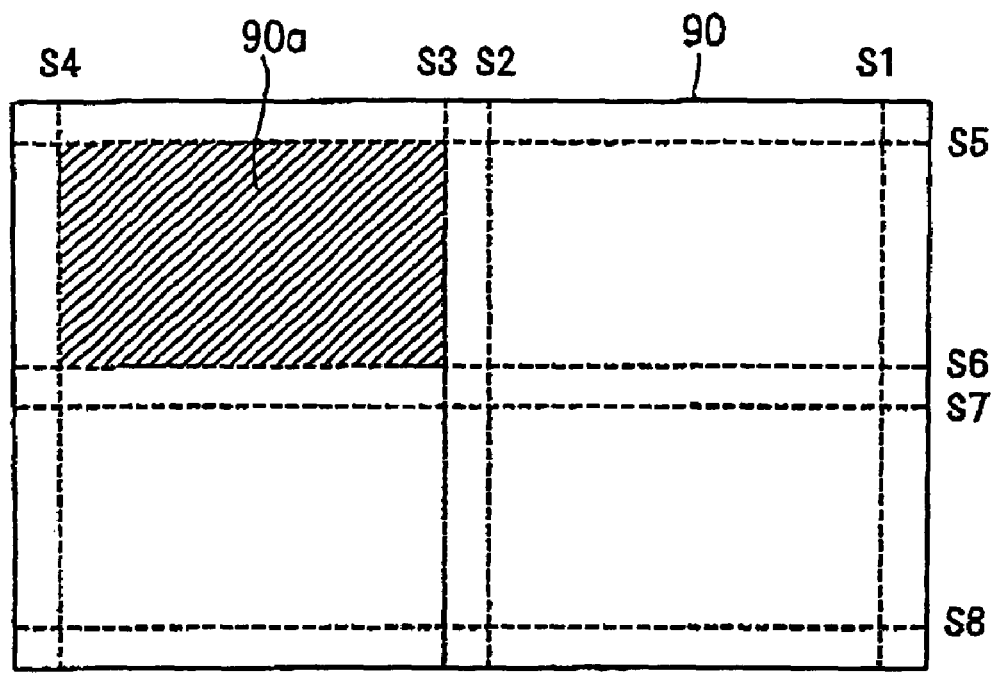
FIG. 56 is a diagram for showing a scribe pattern for scribing a substrate in the substrate cutting system according to Embodiment 2 of the prevent invention.

As the method for scribing the front and back surfaces of the bonded mother substrate 90, a conventional method as shown in FIG. 56, in which scribe lines are formed in turn along lines to be scribed S1 to S4 along a vertical direction, which is a narrow side direction of the bonded mother substrate 90, and then scribe lines are formed in turn along lines to be scribed S5 to S8 along the horizontal direction, which is wide side direction, may be used in general.

Figure 57:
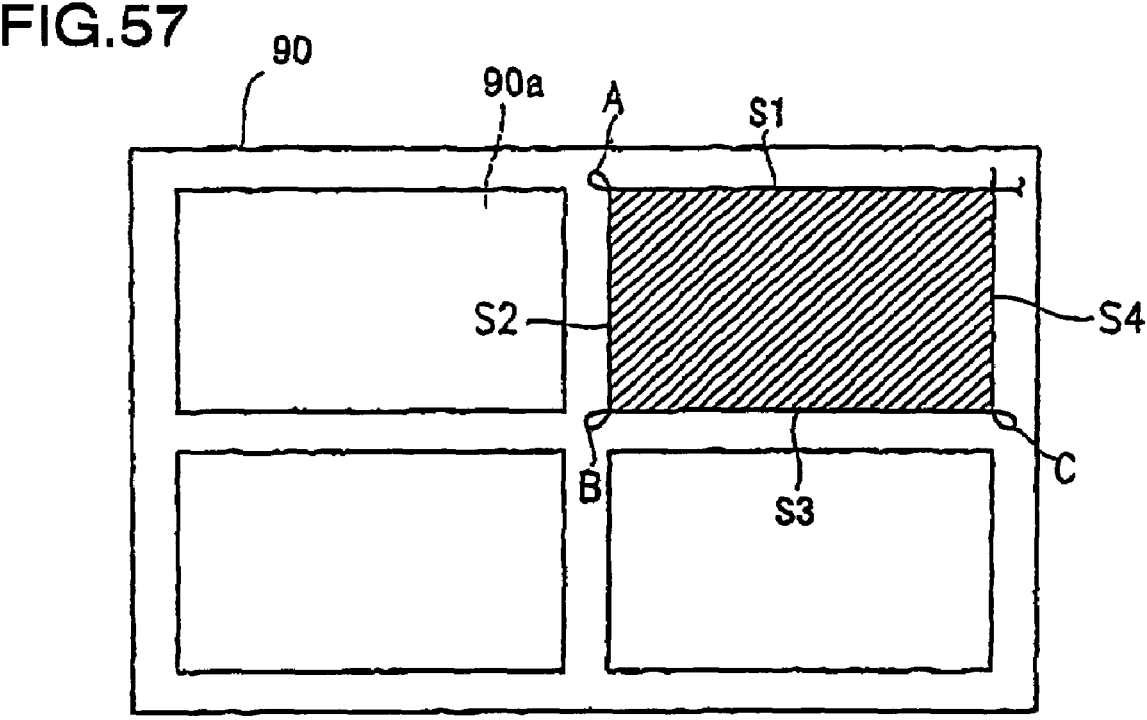
FIG. 57 to a diagram for showing another scribe pattern for scribing a substrate in the substrate cutting system according to Embodiment 2 of the present invention.

Beside the above-described scribing method, a scribing method as shown in FIG. 57 may be preferably used for the substrate cutting system of the present invention. In FIG. 57, four panel substrates 90a are formed from one bonded mother substrate 90.

The bonded mother substrate 90 has a rectangular shape. Four panel substrates 90a are obtained by forming two panel substrates 90a along the longitudinal direction of the bonded mother substrate 90 and forming two panel substrates 90a along the width direction which is orthogonal to the longitudinal direction. Each of the panel substrates 90a is formed with an appropriate space apart from the adjacent panel substrate 90a and from side edges along the longitudinal direction and side edges of the width direction of the bonded mother substrate 90.

By having the cutter wheel 162a of the upper portion substrate cutting device 160 and the cutter wheel 162a of the lower portion substrate cutting device 170 oppose each other, and are pressed and rotated at the same time, scribe lines across the entire circumference are formed on the front and back surface of the bonded mother substrate 90 for each of the panel substrates 90a one by one in turn.

In this example, first, scribe line is formed along one linear line to be scribed S1 along the side edges parallel to the longitudinal direction of the bonded mother substrate 90 for the panel substrate 90a to be scribed. More specifically, the cutter wheels 162a of the cutter heads 62c are pressed and rotated on the bonded mother substrate 90 along the line to be scribed S1.

Figure 58:
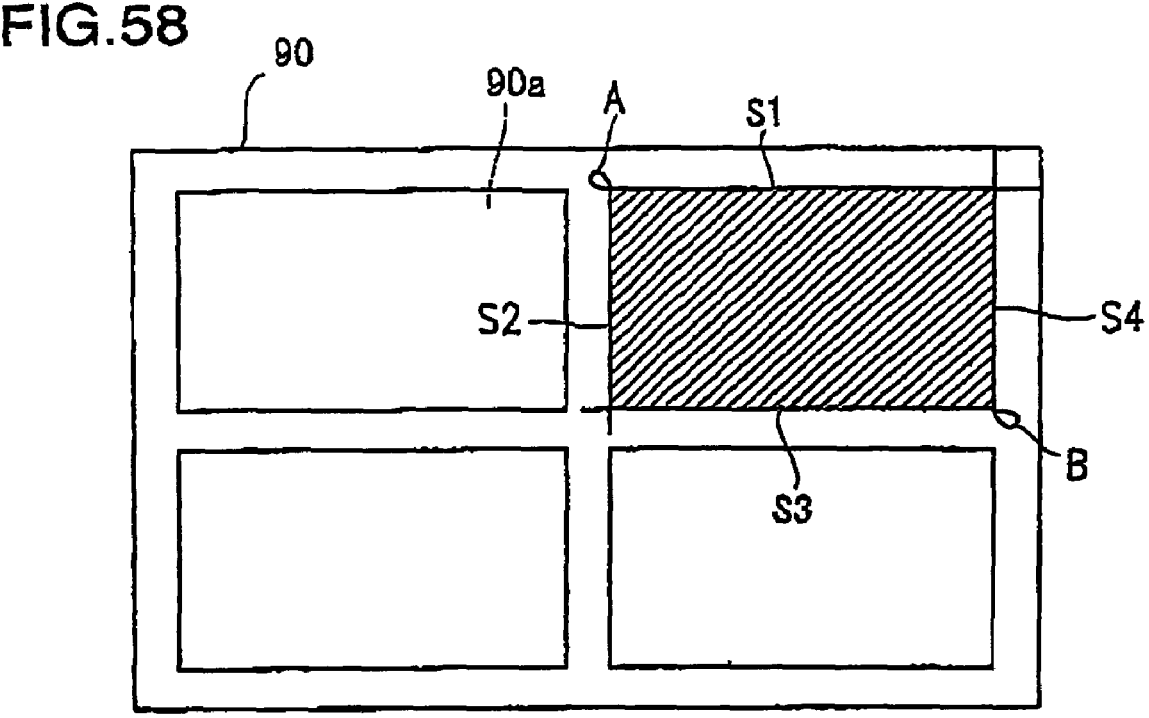
FIG. 58 is a diagram for showing yet another scribe pattern for scribing a substrate in the substrate cutting system according to Embodiment 2 of the present invention.

In FIG. 58, it is shown that the scribe start point by the cutter wheels 162a is a position on the bonded mother substrate 90 (a position for internal cut). However, it may be a position near the outside of the end surface of the bonded mother substrate 90 along the line to be scribed S1 (a position for external cut).

When the scribe line is formed along the line to be scribed S1 by a vertical crack which extends across the entirety of the thickness direction, the scribing device guide body 30 is moved to Y direction and the upper portion substrate cutting device 160 and the lower portion substrate cutting device 170 are moved in X direction at the same time such that the cutter wheels 162a revolves around the vertical axis by 270 degrees to form a circular trace having a radius of about 1 nm (a corner portion A in FIG. 58).

When the cutter wheels 162g are revolving, the pressure of the cutter wheels 162a to the bonded mother substrate 90 is reduced so that there is no deep vertical crack formed on the bonded mother substrate 90. When the thickness of the bonded substrate 90 is 0.7 mm, the depth of the vertical crack formed in the bonded mother substrate 90 when the cutter wheels 162a is revolving is about 100 to 200 μm.

When the cross-scribing is performed by the cutter wheels 162a as shown in FIG. 56, a chip tends to be generated in the bonded mother substrate 90 at cross points of the scribe lines formed when scribing to performed in first direction and scribing is performed in second direction.

Since a vertical cracks which almost extends to the thickness of the bonded mother substrate 90 has been already formed when scribing is performed in the first direction, the mother glass substrate 90 sinks in front of the first scribe line when the cutter wheels 162a reach near the scribe line in the first direction while scribing in the second direction and such a chip may be generated when the cutter wheels 162a run on the glass substrates along the scribe line in the first direction at a crossing portion of the scribe line in the first direction and a scribe line in the second direction.

In the scribing method as shown in FIG. 57, the cutter wheels 162a revolve and arose the scribe line which has been already formed along the line to be scribed S1 with the pressure to the bonded mother substrate 90 being reduced. Thus, a part of the bonded mother substrate 90 does not sink before the scribing lines cross each other, and thus, it is possible to prevent a chip from occurring in the bonded mother substrate 90 when the scribing lines cross each other.

When travel direction of the cutter wheels 162a revolve by 270 degrees and the cutter wheels 162a are along the linear line to be scribed S2 along the width direction of the panel substrates 90a which are orthogonal to the line to be scribed S1, the cutter wheels 162a are pressed and rotated along the line to be scribed S2. Thus, the scribe line is formed by a vertical crack which extends across the entirety of the thickness direction along the line to be scribed S2.

Then, again, the cutter wheels 162a revolve by 270 degrees to a direction orthogonal to the line to be scribed S2 while forming a circular trace having a radius of about 1 mm in corner portion B without separating the cutter wheels 162a from the front and back surfaces of the bonded mother substrate 90. Thus, the cutter wheels 62a are along the line to be scribed S3 and form the scribe line by a vertical crack which extends across the entirety of the thickness direction along the line to be scribed S3. Furthermore, again, the cutter wheels 162a revolve by 270 degrees to a direction orthogonal to the line to be scribed S3 while forming a circular trace having a radius of about 1 mm in corner portion C without separating the cutter wheels 162a from the front and back surfaces of the bonded mother substrate 90. Thus, the cutter wheels 162a are along the line to be scribed S4 and form the scribe line by a vertical crack which extends across the entirety of the thickness direction along the line to be scribed S4.

In this way, a closed curve including four linear scribe lines is formed around a panel substrate 90a. Then, for example, for forming the panel substrate 90a adjacent in the longitudinal direction of the bonded mother substrate 90, a closed curve including four linear scribe lines is formed across the entire circumference of the panel substrate 90a similarly. Then, closed curves including four linear scribe lines are formed across the entire circumferences for each of the remaining pair of the panel substrates 90a in turn.

Besides the above-described scribing method, a scribing method as shown in FIG. 58 can be preferably used in the substrate cutting system of the present invention. In FIG. 58, four panel substrates 90a are formed from one bonded mother substrate 90.

In the scribing method shown in FIG. 58, scribe lines along lines to be scribed S1 and S2 which are orthogonal to each other on the panel substrates 90a are formed in the method as described above. For forming the scribe line along the line to be scribed S1, the cutter wheels 362a is positioned outside the end surface of the bonded mother substrate 90 and the scribe line along the line to be scribed S1 is continuously formed therefrom.

A chip which may be generated when the cutter wheels 162a run on the front and back surfaces of the bonded mother substrate 90 at the start of scribing does not affect the panel substrates 90a to become products.

Then, the cutter wheels 162a revolve by 270 degrees to a direction orthogonal to the line to be scribed S1 while forming a circular trace in the corner portion A. Thus, the cutter wheels 162a are along the line to be scribed S2 and form the scribe line by a vertical crack which extends across most of the entirety of the thickness direction along the line to be scribed S2.

Then, the cutter wheels 162a are temporarily separated from the surface of the bonded mother substrate 90, and the scribe lines along the lines to be scribed S3 and S4 in a direction orthogonal to the line to be scribed S1 are formed in this order. In this case, a chip which may be generated when the cutter wheels 162a run on the front and back surfaces of the bonded mother substrate 90 at the start of scribing does not affect the panel substrates 90a to become products.

In this way, four linear scribe lines are formed around the panel substrate 90a. Then, for example, for forming the panel substrate 90a adjacent in the longitudinal direction of the bonded mother substrate 90, four linear scribe lines are formed across the entire circumference of the panel substrate 90a similarly. Then, closed curves including four linear scribe lines are formed across the entire circumferences for each of the remaining pair of the panel substrates 90a in turn.

Figure 59:
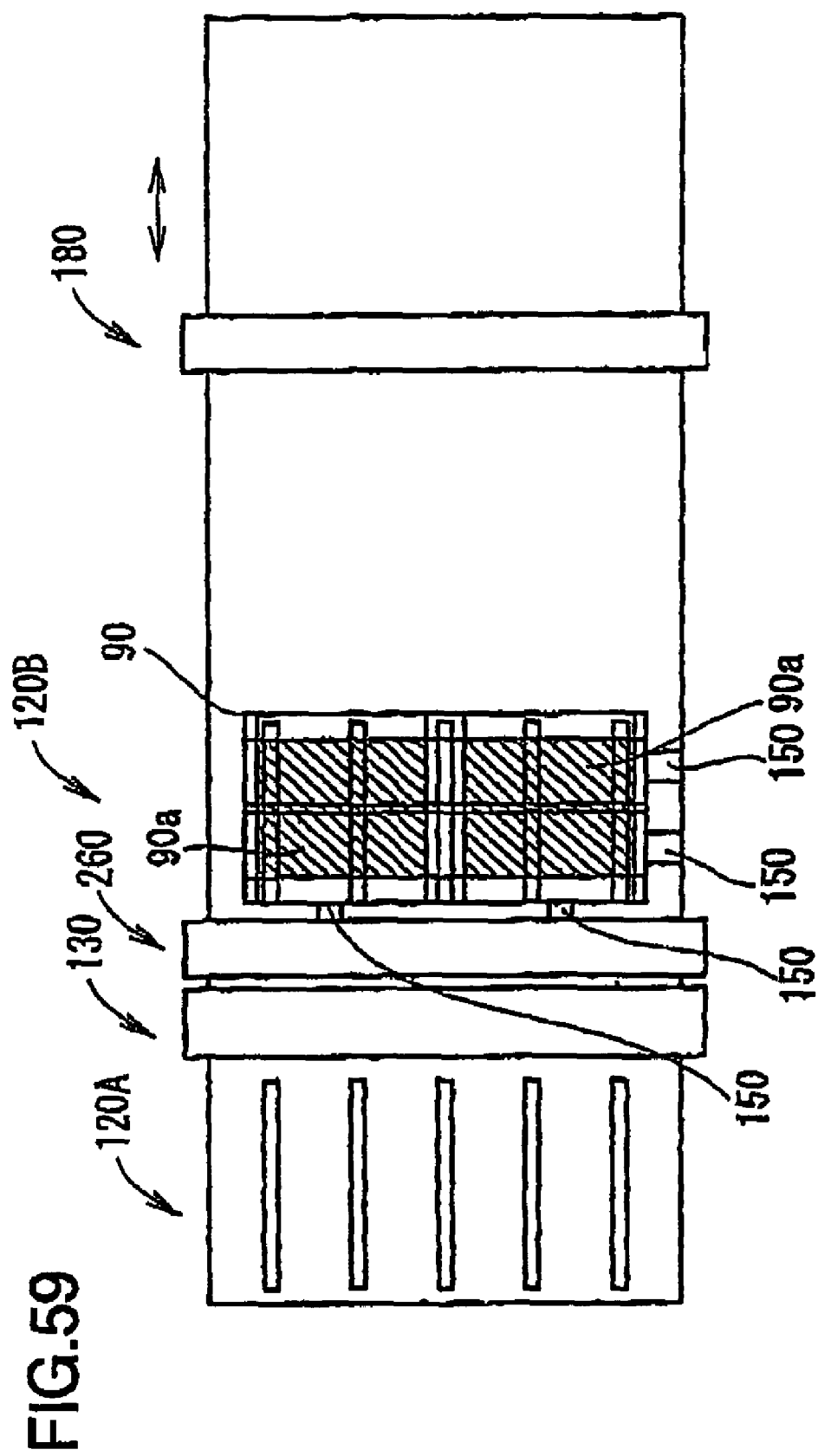
FIG. 59 is a schematic plan view for illustrating an operation of the substrate cutting system according to Embodiment 2 of the present invention.

After the scribe lines are formed on the bonded mother substrate by the above-described scribing method, as shown in FIG. 59, with the bonded mother substrate 90 on which the scribe line 95 is formed being supported by the timing belts 121e of the second substrate supporting units 121B, the steam unit portion 260 moves toward the substrate carry-in side and blows the steam entirely on the front and back surfaces of the bonded mother substrate 90 on which the scribe lines are carved to completely cut the bonded mother substrate 90. At the same time, the water remaining on the front and back surfaces of the bonded mother substrate 90 after the steam is blown thereto is removed by the air knife 71.

By blowing the steam onto the entire front and back surface of the bonded mother substrate 90 having the scribe lines carved thereon, the scribe lines formed by the cutter wheels 162a experience volume expansion since the front and back surface portions of the bonded mother substrate 90 are heated. In this way, vertical cracks extend from the surface of the upper and lower mother substrates of the bonded mother substrate 90 toward the bonded surface, and the bonded mother substrate 90 is completely cut.

Thereafter, as shown in FIG. 59, all the panel substrates 90a cut from the bonded mother substrate 90 on the timing belts 121e of all the second substrate supporting units 121B of the second substrate supporting portion 120B are carried out by the carrying robot 240 of the substrate carry-out device 180, and thus, a cut bonded mother substrate 90' (mill end) is supported.

Then, the substrate carry-out device 180 and the steam unit portion 260 moves toward the end portion on the substrate carry-out side.

Figure 60:
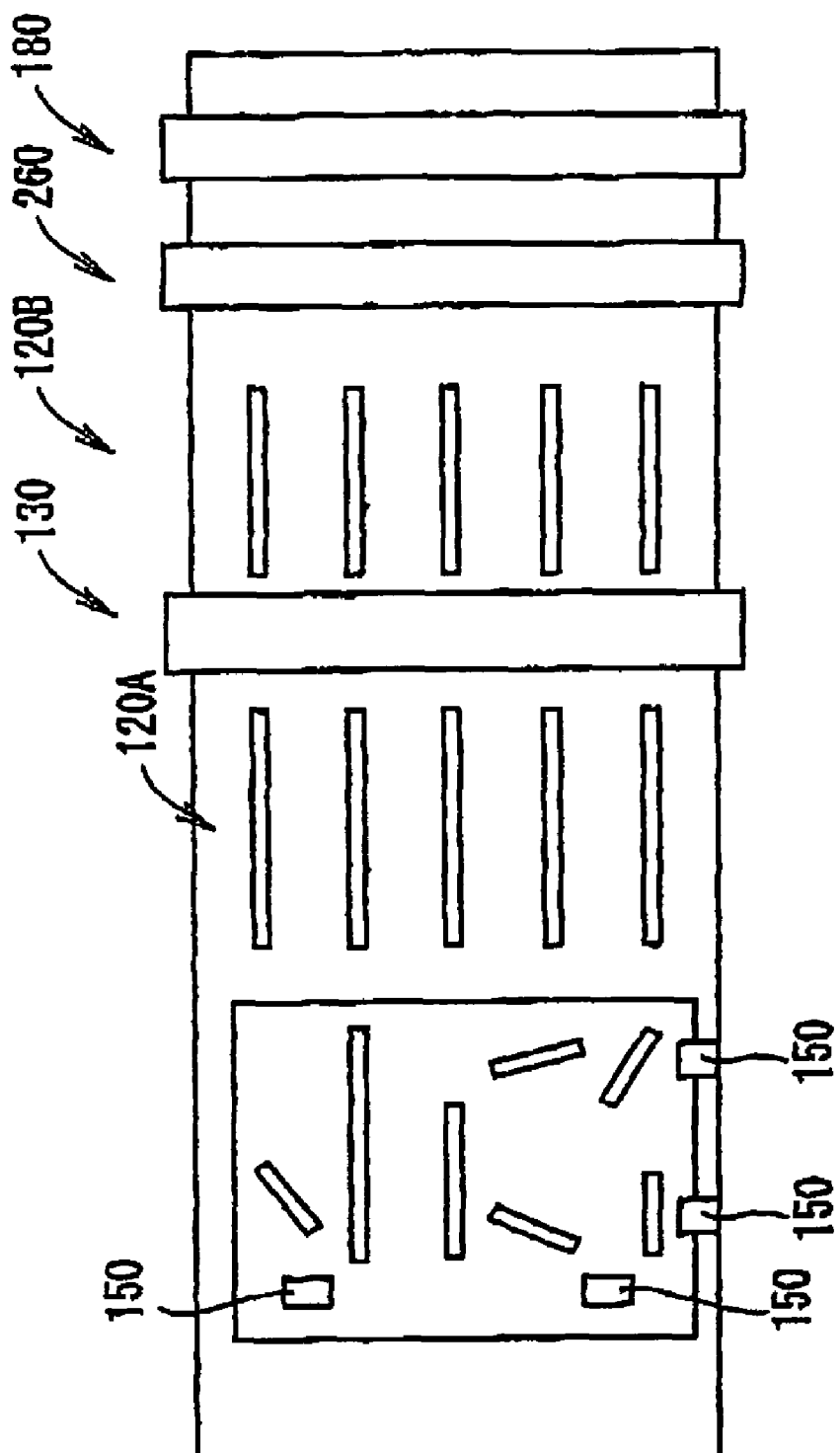
FIG. 60 is a schematic plan view for illustrating an operation of the substrate cutting system according to Embodiment 2 of the present invention.

Thereafter, as shown in FIG. 60, the scribing device guide body 130, the second substrate supporting portion 120B, and the first substrate supporting portion 120A are slid toward the substrate carry-out side. At this time, timing belts 121e of the first substrate supporting units 121A of the first substrate supporting portion 120A and the timing belts 121e of the second substrate supporting units 121B of the second substrate supporting portion 120B rotates as if they move the bonded mother substrate 90 in the substrate carry-in direction at the same rate as the moving speed of the scribing device guide body 130.

Thus, the timing belts 121e of the first substrate supporting units 121A and the timing belts 121e of the second substrate supporting units 121B are sequentially brought into a non-contact state without being in sliding contact from the lower surface of the cut bonded mother substrate 90'. The supports of the cut bonded mother substrate 90' by the timing belts 221e are sequentially released. Then, support of the cut bonded mother substrate 90' (mill end) by the clamp device 150 is released and the cut bonded mother substrate 90' (mill end) drops downward. In this case, the cut bonded mother substrate 90' dropped downward (mill end and cullet) is guided by a guiding plate arranged in a slanted state and is accommodated within a cullet accommodation box.

By employing the scribing method which will be described below as the scribing method by the upper portion substrate cutting device 160 and the lower portion substrate cutting device 170 of the scribing device guide body 130, a cutting process of the bonded substrate by the steam unit portion 260 may be omitted.

Figure 61:
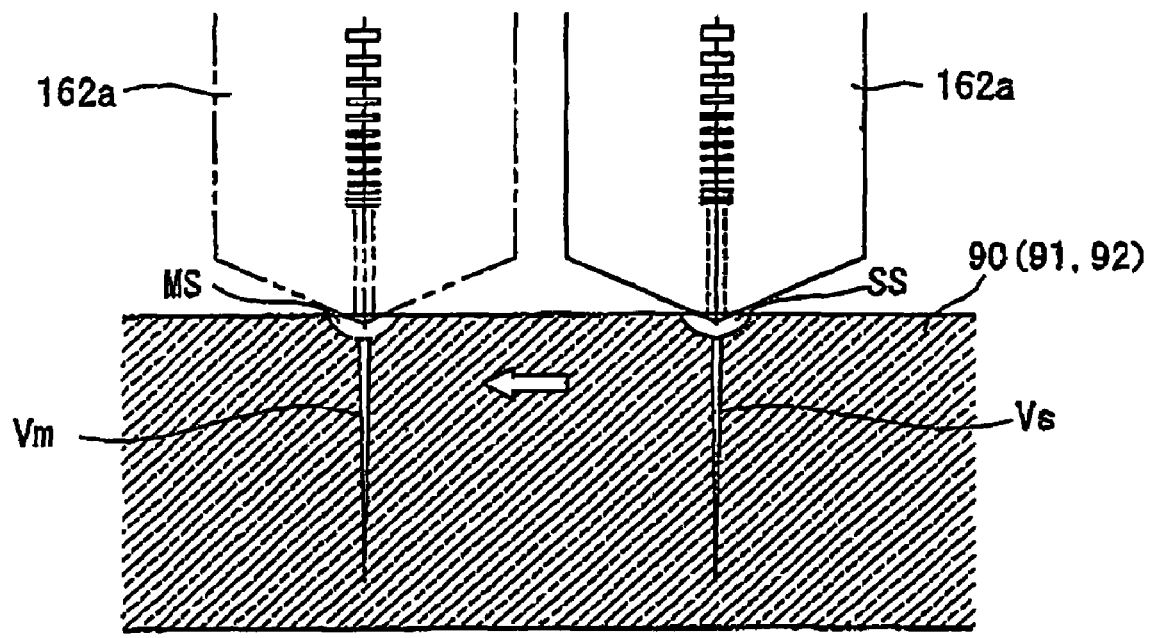
FIG. 61 is a cross-sectional view of a substrate for illustrating a principle of a substrate cutting method according to the present invention.

At this time, as shown in FIG. 61, the cutter wheels 162a are pressed and rotated on an upper mother substrate 91 and a lower mother substrate 92 of the bonded mother substrate 90 along lines to be cut on the mother substrates 91 and 92 for scribing the mother substrates 91 and 92. Thus, vertical cracks Vm along thickness directions of the mother substrates 91 and 92 are sequentially formed along the lines to be cut, and main scribe lines MS are formed. The vertical cracks Vm are formed such that they extend by 80% or more of the thickness of the mother substrates 91 and 92, and more preferably, 90% or more from surfaces of the mother substrates 91 and 92.

Thereafter, in the area outside the panel substrates obtained by cutting the mother substrates 91 and 92, the mother substrates 91 and 92 are scribed by pressing and rotating the cutter wheels 162a along the main scribe lines MS on the mother substrates 91 and 92 with spaces of about 0.5 to 1.0 mm apart from the main scribe lines MS. In this way, vertical cracks Vs along the thickness directions of the mother substrates 91 and 92 are sequentially formed along the main scribe lines MS to form supplementary scribe lines SS.

At this time, the cutter wheels 162a presses and rotates on the surfaces of the mother substrates 91 and 92, and the blades thereof cut into the surfaces of the mother substrates 91 and 92. Thus, a compressed force is applied to the surfaces of the mother substrates 91 and 92 and the compressed force has influence on the surface portions of the vertical cracks Vm in the main scribe lines MS which have been already formed. In this example, the vertical cracks Vm forming the main scribe lines MS are formed to extend by 80% or more of the thickness of the mother substrates 91 and 92. Thus, when the surface portion of the mother substrates 91 and 92 are compressed, the vertical cracks Vm of the main scribe lines MS have gaps on the surface port ions of the mother substrates 91 and 92 compressed and gaps on bottom portions are widened. Therefore, the vertical cracks Vm are elongated toward the bonded surface of the mother substrates 91 and 92. When the vertical cracks Vm reach the bonded surface of the mother substrates 91 and 92 and the vertical cracks Vm reach the bonded surface of the mother substrates 91 and 92 across the entirety of the main scribe lines MS, the bonded mother substrate 90 is cut along the main scribe lines MS.

It in preferable that the supplementary scribe lines SS are formed with spaces of about 0.5 to 1.0 mm apart from the main scribe lines MS. When the spaces between the supplementary scribe lines SS and the main scribe lines MS are smaller than 0.5 mm, a large compression force is applied to the surface portion of the vertical cracks Vm forming the main scribe lines MS, and damage such as chip may occur in the surface side end portions of the vertical cracks Vm. On the other hand, when the space to larger than 1.0 mm, the compression force applied to the vertical cracks Vm on the main scribe lines MS is not enough, and the vertical cracks Vm may not reach the bonded surface of the mother substrates 91 and 92.

As described above, by forming double scribe lines of the main scribe lines MS and the supplementary scribe lines SS with predetermined spaces, a plurality of panel substrates 90*a* are cut out of the bonded mother substrate 90.

Figure 62:
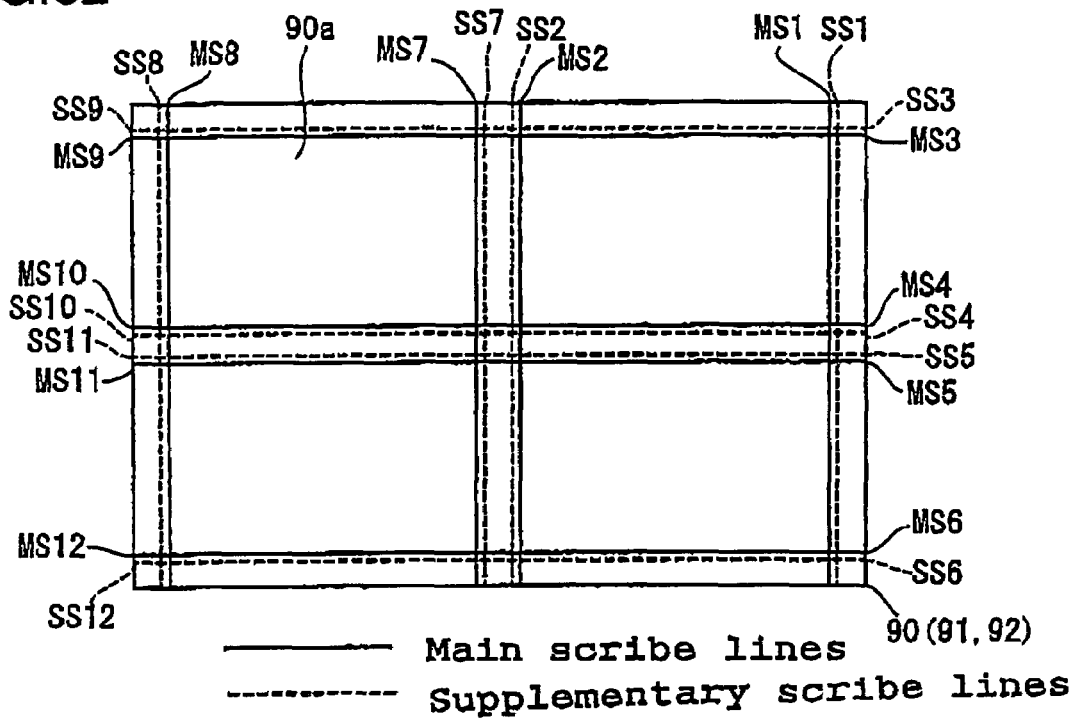
FIG. 62 is a plan view of a substrate showing a scribe pattern of the substrate for illustrating an example of the substrate cutting method according to the present invention.

FIG. 62 is a diagram for illustrating a scribe pattern for cutting panel substrates 90*a* out of the bonded mother substrate 90 by using such double scribe lines of the main scribe lines MS and the supplementary scribe lines SS. The cutter wheels 162*a* of the upper portion substrate cutting device 160 and the lower portion substrate cutting device 170 run along side edges of the substrate carry-out side of two panel substrates 90*a* on the substrate carry-out side of the bonded mother substrate 90, and a double scribe line (main scribe line MS1 and supplementary scribe line SS1) is formed on the side edges of the substrate carry-out side of the two panel substrates 90*a*.

Then, main scribe line MS2 and supplementary scribe line SS2 are formed along the side edges of the substrate carry-in side of the two panel substrates 90*a* on the substrate carry-out side of the bonded mother substrate 90. When the side edges of the substrate carry-out side and the substrate carry-in side of the two panel substrates 90*a* on the substrate carry-out side of the bonded mother substrate go are out, the scribing device guide body 130 slides toward the substrate carry-out side so that the cutter wheels 62*a* locate on the side edge portion located on the substrate carry-out side of the bonded mother substrate 90. Then, the upper portion substrate cutting device 160 and the lower portion substrate cutting device 170 slide along the upper guide rail 131 and the lower guide rail 132 so that the cutter wheels 162*a* of the upper portion substrate cutting device 160 and the lower portion substrate cutting device 170 are on an extension of the side edge of the panel substrate 90*a* on the substrate carry-out side and close to the frame 111A of the main frame 111, which is close to the main frame 111. Along the extension of the side edge, a double scribe line (main scribe line MS3 and supplementary scribe line SS3) is formed, and the side edge close to the frame 111A of the panel substrate 90*a* on the substrate carry-out side and close to the frame 111A of the main frame 111 is cut.

Then, double scribe lines (main scribe lines MS4 to MS6 and supplementary scribe lines SS4 to SS6) are formed in parallel with the frame 111A in a similar manner. Thus, side edges of the panel substrates 90*a* located on the substrate carry-out side in a direction along the frame 111A are respectively out.

Thereafter, regarding two other panel substrates 90*a* along the upper guide rail 131 and the lower guide rail 132, side edges of the panel substrates 90*a* are cut by forming double scribe lines (main scribe lines MS7 to MS12 and supplementary scribe lines SS7 to SS12) along side edges of the panel substrates 90*a*.

In the above description, an example where double scribe lines are individually formed has been explained. However, the present invention is not limited to such a method. As long as the double scribe lines are formed along the side edges of the panels 90*a*, any method may be used. For example, double scribe lines may be formed on the side edges of the panel substrates 90*a* by using one scribe line.

Figure 63:
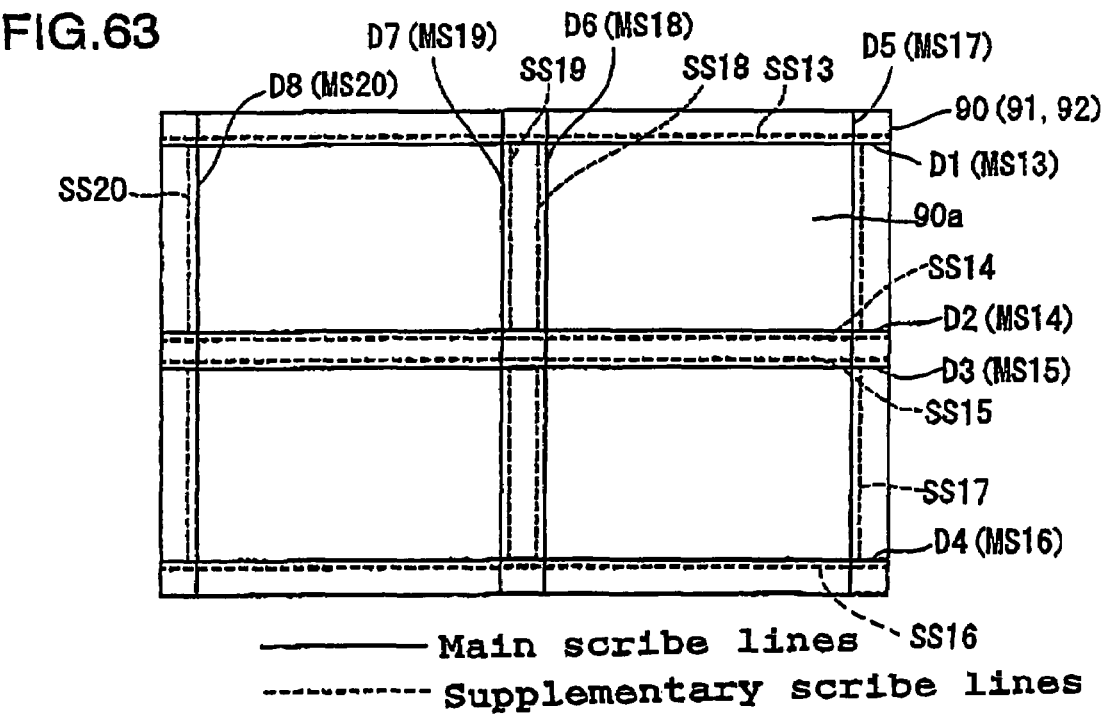
FIG. 63 to a plan view of a substrate showing a scribe pattern of the substrate for illustrating another example of the substrate cutting method according to the present invention.

FIG. 63 is a plan view for illustrating a scribe pattern for cutting panel substrates 90*a* out of the bonded mother substrate 90 by using double scribe lines of the main scribe lines MS and the supplementary scribe lines SS. In this example, the mother substrates 91 and 92 of the bonded mother substrate 90 are out along first to eighth lines to be cut D1 through D8 in this order to become four panel substrates 908 arranged in two rows and two columns.

The first line to be cut D1 corresponds to side edges of two panel substrates 90*a* in a first row along a row direction (horizontal direction), and is spaced apart from a side edge of the bonded mother substrate 90 along the row direction by a predetermined space. The second line to be cut D2 corresponds to side edges of the two panel substrates 90*a* in the first low, which are close to the panel substrate 90*a* in a second row. The third line to be cut D3 corresponds to side edges of two panel substrates 90*a* in the second row which are close to the panel substrates 90*a* in the first row, and is spaced apart from the second line to be cut D2 by 2 to 4 mm. The fourth line to be cut D4 corresponds to side edges of the two panel substrates 90*a* in the second row in a row direction (horizontal direction), and is spaced apart from the other side edges of the bonded mother substrate 90 along the row direction by a predetermined space.

The fifth line to be cut D5 corresponds to side edges of two panel substrates 90*a* in a first column along the column direction (vertical direction), and is spaced apart from one side edge of the bonded mother substrate 90 along the column direction. The sixth line to be cut D6 corresponds to the side edges of the two panel substrates 90*a* in the first column, which are close to panel substrates 90*a* in a second column. The line to be cut D7 corresponds to side edges of the two panel substrates 90*a* in the second column, which are close to the panel substrates 90*a* in the first column, and is spaced apart from the sixth line to be cut D6 by 2 to 4 mm. The line to be cut D8 corresponds to the side edges of the two panel substrates 90*a* in the second column along the column direction (vertical direction), and is spaced apart from the other side edges of the bonded mother substrate 90 along the column direction by a predetermined space.

For cutting such a bonded mother substrate 90, first, the cutter wheels 162*a* are pressed and rotated along, for example, the first to fourth lines to be cut D1 to D4 in this order. Thus, first to fourth main scribe lines MS13 to MS16 are formed by vertical cracks having depths of 90% or more of the thicknesses of the mother substrates 91 and 92 from the surface of the upper and lower mother substrates 91 and 92 of the bonded mother substrate 90.

In this state, the cutter wheels 162*a* are pressed and rotated along the fifth line to be cut D5. Thus, fifth main scribe line MS17 is formed along the fifth line to be cut D5.

Thereafter, sixth to eighth main scribe lines MS18 to MS20 are formed along the sixth through eighth lines to be cut D6 to D8 in this order by pressing and rotating the cutter wheels 162*a* along the sixth through eighth lines to be cut D6 to D8 in turn in a similar manner.

After the first through eighth main scribe lines MS 13 to MS 20 are formed as such, first supplementary scribe line SS13 to formed along the first main scribe line MS13 by pressing and rotating the cutter wheels 162*a* in a side edge portion of the bonded mother substrate 90, which is on opposite side of the panel substrates 90*a* with respect to the first main scribe line MS13, with a space of about 0.5 to 1.0 mm from the first main scribe line MS13. Thus, vertical cracks on the first main scribe line MS13 extend toward the bonded surface of the mother substrates 91 and 92 of the bonded mother substrate 90 and reach the bonded surface of the mother substrates 91 and 92. Such a phenomena occurs across entirety of the first main scribe line MS13, and the bonded mother substrate 90 is cut along the first main scribe line MS13.

Next, a second supplementary scribe line SS14 is formed along the second main scribe line MS14 by the cutter wheels 162a in an area opposite to the panel substrates 90 with respect to the second main scribe line MS14, with a space of about 0.5 to 1.0 mm from the second main scribe line MS14. Thus, vertical cracks on the second main scribe line MS14 extend toward the bonded surface of the mother substrates 91 and 92 of the bonded mother substrate 90 from the surfaces of the mother substrates 91 and 92 of the bonded mother substrate 90, and the vertical cracks reach the bonded surface of the mother substrates 91 and 92 across the entirety of the second main scribe line MS14. In this way, the bonded mother substrate 90 is cut along the second main scribe line MS14.

Along the third main scribe line MS15 and the fourth main scribe line MS16, third supplementary scribe line SS15 and a fourth supplementary scribe line SS16 are respectively formed on the side opposite to the panel substrates 90a. Thus, the bonded mother substrate 90 is sequentially cut along the third main scribe line MS15 and the fourth main scribe line MS16.

Thereafter, along the fifth to eighth main scribe lines MS17 to MS20, fifth to eighth supplementary scribe lines SS17 to SS20 are formed on the side opposite to the panel substrates 90a respectively between the first main scribe line 13 and the second main scribe line MS14, and between the third main scribe line MS15 and the fourth main scribe line MS16. Thus, the bonded mother substrate 90 are cut along the fifth to eighth main scribe lines MS17 to MS20 and unnecessary portions are removed. As a result, four panel displays 90a can be obtained.

In this example, the first to eighth main scribe lines MS13 to MS20 are formed between end surfaces of the bonded mother substrate 90, more specifically, formed across the entirety of the lines to be cut D1 to D5 formed across one and surface of the bonded mother substrate 90b to the opposing other end surface. Further, the first to eighth supplementary scribe lines SS13 to SS20 are respectively formed across the and surface or one cut surface which has been cut to the opposing other end surface or the other cut surface.

Figure 64:
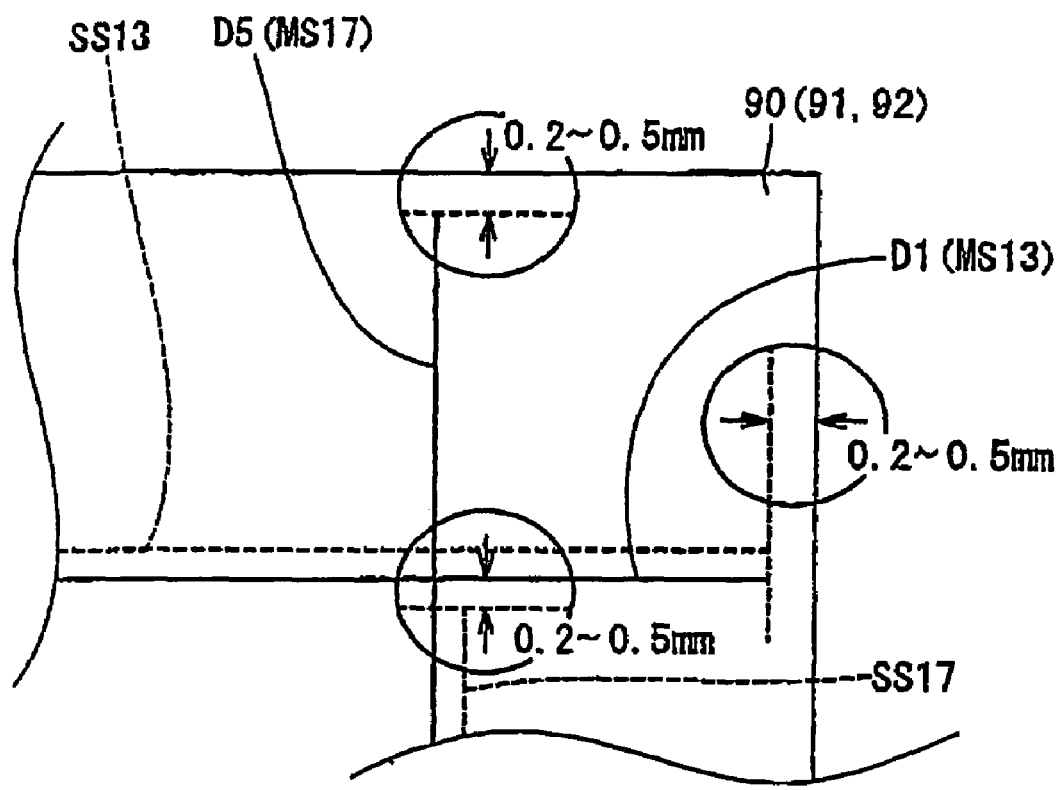
FIG. 64 is a partial plan view of a substrate showing a scribe pattern of the substrate for illustrating yet another example of the substrate cutting method according to the present invention.

The present invention is not limited to the method in which the first to eighth main scribe lines MS13 to MS20 are formed across the entirety of the lines to be cut D1 to D8 formed between the end surfaces of the bonded mother substrate 90, the first to fourth supplementary scribe lines SS13 to SS16 across the one end surface of the bonded mother substrate 90 and the opposing other end surface, and the fifth to the eighth supplementary scribe lines SS17 to the SS20 are formed across one cut surface of the bonded mother substrate 90 to the opposing other cut surface. As shown in FIG. 64, positions spaced apart from the one end surface of the mother glass substrate 10 by about 0.2 to 0.5 mm may be the start positions of the first to eighth main scribe lines MS13 to MS 20, and similarly, positions in front of is the other end surfaces by about 0.2 to 0.5 mm may be end portions of the first to eighth main scribe lines MS13 to MS20.

In this example, when the cutter wheels 162a are pressed and rotated on the mother substrates 91 and 92 of the bonded mother substrate 90 to perform scribing for forming the first to eighth main scribe lines MS13 to MS20, vertical cracks extend in back and front directions of the scribing direction with respect to the scribing start positions. Thus, the first to eighth main scribe lines MS13 to MS20 to be formed reach one end surface of the mother substrates 91 and 92 of the bonded mother substrate 90.

Similarly, even though the scribing end positions of the first to eighth main scribe lines MS13 to MS20 are in front of the other end surface of the mother substrates 91 and 92 of the bonded mother substrate 90, since the vertical cracks in the mother substrates 91 and 92 extend in the scribing direction, the first to eighth main scribe lines MS13 to MS20 to be formed reach the other end surface of the mother substrates 91 and 92.

This shows that it is not necessary to form first to eighth supplementary scribe lines SS13 to SS20 across one end surface or one cut surface which has been cut of the mother substrates 90 and 91 to the opposing other end surface or the opposing other cut surface. As shown in FIG. 64, positions appropriately spaced apart from one end surface or the one cut surface which has been cut of the mother substrates 91 and 92 of the bonded mother substrate 90 by 0.2 to 0.5 mm may be start positions of the first to eighth supplementary scribe lines SS13 to SS20. Similarly, positions in front of the other end surface or cut surface by about 0.2 to 0.5 mm may be end positions of the first to eighth supplementary scribe lines SS13 to SS20.

Furthermore, one of the first to eighth main scribe lines MS13 to MS20 and the first to eighth supplementary scribe lines SS13 to SS20 may be formed across the one end surface or one cut surface which has been cut of the mother substrates 91 and 92 of the bonded mother substrate to the other end surface or the other cut surface of the mother substrates 91 and 92, and the other of the first to eighth main scribe lines MS13 to MS20 and the first to eighth supplementary scribe lines SS13 to SS20 may be formed across the position appropriately space apart from the one end surface or one cut surface which has been cut of the mother substrates 91 and 92 of the bonded mother substrate 90 to positions in front of the other end surface or the other cut surface of the mother substrates 91 and 92.

FIG. 65 is a plan view for illustrating another scribe patter for cutting the panel substrates 90a out of the bonded mother substrate 90. In this scribing method, first and second main scribe lines MS13 and MS14 are formed by the cutter wheels 162a, along first and second lines to be cut D1 and D2 on the bonded mother substrate 90 along the horizontal direction are respectively formed by vertical cracks which extend to 90% or more of the thicknesses of the mother substrates 91 and 92 from the surfaces of the mother substrates 91 and 92 of the bonded mother substrate 90. Thereafter, in the area between the first and second main scribe lines MS13 and MS14, fifth main scribe line MS17 along the fifth line to be cut D5 along the vertical direction is formed by the cutter wheels 162a, and fifth supplementary scribe lines SS17 is formed on the side opposite to the panel substrates 90a being spaced apart from the fifth main scribe line MS17 by about 0.5 to 1.0 mm.

In this example, the fifth main scribe line MS17 and the fifth supplementary scribe line SS117 respectively arose the first and second main scribe lines MS13 and MS14. The fifth main scribe line MS17 runs over the second main scribe line MS14 and then is inverted by 180 degrees to form the fifth supplementary scribe line SS17 so that the fifth main scribe line MS17 and the fifth supplementary scribe line SS17 are formed continuously with one scribing.

Thereafter, similarly, in the area between the first and second main scribe lines MS13 and MS14, sixth scribe line MS18 is formed by the cutter wheals 162a along sixth line to be cut D8, and then is inverted to form sixth supplementary scribe line SS18 on the side opposite to the panel substrates 90a. Further, seventh main scribe line MS19 and seventh supplementary scribe lines SS19, and eight main scribe line MS20 and eighth supplementary scribe lines SS20 are formed similarly in turn. Since the fifth to eighth main scribe lines MS17 to MS20 and the fifth to eighth supplementary scribe lines SS17 to SS20 pass across the first and second main scribe lines MS13 and MS14, it is ensured that vertical cracks forming the first and second main scribe lines MS13 and MS14 reach the bonded surface of the mother substrates 91 and 92 of the bonded mother substrate 90 across the entirety of the first and second main scribe lines MS13 and MS14, and a pair of the panel substrates 90a are obtained.

Before the substrate is cut into the pair of the panel substrates 90a at this point, an area of the bonded mother substrate 90 which has not been cut is referred to a second substrate portion 90c.

Figure 66:
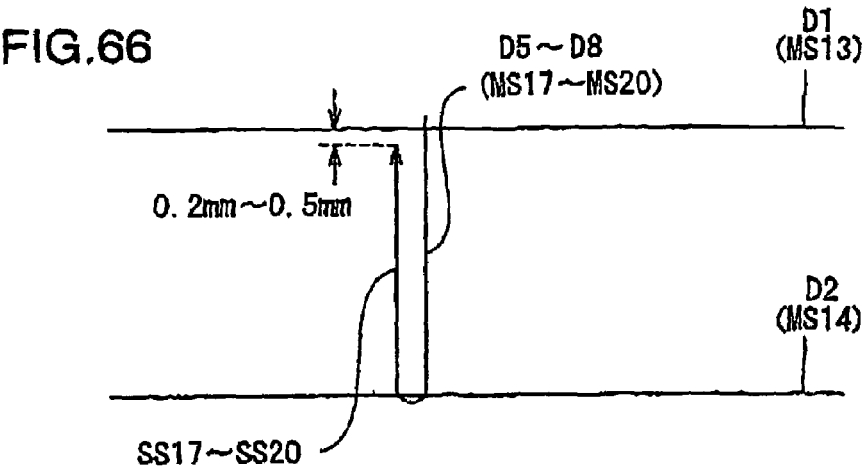
FIG. 66 is a plan view of a substrate showing a scribe pattern of the substrate for illustrating yet another example of the substrate cutting method according to the present invention.

Next, as shown in portion (b) of FIG. 66, on the second substrate portion 90c cut by the second main scribe line MS14, the cutter wheels 162a are pressed and rotated along the lines to be cut D3 and D4 on the bonded mother substrate 90 along the vertical direction, and third and fourth main scribe lines MS15 and MS16 are formed by vertical cracks extended to 90% or more of the thicknesses of the mother substrates 91 and 92 from the surfaces of the mother substrates 91 and 92 of the bonded mother substrate 90. Thereafter, in the area between the third and fourth main scribe lines MS15 and MS16, ninth main scribe line MS21 and fifth supplementary scribe line SS21 along ninth line to be cut D9 along the vertical direction, tenth main scribe line MS22 and tenth supplementary scribe line SS22 along the tenth line to be cut D10, eleventh main scribe line MS23 and eleventh supplementary scribe line SS23 along the eleventh line to be cut D11, and twelfth main scribe line MS24 and twelfth supplementary scribe line SS24 along the twelfth line to be cut D12 are sequentially formed outside the panel substrates 90a so as to cross the third and fourth main scribe lines MS15 and MS16. Thus, the second substrate portion 90c is cut, and a pair of panel substrates 90a are cut.

It is not necessary that the fifth to twelfth supplementary scribe lines SS21 to SS24 cross the first and third main scribe lines MS13 and MS15. For example, as shown in FIG. 66, positions in front of the first and third main scribe lines MS13 and MS15 by about 0.2 to 0.5 mm may be end portions of the fifth to twelfth supplementary scribe lines SS17 to SS24. In such a case, vertical cracks forming the fifth to twelfth supplementary scribe lines SS17 to SS24 also extend in the scribing direction. The fifth to twelfth main scribe lines MS17 to MS24 are cut across the entirety of the main scribe lines MS17 to MS24.

Figure 67:
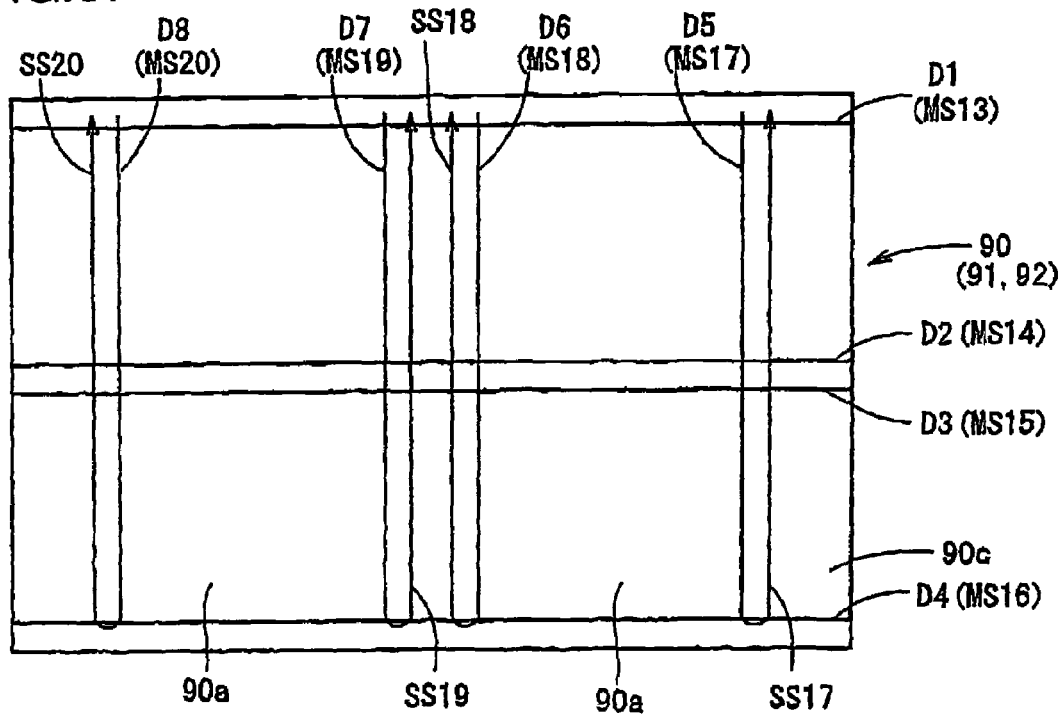
FIG. 67 is a partial plan view of a substrate showing a scribe pattern of the substrate for illustrating yet another example of the substrate cutting method according to the present invention.

In the case where the scribe lines are formed to cross each other for cutting the substrate as described above, as shown in FIG. 67, first, the main scribe lines MS13 to MS16 are formed along the first to fourth lines to be cut D1 to D4, and then, the fifth main scribe line MS17 and the fifth supplementary scribe line SS17, the sixth main scribe line MS18 and the sixth supplementary scribe line SS18, the seventh main scribe line MS19 and the seventh supplementary scribe line SS19, and the eighth main scribe line MS20 and the eighth supplementary scribe line SS20 are formed to respectively cross the first main scribe line MS13 and fourth main scribe line MS16 such that the main scribe lines and the supplementary scribe lines are formed continuously with one scribing by inverting the line by 180 degrees after they cross over the fourth main scribe line MS16.

Figure 68:
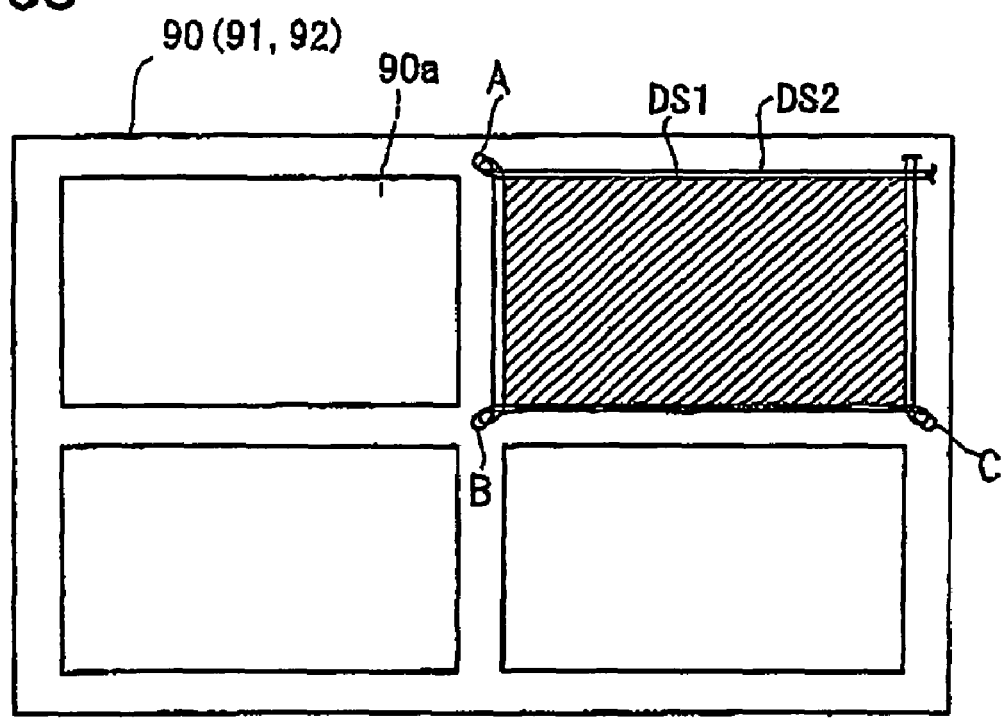
FIG. 68 to a plan view of a substrate showing a scribe pattern of the substrate for illustrating yet another example of the substrate cutting method according to the present invention.

FIG. 68 is a schematic plan view for illustrating a scribing pattern for cutting the display panels 90a out of the bonded mother substrate 90 by using double scribe lines of main scribe lines MS and supplementary scribe lines SS. First, with the scribing method shown in FIG. 57, four scribe lines along lines to be scribed S1 to S4 with respect to the panel substrates 90a (hereinafter, four linear scribe lines across the entire circumferences of the panel substrates 90a will be referred to as main scribe line DS1) are formed. Then, outside the panel substrates 90a with respect to the main scribe line DS1, four linear sub-scribe line DS2 in parallel to the main scribe line DS1 spaced apart from the main scribe line DS1 by about 0.5 to 1 mm.

As described above, when the sub-scribe line DS2 it formed with a space of about 0.5 to 1 mm apart from the main scribe line DS1, a stress to applied to a horizontal direction which is orthogonal to the formation direction of the scribe lines on a surface of the bonded mother substrate 90 when the sub-scribe line S2 is formed. Thus, a compression force is applied to surface portions of the vertical cracks which form the main scribe line DS1 which has been already formed. When the compression force is applied to the surface portion of the vertical cracks forming the main scribe line DS1 as such, a reaction force is applied in a direction to widen the width of the vertical cracks forming the main scribe line DS1. In this way, the vertical cracks extend in the thickness direction of the bonded mother substrate 90 and the vertical cracks reach the bonded surface of the mother substrates 91 and 92 of the bonded mother substrate.

Figure 69:
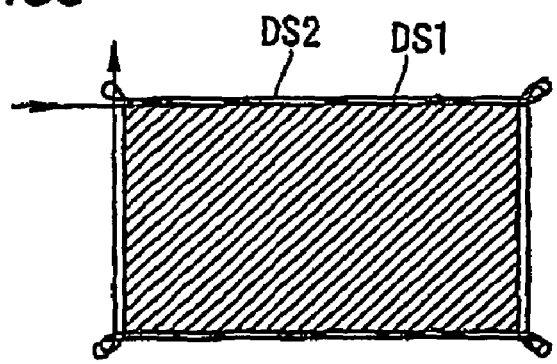
FIG. 69 is a plan view for illustrating yet another example of the substrate cutting method according to the present invention.

In this example, as shown in FIG. 69, sub-scribe line DS2 may be formed continuously after the main scribe line DS1 without separating the cutter wheels 162a from the front and back surfaces of the bonded mother substrate 90 after the main scribe line DS1 is formed.

Figure 70:
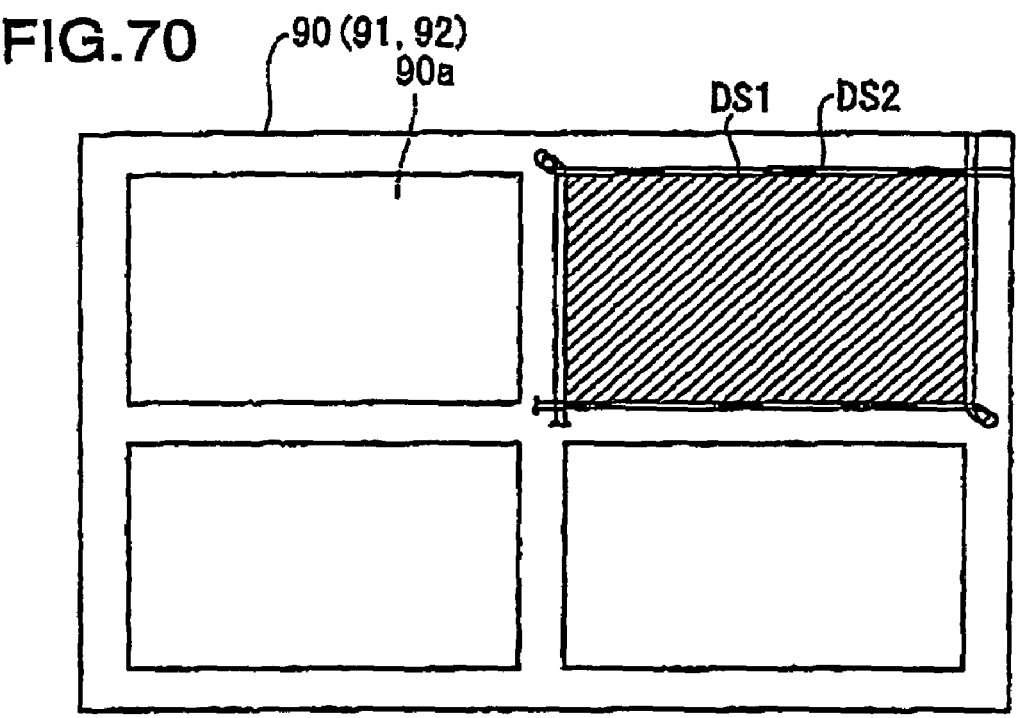
FIG. 70 is a plan view of a substrate showing a scribe pattern of the substrate for illustrating yet another example of the substrate cutting method according to the present invention.

Furthermore, as shown in FIG. 58, when scribe lines are first formed along lines to be scribed S1 and S2, and then scribe lines are continuously formed along lines to be scribed S4 and S2, as shown in FIG. 70, the sub-scribe line DS2 may be formed after the main scribe line DS1 is formed.

Further, as a method for cutting the substrate, a method in which double scribe lines are formed on the bonded mother substrates where the glass substrates, which is a type of brittle material substrate, are bonded as mother substrates has been described. However, the present invention is not limited to this. When the substrate is a metal substrate such as steel sheet, wood plate, a plastic substrate, and a brittle material substrate such as ceramics substrate, glass substrate, semiconductor substrate or the like, a method for cutting the substrate by using, for example, laser light, a dicing saw, a cutting blade, a diamond cutter, or the like may be used.

Furthermore, the substrates include, besides mother substrate, a bonded substrate formed by bonding the same type of mother substrates, a bonded mother substrate formed by bonding different types of mother substrates, and a substrate formed by laminating mother substrates.

Embodiment 3

Figure 71:
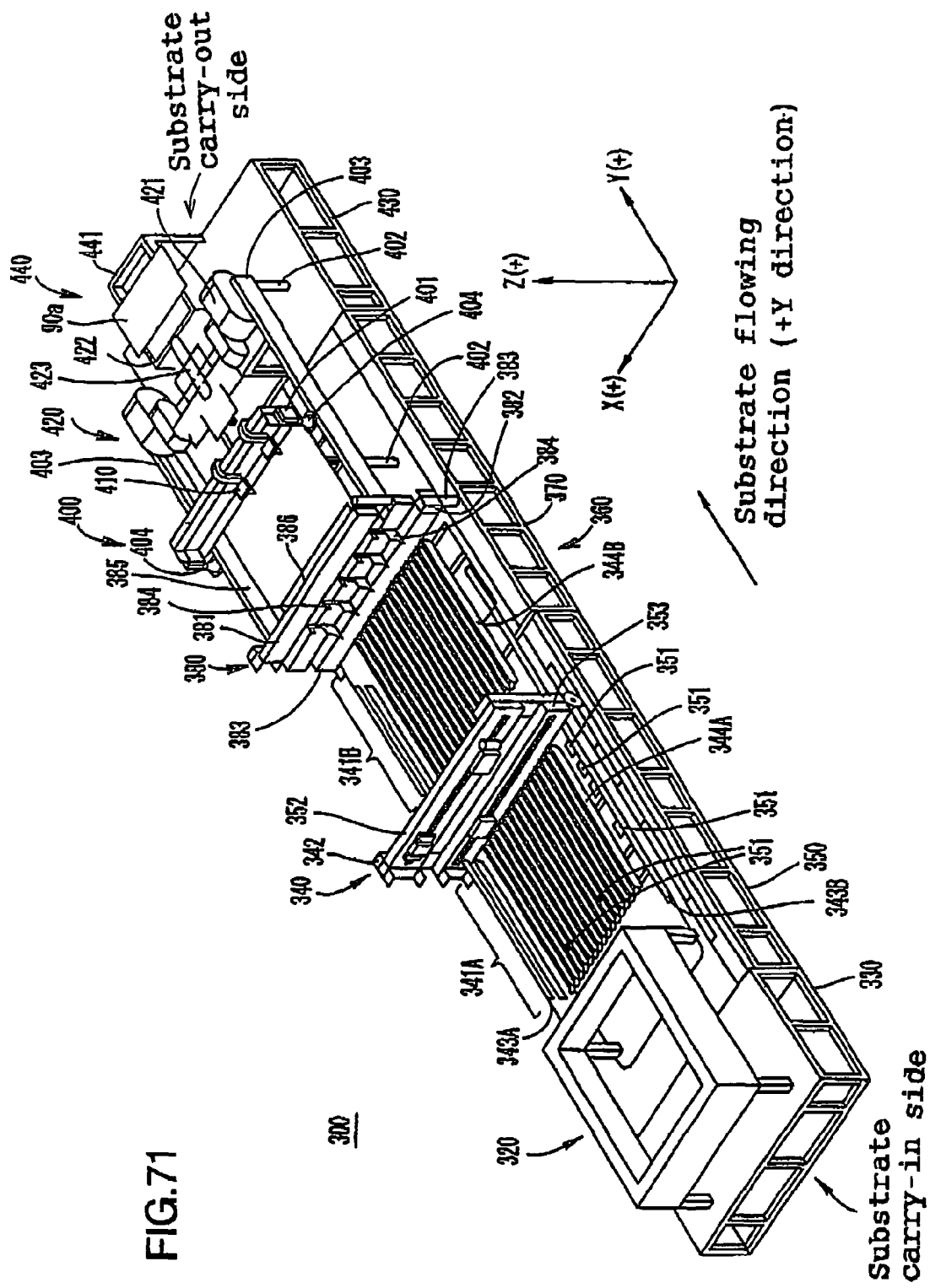
FIG. 71 to a schematic perspective view showing an example of a substrate cutting system according to Embodiment 3 of the present invention in whole.
Figure 72:
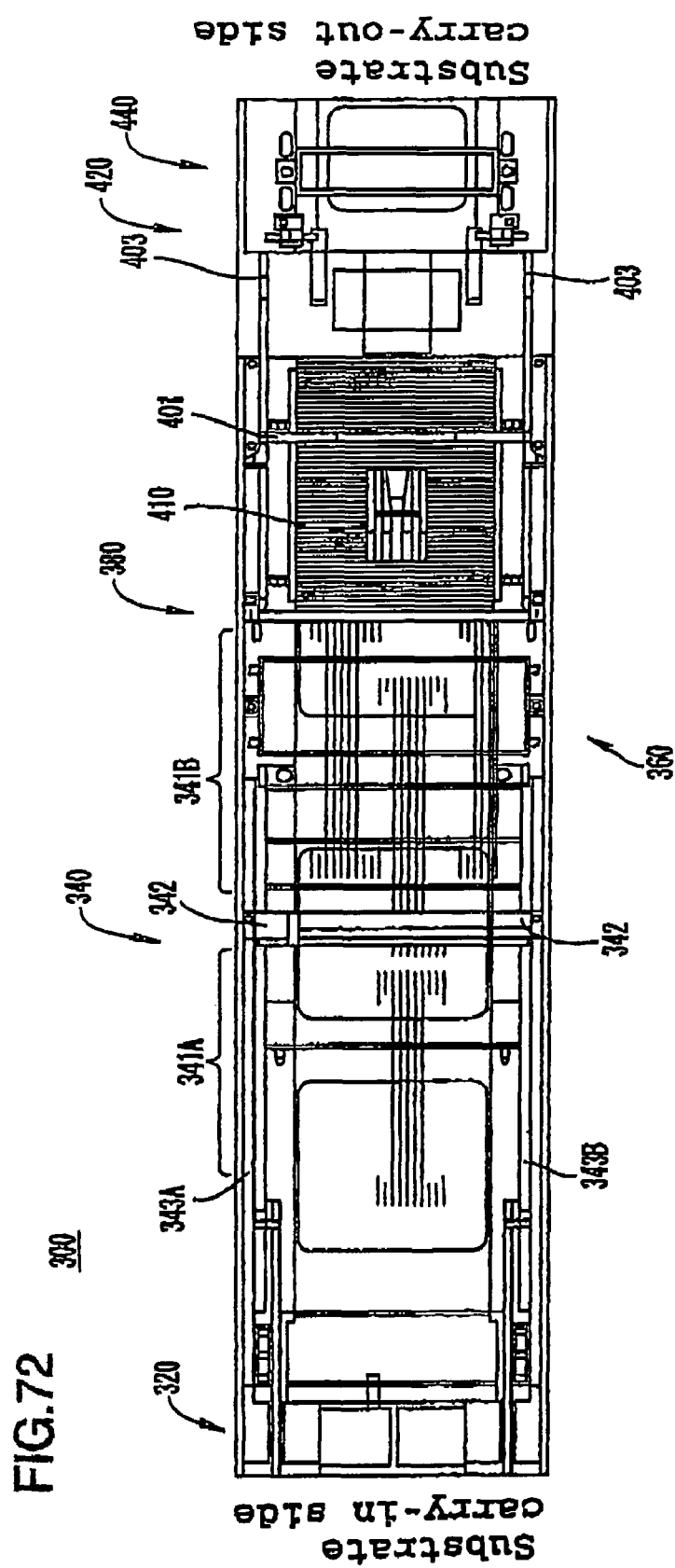
FIG. 72 is a schematic plan view showing the substrate cutting system.
Figure 73:
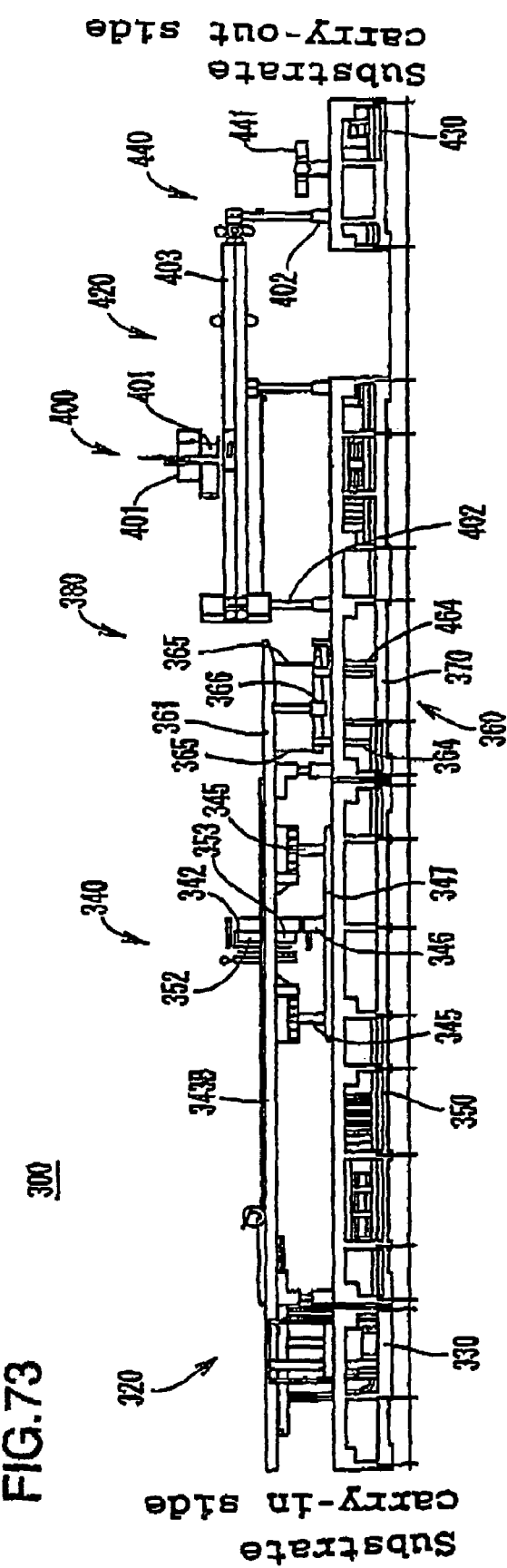
FIG. 73 is a schematic side view showing the substrate cutting system.

FIG. 71 is a schematic perspective view showing an example of another embodiment of the substrate cutting system according to the present invention in whole. FIG. 72 to a plan view of the substrate cutting system. FIG. 73 is a side view of the substrate cutting system. In the present invention, "substrates" include mother substrates cut into a plurality of substrates and also include single plates of metal substrates such as steel sheets, wood plates, plastic substrates and ceramic substrate, semiconductor substrates, and brittle material substrates such as glass substrates. Furthermore, the "substrates" are not limited to such single plates, but also includes bonded substrates formed by bonding pairs of substrates and laminated substrates formed by laminating pairs of substrates.

The substrate cutting system according to the present invention cut the bonded mother substrate 90 formed by boding a pair of mother glass substrates to each other into a plurality of panel substrates (display panel bonded substrates)

for producing, for example, panel substrates (display panel bonded substrates) of the liquid crystal display apparatus which are bonded to each other.

A substrate cutting system 300 according to Embodiment 3 includes a positioning unit portion 320, a scribe unit portion 340, a lift conveyer portion 360, a steam break unit portion 380, a substrate carrying unit portion 400, a panel inversion unit portion 420, and a panel terminal separation portion 440.

Regarding the substrate cutting system 300 according Embodiment 3, a side on which positioning unit portion 320 is located is referred to as a substrate carry-in side and a side on which the panel terminal separation portion 440 to located is referred to as a substrate carry-out side in the following description. In the substrate cutting system 300, a direction in which the substrates are carried (substrate flowing direction) is +Y direction from the substrate carry-in side to the substrate carry-out side. The direction in which the substrates are carried is a direction orthogonal to a scribing device guide body 342 of the scribe unit portion 340 in a horizontal fashion and the scribing device guide body 342 is provided along X direction.

The following description will be made with reference to an example in which the bonded mother substrate 90 is cut as a substrate. First, the bonded mother substrate 90 is carried into the positioning unit portion 320 by a carrying device (not shown) of the former step. Then, the positioning unit portion 320 places the bonded mother substrate 90 on a first substrate supporting portion 341A of the scribe unit portion 340 and positions the bonded mother substrate 90 on the first substrate supporting portion 341A.

Figure 74:
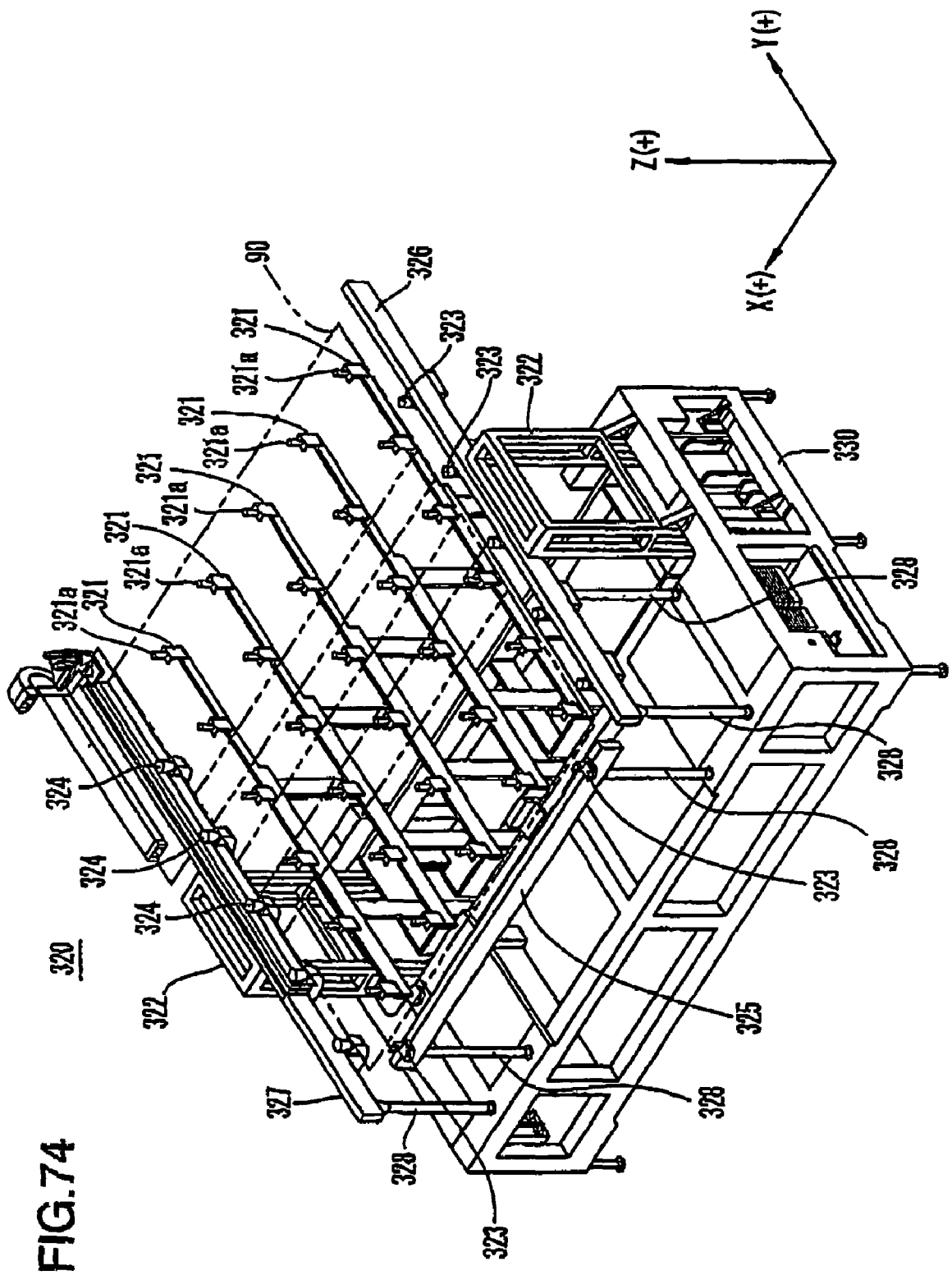
FIG. 74 is a schematic perspective view showing a positioning unit portion of the substrate cutting system according to Embodiment 3 of the present invention.

As shown in FIG. 74, the positioning unit portion 320 includes: a guide bar 326 elongated along one side edge of a mounting structure 330, which is provided along Y direction on the mounting structure 330 via pillars 328; and a guide bar 327 elongated along the other side edge of the mounting structure 330 in parallel with the guide bar 326. The positioning unit portion 320 further includes a guide bar 323 elongated along X direction provided on the mounting structure 330 via pillars 328 on the substrate carry-in side of the mounting structure 330 between the guide bar 326 and the guide bar 327.

The guide bar 325 and the guide bar 326 respectively include a plurality of reference rollers 323 which will be criteria for positioning the bonded mother substrate 90. The guide bar 327 includes a plurality of pushers 324 for pushing the bonded mother substrate 90 toward the reference rollers provided on the guide bar 326 for positioning the bonded mother substrate 90.

Above the mounting structure 330, a plurality of suction pad bases 321 are provided between the guide bar 326 and the guide bar 327 with predetermined spaces therebetween. The suction pad bases 321 are hold by a moving device 322 provided on an upper surface of the mounting structure 330 on the guide bar 326 side and a moving device 322 provided on an upper surface of the mounting structure 330 on the guide bar 327 side.

The suction pad bases 321 include suction bases 321a. Plurality of the suction bases 321a receive the bonded mother substrate 90 from the carrying device (not shown) of the former step, and suck the bonded mother substrate 90 by sucking devices which are not shown for adsorption.

The first substrate supporting portion 341A of the scribe unit portion 340 moves toward the substrate carry-in side and waits at the position of the positioning unit portion 320. The plurality of suction pad bases 321 holding the bonded mother substrate 90 sink into the waiting first substrate supporting portion 341A by moving devices 322. Thus, the bonded mother substrate 90 is placed on the first substrate supporting portion 341A.

The scribe unit portion 340 has a structure similar to that in the substrate cutting system 100 according to Embodiment 2 except for it does not include the substrate carry-out device 180 and the steam unit portion 260. Other mechanical structure is similar to that of Embodiment 1.

The scribing device guide body 342 of the scribe unit portion 340 is coupled with the first substrate supporting portion 341A and a second substrate supporting portion 341B, and, as the scribing device guide body 342 moves in Y-direction, the first substrate supporting portion 341A and the second substrate supporting portion 341B move in the same direction as the scribing device guide body 342 at the same time.

The first substrate supporting portion 341A and the second substrate supporting portion 341B respectively include a plurality of first substrate supporting units 344A and a plurality of second substrate supporting units 344B which are movable in the same direction as the moving direction of the scribing device guide body 342. The first substrate supporting units 344A and the second substrate supporting units 344B are respectively formed linearly along a direction parallel to a frame 343A and a frame 343B (Y direction).

One of the first substrate supporting units 344A provided in the first substrate supporting portion 341A is similar to the first substrate supporting units 121A shown in FIG. 43 in Embodiment 2. Timing belts provided in the first substrate supporting units 344A are rotated when clutch provided in the first substrate supporting portion 341A is coupled with a driving axis.

A plurality of the first substrate supporting units 344A are arranged with predetermined spaces therebetween, and move in Y direction along the frames 343A and 343B with the scribing device guide body 342.

A mechanism for rotating the timing belts of the first substrate supporting units 344A having such structures is similar to that shown in FIGS. 44 to 46 in Embodiment 2. The frames 111A and 111B in FIG. 44 correspond to the frames 343A and 343B in Embodiment 3.

As shown in FIG. 44, clamp units including clutches for rotating timing belts by rotating driving timing pulleys of the plurality of first substrate supporting units 344A provided in the first substrate supporting portion 341A are provided on the sides of frames 343A and 343B.

As shown in FIG. 73, a pillar 345 on the frame 343A side which supports the first substrate supporting units 344A and a pillars 345 on the frame 343B side are held by the guide bases 347, and to the pillars 345 for supporting both ends of the scribing device guide body 342, movers (not shown) of the linear motors are attached. Thus, by driving the linear motors, the scribing device guide body 342 is moved toward the substrate carry-in side, and a plurality of first substrate supporting units 344A of the first substrate supporting portion 341A are moved toward the substrate carry-in side.

When the scribing device guide body 342 is moved, the pinion of the clutch unit on the frame 343A side and the pinion of the clutch unit on the frame 343B side, which are engaged with the racks attached as in FIG. 45 along the frames 343A and 343B, are rotated.

For rotating the driving timing pulleys of the first substrate supporting units 344A and moving the timing belts, clutches on both sides of the frames 343A and 343B may be coupled to the respective driving axes to which the rotation of the pinions is transmitted, or the clutch on one of the frames 343A and 343B may be coupled to the driving axes to which rotation of the pinions is transmitted.

The second substrate supporting portion 341B includes a plurality of second substrate supporting units 344B which are movable in the same direction as the moving direction of the scribing device guide body 342. The second substrate supporting units 344B have similar structures as those of the first substrate supporting units 344A, and supported by the pillar 345 on the frame 343A side and the pillar 345 on the frame 343B side so as to be attached in an inverted direction with respect to Y direction to provide an arrangement symmetrical with respect to the scribing device guide body 342. The respective pillars are supported by the guide bases 347.

Since the movers (not shown) of the linear motors are attached to the guide bases 347 for holding the pillars 346 which support both ends of the scribing device guide body 342, the scribing device guide body 342 is moved toward the substrate carry-in side by driving the linear motor, and a plurality of the second substrate supporting units 344B of the second substrate supporting portion 341B also move toward the substrate carry-in side.

On the frame 343A side and the frame 343B side of the second substrate supporting portion 341B, clutch units similar to those in the first substrate supporting portion 341A are provided. When the scribing device guide body 342 is moved, the pinion of the clutch unit on the frame 343A side and the pinion of the clutch unit on the frame 343B side, which are engaged with the racks attached along the frames 343A and 343B, are rotated.

For rotating the driving timing pulleys of the second substrate supporting units 344B and moving the timing belts, clutches on both sides of the frames 343A and 343B may be coupled to the respective driving axes to which rotation of the pinions is transmitted, or the clutch on one of the frames 343A and 343B way be coupled to the driving axes to which rotation of the pinions is transmitted.

Furthermore, above the mounting structure 350, the clamp device 351 for clamping the bonded mother substrate 90, which is supported by the first substrate supporting portion 341A and pushed against the positioning pins so as to be positioned, is provided. For example, as shown in FIG. 71, the clamp device 351 includes a plurality of clamp devices 351 attached to the frame 343B with predetermined spaces therebetween in a longitudinal direction so as to clamp a side edge of the bonded mother substrate 90 along the frame 343B, and a plurality of clamp devices 351 arranged along the direction orthogonal to the frame 343B with a predetermined spaces therebetween for clamping a side edge of the bonded mother substrate 90 on the substrate carry-in side.

The operation of each of the clamp devices 351 is as described with reference to FIGS. 49 and 50, and thus, the description thereof is omitted.

Further, in the above-described the arrangement of the clamp device 351, the clamp device 351 for holding the bonded mother substrate 90 is provided on the substrate carry-in side in a direction orthogonal to the frame 343A and the frame 343B. However, even when the clamp device 351 is provided only on the frame 343B, the bonded mother substrate 90 can be held without receiving damage.

The structure of the clamp devices 351 as described above is merely an example used in the substrate cutting system of the present invention, and the structures are not limited to such structures. The clamp device 150 and the clamp members 151 may have any kind of structures as long as they can grip or hold the side edges of the bonded mother substrate 90. When the substrate size is small, the substrate can be held by clamping one position of the side edge of the substrate, and the substrate can be cut without causing a defect in the substrate.

As shown in FIG. 40 of Embodiment 2, the upper portion substrate cutting device 160 is attached to the upper guide rail 352 in the scribing device guide body 342. The lower portion substrate cutting device 170 having the similar structure as the upper portion substrate cutting device 160 but inverted upside down as shown in FIG. 41 of Embodiment 2 is attached to the lower guide rail 354. The upper portion substrate cutting device 160 and the lower portion substrate cutting device 170 respectively slide along the upper guide rail 352 and the lower guide rail 353 by the linear motors.

For example, in the upper portion substrate cutting device 160 and the lower portion substrate cutting device 170, a cutter wheel 162a for scribing the upper glass substrate of the banded mother substrate 90 similar to that shown in FIGS. 40 and 41 in Embodiment 2 is rotatably attached to a tip holder 162b, and the tip holder 162b is rotatably attached to a cutter head 162c having an axis in a direction vertical to the front and back surfaces of the bonded mother substrate 90 held by the clamp devices 351. The cutter head 162a is movable along a direction vertical to the front and back surfaces of the bonded mother substrate by driving means which is not shown. The cutter wheel 162a is appropriately loaded by energizing means which is not shown.

The cutter wheel 162a held by the tip holder 162b may have a blade edge protruded so as to have a center portion in a width direction of a shape of letter V with an obtuse angle and may have protrusions of a predetermined height formed on the blade edge with predetermined pitches in a circumferential direction as disclosed in Japanese Laid-Open Publication No. 9-188534.

The lower portion substrate cutting device 170 provided on the lower guide rail 353 has a similar structure as the upper portion substrate cutting device 160 but inversed upside down. A cutter wheel 162a of the lower portion substrate cutting device 170 (see FIG. 41) is arranged so as to oppose the cutter wheel 162a of the upper portion substrate cutting device 160.

The cutter wheel 162a of the upper portion substrate cutting device 160 are pressed onto a surface of the bonded mother substrate 90 and rotated by the above-described energizing means and moving means of the cutter head 162c. The cutter wheal 162a of the lower portion substrate cutting device 170 is pressed onto a back surface of the bonded mother substrate 90 by the above-described energizing means and moving means of the cutter head 162c. By moving the upper portion substrate cutting device 160 and the lower portion substrate cutting device 170 in the same direction at the same time, the bonded mother substrate 90 to cut.

It is preferable that the cutter wheel 162a is rotatably supported by a cutter head 165 using a servo motor disclosed in WO 03/011777.

FIG. 51 shows a side view of an exemplary cutter head 165 using a servo motor. FIG. 52 is a front view of the main part of the cutter head 165. A servo motor 165b is held between a pair of side walls 165a in an inverted state. In the lower part of the side walls 165a, a holder maintaining assembly 165c having a shape of letter L when viewed from side is rotatably provided via a spindle 165d. On the front portion of the holder maintaining assembly 165c (the right hand part in FIG. 52), the tip holder 162b for rotatably supporting the cutter wheel 162a via an axis 16e. Flat bevel gears 165f are respectively attached to the rotation axis of the servo motor 165b and the spindle 165d so as to engage each other. With such a structure, by rotating the servo motor 165b in normal or inverted direction, the holder maintaining assembly 165c performs an elevating operation having the spindle 165d as a fulcrum and the cutter wheel 162a moves up and down. The cutter head 165 itself is included in the upper portion substrate cutting device 160 and/or lower portion substrate cutting device 170.

FIG. 53 is a front view showing another example of a cutter head using a servo motor. In this example, the rotation axis of the servo motor 165b is directly connected to the holder maintaining assembly 165c.

The cutter heads of FIGS. 51 and 53 moves the cutter wheel 162a for positioning by rotating the servo motor by position control. Such a cutter head controls a rotation torque which acts to bring back the position of the cutter wheel 162a to the position which has been previously set to the servo motor 165b when the position is moved from the set position, and transmits a scribing pressure to a brittle material substrate during scribing operation in which the cutter head is moved in the horizontal direction to form scribe lines on the bonded mother substrate 90. In other words, the servo motor 165b controls the position of the cutter wheel 162a in a vertical direction and also serves as energizing means for the cutter wheel 162a.

By using the cutter head including the servo motor as described above, the rotation torque of the servo motor can be corrected while the bonded mother substrate 90 is being scribed instantly in accordance with the change in a scribing pressure due to a variance in resistance applied to the cutter wheel. Thus, stable scribing is performed and scribe lines with high quality can be formed.

A cutter head including a mechanism to periodically change the pressure to the bonded mother substrate 90 by a scribing cutter by vibrating the scribing cutter such as a diamond point cutter and/or cutter wheel for scribing the bonded mother substrate 90 may also effectively applied to the cutting of the mother substrate by the substrate cutting system of the present invention.

The structures of the upper portion substrate cutting device 160 and the lower portion substrate cutting device 170 are not limited to the above-described structures. The devices may have any kind of structures as long as they process the front and back surfaces of the substrate to cut the substrate.

For example, the upper portion substrate cutting device 160 and the lower portion substrate cutting device 170 may be a device for cutting the mother substrate by using laser light, a dicing saw, a cutting blade, a diamond cutter, or the like.

When the mother substrate is a metal substrate such as steel sheet, wood plate, a plastic substrate, and a brittle material substrate ouch as ceramics substrate, glass substrate, semiconductor substrate or the like, a scribing device for cutting the mother substrate by using, for example, laser light, a dicing saw, a cutting blade, a diamond cutter, or the like may be used.

Furthermore, the upper portion substrate cutting device 160 and the lower portion substrate cutting device 170 may further include cutting assistance means for assisting in the cutting of the substrate. The cutting assistance means may be, for example, means for pressing a roller or the like to the substrate, or means for warming (heating) the substrate by spraying compressed air to the substrate, irradiating the substrate with laser, or blowing hot air to the substrate.

In the above example, the upper portion substrate cutting device 160 and the lower portion substrate cutting device 170 have the same structure. However, they may have different structures depending upon the cutting pattern of the substrate and cutting conditions for the substrate.

The lift conveyer portion 360 is a device for carrying the scribed bonded mother substrate 90 which is placed on the plurality of second substrate supporting units 344B of the second substrate supporting portion 241B to the steam break unit portion 380 after the bonded mother substrate 90 is scribed by the upper portion substrate cutting device 160 and the lower portion substrate cutting device 170 of the scribing device guide body 342 of the scribe unit portion 340, and then, clamping of the bonded mother substrate 90 by the clamp devices 351 is released.

Figure 75:
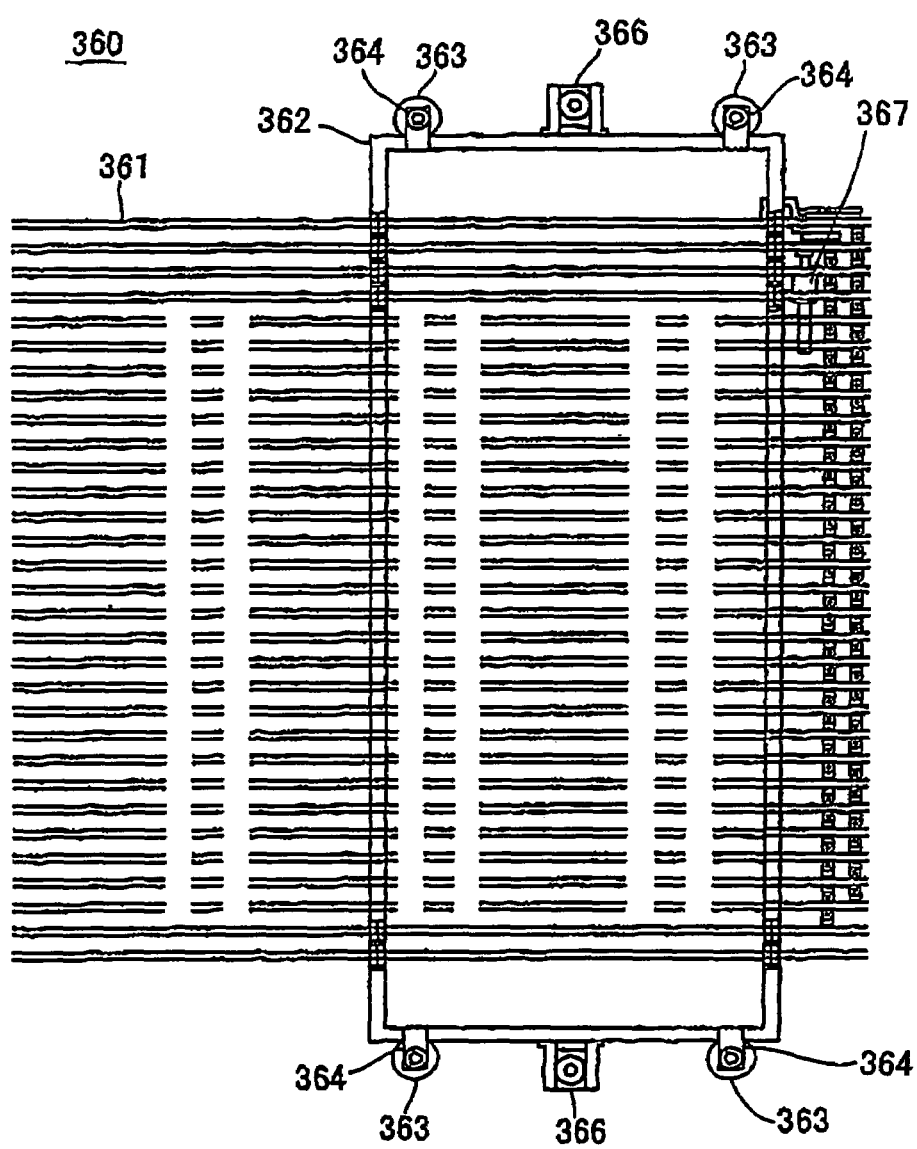
FIG. 75 in a schematic plan view of a lift conveyer portion of the substrate cutting system according to Embodiment 3 of the present invention.
Figure 76:
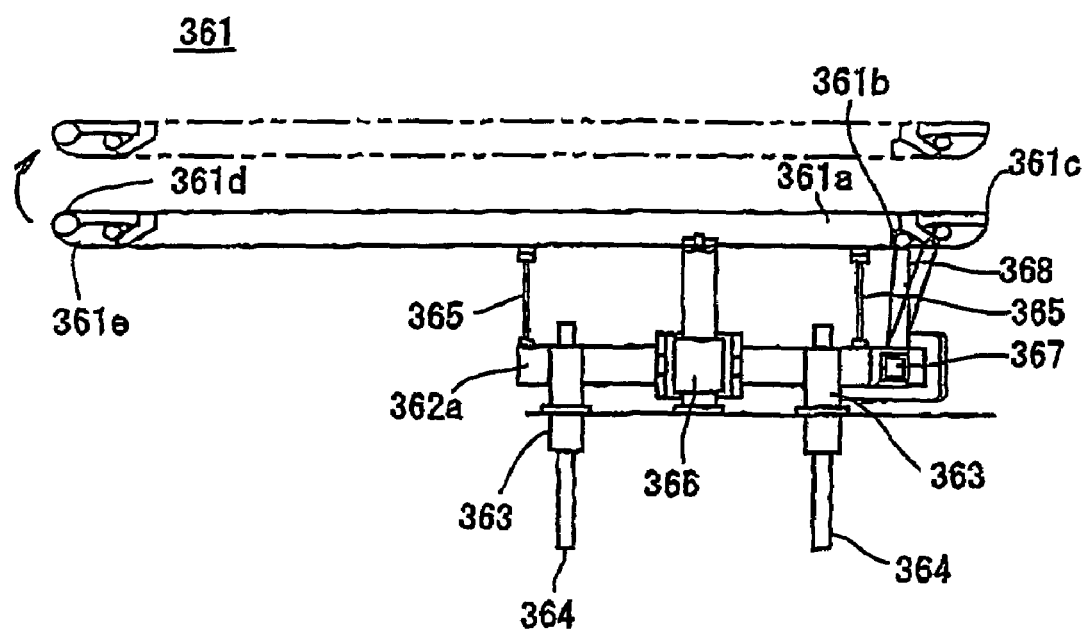
FIG. 76 is a side view of a third substrate supporting unit of the lift conveyer portion.

FIG. 75 is a plan view of the lift conveyer portion 360. FIG. 76 is a side view of third substrate supporting units 361 which form the lift conveyer portion 360.

Each of the third substrate supporting units 361 has a support main body 361a elongated linearly along a direction parallel to the frames 343A and 343B (Y direction), and timing pulleys 361c and 361d for guiding a timing belt 361e are respectively attached to end portions of the support main body 361a. A driving timing pulley 361b is coupled to a rotation axis to which rotation of a rotation motor 367 is transmitted by a belt 368, and rotates the timing belt 361e.

A plurality of the third substrate supporting units 361 are arranged in the lift conveyer portion 360 with predetermined spaces therebetween. The plurality of the third substrate supporting units 361 are held to a holding frame 362 via pillars 365 such that a plurality of the second substrate supporting units 344B of the second substrate supporting portion 341B of the scribe unit portion 340 are inserted between the spaces.

A center portion of each of the frames 362a of the holding frames 362 on the frame 343A side and the frame 343B side includes a cylinder 366. The main body of the cylinder 366 is jointed to an upper surface of mounting structure 370, and a rod of the cylinder 366 is jointed to each of the frames 362a of the holding frames 362. On both sides of each of the frames 362a of the holding frames 362, guide shafts 364 are provided, and respectively inserted into linear guides 363 provided on the upper surface of the mounting structure 370.

The scribed bonded mother substrate 90, which is placed on the plurality of second substrate supporting units 344B of the second substrate supporting portion 241B after the bonded mother substrate 90 is scribed by the upper portion substrate cutting device 160 and the lower portion substrate cutting device 170 of the scribing device guide body 342 of the scribe unit portion 340, and then, clamping (holding) of the bonded mother substrate 90 by the clamp devices 351 is released, is placed on the plurality of the third substrate supporting units 361 and is moved to a predetermined position in upstream (+Z direction) along a vertical direction by driving the cylinders 366. Then, by rotating the rotation motor 367 and moving the timing belt 361e, the bonded mother substrate 90 is moved to the steam break unit portion 380.

The steam break unit portion 380 has similar structure as the steam unit portion 260 shown in FIG. 47 in Embodiment 2 except that it is fixed instead of moving along Y direction.

The steam break unit portion 380 includes an upper steam unit attachment bar 381 for attaching a plurality of steam units 384 for spraying steam to the upper mother substrate 91 of the bonded mother substrate 90 and a lower steam unit attachment bar 382 for attaching a plurality of steam units 384 for spraying steam on the lower mother substrate 92 of the bonded mother substrate 90 attached to pillars 383 along X direction parallel to the scribing device guide body 342.

The pillars 383 of the scribe unit portion 340 on the frame 343A side and the frame 343B side are respectively jointed to the upper surface of the mounting structure 370. On the substrate carry-out side of the steam break unit portion 380, a belt conveyer 385 for supporting and carrying the completely cut bonded mother substrate 90 after steam is sprayed on the front and back surfaces of the bonded mother substrate 90 from the steam units 384, which is, for example, a rotating belt having a sheet shape, is provided.

The rotation moving speed of the belt conveyer 385 provided on the substrate carry-out side of the steam break unit portion 380 is set to be substantially the same as the rotation moving speed of the timing belt 361*e* of the plurality of the third substrate supporting units 361 of the lift conveyer portion 360, and they move in synchronization.

The steam break unit portion 380 has similar structure as the steam unit portion 260 shown in FIG. 47 in Embodiment 2. A plurality of steam units 384 are attached to the upper steam unit attachment bar 381 and a plurality of steam units 384 are attached to the lower steam unit attachment bar 382 with a gap GA spaced apart from the upper plurality of steam units 384. The gap GA is adjusted so an to allow the bonded mother substrate 90 to pass through the gap GA.

The structures of the steam units 384 are similar as those of the steam units 261 shown in FIG. 48 in Embodiment 2. Each of the steam units 384 is mostly made of an aluminum material, and a plurality of heaters 261*a* are embedded in a vertical direction. When an opening/closing valve (not shown) which can be opened or closed automatically is opened, water flows into the steam unit 261 from a water supply port 261*b* and heated by the heaters 261*a*. The supplied water is vaporized and becomes steam. The steam is blown to the surface of the mother substrate through a conducting hole 261*c* and from a spray nozzle 261*d*.

Further, on the carry-out side of the upper steam unit attachment bar 381, an air knife 386 for removing water which remains on the surface of the mother substrate 90 after the steam is blown to the upper surface of the mother substrate 90 is attached.

The lower steam unit attachment bar 382 also includes the steam units 384 and the air knife 386 similar to those attached to the upper steam unit attachment bar 382.

The scribed bonded mother substrate 90 which is placed on the plurality of second substrate supporting units is placed on the third substrate supporting units 361 and is moved to a predetermined position above along the vertical direction (Y direction). Then, the belt conveyer 385 provided on the steam break unit portion 380 on the substrate carry-out side is moved at the substantially same rotation moving speed as that of the timing belts 361*e* of the plurality of the third substrate supporting units 361. Thus, the scribed bonded mother substrate 90 passes through the steam break unit portion 380, is out into panel substrates 90*a*, and is to be supported by the belt conveyer 385.

The substrate carrying unit portion 400 is a device for taking up a moving or stopped panel substrate 90*a* which has passed through the steam break unit portion 380, has been cut into panel substrates 90*a*, and is to be supported by the belt conveyer 385, and placing on a panel holding portion 422 of an inverted carrying robot 421 of panel inversion unit portion 420.

Above the mounting structure 370 and mounting structure 430 of the substrate carrying unit portion, a substrate carry-out device guide 401 for allowing the carrying robot 410 for carrying out the panel substrates cut out of the bonded mother substrate 90 to move in X direction parallel to the steam break unit portion 380 and the scribing device guide body 342, which is a direction orthogonal to Y direction, that is a substrate flowing direction. The substrate carrying unit portion 400 has both end portions of the substrate carry-out device guide 401 slide via supporting members 404 by linear motors along guides 403 respectively provided on the upper surfaces of the mounting structure 370 and 430 via pillars 402 on the frame 343A side and the frame 343B side. In this case, the linear motors are formed by inserting movers (not shown) of the linear motors respectively attached to the supporting members 404 into the stators respectively provided on the guides 403.

The carrying robot 410 includes an adsorption portion (not shown) for auction-adsorbing panel substrates 90*a* cut out of the bonded mother substrate 90. The carrying robot 410 is slid to the substrate carry-out side with the panel substrate 90*a* adsorbed by the adsorption portion. Thus, the panel substrate 90*a* is placed on the panel holding portion 422 of the inverted carrying robot 421 of the panel inversion unit portion 420.

Since the structure of the carrying robot 410 of the substrate carrying unit portion 400 is similar to that of the carrying robot 240 shown in FIG. 42 in Embodiment 2, the detailed description thereof is omitted. The carrying robot 410 is attached to the substrate carry-out device guide 401, and is made movable in a direction along the substrate carry-out device guide 401 (X direction) by a moving mechanism formed by combining driving means of a linear motor or servo motor and a linear guide.

For carrying the panel substrates 90*a* cut out of the bonded mother substrate 90 by the carrying robot 410, the cut panel substrates 90*a* are hold by adsorption pads of the carrying robot 410 by sucking with a sucking mechanism which is not shown, and the entire carrying robot 410 is temporarily lifted by a moving mechanism (not shown). Then, the substrates are carried to the inverted carrying robot 421 of the panel inversion unit portion 420 in next step, and the entire carrying robot 410 is moved down again by the moving mechanism (not shown) and placed in a previously decided state in a predetermined position of the panel holding portion 422 of the inverted carrying robot 421 of the panel inversion unit portion 420 in the next step.

The panel inversion unit portion 420 includes the inverted carrying robot 421. The panel inversion unit portion 420 receives the panel substrates 90*a* from the carrying robot 410 of the substrate carrying unit portion 400 and inverts the panel substrates 90*a* upside down to place on a separation table 441 on the panel terminal separation portion 440.

The panel holding portion 422 of the inverted carrying robot 421 includes, for example, a plurality of adsorption pads, and is held so as to be rotatable with respect to a robot main body 423 of the inverted carrying robot 421.

Figure 77:
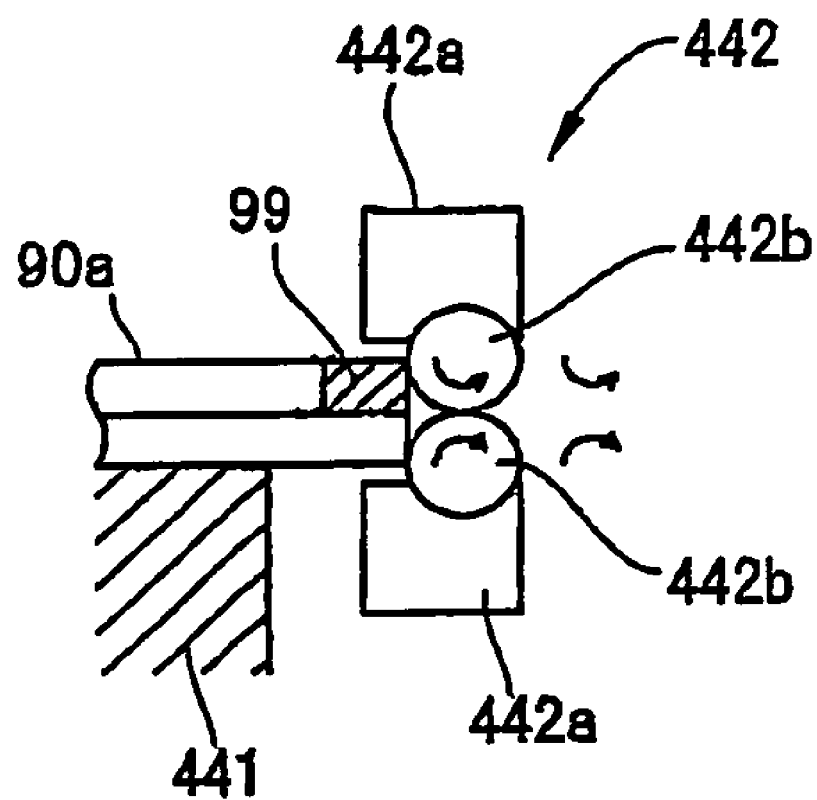
FIG. 77 is a schematic view for illustrating a panel terminal separation portion of the substrate cutting system according to Embodiment 3 of the present invention.

Regarding the panel substrates 90*a* placed on the separation table 441 of the panel terminal separation portion 440 by the inverted carrying robot 421, unnecessary portions 99 of the panel substrates 90*a* are separated from the panel substrates 90*a* by an unnecessary portion removal mechanism 442 provided near the side edge portions of the separation table 441 as shown in FIG. 77, for example, by an insertion robot (not shown).

As shown in FIG. 77, the unnecessary portion removal mechanism 442 is formed by arranging a plurality of removal roller portions 442*a* respectively having a pair of the rollers 442*b* opposing each other along a side edge of the separation table 441 with a predetermined pitch. The opposing rollers 442*b* provided in the provided in the removal roller portions 442*a* are energized in directions to approach each other. The unnecessary portion 99 of the upper substrate of the panel substrate 90*a* and a lower side edge of the panel substrate 90*a* are inserted between the rollers 442*b* by the insertion robot (not shown). The rollers 442*b* rotate only in one direction of the insertion direction into the rollers 442*b* of the panel substrate 90*a*. A pair of opposing rollers 442*b* are respectively set to rotate in the reversed direction.

The substrate cutting system of Embodiment 3 having such a structure will be explained with reference mainly to an example in which a bonded substrate formed by bonding large-scale glass plates is cut.

For cutting the bonded mother substrate 90 formed by bonding large-scale glass substrates to each other into a plurality of panel substrates 90a (see FIG. 55), the bonded mother substrate 90 is received and adsorbed by a plurality of suction bases 321a provided on a plurality of suction pad bases 321 of the positioning unit portion 320 of Embodiment 3 from the carrying device (not shown) of the former step.

The four clutches of the first substrate supporting portion 341A and the second substrate supporting portion 341B of the scribe unit portion 340 release connection with driving axes such that timing pulleys for rotating the timing belts of the first substrate supporting units 344A and the second substrate supporting units 344B (such an operation is referred to as switching off a clutch in the following description).

Figure 78:
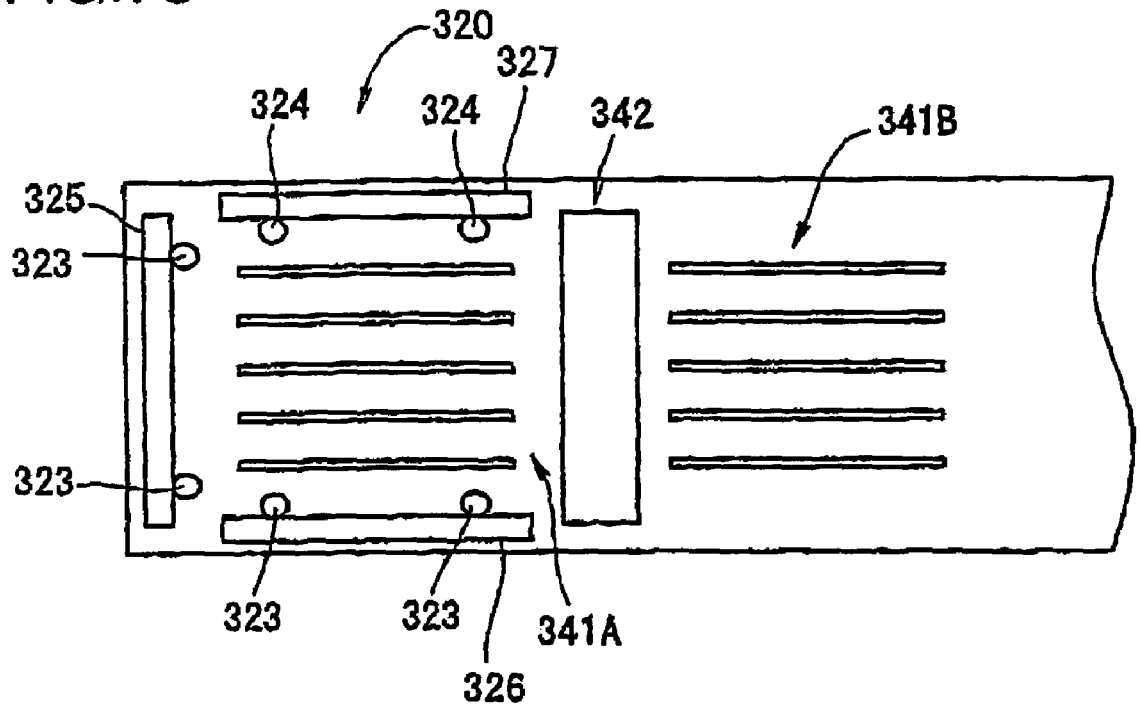
FIG. 78 is a partial schematic plan view for illustrating an operation of the substrate cutting system according to Embodiment 3 of the present invention.

As shown in FIG. 78, the first substrate supporting portion 341A moves toward the substrate carry-in side with the scribing device guide body 342 and the second substrate supporting portion 341B with the clutches switched off, and waits at the positioning unit portion 320.

Figure 79:
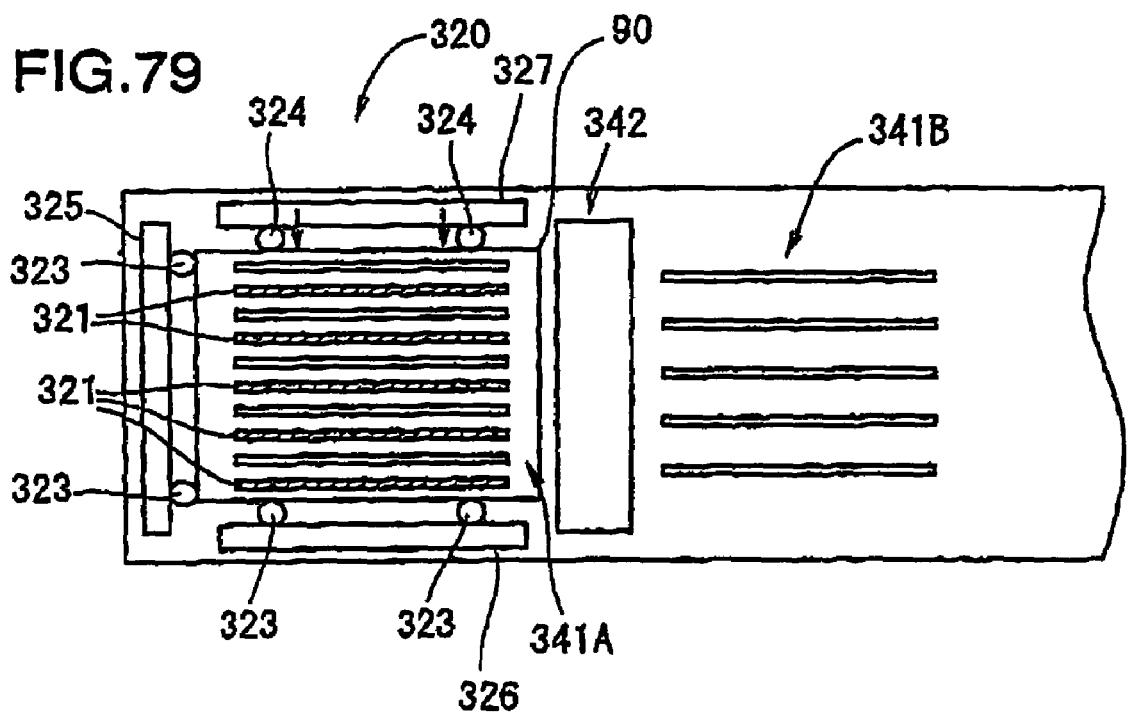
FIG. 79 is a partial schematic plan view for illustrating an operation of the substrate cutting system according to Embodiment 3 of the present invention.

Then, as shown in FIG. 79, a plurality of the suction pad bases 321 holding the bonded mother substrate 90 sinks into the first substrate supporting portion 341A in a waiting state by a moving device 322. Then, adsorption state of the bonded mother substrate by the plurality of adsorption pads is released to place the bonded mother substrate 90 on the first substrate supporting portion 341A.

As described above, with the bonded mother substrate 90 being placed on the first substrate supporting portion 341A, and with the four clutches of the first substrate supporting portion 341A and the second substrate supporting portion 341B being switched off, the first substrate supporting portion 341A slightly moves toward the substrate carry-in side together with the scribing device guide body 342 and the second substrate supporting portion 341B, and abut the side edge of the bonded mother substrate 90 on the substrate carry-in side against a plurality of the reference rollers 323 provided in the guide bar 325 of the positioning unit portion 320.

After the side edge of the bonded mother substrate 90 on the substrate carry-in side abuts against a plurality of the reference rollers 323 provided in the guide bar 325 of the positioning unit portion 320, the pushers 324 of the guide bar 327 of the positioning unit portion 320 pushes the bonded mother substrate 90 toward the reference rollers 323 of the guide bar 326. The side edge of the bonded mother substrate 90 on the guide bar 326 side abuts the reference rollers 323 provided in the guide bar 326. Thus, the bonded mother substrate 90 is positioned in the first substrate supporting portion 341A of the scribe unit portion 340.

Then, with the pushing of the bonded mother substrate 90 toward the reference rollers 323 of the guide bar 326 by the pushers 324 of the guide bar 327 of the positioning unit portion 320 being released and the four clutches of the first substrate supporting portion 341A and the second substrate supporting portion 341B being switched off, the first substrate supporting portion 341A moves together with the scribing device guide body 342 and the second substrate supporting portion 341B. After the bonded mother substrate 90 is moved to the position to be held by the clamp devices 351, the side edge portions of the bonded mother substrate 90 are clamped by the clamp devices 351.

When the side edges of the bonded mother substrate 90 which are orthogonal to each other are respectively clamped by the clamp device 351, the clamp members 151 clamping the side edges of the bonded mother substrate 90 sink approximately at the same time due to the weight of the bonded mother substrate itself. Thus, the bonded mother substrate 90 is supported supplementarily by the timing belts of all the first substrate supporting units 344A.

Figure 80:
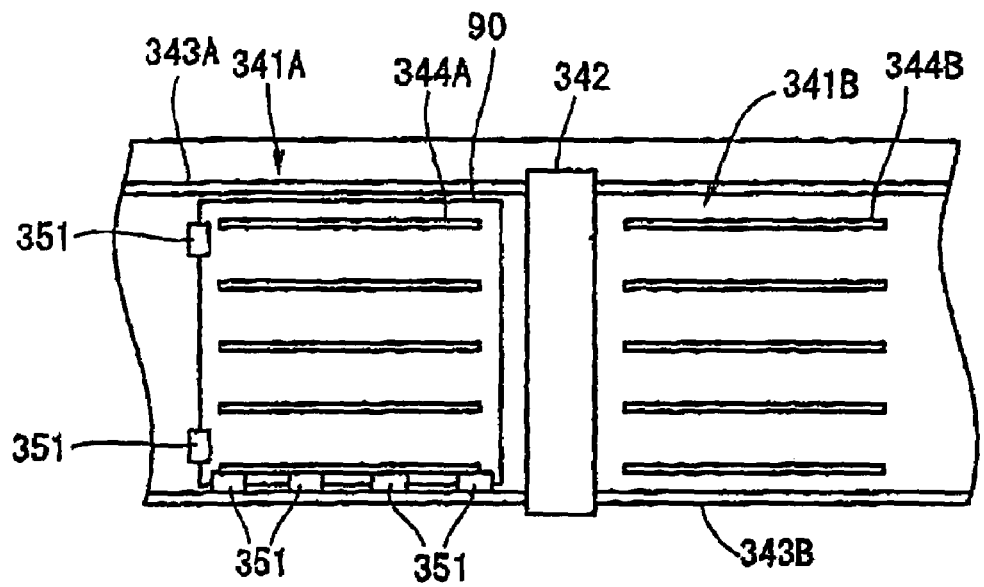
FIG. 80 is a partial schematic plan view for illustrating an operation of the substrate cutting system according to Embodiment 3 of the present invention.

As shown in FIG. 80, in such a state where the side edges of the bonded mother substrate 90 which are orthogonal to each other are respectively clamped by the clamp device 351 and supported by the first substrate supporting units 344A, the four clutches of the first substrate supporting portion 341A and the second substrate supporting portion 341B of the scribe unit portion 340 are coupled to the driving axes such that timing pulleys for rotating the timing belts of the first substrate supporting units 344A and the second substrate supporting units 344B rotate (such an operation will be referred to switching on a clutch in the following description).

After the clutches of the four clutch units of the first substrate supporting portion 341A and the second substrate supporting portion 341B are switched on, the scribing device guide body 342 slides toward the substrate carry-in side so as to be at a predetermined position on a side edge of the bonded mother substrate 90 clamped by the clamp devices 351 in a horizontal fashion on the substrate carry-out side. The first optical device and the second optical device provided on the scribing device guide body 342 move along the guide body 342 from waiting positions. Thus, the images of the first alignment mark and the second alignment mark provided on the bonded mother substrate 90 are taken.

Since the scribing device guide body 342 slides, the first substrate supporting portion 341A slides toward the substrate carry-in side, and second substrate supporting portion 341B slides toward the substrate carry-in side. The timing belts of the first substrate supporting units 344A of the first substrate supporting portion 341A and the timing belts of the second substrate supporting units 344B of the second substrate supporting portion 341B moves the bonded mother substrate 90 in a direction opposite to the moving direction of the scribing device guide body 342 at the rate same as the moving speed of the scribing device guide body 342. Thus, the bonded mother substrate 90 does not move, and while being held by the clamp devices 351, the bonded mother substrate 90 is supported without being in sliding contact with the timing belts of the first substrate supporting units 344A of the first substrate supporting portion 341A and the timing belts of the second substrate supporting units 344B of the second substrate supporting portion 341B.

Next, based on the results of taking the images of the first alignment mark and the second alignment mark, angle of the bonded mother substrate 90 supported by the clamp devices 351 in a horizontal fashion in a direction along the scribing device guide body 342, cutting start position and cutting end position by a calculation using an operation process device which is not shown. Based on the calculated results, the scribing device guide body 342 is moved with the upper portion substrate cutting device 160 and the lower portion substrate cutting device 170 to cut the bonded mother substrate 90 (Such an operation may be referred to as scribing or cutting by linear interpolation).

In this example, the cutter wheels 162a respectively opposing the front surface and the back surface of the bonded mother substrate 90 are pressed onto the front back surfaces and rotated. Thus, scribe lines 95 are formed on the front surface and the back surface of the bonded mother substrate 90.

Figure 81:
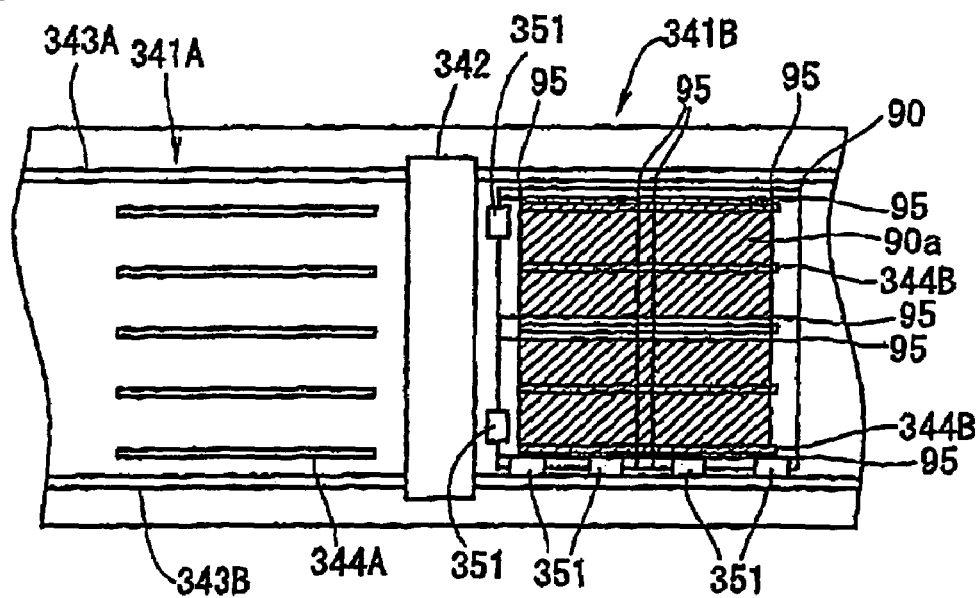
FIG. 81 is a partial schematic plan view for illustrating an operation of the substrate cutting system according to Embodiment 3 of the present invention.

FIG. 81 is a diagram showing the second substrate supporting portion 341B supporting the bonded mother substrate when the scribe lines 95 are formed in the side edge portions of four panel substrates 90a for cutting four panel substrates out of the bonded mother substrate 90 by pressing and rotating the cutter wheel 162a of the upper portion substrate cutting device 160 and the cutter wheel 162a of the lower portion substrate cutting device 170.

As shown in FIG. 81, from the bonded mother substrate 90, for example, two panel substrates 90a in a column direction along the upper guide rail 352 and the lower guide rail 353 are cut out for two columns. For cutting four display panels 90a out of the bonded mother substrate 90, the cutter wheel 162a of the upper portion substrate cutting device 160 and the cutter wheel 162a of the lower portion substrate cutting device 170 are respectively pressed and rotated along the side edges of the display panels 90a.

in this example, the cutter wheel 162a of the upper portion substrate cutting device 160 and the cutter wheel 162a of the lower portion substrate cutting device 170 generate vertical cracks in the portions of the glass substrates where the cutter wheels 162a rotated, and a scribe line 95 is formed. Since protrusions are formed in a predetermined pitch in circumferential direction of the blade edges of the cutter wheels 162a, vertical cracks having the length of about 90% of the thickness of the glass substrate in the thickness direction are formed in the glass substrates.

Further, a scribing method using a cutter head including a mechanism for periodically changing a pressure to the bonded mother substrate 90 by a scribe cutter by vibrating the scribe cutter such as a diamond point cutter, cutter wheel or the like for scribing the bonded mother substrate 90 may be effectively applied to the cutting of the bonded mother substrate 90 by the substrate cutting system of the present invention.

When the scribing process on the front and back surfaces of the bonded mother substrate 90 is finished and the bonded mother substrate 90 is in a state as shown in FIG. 81, clamping (holding) of the bonded mother substrate 90 by the clamp devices 351 to released, and the clutches of the four clutch units of the second substrate supporting portion 241B are switched off while the bonded mother substrate 90 is being placed on the second substrate supporting portion 241B.

Figure 82:
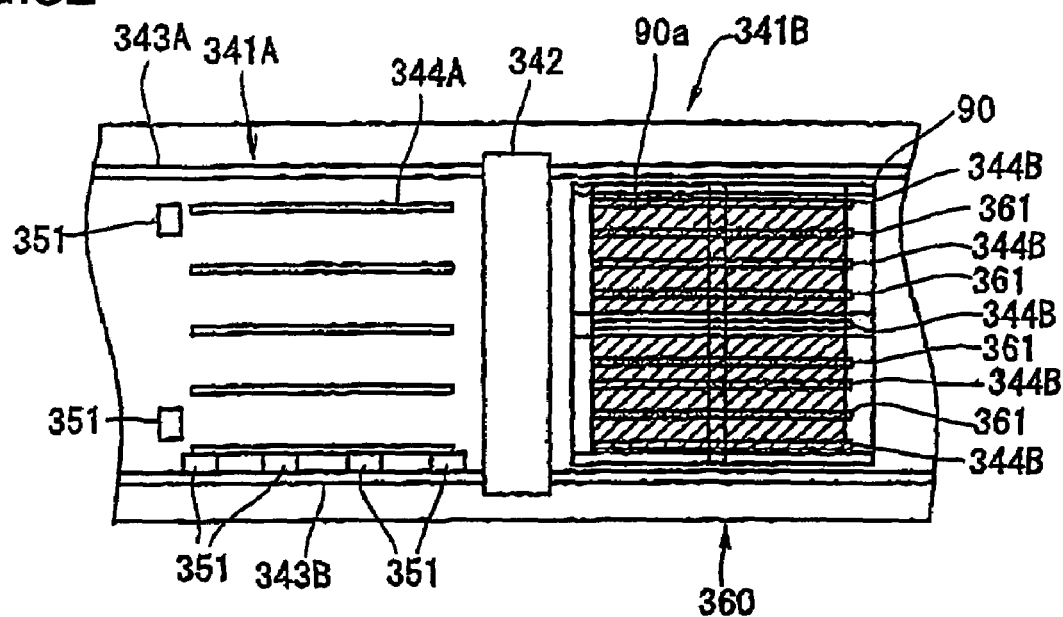
FIG. 82 is a partial schematic plan view for illustrating an operation of the substrate cutting system according to Embodiment 3 of the present invention.

Thereafter, as shown in FIG. 82, the second substrate supporting portion 341B carrying the scribed bonded mother substrate 90 moves toward the substrate carry-out side with the first substrate supporting portion 341A and the scribing device guide body 342, and moves to the position to be inserted into the spaces between a plurality of third substrate supporting units 361 arranged in the lift conveyer portion 360 with a predetermined spaces.

As a scribing method for forming scribe lines in side edge portions of the four panel substrates 90a for cutting four panel substrates out of the bonded mother substrate 90 by pressing and rotating the cutter wheel 162a of the upper portion substrate cutting device 160 and the cutter wheel 162a of the lower portion substrate cutting device 170, a scribing method shown in FIGS. 56 to 58 in Embodiment 2 may be effectively applied to the substrate cutting system according to Embodiment 3 instead of the scribing method shown in FIG. 81.

Figure 83:
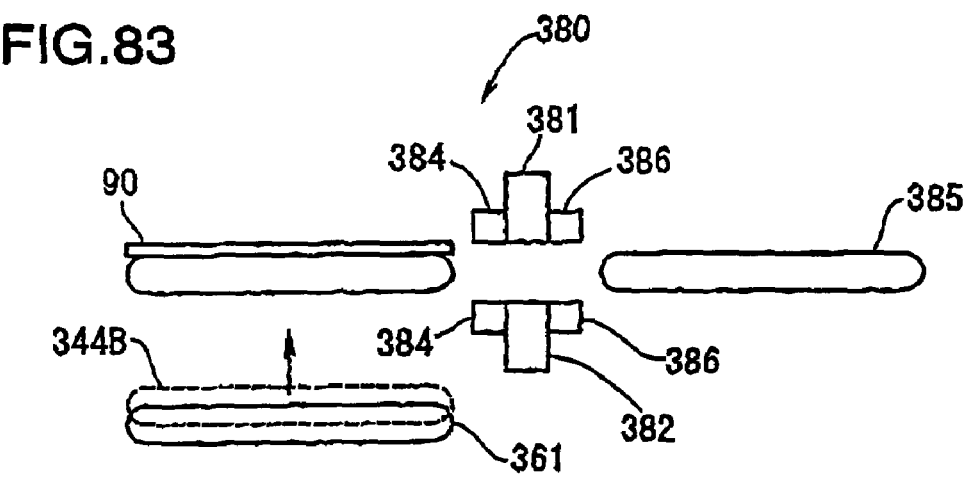
FIG. 83 is a partial schematic plan view for illustrating an operation of the substrate cutting system according to Embodiment 3 of the present invention.

A plurality of third substrate supporting units 361 are arranged in the lift conveyer portion 360 with predetermined spaces therebetween. As shown in FIG. 76, the plurality of third substrate supporting units 361 are held by the holding frame 362 via the pillars 365 such that the plurality of the second substrate supporting units 344B of the second substrate supporting portion 341B of the scribe unit portion 340 are inserted into the spaces. As shown in FIG. 83, the plurality of the third substrate supporting units 361 are arranged such that a surface of the timing belts 361e receiving the scribed bonded mother substrate 90 is lower than a surface of the second substrate supporting units 344B on which the scribed bonded mother substrate 90 is to be placed.

After the bonded mother substrate 90 is scribed by the upper portion substrate cutting device 160 and the lower portion substrate cutting device 170 of the scribing device guide body 342 of the scribe unit portion 340, clamping (holding) of the bonded mother substrate 90 by the clamp devices 351 is released. The scribed bonded mother substrate 90 placed on the plurality of the second substrate supporting units 344B of the second substrate supporting portion 241B is placed on the plurality of the third substrate supporting units 361 and moved to a predetermined position in upper direction (+Z direction) along vertical direction. Then, by rotating the rotation motor 367 and moving the timing belts 361e, the bonded mother substrate 90 is carried to the break unit portion 380.

The break unit portion 380 includes an upper steam unit attachment bar 381 for attaching a plurality of steam units 384 for spraying steam to the upper mother substrate 91 of the bonded mother substrate 90 and a lower steam unit attachment bar 382 for attaching a plurality of steam units 384 for spraying steam on the lower mother substrate 92 of the bonded mother substrate 90 attached to pillars 383 along X direction parallel to the scribing device guide body 342.

The rotation moving speed of the belt conveyer 385 provided on the substrate carry-out side of the steam break unit portion 380 to set to be substantially the same as the rotation moving speed of the timing belt 361e of the plurality of the third substrate supporting units 361 of the lift conveyer portion 360 and they move in synchronization. Thus, the scribed bonded mother substrate 90 passes through the break unit portion 380.

Further, on the carry-out side of the upper steam unit attachment bar 381, the air knife 386 is attached, and in the lower steam unit attachment bar 382, the steam units 384 and the air knife 386 similar to those attached to the upper steam unit attachment bar 382 are also provided. After the steam is blown to the front and back surfaces of the mother substrate 90, the water remaining on the front and back surfaces of the mother substrate 90 is completely removed.

After the scribed bonded mother substrate 90 is placed on the plurality of the third substrate supporting units 361 and moved to a predetermined position in upper direction (+Z direction) along vertical direction, the bonded mother substrate 90 is moved by the belt conveyer 385 provided in the steam break unit portion on the substrate carry-out side at the rotation moving speed substantially same as that of the timing belts 361e of the plurality of the third substrate supporting units 361. Then, the scribed bonded mother substrate 90 passes through the break unit portion 380. Thus, the bonded mother substrate 90 is cut and in a state to be supported by the belt conveyer 385.

A moving or stopped panel substrate 90a which has passed through the steam break unit portion 380, has been cut into panel substrates 90a, and is to be supported by the belt conveyer 385 is taken up by the carrying robot 410. Then, the panel substrate 90a is placed an a panel holding portion 422 of an inverted carrying robot 421 of panel inversion unit portion 420.

The inverted carrying robot 421 of panel inversion unit portion 420 receives the panel substrate 90a from the carrying robot 410 and inverts the panel substrate 90a upside down to place on a separation table 441 on the panel terminal separation portion 440.

Regarding the panel substrate 90a placed on the separation table 441 of the panel terminal separation portion 440 by the inverted carrying robot 421, unnecessary portions 99 of the panel substrates 90a are separated from the panel substrates 90a by an unnecessary portion removal mechanism 442 provided near the side edge portions of the separation table 441 as shown in FIG. 77, for example, by an insertion robot (not shown).

By employing the scribing method shown in FIGS. 61 to 70 in Embodiment 2 as the scribing method by the upper portion substrate cutting device 160 and the lower portion substrate cutting device 170 of the scribing device guide body 342, a cutting process of the bonded substrate 90 by the steam unit portion 380 may be omitted.

Further, as a method for cutting, the substrate, a method in which double scribe lines are formed on the bonded mother substrates where the glass substrates, which is a type of brittle material substrate, are bonded as mother substrates has been described. However, the present invention is not limited to this. When the mother substrate is a metal substrate such as steel sheet, wood plate, a plastic substrate, and a brittle material substrate such as ceramics substrate, glass substrate, semiconductor substrate or the like, a method for cutting the substrate by using, for example, laser light, a dicing saw, a cutting blade, a diamond cutter, or the like may be used.

Furthermore, the substrates include, besides mother substrate, a bonded substrate formed by bonding the same type of mother substrates, a bonded mother substrate formed by bonding different types of mother substrates, and a substrate formed by laminating mother substrates.

Embodiment 4

Figure 84:
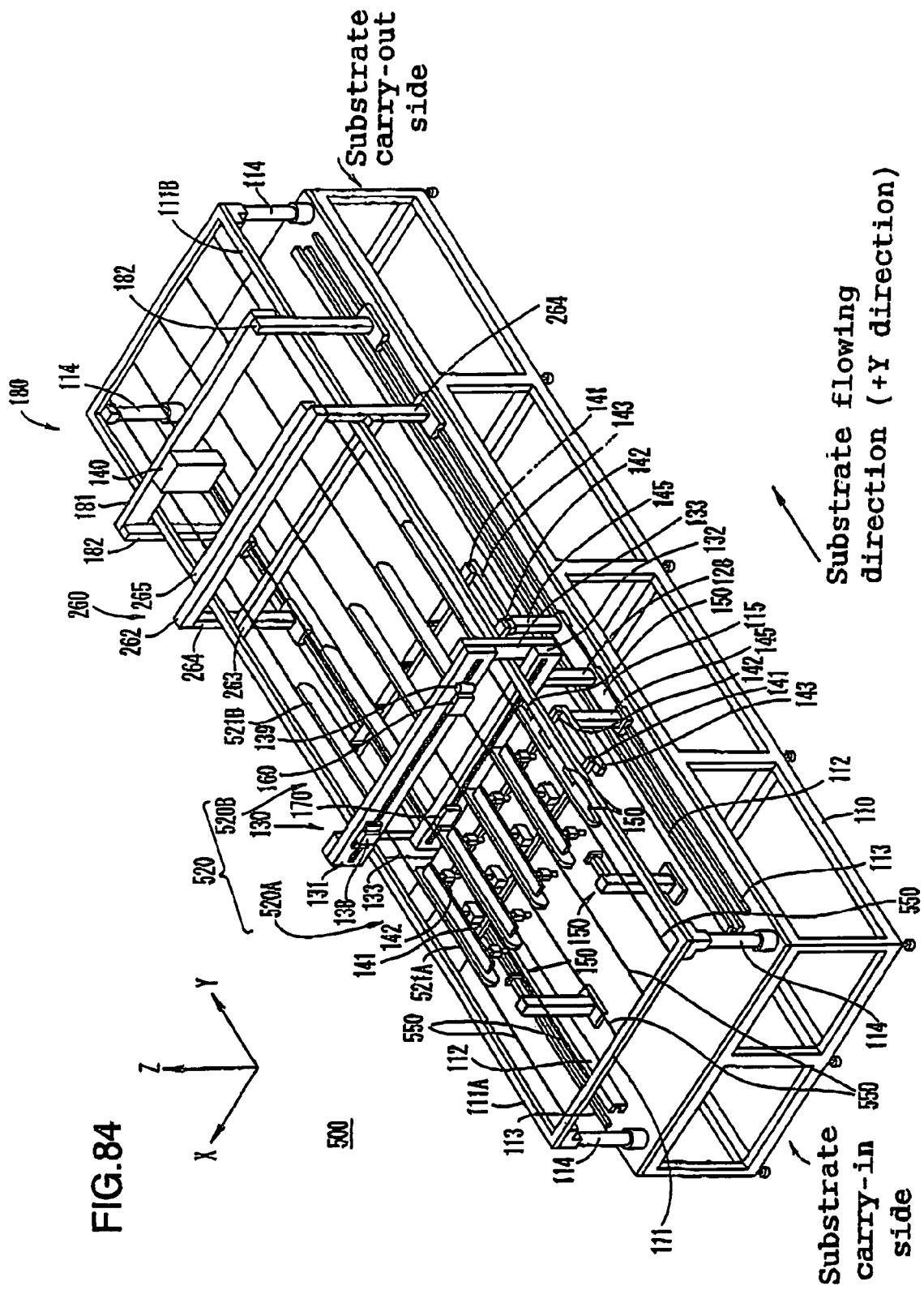
FIG. 84 is a schematic perspective view showing an example of a substrate cutting system according to Embodiment 4 of the present invention.

FIG. 84 is a schematic perspective view showing an example of another embodiment of the substrate cutting system according to the present invention in whole. In the present invention, "substrates" include mother substrates cut into a plurality of substrates and also include single plates of metal substrates such as steel sheets, wood plates, plastic substrates and ceramic substrate, semiconductor substrates, and brittle material substrates such as glass substrates. Furthermore, the "substrates" are not limited to such single plates, but also includes bonded substrates formed by bonding pairs of substrates and laminated substrates formed by laminating pairs of substrates.

The substrate cutting system according to the present invention out the bonded mother substrate 90 formed by boding a pair of mother glass substrates to each other into a plurality of panel substrates (display panel bonded substrates) for producing, for example, panel substrates (display panel bonded substrates) of the liquid crystal display apparatus which are bonded to each other.

A substrate cutting system 500 according to Embodiment 4 has a similar structure as Embodiment 2 except for that the substrate supporting device 120 in the substrate cutting system 100 in Embodiment 2 is replaced with the substrate supporting device 520 of Embodiment 4, and a plurality of supporting belts 550 are hung within the substrate cutting system according to Embodiment 4. Thus, the like parts in Embodiment 2 shown in FIG. 84 are denoted by like reference numerals. Detailed description will be omitted.

Regarding the substrate cutting system 500 according Embodiment 4, a side on which the first substrate supporting device 520 is located is referred to as a substrate carry-in side and a side on which the substrate carrying device 180 is located is referred to as a substrate carry-out side in the following description. In the substrate cutting system 500 of the present invention, a direction in which the substrates are carried (substrate flowing direction) is +Y direction from the substrate carry-in side to the substrate carry-out side. The direction in which the substrates are carried is a direction orthogonal to a scribing device guide body 130 in a horizontal fashion and the scribing device guide body 130 is provided along X direction.

The first substrate supporting portion 520A and second substrate supporting portion 520B of the substrate supporting device 520 respectively includes, for example, five first substrate supporting units 521A and second substrate supporting units 521B which are movable in a direction same as the moving direction of the scribing device guide body 130. The first substrate supporting units 521A and the second substrate supporting units 521B are formed to have linear shape along the direction parallel to the frames 111A and 111B in the longitudinal direction of the main frame 111 (Y direction).

Figure 86:
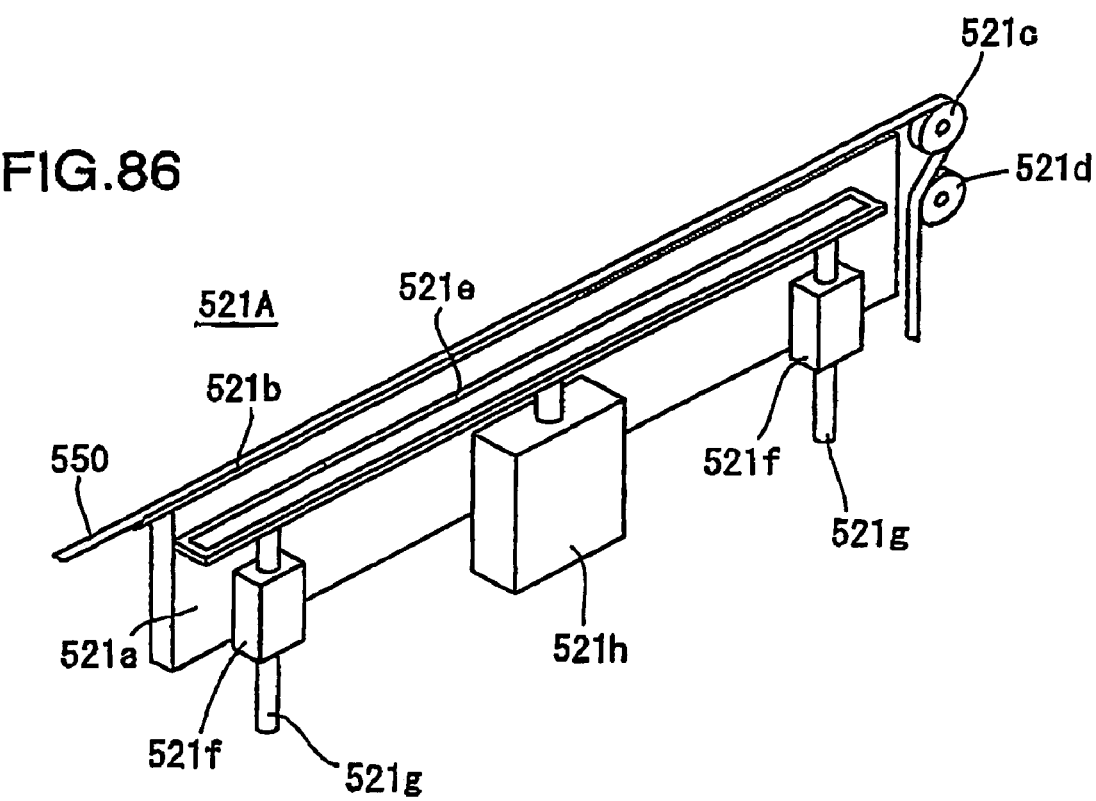
FIG. 86 is a side view for illustrating an operation of the substrate supporting device of the substrate cutting system.

FIG. 86 is a side view of one of the first substrate supporting units 521A provided in the first substrate supporting portion 520A. The first substrate supporting unit 521A has a support main body 521a elongated linearly along the direction parallel to the main frame 111 (Y direction). On an upper portion of the support main body 521a, a belt receiver 522b for guiding the supporting belt 550 is provided. On the end portion of the support main body 521a on the substrate carry-out side, pulleys 521c and 521d are attached. Further, on a lower central portion of the support main body 521a, a cylinder 521h is provided. A cylinder rod of the cylinder 521h is jointed to a suction plate 522e. On both lower end portions of the support main body 521a, linear guides 521f are provided. One end of each of the shafts 521g which are inserted into the linear guides 521f is jointed to the suction plate 521e.

The suction plate 521e moves to a position higher than the supporting belt 550 by driving the cylinder 521h, and receives the bonded mother substrate 90 carried by the carrying device which is not shown from the former step to the first substrate supporting portion 420, and sucks and adsorbs the bonded mother substrate 90 by a suction mechanism which is not shown to place on the supporting belt 550 of the first substrate supporting unit 521A.

The cylinder 521h has a structure of a two-stage cylinder. By controlling a pattern to put compressed air into the cylinder by an electromagnetic valve which is not shown, the suction plate 521e is selectively placed at the lowest position lower than the supporting belt 550 as shown in FIG. 85, the highest position for receiving the bonded mother substrate 90, and the intermediate position for placing the bonded mother substrate 90 on the supporting belt 550 supporting belt 550.

The pillars 145 are provided on the upper surface of the guide bases 115 held in the moving units of the pair of the guide rails 113 provided on the upper surface of the mounting structure 110. Above the pillars 145, the supporting members 143 are provided parallel to Y direction along the frames 111A and 111B of the main frame 111. The support main bodies 521a are respectively attached to two unit attachment members 141 and 142 bridging to the supporting members 143 in X direction orthogonal to the frames 111A and 111B of the main frame 111 via the junction members 146 and 147.

Figure 85:
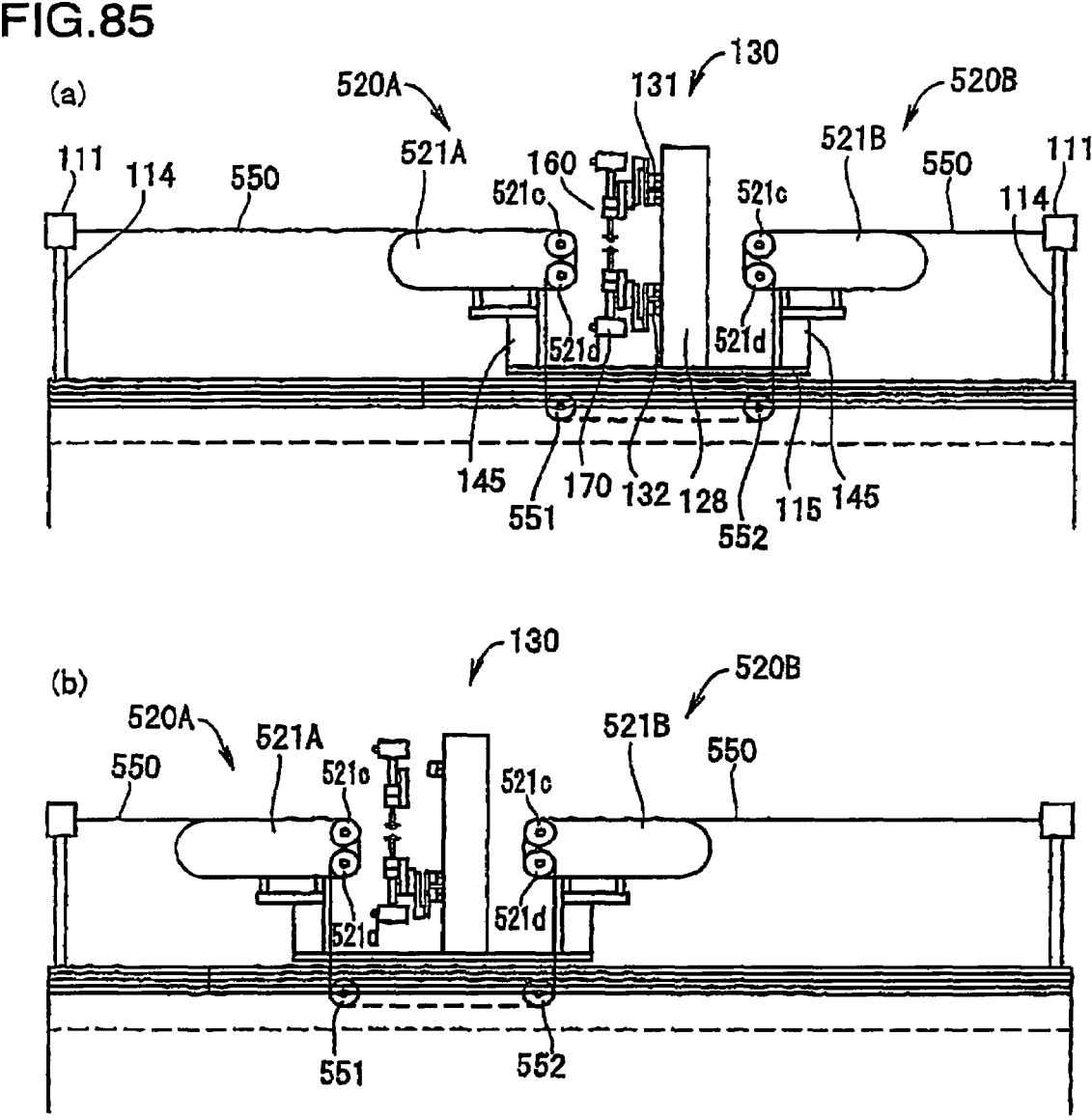
FIG. 85 is a schematic perspective view of a first substrate supporting unit of a substrate supporting device of the substrate cutting system.

FIG. 85 shows the first substrate supporting unit 521A as moved toward the substrate carry-in side with the scribing device guide body 130 and the second substrate supporting unit 521B. As shown in the portion (a) of FIG. 85 and FIG. 86 the supporting belt 550 is connected to the main frame 111 on the substrate carry-in side is supported by the belt receiver 521b of the first substrate supporting unit 521A, hung over the pulleys 521c and 521d of the first substrate supporting unit 521A, and hung over a lower pulley 551 of the first substrate supporting unit 521A and a lower pulley 552 of the second substrate supporting unit 521B. Then, the supporting belt 550 is hung over the pulleys 521d and 521c of the second substrate supporting unit 521B, supported by the belt receiver of the second substrate supporting unit 521B, and then connected to the main frame 111 on the substrate carry out side to have a tension.

The pillar 145 on the frame 111A side and the pillar 145 on the frame 111B side which support first substrate supporting units 521A are held by the guide base 115. Since the movers (not shown) of the linear motors are attached to the guide bases 115 for holding the pillars 128 which support both ends of the scribing device guide body 130, the scribing device guide body 130 is moved toward the substrate carry-in side by driving the linear motor, and the five first substrate supporting units 521A of the first substrate supporting portion 520A also move toward the substrate carry-in side.

A plurality of first substrate supporting units 521A (five in the present embodiment) are arranged with a predetermined spaces therebetween, and move in Y direction along the frames 111A and 111B of the main frame 111 together with the scribing device guide body 130.

The second substrate supporting portion 520B of the substrate supporting device 520 respectively includes, for example, the second substrate supporting units 521B which are movable in a direction same as the moving direction of the scribing device guide body 130. The second substrate supporting units 521B have similar structures as those of the first substrate supporting units 521A except for that they do not include the suction plate 521e, cylinder 521h for moving the suction plate 521e, linear guides 521f, and shafts 521g, and supported by the pillar 145 on the frame 111A side and the pillar 145 on the frame 111B side so as to be attached in an inverted direction with respect to Y direction to provide an arrangement symmetrical with respect to the scribing device guide body 130. The respective pillars are supported by the guide bases 115.

Since the movers (not shown) of the linear motors are attached to the guide bases 115 for holding the pillars 128 which support both ends of the scribing device guide body 130, the scribing device guide body 130 is moved toward the substrate carry-in side by driving the linear motor, and the five second substrate supporting units 521B of the second substrate supporting portion 520B also move toward the substrate carry-in side.

As shown in the portion (b) of FIG. 85, when the first substrate supporting unit 521A moves toward the substrate carry-in side with the scribing device guide body 130 and the second substrate supporting unit 521B, the supporting belt 550 of the first substrate supporting unit 521A sinks below the scribing device guide body 130, and the supporting belt 550 of the second substrate supporting unit 521B appears on the belt receiver 521b of the second substrate supporting unit 521B from below the scribing device guide body 130.

Further, when the second substrate supporting unit 521B moves toward the substrate carry-out side with the scribing device guide body 130 and the first substrate supporting unit 521A, the supporting belt 550 of the second substrate supporting unit 521B sinks below the scribing device guide body 130, and the supporting belt 550 of the first substrate supporting unit 521A appears on the belt receiver 521b of the first substrate supporting unit 521A from below the scribing device guide body 130.

The operation of the substrate cutting system of Embodiment 4 having such a structure will be explained with reference mainly to an example in which a bonded substrate formed by bonding large-scale glass plates is cut.

Figure 87:
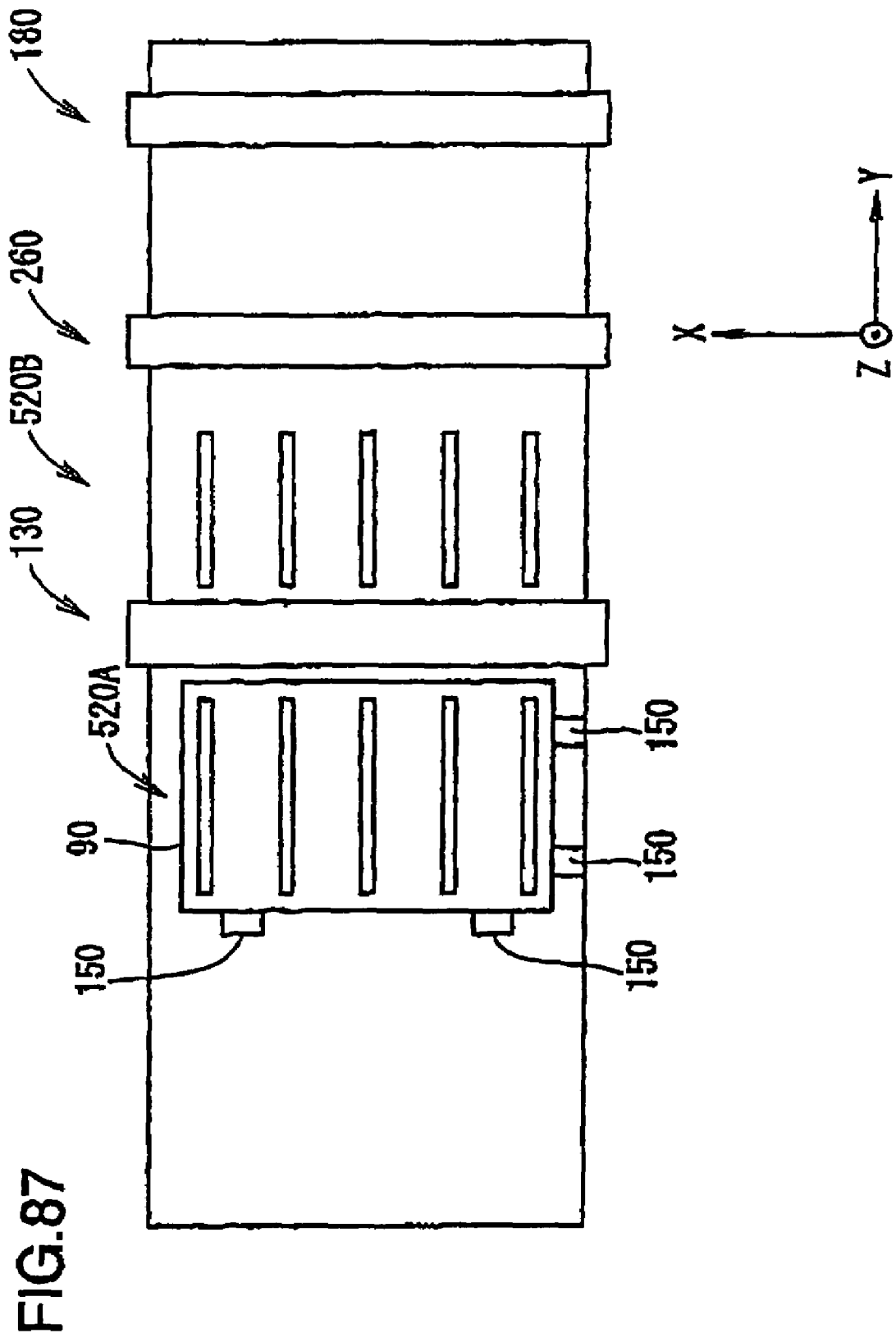
FIG. 87 is a schematic plan view for illustrating an operation of the substrate cutting system according to Embodiment 4 of the present invention.

For cutting the bonded mother substrate 90 formed by bonding large-scale glass substrates to each other into a plurality of panel substrates 90a (see FIG. 88), first, as shown in FIG. 87, the bonded mother substrate 90 is carried into the substrate cutting system by the carrying robot or the like from the end portion on the substrate carry-in side, and is placed on the supporting belts 550 of all the second substrate supporting units 521A of the first substrate supporting portion 520A in a horizontal fashion.

In such a state, as in Embodiment 2, the bonded mother substrate 90 is pressed with a pressure which is not shown so as to abut positioning pins (not shown) arranged along the frame 111B of the main frame 111. The bonded mother substrate 90 is also pressed with a pressure which is not shown so as to abut positioning pins (not shown) arranged along a direction orthogonal to the frame 111B. In this way, the bonded mother substrate 90 is positioned at a predetermined position in the housing 110 in the substrate cutting system.

Then, as shown in FIG. 87, the bonded mother substrate 90 has its side edge along the frame 111B of the main frames 111 clamped by the clamp members 151 of the clamp device 150. The side edge of the bonded mother substrate 90 on the substrate carry-in side in clamped by the clamp members 151 arranged on the substrate carry-in side so as to be orthogonal to the frame 111B.

When the side edges of the bonded mother substrate 90 which are orthogonal to each other are respectively clamped by the clamp device 150, the clamp members 151 clamping the side edges of the bonded mother substrate 90 sink approximately at the same time due to the weight of the bonded mother substrate itself. Thus, the bonded mother substrate 90 is supported supplementarily by the supporting belt 550 of all the first substrate supporting units 521A.

In such a state, the scribing device guide body 130 slide toward the substrate carry-in side so as to be at a predetermined position on a side edge of the bonded mother substrate 90 on the substrate carry-out side clamped by the clamp device 50 in a horizontal fashion. The first optical device 138 and the second optical device 139 provided on the scribing device guide body 130 move along the guide body 130 from waiting positions. Thus, the images of the first alignment mark and the second alignment mark provided on the bonded mother substrate 90 are taken.

Since the scribing device guide body 130 slides, the first substrate supporting portion 520A slides toward the substrate carry-in side, and second substrate supporting portion 520B slides toward the substrate carry-in side. At this time, the supporting belt 550 of the first substrate supporting unit 521A on the scribing device guide body 130 side sinks below the scribing device guide body 130, and the supporting belt 550 of the second substrate supporting unit 521B appears on the belt receiver 521 of the second substrate supporting unit 521B. Thus, the supporting belts 550 are not in sliding contact with the lower surface of the bonded mother substrate 90.

Next, based on the results of taking the images of the first alignment mark and the second alignment mark, angle of the bonded mother substrate 90 supported by the clamp device 150 in a horizontal fashion in a direction along the scribing device guide body 130, cutting start position and cutting end position by a calculation using an operation process device which is not shown. Based on the calculated results, the scribing device guide body 130 is moved with the upper portion substrate cutting device 160 and the lower portion substrate cutting device 170 to cut the bonded mother substrate 90 (Such an operation may be referred to as scribing or cutting by linear interpolation).

Figure 88:
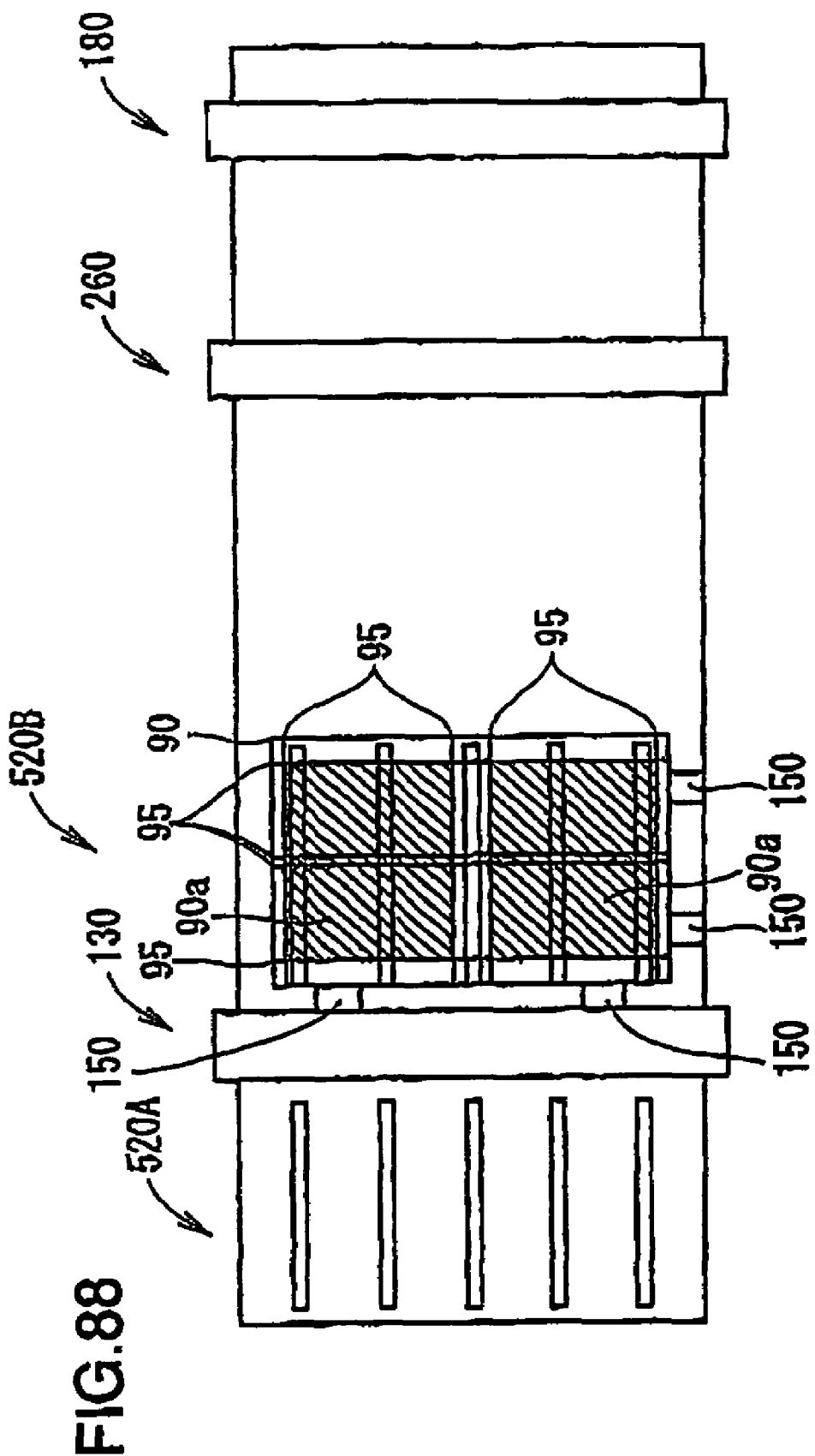
FIG. 88 is a schematic plan view for illustrating an operation of the substrate cutting system according to Embodiment 4 of the present invention.

In this example, as shown in FIG. 88, the cutter wheels 162*a* respectively opposing the front surface and the back surface of the bonded mother substrate 90 are pressed onto the front back surfaces and rotated. Thus, scribe lines 95 are formed on the front surface and the back surface of the bonded mother substrate 90.

From the bonded mother substrate 90, for example, two panel substrates 90*a* in a column direction along the upper guide rail 132 and the lower guide rail 132 are cut out for two columns. For cutting four panel displays 90*a* out of the bonded mother substrate 90, the cutter wheel 162*a* of the upper portion substrate cutting device 160 and the cutter wheel 162*a* of the lower portion substrate cutting device 170 are respectively pressed and rotated along the side edges of the panel substrates.

In this example, the cutter wheel 162*a* of the upper portion substrate cutting device 160 and the cutter wheels 162*a* of the lower portion substrate cutting device 170 generate vertical cracks in the portions of the glass substrates where the cutter wheels 162*a* rotated, and a scribe line 95 is formed. Since protrusions are formed in a predetermined pitch in peripheral edges of the blade edges of the cutter wheels 162*a*, vertical cracks having the length of about 90% of the thickness of the glass substrate in the thickness direction are formed in the glass substrates.

Further, a scribing method using a cutter head including a mechanism for periodically changing a pressure to the bonded mother substrate 90 by a scribe cutter by vibrating the scribe cutter such as a diamond point cutter, cutter wheel or the like for scribing the bonded mother substrate 90 may be effectively applied to the cutting of the bonded mother substrate 90 by the substrate cutting system of the present invention.

As a scribing method for forming scribe lines in side edge portions of the four panel substrates 90*a* for cutting four panel substrates 90*a* out of the bonded mother substrate 90 by pressing and rotating the cutter wheel 162*a* of the upper portion substrate cutting device 160 and the cutter wheel 162*a* of the lower portion substrate cutting device 170, a scribing method shown in FIGS. 56 to 58 in Embodiment 3 may be effectively applied to the substrate cutting system according to Embodiment 3 beside the scribing method shown in FIG. 81.

During a scribing process by the cutter wheels 162*a* of the upper portion substrate cutting device 160 and the lower portion substrate cutting device 170, all the first substrate supporting units 521A of the first substrate supporting portion 520A and all the second substrate supporting units 521B of the second substrate supporting portion 520B move to the substrate carry-in side and the substrate carry-out side. When they move to the substrate carry-in side, the supporting belt 550 of the first substrate supporting unit 521A on the scribing device guide body 130 side sinks below the scribing device guide body 130, and the supporting belt 550 of the second substrate supporting unit 521B appears on the belt receiver 521 of the second substrate supporting unit 521B. When they move to the substrate carry-out side, the supporting belt 550 of the second substrate supporting unit 521B sinks below the scribing device guide body 130, and the supporting belt 550 of the first substrate supporting unit 521A appears on the belt receiver 521*b* of the first substrate supporting unit 521A from below the scribing device guide body 130. Thus, there is no possibility that the supporting belts 550 are in sliding contact with the lower surface of the bonded mother substrate 90.

Figure 89:
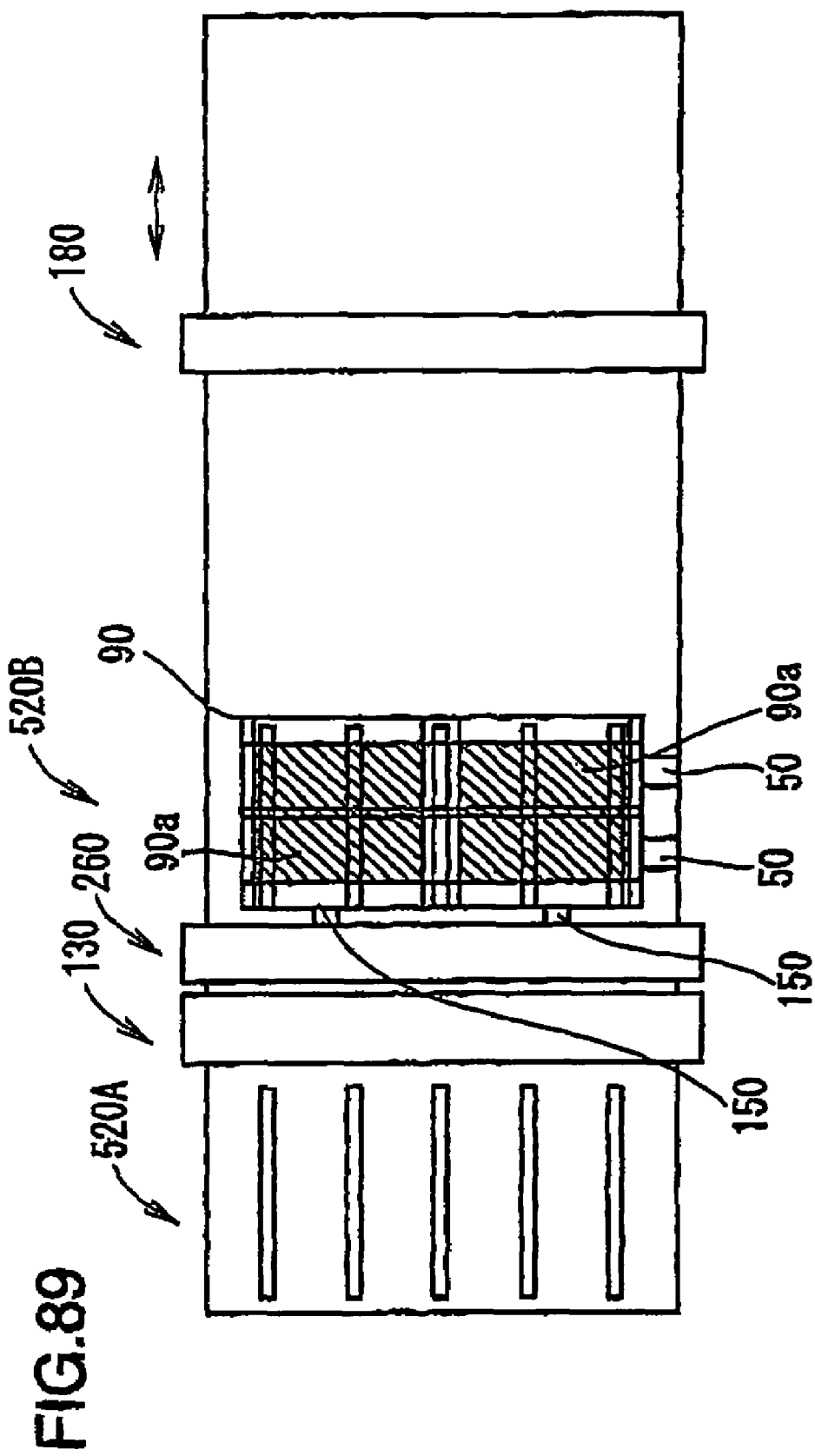
FIG. 89 is a schematic plan view for illustrating an operation of the substrate cutting system according to Embodiment 4 of the present invention.

After the scribe lines are formed on the bonded mother substrate by the above-described scribing method, as shown in FIG. 89, with the bonded mother substrate 90 on which the scribe line 95 is formed being supported by the supporting belts 550 of the second substrate supporting units 521B, the steam unit portion 260 moves toward the substrate carry-in side and blows the steam entirely on the front and back surfaces of the bonded mother substrate 90 on which the scribe lines are carved to completely cut the bonded mother substrate 90. At the same time, the water remaining on the front and back surfaces of the bonded mother substrate 90 after the steam is blown thereto is removed by the air knife 71.

By blowing the steam onto the entire front and back surface of the bonded mother substrate 90 having the scribe lines carved thereon, the scribe lines formed by the cutter wheels 162*a* experience volume expansion since the surface portions of the mother substrate 1 are heated. In this way, vertical cracks extend in the thickness direction of the mother substrate, and the bonded mother substrate 90 is completely cut.

Thereafter, as shown in FIG. 89, all the panel substrates 90*a* cut from the bonded mother substrate 90 on the supporting belts 550 of all the second substrate supporting units 521B of the second substrate supporting portion 520B are carried out by the carrying robot 240 of the substrate carry-out device 180, and thus, a cut bonded mother substrate 90' (mill end) is supported.

Then, the substrate carry-out device 180 and the steam unit portion 260 moves toward the end portion on the substrate carry-out side.

Figure 90:
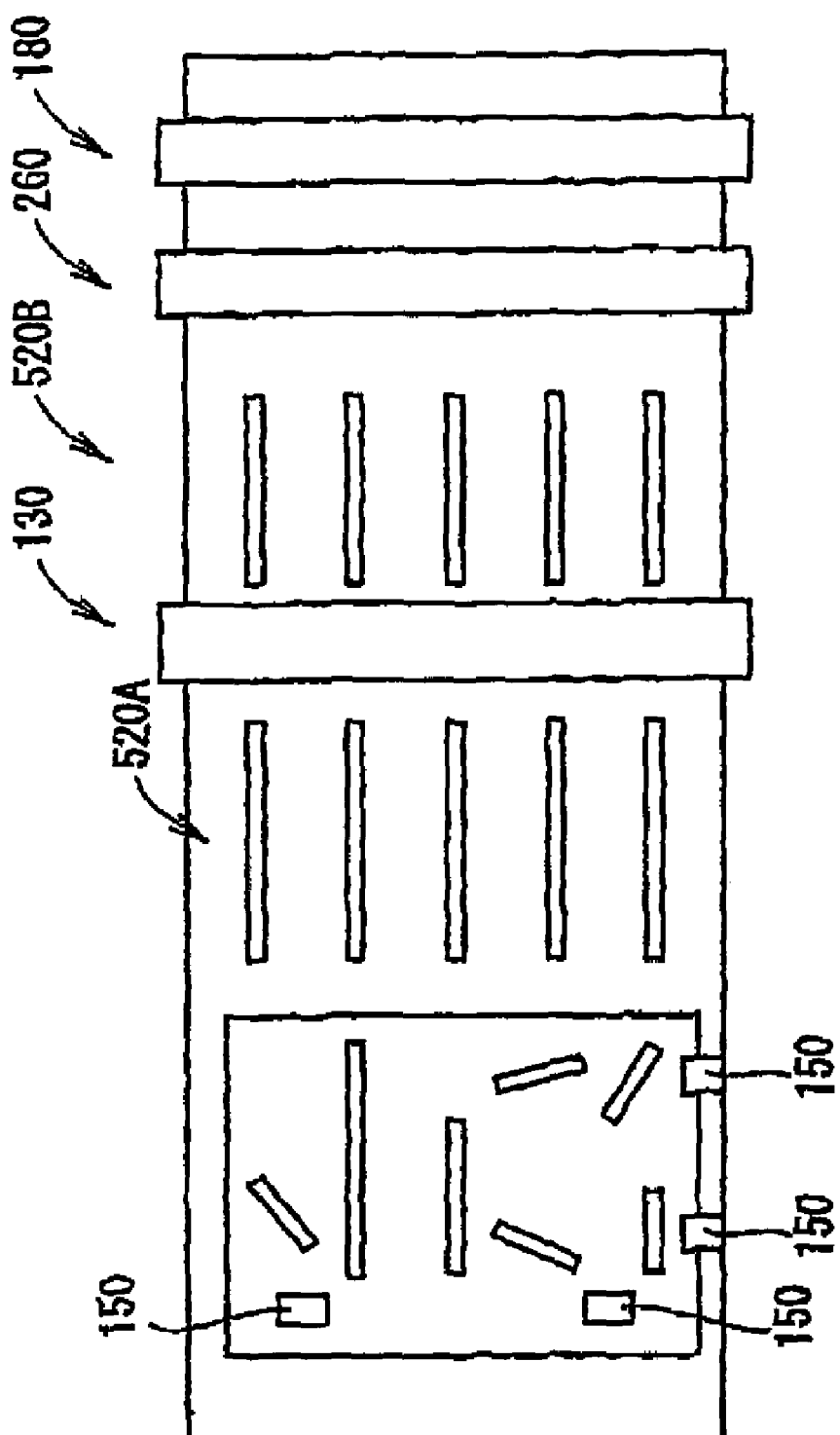
FIG. 90 is a schematic plan view for illustrating an operation of the substrate cutting system according to Embodiment 4 of the present invention.
Figure 93:
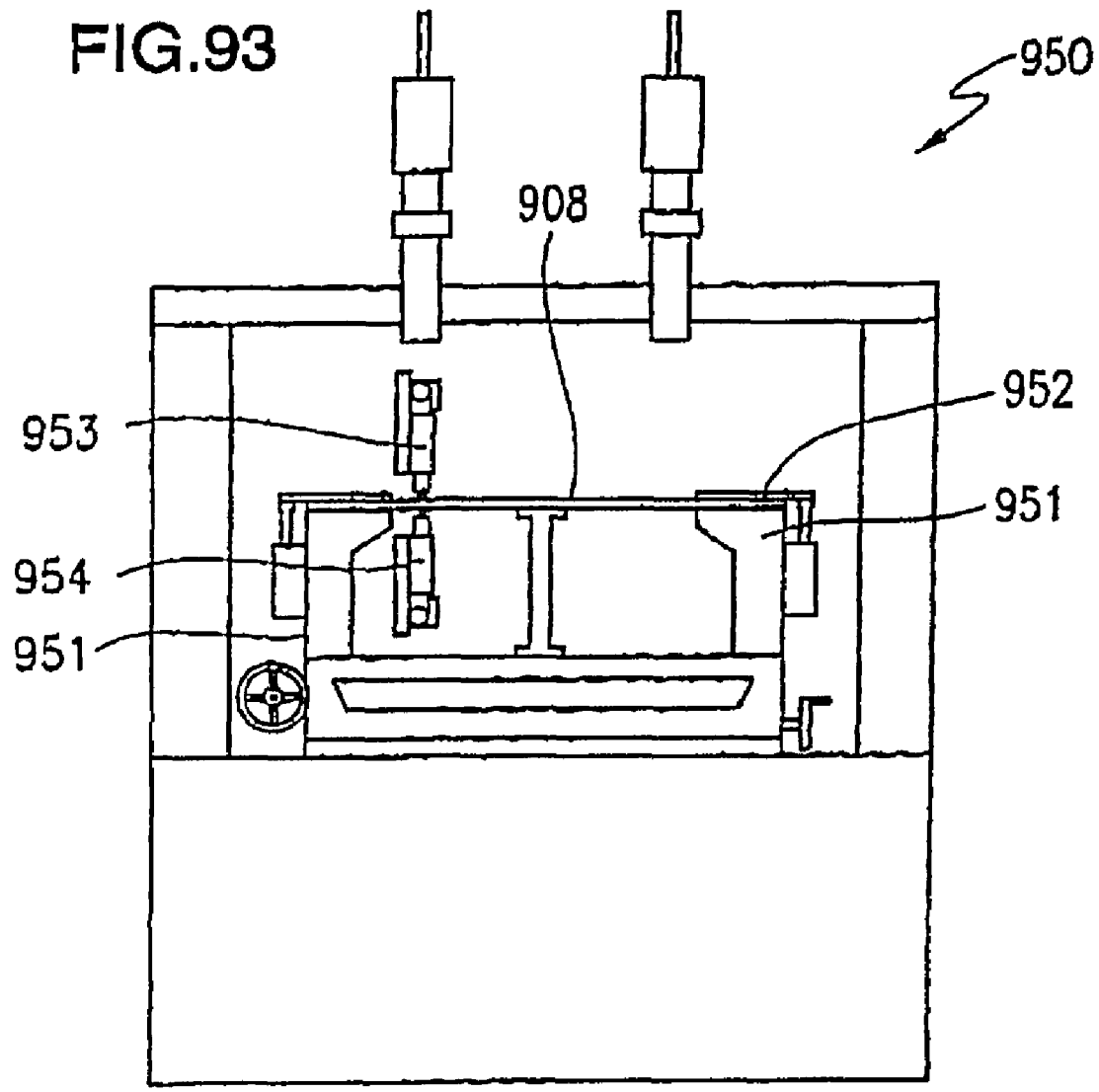
FIG. 93 is a front view showing a structure of a conventional scribing apparatus.

Thereafter, as shown in FIG. 90, the scribing device guide body 130, the second substrate supporting portion 520B and the first substrate supporting portion 520A are slid toward the substrate carry-out side. At this time, the supporting belt 550 of the second substrate supporting unit 521B on the scribing device guide body 130 side sinks below the scribing device guide body 130, and the supporting belt 550 of the first substrate supporting unit 521A appears on the belt receiver 521*b* of the first substrate supporting unit 521A from below the scribing device guide body 130. Thus, the supporting belts 550 are not in sliding contact with the lower surface of the cut bonded mother substrate 90' (mill end).

Thus, the supporting belts 550 of the first substrate supporting units 521A and the supporting belts of the second substrate supporting units 521B of the second substrate supporting portion 520 are sequentially brought into a non-contact state without being in sliding contact from the lower surface of the cut bonded mother substrate 90'. The supports of the cut bonded mother substrate 90' by the supporting belts 550 are sequentially released. Then, support of the cut bonded mother substrate 90' (mill end) by the clamp device 150 is released and the cut bonded mother substrate 90' (mill end) drops downward. In this case, the cut bonded mother substrate 90' dropped downward (mill end and cullet) is guided by a guiding plate arranged in a slanted state and is accommodated within a cullet accommodation box.

By employing the scribing method shown in FIGS. 61 to 70 in Embodiment 2 as the scribing method by the upper portion substrate cutting device 160 and the lower portion substrate cutting device 170 of the scribing device guide body 130, a cutting process of the bonded mother substrate 90 by the steam unit portion 260 may be omitted.

Further, as a method for cutting the substrate, a method in which double scribe lines are formed on the bonded mother substrates where the glass substrates, which is a type of brittle material substrate, are bonded as mother substrates has been described. However, the present invention is not limited to this. When the mother substrate is a metal substrate such as steel sheet, wood plate, a plastic substrate, and a brittle material substrate such as ceramics substrate, glass substrate, semiconductor substrate or the like, a method for cutting the substrate by using, for example, laser light, a dicing saw, a cutting blade, a diamond cutter, or the like may be used.

Furthermore, the substrates include, besides mother substrate, a bonded substrate formed by bonding the same type of mother substrates, a bonded mother substrate formed by bonding different types of mother substrates, and a substrate formed by laminating mother substrates.

Embodiment 5

A substrate manufacturing apparatus 901 shown in FIG. 91 is obtained by connecting a substrate chamfering device 700 for chamfering end surfaces of the cut substrate is connected to one of the substrate cutting systems 1, 100, 300 and 500 according to the present invention.

Substrate manufacturing apparatuses 902 and 903 shown in FIG. 92 is obtained by further incorporating an inspection system for inspecting the size, conditions of the front and back surfaces and end surfaces and the like of the cut substrates and for inspecting the functions of the substrates into the above-described substrate manufacturing apparatus 901.

In the above description of the operations of the substrate cutting systems according to Embodiments 2 to 4, examples in which the mother glass substrate formed by bonding glass substrates is cut have been described. However, the present invention is not limited to these. For example, operations different from the above description may be performed depending on the types of the substrates to be cut or in order to enhance the functionalities of the devices which form the substrate cutting system.

In the above descriptions regarding Embodiments 1 to 4, the substrate cutting systems for cutting the bonded mother substrate formed by bonding glass substrates to each other into a plurality of display panels have been described. However, the substrate which can be applied to the present invention to not limited to this.

The substrates which can be applied to the present invention include metal substrates having the mother substrates such as steel sheets, wood plates, plastic substrates and ceramic substrate, semiconductor substrates, and brittle material substrates such as glass substrates. Furthermore, the substrates include bonded substrates formed by bonding the same type of mother substrates, bonded mother substrates formed by bonding different types of mother substrates, and substrates formed by laminating mother substrates.

INDUSTRIAL APPLICABILITY

The substrate cutting system according to the present invention, as described above, holds a substrate with clamp devices and supports with substrate supporting devices which slide as a out guide body moves. Thus, it becomes possible to perform a cutting process in two directions orthogonal to each other at the same time from front and back surfaces of the substrate by setting the substrate once. This causes the entire system to be compact. Also, various substrates can be cut efficiently.

The invention claimed is:

1. A substrate cutting system comprising:
   a clamp device for gripping a side edge of a substrate and holding the substrate in a horizontal state;
   a pair of substrate cutting devices respectively being provided above and below the substrate, the pair of substrate cutting devices respectively forming a scribing line on an upper surface and a lower surface of the substrate;
   a scribing device guide body for holding each of the substrate cutting devices such that each of the substrate cutting devices is movable along the upper surface and the lower surface of the substrate in the X direction, the scribing device guide body being provided so as to be movable in the Y direction perpendicular to the X direction with respect to the clamp device;
   a first substrate supporting portion being provided on one side in the Y direction with respect to the scribing device guide body in order to support the lower surface of the substrate; and
   a second substrate supporting portion being provided on the other side in the Y direction with respect to the scribing device guide body in order to support the upper surface of the substrate;
   characterized in that
   the first substrate supporting portion and the second substrate supporting portion respectively include a plurality of first substrate supporting units and a plurality of second substrate supporting units, each of the plurality of first substrate supporting units and each of the plurality of second substrate supporting units moving in the Y direction along with the movement of the scribing device guide body in the Y direction, and a plurality of supporting belts are provided each supported by the substrate supporting units in the Y direction, and
   each of the supporting belts supports without rubbing the lower surface of the substrate, the substrate being held by the clamp device with respect to the Y direction of the first substrate supporting unit and the second substrate supporting unit along with the movement of the scribing device guide body in the Y direction.

2. A substrate cutting system according to claim 1, wherein the plurality of supporting belts are structured by a plurality of first supporting belts provided on the first substrate supporting portion and a plurality of second supporting belts provided on the second substrate supporting portion.

3. A substrate cutting system according to claim 2, wherein the first substrate supporting units are structured so as to move away from each other when the scribing device guide body moves toward the second substrate supporting portion and to move closer to each other when the scribing device guide body moves in the opposite direction, and
   the second substrate supporting units are structured so as to move away from each other when the scribing device guide body moves toward the first supporting substrate supporting portion and to move closer to each other when the scribing device guide body moves in the opposite direction.

4. A substrate cutting system according to claim 3, wherein each of the first supporting belts is supported by a first guide roller, the first guide roller being provided on each of the first substrate supporting units, and
   each of the second supporting belts is supported by a second guide roller, the second guide roller being provided on each of the second substrate supporting units.

5. A substrate cutting system according to claim 4, wherein the first substrate supporting portion includes winding means for rotating so as to wind each of the first supporting belts as the scribing device guide body approaches and to unwind each of the first supporting belts as the scribing device guide body moves away,
   one end of each of the first supporting belts is fixed to the winding means, each of the first supporting belts is wound around the first guide roller of each of the first substrate supporting units which are arranged adjacent to the scribing device guide body and extends toward an end portion where the winding means is provided, and the other end is fixed at the end portion.

6. A substrate cutting system according to claim 4, wherein the second substrate supporting portion includes winding means in an end portion on a far side with respect to the first substrate supporting portion, the winding means rotating so as to wind each of the second supporting belts as the scribing device guide body approaches and to unwind each of the second supporting belts as the scribing device guide body moves away, and one end of each of the second supporting belts is fixed to the winding means, each of the second supporting belts passes through an area below each of the second guide rollers provided on each of the second substrate supporting units, each of the second supporting belts is wound around the second guide roller of each of the second substrate supporting units arranged adjacent to the scribing device guide body and extends toward an end portion where the winding means is provided, and the other end is fixed at the end portion.

7. A substrate cutting system according to claim 2, wherein each of the first supporting belts is respectively provided on each of the first substrate supporting units so as to circulate along the Y direction, the first substrate supporting units are held by at least one guide base, the guide base integrally moving with the scribing device guide body in the Y direction, and along with the movement of the guide base in the Y direction, the first supporting belts circulate such that a portion of each of the first supporting belts for supporting the substrate moves at the same speed as that of the guide base in a direction opposite to the movement direction of the guide base.

8. A substrate cutting system according to claim 7, wherein each of the second supporting belts is respectively provided on each of the second substrate supporting units so as to circulate along the Y direction, the second substrate supporting units are held by the at least one guide base, and along with the movement of the guide base in the Y direction, the second supporting belts circulate such that a portion of each of the second supporting belts for supporting the substrate moves at the same speed as that of the guide base in a direction opposite to the movement direction of the guide base.

9. A substrate cutting system according to claim 8, further comprising:

a rack provided on a movement area of the guide base along the Y direction;

a first pinion provided on the guide base so as to rotate by engaging with the rack; and a first power transmission means for transmitting the rotation of the first pinion to a pulley provided on each of the first substrate supporting units in order to cause each of the first substrate supporting belts to circulate.

10. A substrate cutting system according to claim 9, further comprising:

a second pinion provided on the guide base so as to rotate by engaging with the rack; and a second power transmission means for transmitting the rotation of the second pinion to a pulley provided on each of the first substrate supporting units in order to cause each of the second substrate supporting belts to circulate.

11. A substrate cutting system according to claim 10, wherein a clutch is provided for blocking power to be transmitted in each of the first power transmission means and the second power transmission means.

12. A substrate cutting system according to claim 1, wherein the first substrate supporting units and the second substrate supporting units are held by at least one guide base, the at least one guide base integrally moving with the scribing device guide body in the Y direction, one end of each of the plurality of supporting belts is fixed to a frame adjacent an end portion on a far side of the first substrate supporting portion with respect to the second substrate supporting portion, the other end is fixed to the frame adjacent an end portion on a far side of the second substrate supporting portion with respect to the first substrate supporting portion, furthermore, while being respectively supported by each of the first substrate supporting units and each of the second substrate supporting units, respectively, each of the plurality of supporting belts is wound around a pulley, each of the pulleys being provided to be rotatable at an end portion of each of the first substrate supporting units and each of the second substrate supporting units, the end portion being adjacent to the scribing device guide body, and each of the plurality of supporting belts is wound around a pulley rotatably provided on the guide base so as to pass below the scribing device guide body.

13. A substrate cutting system according to claim 1, further comprising a pair of steam unit portions for respectively spraying steam on the upper surface and the lower surface of the substrate, the scribing line being formed on the upper surface and the lower surface.

14. A substrate cutting system according to claim 1, wherein the substrate cutting device includes:

a pair of cutting wheels, the pair of cutting wheels being pressed and contacted onto the upper surface and the lower surface of the substrate, respectively, and forming a scribing line on the upper surface and the lower surface of the substrate, respectively; and a pair of energizing means for pressing and contacting the pair of the cutter wheels onto the upper surface and the lower surface of the substrate, respectively.

15. A substrate cutting system according to claim 14, wherein each of the pair of the energizing means has a servo motor.

16. A substrate cutting system according to claim 1, wherein the clamp device is provided so as to be movable in an upper and lower direction.

17. A substrate cutting system according to claim 1, wherein the substrate is a brittle material substrate.

18. A substrate cutting system according to claim 1, wherein the substrate is a bonded substrate for which a pair of brittle material substrate is bonded.

* * * * *

UNITED STATES PATENT AND TRADEMARK OFFICE
CERTIFICATE OF CORRECTION

PATENT NO. : 7,426,883 B2  
APPLICATION NO. : 10/535871  
DATED : September 23, 2008  
INVENTOR(S) : Nishio et al.

Page 1 of 1

It is certified that error appears in the above-identified patent and that said Letters Patent is hereby corrected as shown below:

On the Title Page

Item [73] Assignee: insert --MITSUBOSHI DIAMOND INDUSTRIAL CO., LTD.--.

Signed and Sealed this

Fifth Day of May, 2009

JOHN DOLL  
*Acting Director of the United States Patent and Trademark Office*